US011716525B2

(12) United States Patent
Shimizu et al.

(10) Patent No.: US 11,716,525 B2
(45) Date of Patent: Aug. 1, 2023

(54) VEHICLE WINDSHIELD CAMERA MODULE

(71) Applicant: DENSO CORPORATION, Kariya (JP)

(72) Inventors: Nobuhisa Shimizu, Kariya (JP); Yasuki Furutake, Kariya (JP); Kensuke Chikata, Kariya (JP); Kazuma Yamaguchi, Kariya (JP); Yoichi Kajino, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/363,124

(22) Filed: Mar. 25, 2019

(65) Prior Publication Data

US 2019/0222727 A1 Jul. 18, 2019

Related U.S. Application Data

(63) Continuation of application No. 15/956,170, filed on Apr. 18, 2018, now Pat. No. 10,291,830, which is a (Continued)

(30) Foreign Application Priority Data

| | | | |
|---|---|---|---|
| Apr. 3, 2017 | (JP) | .................................. | 2017-73643 |
| Sep. 4, 2017 | (JP) | .................................. | 2017-169804 |
| Nov. 1, 2017 | (JP) | .................................. | 2017-212156 |
| Nov. 6, 2017 | (JP) | .................................. | 2017-214140 |

(51) Int. Cl.
*H04N 5/225* (2006.01)
*H04N 23/54* (2023.01)
(Continued)

(52) U.S. Cl.
CPC ............. *H04N 23/54* (2023.01); *B60R 11/04* (2013.01); *G02B 13/0045* (2013.01); *G02B 13/04* (2013.01); *G02B 13/18* (2013.01); *G03B 17/02* (2013.01); *G03B 17/12* (2013.01); *G03B 17/55* (2013.01); *H04N 23/51* (2023.01);
(Continued)

(58) Field of Classification Search
None
See application file for complete search history.

(56) References Cited

U.S. PATENT DOCUMENTS

| | | | |
|---|---|---|---|
| 9,871,971 | B2 | 1/2018 | Wang et al. |
| 10,175,560 | B2 | 1/2019 | Furutake et al. |

(Continued)

FOREIGN PATENT DOCUMENTS

| | | | |
|---|---|---|---|
| JP | 2001-124970 | A | 5/2001 |
| JP | 2006-251058 | A | 9/2006 |

(Continued)

OTHER PUBLICATIONS

U.S. Appl. No. 16/375,679, filed Apr. 4, 2019, Furutake, et al.
(Continued)

*Primary Examiner* — Twyler L Haskins
*Assistant Examiner* — Wesley J Chiu
(74) *Attorney, Agent, or Firm* — Maschoff Brennan

(57) ABSTRACT

A camera module, which is mounted on an inside of a front windshield of a vehicle and to image an external environment of the vehicle, includes a lens unit and an imager to image the external environment by forming an optical image, which is from the external environment through the lens unit.

33 Claims, 66 Drawing Sheets

Related U.S. Application Data continuation-in-part of application No. 15/828,125, filed on Nov. 30, 2017, now Pat. No. 11,150,448.

(51) Int. Cl.

| | |
|---|---|
| ***G02B 13/04*** | (2006.01) |
| ***G03B 17/12*** | (2021.01) |
| ***G02B 13/18*** | (2006.01) |
| ***G03B 17/55*** | (2021.01) |
| ***B60R 11/04*** | (2006.01) |
| ***G03B 17/02*** | (2021.01) |
| ***G02B 13/00*** | (2006.01) |
| ***H04N 23/51*** | (2023.01) |
| ***H04N 23/698*** | (2023.01) |
| *B60R 11/00* | (2006.01) |
| *G03B 17/56* | (2021.01) |
| *G03B 11/04* | (2021.01) |

(52) U.S. Cl.

CPC .... *H04N 23/698* (2023.01); *B60R 2011/0026* (2013.01); *B60R 2011/0063* (2013.01); *G03B 11/04* (2013.01); *G03B 11/045* (2013.01); *G03B 17/561* (2013.01)

(56) References Cited

U.S. PATENT DOCUMENTS

| | | | | |
|---|---|---|---|---|
| 10,291,830 | B2 | 5/2019 | Shimizu et al. | |
| 2004/0032668 | A1 | 2/2004 | Schaefer et al. | |
| 2005/0104995 | A1 | 5/2005 | Spryshak | |
| 2006/0038668 | A1 | 2/2006 | DeWard et al. | |
| 2006/0266835 | A1 | 11/2006 | Tanida | |
| 2007/0263090 | A1 | 11/2007 | Abe | |
| 2009/0041452 | A1 | 2/2009 | Yoneji | |
| 2009/0079863 | A1* | 3/2009 | Aoki | H04N 5/2254 348/374 |
| 2009/0295181 | A1 | 12/2009 | Lawlor et al. | |
| 2010/0277935 | A1 | 11/2010 | Endo et al. | |
| 2011/0163904 | A1 | 7/2011 | Alland et al. | |
| 2011/0216197 | A1 | 9/2011 | Mulin et al. | |
| 2012/0155855 | A1 | 6/2012 | Okuda | |
| 2012/0207461 | A1 | 8/2012 | Okuda | |
| 2013/0093584 | A1 | 4/2013 | Schumacher | |
| 2014/0016919 | A1 | 1/2014 | Okuda | |
| 2014/0160284 | A1 | 6/2014 | Achenbach et al. | |
| 2014/0211009 | A1 | 7/2014 | Fursich | |
| 2014/0226012 | A1 | 8/2014 | Achenbach | |
| 2015/0015713 | A1* | 1/2015 | Wang | H04N 7/18 348/148 |
| 2015/0030319 | A1 | 1/2015 | Matori | |
| 2015/0036363 | A1 | 2/2015 | Fleskens | |
| 2015/0042798 | A1 | 2/2015 | Takeda | |
| 2015/0042804 | A1 | 2/2015 | Okuda | |
| 2015/0042874 | A1* | 2/2015 | Takeda | B60R 11/04 348/374 |
| 2015/0103417 | A1 | 4/2015 | Nomura et al. | |
| 2015/0109447 | A1 | 4/2015 | Okuda | |
| 2015/0130974 | A1* | 5/2015 | Chuang | H04N 5/2257 348/262 |
| 2015/0207967 | A1 | 7/2015 | Fritz et al. | |
| 2015/0256729 | A1 | 9/2015 | Wato | |
| 2015/0264230 | A1* | 9/2015 | Takeda | G01B 11/26 348/95 |
| 2015/0273799 | A1* | 10/2015 | Takama | H04N 5/2252 348/373 |
| 2015/0312456 | A1 | 10/2015 | Bauer et al. | |
| 2015/0327398 | A1* | 11/2015 | Achenbach | B60R 1/00 348/148 |
| 2015/0340640 | A1 | 11/2015 | Kang | |
| 2015/0353024 | A1 | 12/2015 | Cooper | |
| 2015/0358511 | A1 | 12/2015 | Jung | |
| 2016/0023620 | A1 | 1/2016 | Matori | |
| 2016/0033621 | A1* | 2/2016 | Ottenhues | G01S 7/032 342/175 |
| 2016/0039358 | A1 | 2/2016 | Okuda et al. | |
| 2016/0180178 | A1 | 6/2016 | Nakamura et al. | |
| 2016/0307953 | A1 | 10/2016 | Kono et al. | |
| 2016/0381292 | A1* | 12/2016 | Lu | H04N 5/2258 348/36 |
| 2017/0064877 | A1 | 3/2017 | Ratcliffe | |
| 2017/0217369 | A1 | 8/2017 | Endo et al. | |
| 2017/0295306 | A1* | 10/2017 | Mleczko | H05K 5/0034 |
| 2017/0305361 | A1 | 10/2017 | Okuda et al. | |
| 2017/0310952 | A1 | 10/2017 | Adomat et al. | |
| 2017/0334364 | A1 | 11/2017 | Usami et al. | |
| 2018/0284398 | A1 | 10/2018 | Furutake et al. | |
| 2018/0284399 | A1 | 10/2018 | Furutake et al. | |
| 2018/0284400 | A1 | 10/2018 | Furutake et al. | |
| 2018/0284577 | A1 | 10/2018 | Furutake et al. | |
| 2018/0288291 | A1 | 10/2018 | Shimizu et al. | |
| 2018/0307122 | A1* | 10/2018 | Sugiyama | G06F 1/1686 |
| 2018/0338070 | A1* | 11/2018 | Sigle | H04N 23/54 |
| 2019/0094660 | A1 | 3/2019 | Furutake et al. | |
| 2019/0361153 | A1* | 11/2019 | Wang | G02B 13/001 |
| 2019/0373142 | A1* | 12/2019 | Fujiwara | H04N 23/54 |

FOREIGN PATENT DOCUMENTS

| | | | |
|---|---|---|---|
| JP | 2009-120135 | A | 6/2009 |
| JP | 2011-165004 | A | 8/2011 |
| JP | 2015-000713 | A | 1/2015 |
| JP | 5761100 | B2 | 8/2015 |
| JP | 5316562 | B2 | 10/2016 |
| WO | WO 2013/123161 | A1 | 8/2013 |

OTHER PUBLICATIONS

U.S. Appl. No. 16/393,172, filed Apr. 24, 2019, Furutake, et al.
U.S. Appl. No. 15/842,163, filed Dec. 14, 2017, Chikata, et al.
U.S. Appl. No. 15/828,125 and its entire file history, filed Nov. 30, 2017, Furutake, et al.
U.S. Appl. No. 15/956,072 and its entire file history, filed Apr. 18, 2018, Furutake, et al.
U.S. Appl. No. 15/956,170 and its entire file history, filed Apr. 18, 2018, Shimizu, et al.
U.S. Appl. No. 15/956,164 and its entire file history, filed Apr. 18, 2018, Furutake, et al.
U.S. Appl. No. 15/956,087 and its entire file history, filed Apr. 18, 2018, Furutake, et al.
U.S. Appl. No. 16/203,985 and its entire file history, filed Nov. 29, 2018, Furutake, et al.

* cited by examiner

VEHICLE WINDSHIELD CAMERA MODULE

CROSS REFERENCE TO RELATED APPLICATION

This application is a continuation application of U.S. patent application Ser. No. 15/956,170, filed on Apr. 18, 2018, which is a continuation-in-part application of U.S. patent application Ser. No. 15/828,125, filed Nov. 30, 2017, which claims the benefit of Japanese Patent Applications No. 2017-73643 filed on Apr. 3, 2017, No. 2017-169804 filed on Sep. 4, 2017, No. 2017-212156 filed on Nov. 1, 2017, and No. 2017-214140 filed on Nov. 6, 2017, the disclosure of which is incorporated herein by reference in their entirety. Also, any applications for which a foreign or domestic priority claim is identified in the Application Data Sheet as filed with the present application are hereby incorporated by reference under 37 CFR 1.57.

TECHNICAL FIELD

The present disclosure relates to a camera module.

BACKGROUND

Conventionally, camera modules, which are installed on the inside of a windshield of a vehicle and are configured to image an external environment of the vehicle, have been widely known. One of the foregoing camera modules has been disclosed in Patent Literature 1.

(Patent Literature 1)

Publication of Japanese Patent No. 5316562

SUMMARY

The present disclosure produces a camera module with a new configuration.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
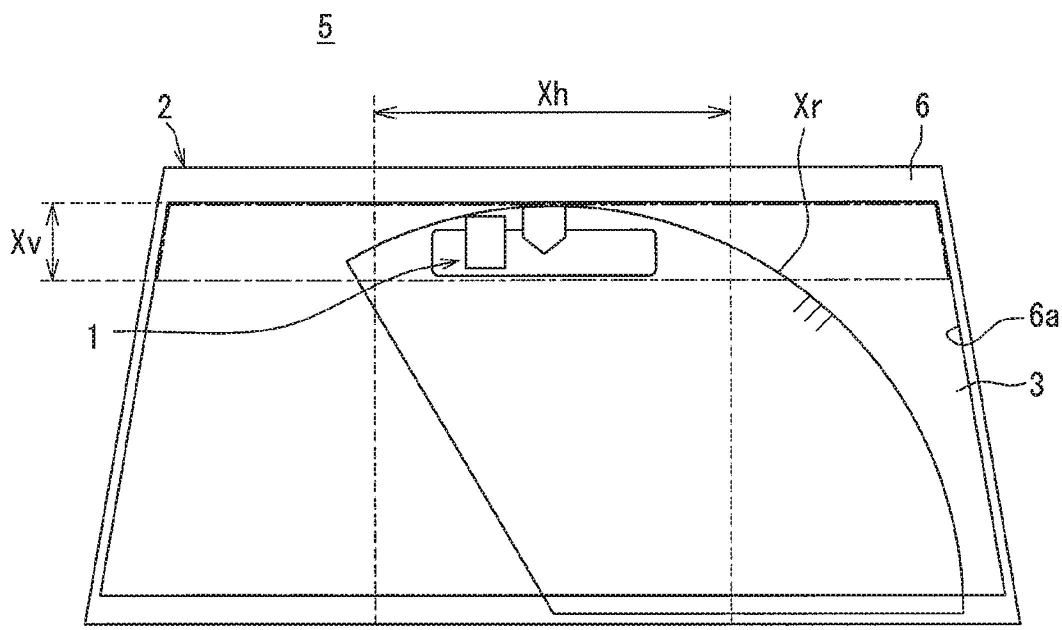
FIG. 1 is a front view illustrating a vehicle to which a camera module is applied according to a first embodiment.

Hereinafter, an outline of the present disclosure will be described.

One type of camera modules of the present disclosure is disclosed in Japanese Patent Literature 1, in which light from an external environment enters a vehicle camera through a lens thereby to image the external environment.

In recent years, for advanced driving assisting or self-driving of a vehicle, camera modules have been required to image a wide range of an external environment to recognize images. In particular, in a state where the vehicle is close to a traffic signal, imaging of the traffic signal above the vehicle is required to enable its image recognition.

To meet the above requirement, it is conceivable to employ a technique of imaging the external environment through a wide angle lens having a wide angle of view. However, in order to secure a brightness and a resolution in imaging of the external environment through the wide angle lens to enable image recognition, increase in size of the wide angle lens is required. As a result, the size of the camera module including the wide angle lens increases in size. Therefore, a concern arises that the large-sized camera module interferes with a field of view of the external environment for a vehicle occupant behind a windshield.

In a case where an outside imaging target range is enlarged by using, for example, a wide angle lens or the like, image processing of an output from the vehicle camera increases. As a result, due to the increase in image processing, heat generation also increases on a circuit board of a circuit that processes the output from the vehicle camera for image processing. Therefore, it is conceivable to enhance a radiation property. In addition, due to the increase in image processing, the circuit board of the image processing circuit, which is for the output from the vehicle camera, is further adapted to progress in the higher-speed and higher-frequency, and consequently, noise further increases. As a result, it is conceivable to enhance electromagnetic compatibility (EMC: Electro-Magnetic Compatibility).

Incidentally, as a lens angle of view becomes wider, excess light incident on the lens further increases. For this reason, it is conceivable to employ a hood. However, in a case where the hood is merely formed at a size comparable to the angle of view of the lens, the camera module including the hood increases in size, resulting in a concern that the large-sized camera module interferes with the field of view of the external environment for the vehicle occupant behind the windshield.

As described above, one object of the present disclosure is to provide a camera module having a novel structure capable of imaging the external environment to enable image recognition.

Another object of the present disclosure is to provide a compact camera module including a wide angle lens.

Still another object of the present disclosure is to provide a camera module with a high thermal radiation property. Yet still another object of the present disclosure is to provide a camera module with a high EMC.

Yet still another object of the present disclosure is to provide a compact camera module including a hood.

Hereinafter, a technical measure of the present disclosure will be described. It should be noted that reference numerals in parentheses described in this column indicate correspondence with specific means described in embodiments to be described in detail later and do not limit the technical scope of the present disclosure.

According to a first aspect of the present disclosure, a camera module (1) is configured to be mounted to an inside of a windshield (3) of a vehicle (2) and to image an external environment (5) of the vehicle. The camera module comprises a lens unit (33) including a wide angle lens (36, 2036). The camera module further comprises an imager (34) to image the external environment by forming thereon an optical image from the external environment through the lens unit. The wide angle lens has a wide angle optical surface (360, 2360) on an external environment side. The wide angle optical surface on an upper side of an optical axis (Aw) of the wide angle lens is larger in size than that on a lower side of the optical axis.

According to the lens unit of the first aspect, the wide angle lens forms the optical image, which is from the external environment of the vehicle, on the imager. In the wide angle lens, the size of the wide angle optical surface of the wide angle lens on the external environment side is larger on the upper side of the optical axis than on the lower side of the optical axis. According to the configuration, the size of the wide angle optical surface on the upper side of the optical axis, which unlikely reflects the vehicle, is larger than that on the lower side of the optical axis which likely reflects the vehicle. Therefore, on the upper side where the size of the wide angle optical surface becomes larger, the upper side range of the external environment above the vehicle can be imaged to enable image recognition. On the other hand, on the lower side where the imaging target range of the external environment is restricted due to the vehicle, even though the size of the wide angle optical surface becomes small, imaging within that range can be secured, and thereby to enable downsizing of the camera module.

According to a second aspect of the present disclosure, a camera module (1) is configured to be mounted to an inside of a windshield (3) of a vehicle (2) and to image an external environment (5) of the vehicle. The camera module comprises a lens unit (33) configured by a combination of a wide angle lens (36, 2036) in front of a rear lens (371, 372, 373, 374, 375) and on an external environment side. The camera module further comprises an imager (34) to image the external environment by forming thereon an optical image from the external environment through the lens unit. The wide angle lens has a wide angle optical surface (360, 2360) on the external environment side. The wide angle optical surface on an upper side of an optical axis (A1) of the rear lens is larger in size than that on a lower side of the optical axis of the rear lens, the optical axis passing through a principal point (Pp) of the wide angle lens.

According to the lens unit of the second aspect, the wide angle lens forms the optical image, which is from the external environment of the vehicle, on the imager. The optical axis in the rear lens passes through the principal point of the wide angle range. In the wide angle lens, the size of the wide angle optical surface on the external environment side is larger on the upper side of the optical axis than on the lower side of the optical axis. According to the configuration, the size of the wide angle optical surface on the upper side of the optical axis, which unlikely reflects the vehicle, is larger than that on the lower side of the optical axis which likely reflects the vehicle. Therefore, the configuration enables to image the upper side range of the external environment above the vehicle on the upper side, where the size of the wide angle optical surface becomes larger, to enable image recognition. On the other hand, on the lower side where the imaging target range of the external environment is restricted due to the vehicle, even though the size of the wide angle optical surface becomes small, imaging within that range can be secured. In this way, downsizing of the camera module can be enabled.

According to a third aspect of the present disclosure, a camera module (1) is configured to be mounted to an inside of a windshield (3) of a vehicle (2) and to image an external environment (5) of the vehicle. The camera module comprises a lens unit (33) including a wide angle lens (36, 2036). The camera module further comprises an imager (34) to image the external environment by forming thereon an optical image from the external environment through the lens unit. The wide angle lens has a wide angle optical surface (360, 2360) on an external environment side. A geometric center (Cwg) of the wide angle optical surface is shifted toward an upper side of the optical axis (Aw) of the wide angle lens.

According to the lens unit of the third aspect, the wide angle lens forms the optical image, which is from the external environment of the vehicle, on the imager. In the wide angle lens, the geometric center of the wide angle optical surface on the external environment side is shifted toward the upper side of the optical axis. According to the configuration, the geometric center of the wide angle optical surface is shifted not toward the lower side of the optical axis, which likely reflects the vehicle, but toward the upper side of the optical axis which unlikely reflects the vehicle. Therefore, on the upper side where the size of the wide angle optical surface becomes larger than that on the lower side according to the shift amount of the geometric center, the upper side range of the external environment than the vehicle can be imaged to enable image recognition. On the other hand, on the lower side where the imaging target range of the external environment is restricted due to the vehicle, even though the size of the wide angle optical surface decreases according to the shift amount of the geometric center, imaging in the range can be secured. In this way, downsizing of the camera module can be enabled.

According to a fourth aspect of the present disclosure, a camera module (1) is configured to be mounted to an inside of a windshield (3) of a vehicle (2) and to image an external environment (5) of the vehicle. The camera module comprises a lens unit (33) configured by a combination of a wide angle lens (36, 2036) in front of a rear lens (371, 372, 373, 374, 375) and on an external environment side. The camera module further comprises an imager (34) to image the external environment by forming thereon an optical image from the external environment through the lens unit. The wide angle lens has a wide angle optical surface (360, 2360) on the external environment side. A geometric center (Cwg) of the wide angle optical surface is shifted toward an upper side of the optical axis (A1) of the rear lens, the optical axis passing through a principal point (Pp) of the wide angle lens.

According to the lens unit of the fourth aspect, the wide angle lens forms the optical image, which is from the external environment of the vehicle, on the imager. The optical axis of the rear lens passes through the principal point of the wide angle lens. In the wide angle lens, the geometric center of the wide angle optical surface on the external environment side is shifted toward the upper side of the optical axis of the rear lens. According to the configuration, the geometric center of the wide angle optical surface is shifted not toward the lower side of the optical axis, which likely reflects the vehicle, but toward the upper side of the optical axis which unlikely reflects the vehicle. Therefore, on the upper side where the size of the wide angle optical surface becomes larger than that on the lower side according to the shift amount of the geometric center, the upper side range of the external environment than the vehicle can be imaged to enable image recognition. On the other hand, on the lower side where the imaging target range of the external environment is restricted due to the vehicle, even though the size of the wide angle optical surface decreases according to the shift amount of the geometric center, imaging in the range can be secured. In this way, downsizing of the camera module can be enabled.

According to a fifth aspect of the present disclosure, a camera module (1) is configured to be mounted to an inside of a windshield (3) of a vehicle (2) and to image an external environment (5) of the vehicle. The camera module comprises a lens unit (33) through which an optical image from the external environment enters. The camera module further comprises an imager (34) to image the external environment by forming the optical image thereon through the lens unit. The camera module further comprises a circuit unit (3050, 4050, 7050) configured by combination of an imaging board (51, 7051), on which an imaging circuit (52) to implement image processing on an output from the imager is mounted, with a flexible board (3053, 4053) connected to the imaging board. The camera module further comprises a metal camera casing (3020, 5020, 6020) accommodating the circuit unit and connected to the flexible board.

According to the circuit unit of the fifth aspect, the flexible board, which is accommodated in and connected to the metal camera casing, is connected to the imaging board on which the imaging circuit for image processing is mounted. According to the configuration, at least one of heat or noise generated in the imaging board can be transmitted to the camera casing through the flexible board. Therefore, at least one of a thermal radiation property or an EMC can be enhanced.

According to a sixth aspect of the present disclosure, a camera module (1) is configured to be mounted to an inside of a windshield (3) of a vehicle (2) and to image an external environment (5) of the vehicle. The camera module comprises a lens unit (33) through which an optical image from the external environment enters. The camera module further comprises an imager (34) to image the external environment by forming the optical image thereon through the lens unit. The camera module further comprises an imaging board (7051) on which an imaging circuit (52) to implement image processing on an output from the imager is mounted. The camera module further comprises a holder (7031) defining a space (7310) accommodating the imaging board and filled with a filler (7038) having a specific property, the specific property being at least one of a thermal radiation property or a conductivity in the space. The camera module further comprises a metal camera casing (3020) accommodating the holder and connected to the filler.

According to the sixth aspect, the partitioned space of the holder accommodates the imaging board on which the imaging circuit for image processing is mounted. The partitioned space of the holder is filled with the filler, which is connected to the metal camera casing. The filler has the specific property which is at least one of a thermal radiation property or a conductivity. According to the configuration, at least one of heat or noise generated in the imaging board can be transmitted to the camera casing through the filler. Therefore, at least one of the thermal radiation property or an EMC can be enhanced.

According to a seventh aspect of the present disclosure, a camera module (1) is configured to be mounted to an inside of a windshield (3) of a vehicle (2) and to image an external environment (5) of the vehicle. The camera module comprises a lens unit (33) through which an optical image from the external environment enters. The camera module further comprises an imager (34) to image the external environment by forming the optical image thereon through the lens unit. The camera module further comprises an imaging board (7051) on which an imaging circuit (52) to implement image processing on an output from the imager is mounted. The camera module further comprises a holder (7031) holding the imaging board. The camera module further comprises a metal camera casing (3020) accommodating the lens unit and the holder and adhered to at least one of the lens unit or the holder with an adhesive (8039), the adhesive connected to the imaging board and having a specific property, the specific property being at least one of a thermal radiation property or a conductivity.

According to the seventh aspect, the adhesive having the specific property, which is at least one of the thermal radiation property or the conductivity, adheres to at least one of the lens unit or the assembly holder, which is accommodated in the metal camera casing, in a connection state with the imaging board on which the imaging circuit for image processing is mounted. According to the configuration, at least one of heat or noise generated in the imaging board can be transmitted to the camera casing through the adhesive. Therefore, at least one of a thermal radiation property or an EMC can be enhanced.

According to an eighth aspect of the present disclosure, a camera module (1) is configured to be mounted to an inside of a windshield (3) of a vehicle (2) and to image an external environment (5) of the vehicle. The camera module comprises a lens unit (33) through which an optical image from the external environment enters. The camera module further comprises an imager (34) to image the external environment by forming the optical image thereon through the lens unit. The camera module further comprises a hood (9040, 10040, 11040, 12040, 17040) to restrict incidence of light on the lens unit from the external environment outside an imaging target range of the imager. Under a definition that an imaginary intersection (I1) is a point, at which a lower light ray (L1) imaginarily intersects with the windshield, that the lower light ray is incident on the lens unit at a taper angle (θ1) within the imaging target range, and that the taper angle defines a horizontal angle of view range which is smaller than that of the lens unit, the hood includes a base wall portion (9041, 41), which is to be located to face the windshield across an imaging space (410) in which the optical image within the imaging target range is led to the lens unit, and a side wall portion (9043, 10043, 11043, 12043), which is raised from the base wall portion on a lateral side of the imaging space and is formed to spread from a periphery of the lens unit toward the imaginary intersection.

According to the hood of the eighth aspect, light outside the imaging target range of the imager in the external environment can be restricted from being incident on the lens unit. The configuration enables to restrict the light from being superimposed on a normal optical image within the imaging target range and from interfering with the imaging.

In particular, according to the hood of the eighth aspect, the base wall portion is located so as to face the windshield across the imaging space. The side wall portions are raised from the base wall portion and on the lateral sides of the imaging space. In the vehicle, the side wall portions spread from the periphery of the lens unit toward the imaginary intersection. According to the configuration, even though the hood is formed small, the side wall portions unlikely block incidence of the lower light ray that intersects with the windshield at the imaginary intersection, wherein the lower light ray is incident at the taper angle defining the horizontal angle of view range, which is smaller than that of the lens unit, in the imaging target range. Therefore, the camera module, which includes the hood that secures the taper angle and is capable of capturing the normal optical image, can be reduced in size.

According to a ninth aspect of the present disclosure, a camera module (1) is configured to be mounted to an inside of a windshield (3) of a vehicle (2) and to image an external environment (5) of the vehicle. The camera module comprises a lens unit (33) through which an optical image from the external environment enters. The camera module further comprises an imager (34) to image the external environment by forming the optical image thereon through the lens unit. The camera module further comprises a hood (18040, 19040) to restrict incidence of light on the lens unit from the external environment outside an imaging target range of the imager. The hood includes a base wall portion (9041), which is to be located to face the windshield across an imaging space (410) in which the optical image within the imaging target range is led to the lens unit, and a side wall portion (18043), which is raised from the base wall portion on a lateral side of the imaging space. Under a definition that an imaginary plane (Si) imaginarily extends along a horizontal direction and includes an optical axis (Aw, A1) of the lens unit, the side wall portion is formed at a height to avoid an edge of a lens angle of view (Ow) of the lens unit on the imaginary plane.

According to the hood of the ninth aspect, light outside the imaging target range of the imager in the external environment is restricted from being incident on the lens unit. The configuration enables to restrict light from being superimposed on the normal optical image within the imaging target range and from interfering with the imaging.

In particular, according to the hood of the ninth aspect, the base wall portion is located to face the windshield across the imaging space. The side wall portion is raised from the base wall portion and is on the lateral side of the imaging space. The side wall portion is formed at the height on the imaginary plane to avoid the edge of the lens angle of view of the lens unit. According to the configuration, even though the hood is formed small, at least incidence of the optical image within the imaging target range is unlikely blocked on the imaginary plane and on the windshield side (that is, the upper side) of the imaginary plane. The imaginary plane imaginarily extends along the horizontal direction to include the optical axis of the lens unit. Therefore, the camera module including the hood, which is capable of capturing the normal optical image in the lens angle of view, can be reduced in size.

According to a tenth aspect of the present disclosure, a camera module (20001) is configured to be mounted to an inside of a windshield (3) of a vehicle (2). The camera module comprises a wide angle lens (20036) located at a position capable of capturing an image of an outside of the vehicle from an inside of the windshield. The camera module further comprises a hood (20040) to restrict light, which is from a vehicle interior of the vehicle is reflected on an inside of the windshield, from entering the wide angle lens. The hood includes two side wall portions (20043) raised toward the windshield in a state where being mounted to the inside of the windshield. A height of the side wall portions in the vertical direction is a height not to block an edge of an angle of view (0) of the wide angle lens on an imaginary plane (Si), the imaginary plane imaginarily extending along a horizontal direction and includes the optical axis (Aw) of the wide angle lens.

With the configuration of the tenth aspect, even though the hood is reduced in size, the hood does not block the imageable range on the imaginary plane including at least the optical axis of the wide angle lens. Therefore, the configuration is enabled to adapt to the wide angle lens while the camera module including the hood is reduced in size.

Hereinafter, multiple embodiments of the present disclosure will be described with reference to the drawings. The same reference numerals are assigned to the corresponding elements in the embodiments, and redundant descriptions thereof may be omitted. When only a portion of a configuration in each embodiment is described, configurations of other embodiments described in advance can be applied to other portions. In addition to the combinations of configurations clearly depicted in the explanation of the embodiments, as long as issues do not particularly arise in a combination, the configurations of multiple embodiments may be partially combined with each other, even when not clearly described.

First Embodiment

Figure 2:
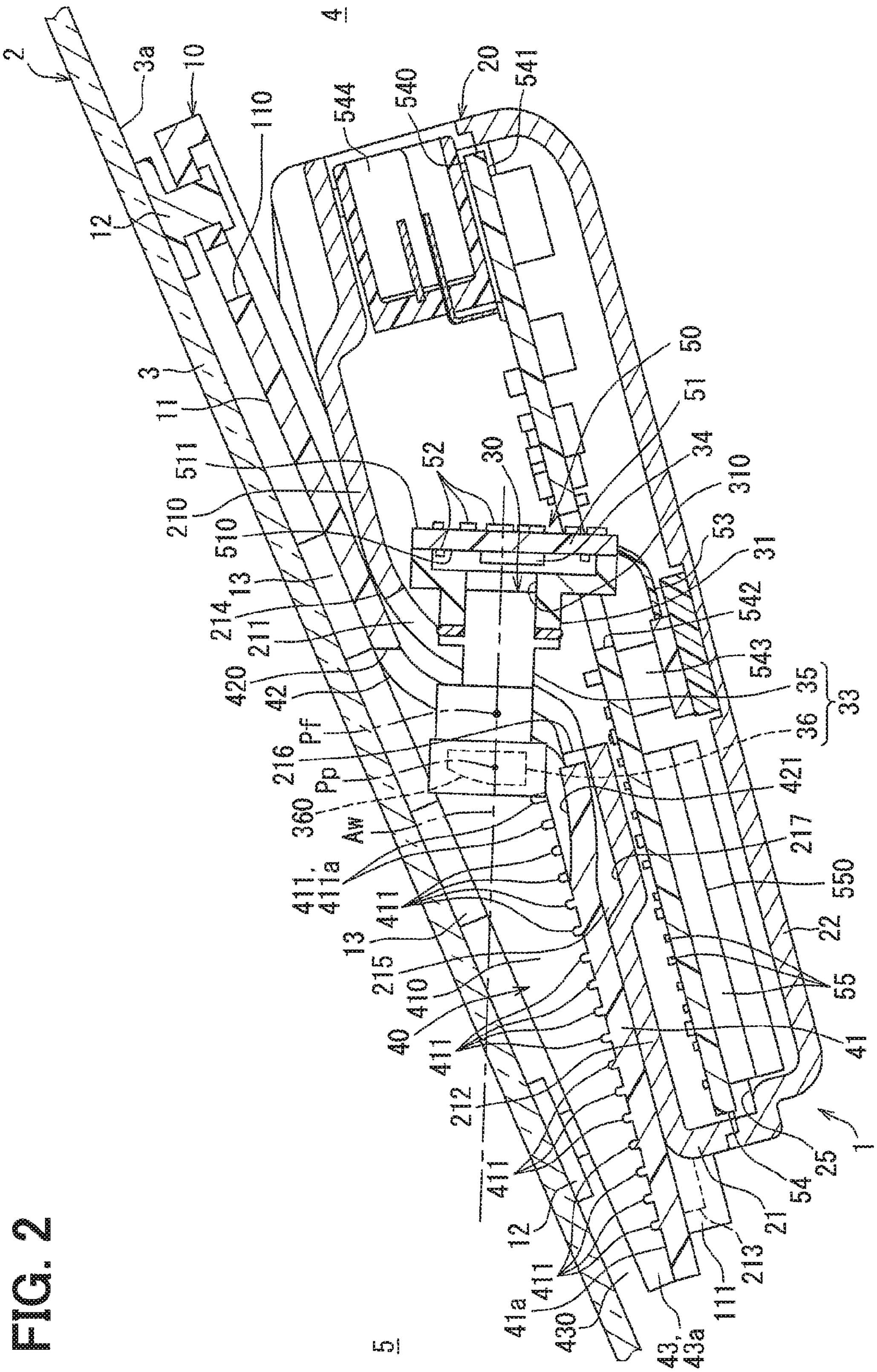
FIG. 2 is a cross-sectional view illustrating the camera module according to the first embodiment.

As shown in FIGS. 1 and 2, a camera module 1 according to a first embodiment is mounted on a vehicle 2 and is configured to image an external environment 5. In the following description, a vertical direction of the vehicle 2 on a horizontal plane is set to a vertical direction. In addition, a vehicle longitudinal direction and a vehicle width direction in horizontal directions of the vehicle 2 on the horizontal plane are set to a front and back direction and a right and left direction, respectively.

The camera module 1 is mounted on an inside of a front windshield 3 in the vehicle 2. The front windshield 3 is located in front of a driver's seat in the vehicle 2. The front windshield 3 partitions a vehicle compartment 4, which is the inside of the front windshield 3, from the external environment 5. The front windshield 3 is made of a light transmissive material such as glass to transmit an optical image entering the vehicle compartment 4 from a scenery of the external environment 5.

An installation position of the camera module 1 to the front windshield 3 is set at a position that does not substantially interfere with a field of view of an occupant who is seated in the driver's seat in the vehicle compartment 4. More specifically, as shown in FIG. 1, a vertical installation position is set within a range Xv, which is, for example, about 20% from an upper edge of an opening window **6*a* of a pillar 6. Inside the vehicle 2, the pillar 6 holds an outer peripheral edge portion of the front windshield 3 in a frame form. A lateral installation position is set within a range Xh, which is, for example, about 15 cm from the center of the opening window 6*a* to each of both sides. With those settings, the installation position is located within a wiping range Xr of a windshield wiper that wipes the front windshield 3. In addition, the installation position is located at a portion, at which the front windshield 3** is inclined by, for example, about 22° to 90° with respect to the front and back direction.

Figure 3:
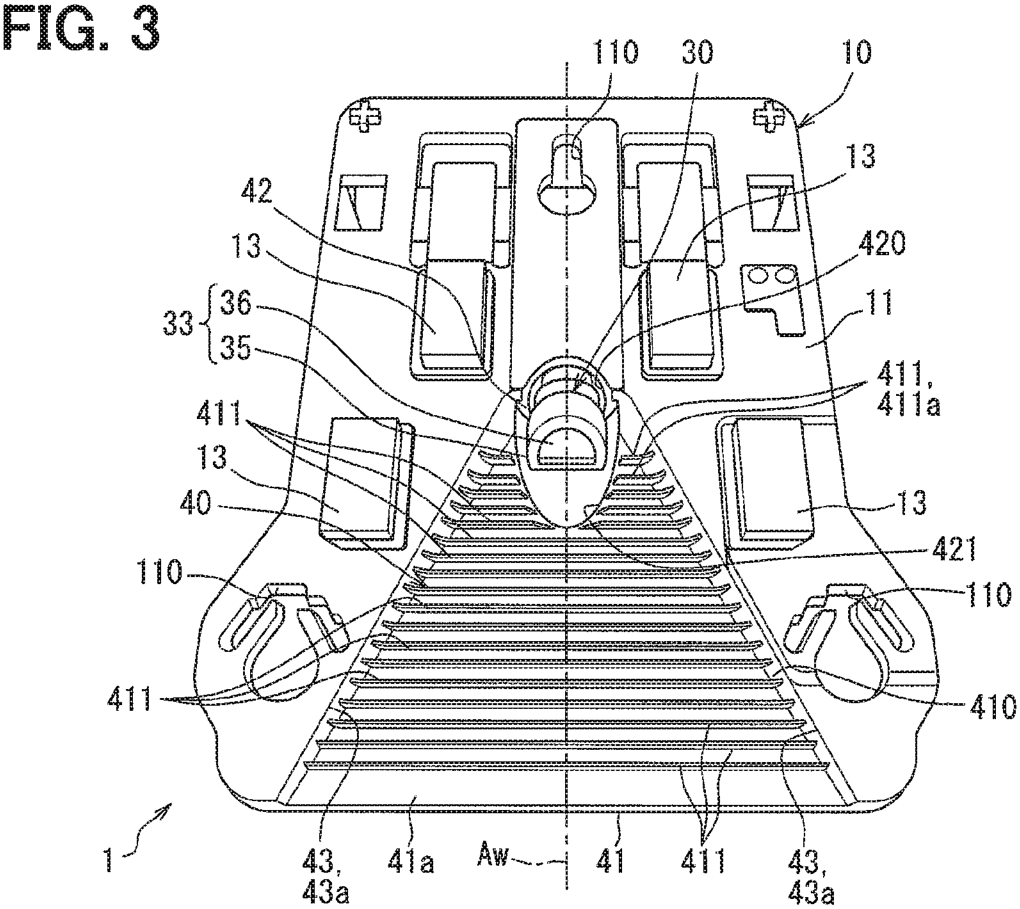
FIG. 3 is a perspective view illustrating the camera module according to the first embodiment.
Figure 4:
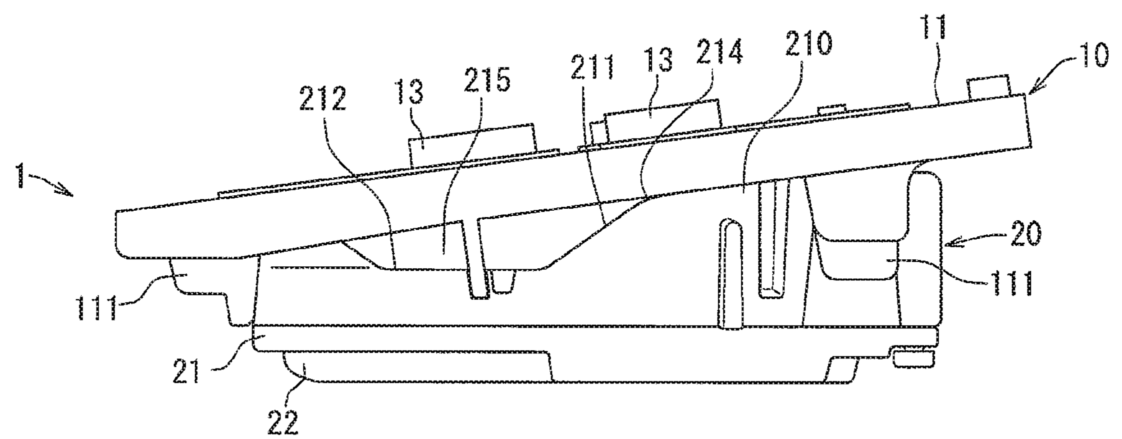
FIG. 4 is a side view illustrating the camera module according to the first embodiment.

As shown in FIGS. 2 to 4, the camera module 1 includes a bracket assembly 10, a camera casing 20, an image assembly 30, a hood 40, and a circuit unit 50.

The bracket assembly 10 includes a bracket main body 11, a cushion 13, and mounting pads 12 in combination. The bracket main body 11 is made of a relatively easily moldable rigid material such as resin and is shaped in a substantially plate-like shape as a whole. The bracket main body 11 is located along an inner surface **3*a* of the front windshield 3**.

The bracket main body 11 holds multiple cushions 13 which are made of elastomer or the like having a buffering function.

As shown in FIGS. 2 and 3, the bracket main body 11 has multiple mounting slots 110 which extend through the bracket main body 11 between both surfaces. The multiple mounting pads 12 are provided corresponding to the mounting slots 110, respectively and individually. Each of the mounting pads 12 is formed by sticking, for example, an adhesive sheet having a buffering function to a base component. The base component is made of, for example, resin. As shown in FIG. 2, the base components of those mounting pads 12 are fixed into the respective mounting slots 110 so as to be held by the bracket main body 11. The adhesive sheet of each mounting pad 12 is fixedly stuck to the inner surface 3*a* of the front windshield 3. In this way, the cushion 13 is interposed between the bracket main body 11 and the front windshield 3. Each mounting pad 12 may be, for example, a suction pad made of elastomer or the like having a buffering function.

Figure 5:
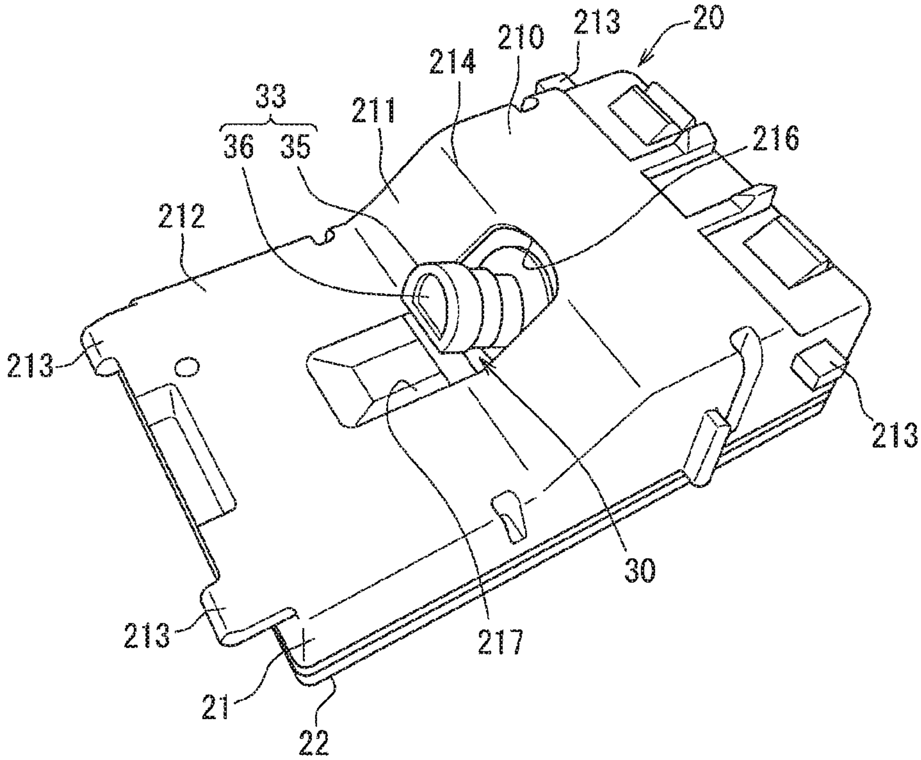
FIG. 5 is a perspective view illustrating a camera casing according to the first embodiment.

As shown in FIGS. 2, 4, and 5, the camera casing 20 includes a pair of casing members 21 and 22. Each of the casing members 21 and 22 is made of a rigid material, which has a comparatively high thermal radiation property such as aluminum, and is formed in a hollow shape as a whole.

The reverse cup-shaped upper casing member 21 is located on a lower side of the bracket assembly 10 so as to direct its opening portion to the lower side on the opposite side of the assembly 10. The upper casing member 21 has multiple fitting protrusion portions 213 which are located at multiple positions on its outer peripheral edge portion and protruding radially outward. In this example, the bracket main body 11 is provided with multiple fitting protrusion portions 111 corresponding to the respective fitting protrusion portions 213, individually. Each fitting protrusion portion 111 is fixed to a corresponding fitting protrusion portion 213 by, for example, snap fit or the like. In this way, the camera casing 20 is positioned inside the front windshield 3 via the bracket assembly 10.

The upper casing member 21 includes an opposing wall portion 210, a bent wall portion 211, and a recess wall portion 212 on its upper wall portion. The opposing wall portion 210 is located in a posture in which the opposing wall portion 210 faces the inner surface 3*a* of the front windshield 3 across the bracket assembly 10. The opposing wall portion 210 is kept at a minimum distance from the front windshield 3 in the above placement posture.

The bent wall portion 211 is bent relative to the opposing wall portion 210. The bent wall portion 211 is located in a posture in which the further bent wall portion 211 is distant away from the opposing wall portion 210 toward the front side, the further the bent wall portion 211 is spaced away downward from the front windshield 3. In the above placement posture, a substantially crest-ridge-shaped portion (that is, a ridge line portion) 214, which is formed by the bent wall portion 211 and the opposing wall portion 210, extends to substantially the entire of the upper casing member 21 in the right and left direction and is at a minimum distance from the front windshield 3.

The recess wall portion 212 is bent relative to the bent wall portion 211. The recess wall portion 212 is located in a posture in which the recess wall portion 212 is distant away from the bent wall portion 211 toward the front side, the further the recess wall portion 212 gets closer to the upper front windshield 3. The recess wall portion 212 defines an accommodation recess 215 for accommodating the hood 40 between the recess wall portion 212 and the front windshield 3 in the above placement posture.

The dish-shaped lower casing member 22 is located on the lower side of the upper casing member 21 so as to direct its opening portion toward the upper side on the side of the upper casing member 21. The lower casing member 22 is fastened to the upper casing member 21 with a screw. In this way, the casing members 21 and 22 define an accommodation space 25 for accommodating the image assembly 30 and the circuit unit 50 in cooperation with each other.

Figure 6:
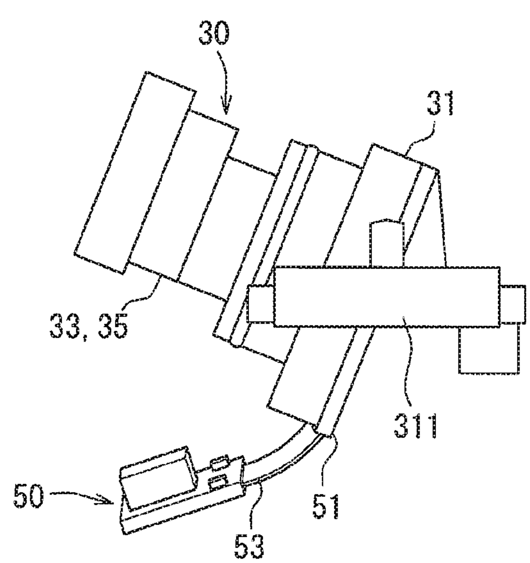
FIG. 6 is a side view illustrating an image assembly and a circuit unit according to the first embodiment.
Figure 7:
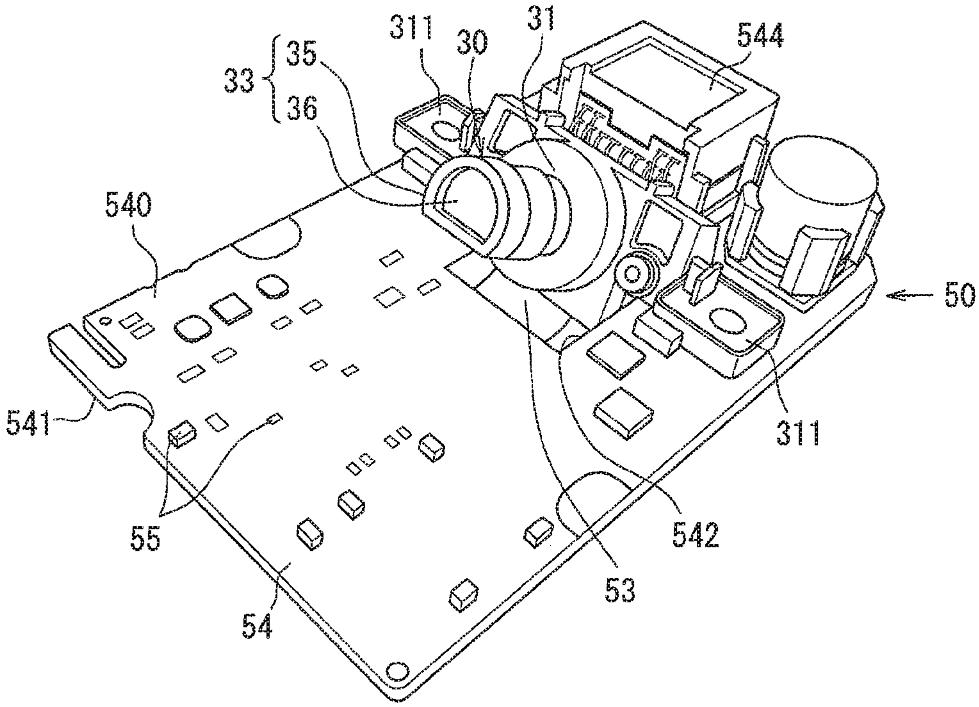
FIG. 7 is a perspective view illustrating the image assembly and the circuit unit according to the first embodiment.

As shown in FIGS. 2, 6, and 7, the image assembly 30 includes an assembly holder 31, a lens unit 33, and an imager 34. The assembly holder 31 is made of a relatively easily moldable rigid material such as resin and shaped in a hollow block as a whole. The assembly holder 31 defines a rear optical path space 310 for leading the optical image toward the imager 34 as accommodated. Both of right and left end portions 311 of the assembly holder 31 are fastened to the upper casing member 21, which is located on the upper side, with a screw.

As shown in FIGS. 2, 3, 5 to 7 and 9, the lens unit 33 includes a lens barrel 35 and a wide angle lens 36. The lens barrel 35 is made of a relatively easily moldable rigid material such as resin and is formed in a substantially tubular shape as a whole. The lens barrel 35 defines a front optical path space 357 for leading the optical image from the wide angle lens 36 as accommodated. The lens barrel 35 is fixed to and in contact with a front end portion of the assembly holder 31 to communicate the front optical path space 357 with the rear optical path space 310.

As shown in FIGS. 2 and 5, a front end portion of the lens barrel 35 is exposed to the outside of the camera casing 20 through the bent wall portion 211. For this exposure, a lens window 216 is formed in the bent wall portion 211 in the form of a through hole through which the lens barrel 35 is inserted. The lens window 216 extends through the bent wall portion 211 between both wall surfaces at the center of the bent wall portion 211 in the lateral direction. Further, the recess wall portion 212 is formed with a release hole 217 in a recessed shape. The release hole 217 opens in the upper wall surface at the center in the lateral direction and is connected to the lens window 216.

As shown in FIGS. 2, 3, 5, and 9, the wide angle lens 36 is formed in a concave meniscus lens shape and is made of a light transmissive material such as glass. The wide angle lens 36 is fixed to the front end portion of the lens barrel 35 so as to close the front optical path space 357 from the front side. An optical axis Aw passing through a principal point Pp of the wide angle lens 36 is set to be inclined downward or upward relative to the front and back direction toward the front side. Alternatively, the optical axis Aw is set along the front and back direction.

So as to ensure a desired lens angle of view of the lens unit 33 as a whole, the wide angle lens 36 is passed thereby to have a relatively wide angle of view of, for example, about 75° to 150°. It is noted that, a wider angle of view may be given. In addition, for example, an F number is set to 2 or more for the wide angle lens 36 so as to secure a desired brightness and a desired resolution of the lens unit 33 as a whole. In order to attain the above angle of view and F number, a focal length from the principal point Pp to the focal point Pf in the wide angle lens 36 is set to be relatively short, and a size of the wide angle lens 36 is set to be relatively large on the upper side of the optical axis Aw as will be described in detail later.

Figure 12:
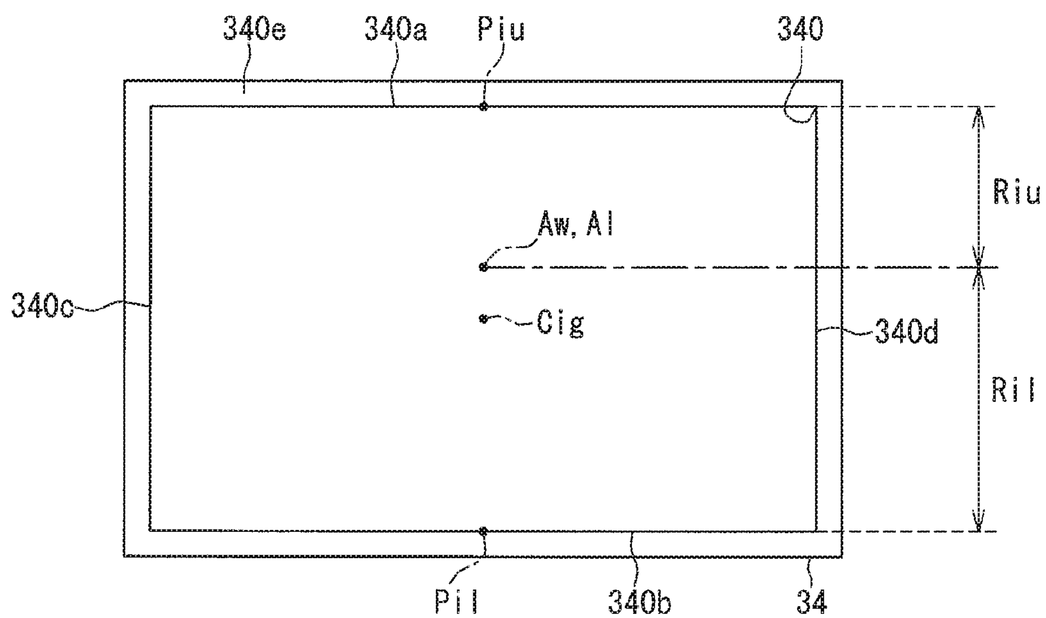
FIG. 12 is a front view illustrating an imager according to the first embodiment.

The imager 34 shown in FIGS. 2 and 12 is mainly configured with a color type or monochrome type image pickup device such as a CCD or a CMOS. The imager 34 may be formed by, for example, a combination of an infrared cut filter (not shown) or the like on the front side of such an image pickup device. The imager 34 is formed in a rectangular plate-like shape as a whole. The imager 34 is accommodated in the assembly holder 31 as shown in FIG. 2, thereby being located in the rear optical path space 310. In this example, the focal point Pf of the wide angle lens 36 is set in the front optical path space 357 thereby being located in front of the imager 34.

In the configuration of the image assembly 30 described above, an optical image transmitted from the external environment 5 through the front windshield 3 is imaged on the imager 34 through the lens unit 33 including the wide angle lens 36. At that time, the optical image of the external environment within the imaging target range 5 is formed as an inverted image on the imager 34 on the rear side of the focal point Pf of the wide angle lens 36. The imager 34 is configured to capture the inverted image as formed thereby to image the external environment 5 and to enable to output a signal or data.

As shown in FIGS. 2 and 3, the hood 40 is formed integrally with the bracket main body 11, for example, by resin molding or the like, thereby forming a part of the bracket assembly 10. The entirety of the hood 40 when viewed from the upper side is in a dish shape which is bilaterally symmetrical with respect to the optical axis Aw of the wide angle lens 36. The hood 40 has a base wall portion 41, a rear end wall portion 42, and side wall portions 43.

The base wall portion 41 is located on the upper side of the recess wall portion 212. The base wall portion 41 is located on the lower side of the optical axis Aw and is located on the front side of the bent wall portion 211. The base wall portion 41 is accommodated in the accommodation recess 215 between the recess wall portion 212 and the front windshield 3. The base wall portion 41 is located in a posture in which the further the bent wall portion 211 gets closer toward the front side, the further the base wall portion 41 gets closer to the upper front windshield 3. In this way, a bottom wall surface 41*a*, which is directed to an upper portion of the base wall portion 41, spreads in a trapezoidal and substantially planar shape and faces the inner surface 3*a* of the front windshield 3 across the imaging space 410. The optical image of the external environment 5, which is within the imaging target range (hereinafter simply referred to as the imaging target range) of the imager 34, passes through the front windshield 3 to be led to the imaging space 410.

The base wall portion 41 is provided with multiple restriction ribs 411. Each of the restriction ribs 411 protrudes from the bottom wall surface 41*a* of the base wall portion 41 into the upper imaging space 410 which is on the front windshield 3 side. Each of the restriction ribs 411 is a ridge extending linearly and is aligned substantially along the lateral direction. The restriction ribs 411 are aligned longitudinally at a predetermined interval apart from each other. The respective restriction ribs 411 multiply reflect light, which is incident on the base wall portion 41, on those wall surfaces opposed to each other to trap the incident light therebetween. In order to produce the trap function, protrusion heights of the respective restriction ribs 411 are set to respective predetermined values.

The rear end wall portion 42 is located so that the lateral center of the rear end wall portion 42 is aligned substantially with the optical axis Aw. The rear end wall portion 42 is raised upward from a rear edge of the base wall portion 41. The rear end wall portion 42 spreads so as to face the lower bent wall portion 211. The rear end wall portion 42 is located in a posture in which the further the rear end wall portion 42 is distant away from the base wall portion 41 toward the rear side, the further the rear end wall portion 42 gets closer to the upper front windshield 3.

A lens window 420 is formed in the rear end wall portion 42 in the form of a through hole through which the lens barrel 35 is inserted. The lens window 420 extends through the rear end wall portion 42 between both wall surfaces at the center of the rear end wall portion 42 in the lateral direction. A front end portion of the lens barrel 35, where the wide angle lens 36 is located, is exposed through the lens window 420 and the lens window 216 described above into the imaging space 410 which is on the upper side of the base wall portion 41. In this way, the optical image of the external environment 5, which is within the imaging target range and is led into the imaging space 410, can enter the lens unit 33 including the wide angle lens 36.

At least one restriction rib 411 protrudes high around the lens barrel 35, which is exposed through the lens window 420, as compared with that at a position spaced away from the lens barrel 35 toward the front side. In other words, a protrusion height of a specific rib 411*a*, which is the at least one restriction rib 411, is higher around the wide angle lens 36. In this example, FIGS. 2 and 3 illustrate multiple specific ribs 411*a* in which those protrusion height increases as the specific ribs 411*a* gets closer to the wide angle lens 36 of the lens unit 33.

In a periphery of the exposed lens barrel 35, an incident hole 421 is formed in the base wall portion 41 in a depressed shape. The incident hole 421 opens on the bottom wall surface 41*a* at the lateral center and is connected to the lens window 420. The incident hole 421 is released into the release hole 217 formed on the lower recess wall portion 212. In this way, the incident hole 421 is enabled to have a depression depth, which allows the optical image of the external environment 5 within the entire imaging target range to enter the lens unit 33.

The side wall portions 43 are located at bilaterally symmetrical positions with respect to the optical axis Aw so as to interpose the imaging space 410 from both of the right and left sides. The side wall portions 43 are raised upward from the right and left side edges of the base wall portion 41, respectively. The respective side wall portions 43 are formed substantially perpendicular to the bottom wall surface 41*a* of the base wall portion 41 and are arranged substantially along the vertical direction. In the side wall portions 43, inner wall surfaces 43*a* have a mutual distance therebetween in the lateral direction, and the mutual distance gradually increases toward the front side. The inner wall surface 43*a* is in a trapezoidal planar shape. Each of the side wall portions 43 has a height from the base wall portion 41, and the height gradually decreases toward the front side. In this way, the respective side wall portions 43 are located in a posture in which the respective side wall portions 43 are spaced from the inner surface 3*a* of the front windshield 3 with a clearance 430 in an entire longitudinal region as shown in FIG. 2.

The hood 40 configured as described above is capable of restricting incidence of excess light on the lens unit 33 from the external environment 5 outside the imaging target range, for example, incidence of reflected light on the inner surface 3*a* of the front windshield 3. In addition, an optical trap function of the respective restriction ribs 411 enables the hood 40 to regulate light reflection on the base wall portion 41 toward the lens unit 33.

As shown in FIGS. 2, 6, and 7, an accommodation position of the circuit unit 50, in addition to the components 31, 33, and 34 of the image assembly 30, is set in the accommodation space 25. The circuit unit 50 includes boards 51, 53, 54 and circuits 52, 55.

As shown in FIGS. 2 and 6, the imaging board 51 is formed of a rigid circuit board, such as a glass epoxy circuit board, and is formed in a substantially rectangular plate-like shape. The imaging board 51 is fastened to the assembly holder 31 with a screw. In this way, the imaging board 51 closes the rear optical path space 310 from the rear side.

The imaging board 51 is formed with a front mounting surface 510, which is exposed to the rear optical path space 310, and a rear mounting surface 511, which is exposed to the accommodation space 25 on the side opposite to the front mounting surface 510. The imager 34 is mounted on the front mounting surface 510. Multiple circuit elements configuring the imaging circuit 52 are mounted on both of the mounting surfaces 510 and 511. Those components as mounted enable the imaging circuit 52 to exchange signals or data with the imager 34.

As shown in FIGS. 2, 6, and 7, the flexible board (FPC) 53 holds a conductive wire in a base film made of, for example, flexible resin or the like, and is formed in a substantially rectangular band shape as a whole. One end portion of the FPC 53 is connected to a lower end of the imaging board 51.

As shown in FIGS. 2 and 7, the control board 54 is a rigid circuit board, such as a glass epoxy circuit board, and is formed in a substantially rectangular plate-like shape. Both surfaces of the control board 54 face the upper side and the lower side, respectively, in the accommodation space 25. In this way, the control board 54 has an upper mounting surface 540 facing upward and a lower mounting surface 541 facing downward. The control board 54 is in abutment with the upper casing member 21 at an outer peripheral edge portion of the control board 54 and at multiple portions of the upper mounting surface 540. The control board 54 is in abutment with the lower casing member 22 at multiple portions of the lower mounting surface 541. In this way, the control board 54 is positioned between the casing members 21 and 22.

The control board 54 is formed with a connection hole 542. The connection hole 542 is in a substantially rectangular hole shape and extends through the control board 54 between the mounting surfaces 540 and 541 at the lateral center. The imaging board 51 and the assembly holder 31 are inserted through the connection hole 542. In this way, the imaging board 51 and the assembly holder 31 are located across the upper side and the lower side of the control board 54. In addition, the mounted portion of the imager 34 on the imaging board 51 is located at least on the upper side of the control board 54. In this example, it may suffice that the mounted portion of the imager 34 on the imaging board 51 is located on the upper side of the control board 54. For example, a lower end of the mounted portion may be placed in the connection hole 542, as shown in FIG. 2, or may be located on the upper side or the lower side of the connection hole 542 (not shown).

As shown in FIGS. 2 and 7, multiple circuit elements configuring the control circuit 55 are mounted on both of the mounting surfaces 540 and 541. An external connector 544 that is exposed outside the camera casing 20 is mounted on the upper mounting surface 540. The external connector 544 is connected to an external circuit such as an ECU outside the camera casing 20.

As shown in FIG. 2, an internal connector 543 that is exposed in the accommodation space 25 is mounted on the lower mounting surface 541. The internal connector 543 is connected to the other end portion of the FPC 53 located below the control board 54. In this way, the control board 54 is connected to the imaging board 51 through the FPC 53 to enable to exchange signals or data between the control circuit 55 and the imaging circuit 52.

Figure 8:
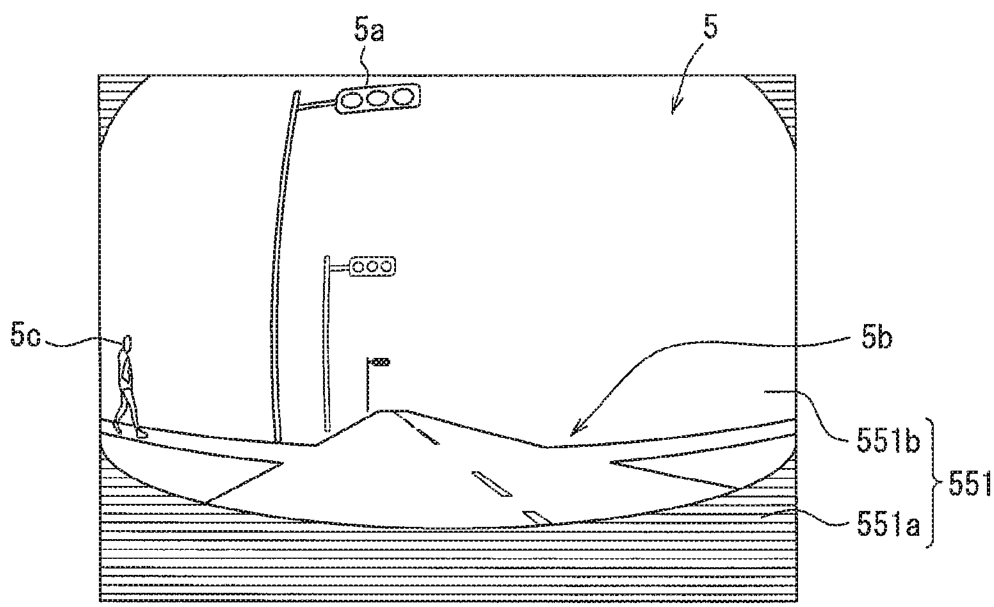
FIG. 8 is a front schematic view illustrating an outside image generated by the first embodiment.

The control circuit 55 includes a microcomputer 550 mainly including a processor as a circuit element mounted on the lower mounting surface 541. In cooperation with the imaging circuit 52, the control circuit 55 processes the output from the imager 34 to implement image processing to generate an outside image 551 as illustrated in FIG. 8. At that time, the outside image 551 is generated so as to enable image recognition of a structure and an obstacle, which are within the imaging target range and are reflected on the image 551. In this example, the imaging target range is set so that a traffic signal 5*a* is reflected on the outside image 551 to enable image recognition when the vehicle 2 comes closer to the traffic signal 5*a*. The traffic signal 5*a* is a structure on the upper side of a roof panel of the vehicle 2. At the same time, the imaging target range is set so that a front obstacle 5*c* (for example, a pedestrian, a bicycle, another vehicle, etc.) entering an intersection 5*b* from the right and the left is reflected on the outside image 551 to enable image recognition when a front bumper of the vehicle 2 comes closer to the intersection 5*b*.

The control circuit 55 further controls the imaging operation of the imager 34, which includes a control of an exposure state during imaging with the imager 34, in cooperation with the imaging circuit 52. At that time, a region of effective pixels 551*b* is set with exclusion of a region of a vehicle image capturing pixel 551*a* that reflects a part (for example, an engine hood or the like) of the vehicle 2 on a lower portion of the outside image 551 generated with the image processing function as illustrated in FIG. 8. In this way, an exposure state during a next image capturing time is controlled based on a pixel value of the effective pixels 551*b* in the set region. The pixel value used for the exposure control may be, for example, a gradation value of a specific one pixel, which is in a region of the effective pixels 551*b*, or gradation values of multiple pixels in the region of the effective pixels 551*b*.

In addition to the image processing function and the imaging control function described above, the control circuit 55 may be provided with, for example, an image recognition function or the like for image recognition of structures and obstacles in the imaging target range and shown in the outside image 551. Alternatively, the control circuit 55 may not be provided with the image recognition function. In addition, at least one of the image processing function or the imaging control function may be provided only with the control circuit 55 or may be provided only with the imaging circuit 52.

(Detailed Structure of Lens Unit)

Subsequently, a detailed structure of the lens unit 33 will be described.

Figure 9:
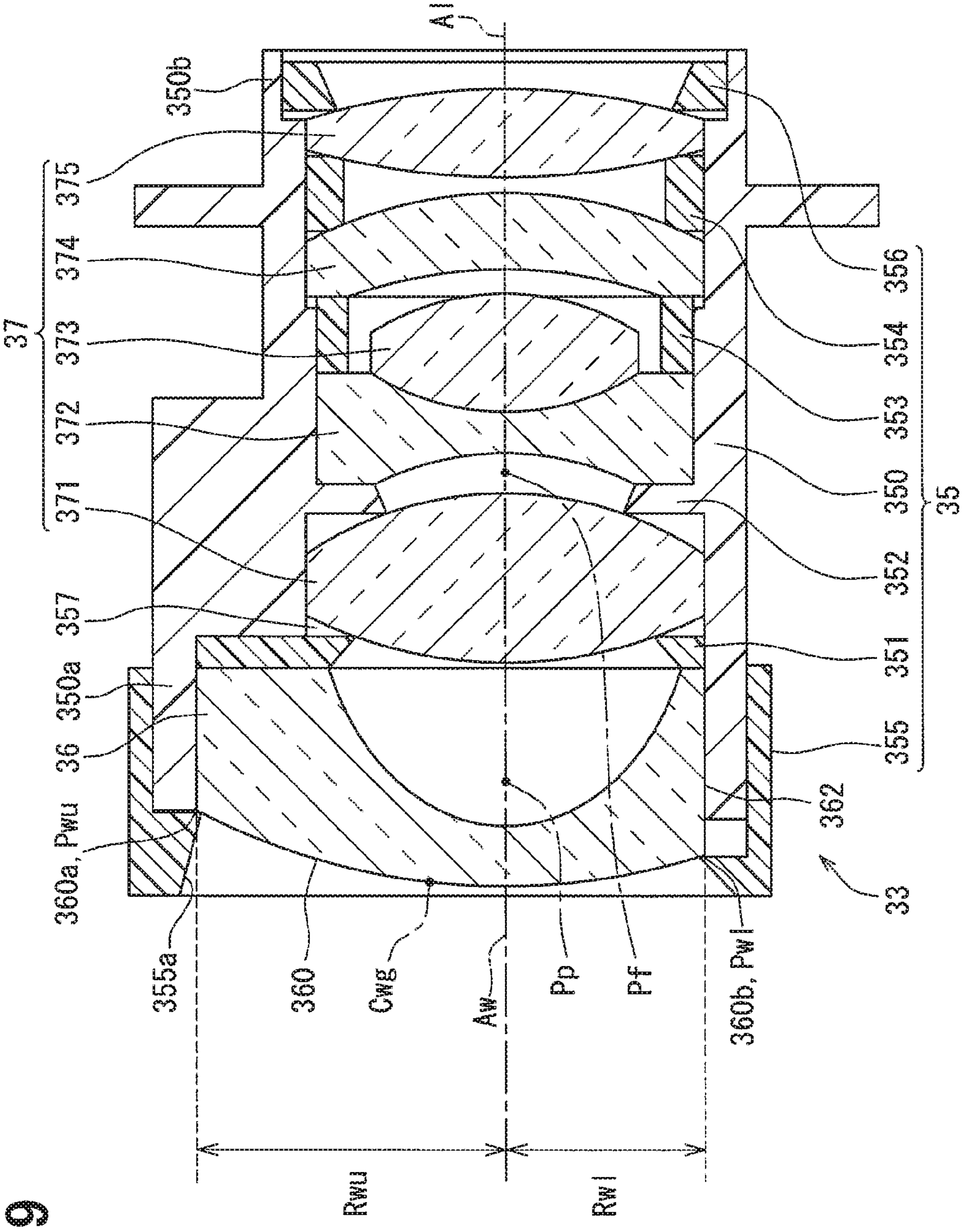
FIG. 9 is a cross-sectional view illustrating a lens unit according to the first embodiment.

As shown in FIG. 9, the lens unit 33 includes a lens set 37 at a rear stage that is on the rear side of the wide angle lens 36 in the lens barrel 35. In other words, the wide angle lens 36 is incorporated in the lens barrel 35 of the lens unit 33 at a front stage on the external environment 5 side which is on the front side of the lens set 37.

In the lens set 37, multiple rear lenses 371, 372, 373, 374, and 375 are aligned in the longitudinal direction for further producing an optical effect, such as correction of an optical aberration, for example, a chromatic aberration, on the optical image, which has been subjected to an optical operation by the wide angle lens 36. Each of the rear lenses 371, 372, 373, 374, and 375 has an aspherical or spherical optical surface on each of front and rear sides. An optical axis Al of the lens set 37 as substantially a common optical axis to the respective rear lenses 371, 372, 373, 374, and 375 is substantially common to (that is, substantially identical with) the optical axis Aw of the wide angle lens 36. In this way, the optical axis Aw of the wide angle lens 36 as well as the optical axis Al of the lens set 37 passes through the principal point Pp of the lens 36.

The first rear lens 371 at a first arrangement order from the front side is formed in a biconvex lens shape and made of a light transmissive material such as glass and is spaced apart from the wide angle lens 36 at a predetermined distance on the rear side. The second rear lens 372 at a second arrangement order from the front side is formed in a biconcave lens shape and made of a light transmissive material such as glass and is spaced apart from the first rear lens 371 at a predetermined distance on the rear side. The third rear lens 373 at a third arrangement order from the front side is formed in a biconvex lens shape and made of a light transmissive material such as glass and fixedly overlaps with a rear optical surface of the second rear lens 372. The fourth rear lens 374 at a fourth arrangement order from the front side is formed in a convex meniscus lens shape and made of a light transmissive material such as glass and is spaced apart from the third rear lens 373 at a predetermined distance on the rear side. The fifth rear lens 375 at a fifth arrangement order from the front side is formed in a biconvex lens shape and made of a light transmissive material such as glass and is spaced apart from the fourth rear lens 374 at a predetermined distance on the rear side.

Figure 10:
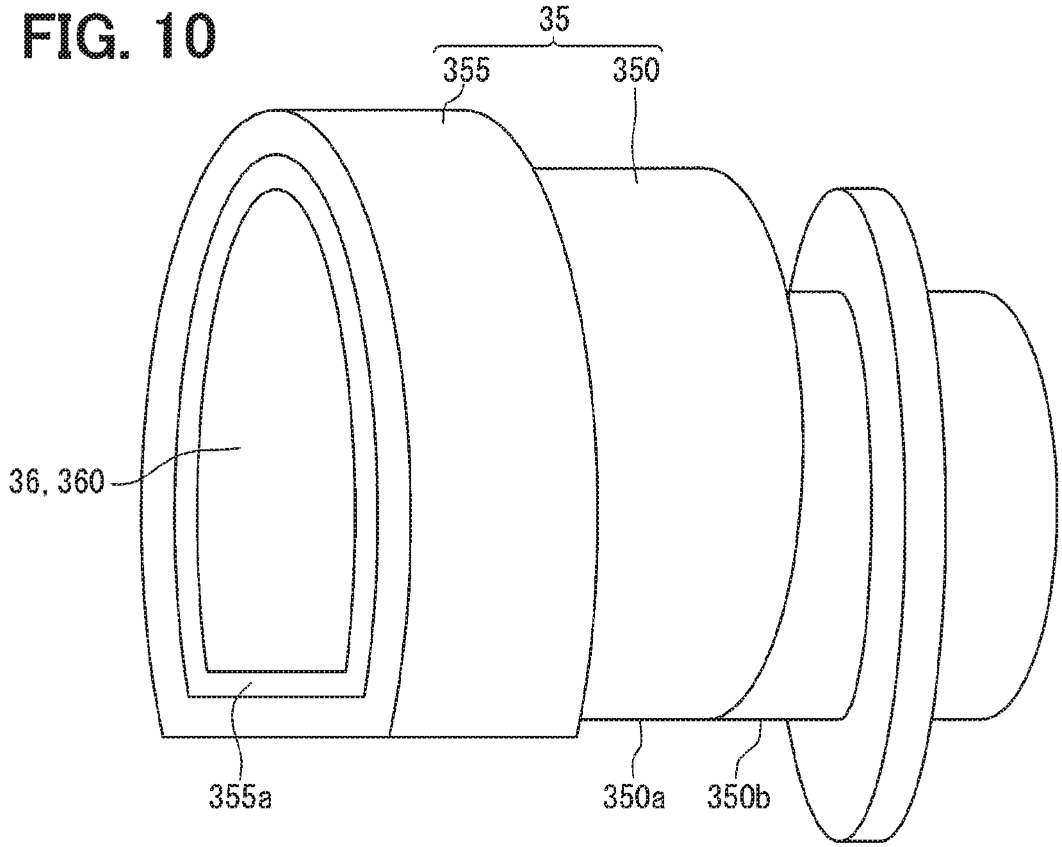
FIG. 10 is a perspective view illustrating the lens unit according to the first embodiment.
Figure 11:
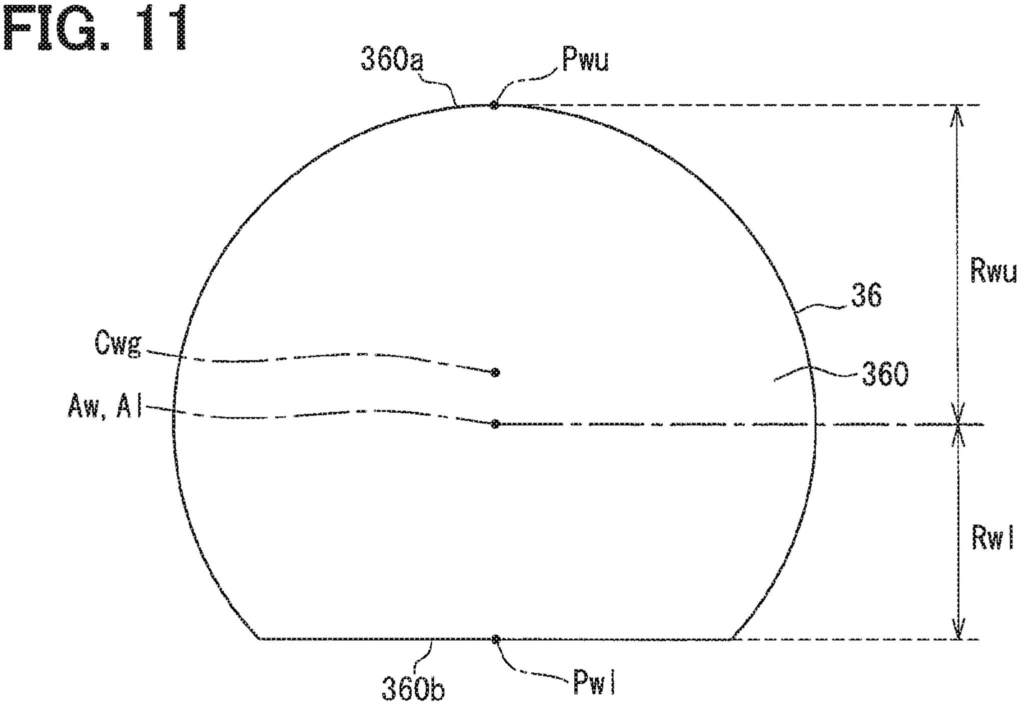
FIG. 11 is a front view illustrating a wide angle lens according to the first embodiment.

As shown in FIGS. 9 to 11, the wide angle lens 36 has a spherical or aspheric wide angle optical surface 360 (also refer to FIG. 2) on the external environment 5 side which is the front side opposite to the rear lenses 371, 372, 373, 374, and 375. In other words, the front optical surface of the wide angle lens 36 configures a wide angle optical surface 360. As shown in FIGS. 9 and 11, the wide angle optical surface 360 is in a cut form at a position below the optical axes Aw and Al of the wide angle lens 36 and the lens set 37. In this configuration, an outer contour of the wide angle optical surface 360 viewed from the front side is in a partial circular shape having an effective diameter. The circular arc portion 360*a* excludes a lower portion of the wide angle optical surface 360 and extends in a range, which is less than one round. A chord portion 360*b* extends between both ends of the circular arc portion 360*a*. In this example, a linear chord portion 360*b*, which embodies the cut form below the optical axes Aw and Al, is set in a state where both ends of a true circular arc portion 360*a* having substantially a constant curvature are connected to each other substantially along the lateral direction. Incidentally, the cut form is not limited to the shape, which is actually cut by machining or the like, and includes a shape beforehand given by molding or the like.

In the wide angle optical surface 360 described above, a lowermost portion Pwl defined at the lateral center of the chord portion 360*b* and an uppermost portion Pwu defined at the lateral center of the arc portion 360*a* are vertically symmetrical with respect to a geometric center Cwg in a projection view viewed from the front side. In other words, the geometric center Cwg of the wide angle optical surface 360 is defined as a midpoint at which a distance between the lowermost portion Pwl and the uppermost portion Pwu of the optical surface 360 is equally divided in the projection view viewed from the front side.

Under the definitions described above, the geometric center Cwg of the wide angle optical surface 360 is shifted upward from the respective optical axes Aw and Al of the wide angle lens 36 and the lens set 37. In this configuration, the size of the wide angle optical surface 360 is larger on the upper side of the optical axes Aw and Al than on the lower side of the optical axes Aw and Al. In other words, an upper size Rwu, which is defined as a distance (that is, a diameter) from the optical axes Aw and Al to the uppermost portion Pwu on the wide optical surface 360, is set to be larger than a lower size Rwl, which is defined as a distance (that is, a diameter) from the optical axes Aw and A1 to the lowermost portion Pwl on the wide angle optical surface 360.

As shown in FIGS. 9 and 10, the lens barrel 35 includes a lens barrel main body 350, spacers 351, 352, 353, 354, and caps 355, 356. The lens barrel main body 350 is made of a relatively easily moldable rigid material such as resin. The lens barrel main body 350 has a pair of accommodation portions 350*a* and 350*b* that define the front optical path space 357. As shown in FIG. 9, an inner contour of the wide angle accommodation portion 350*a* is in a partial tubular hole shape, which is along an outer contour of the wide angle optical surface 360. An outer peripheral surface 362 of the wide angle lens 36 is fitted into the wide angle accommodation portion 350*a* from the front side.

An inner contour of the rear accommodation portion 350*b* is in a tubular hole shape, which is along an outer contour of the rear lenses 371, 372, 374, and 375. The first rear lens 371 is fitted into the rear accommodation portion 350*b* from the front side. In addition, an integrally fixed object of the second and third rear lenses 372 and 373 and each of the fourth and fifth rear lenses 374 and 375 are fitted into the rear accommodation portion 350*b* from the rear side.

The first spacer 351 is formed in an annular plate shape having a partial circular outer contour and a tubular hole shaped inner contour. The first spacer 351 is made of a relatively easily moldable rigid material such as resin. The first spacer 351 is fitted into the wide angle accommodation portion 350*a* from the front side. The first spacer 351 locks the wide angle lens 36 from the rear side and locks the first rear lens 371 from the front side. The second spacer 352 is formed in an annular plate shape integrally with the rear accommodation portion 350*b* by, for example, resin molding or the like. The second spacer 352 holds the first rear lens 371 from the rear side and interposes the first rear lens 371 with the first spacer 351 therebetween. The second spacer 352 locks the second rear lens 372 from the front side.

The third and fourth spacers 353 and 354 are formed in a tubular shape and made of a relatively easily moldable rigid material such as resin. The third and fourth spacers 353 and 354 are fitted into the rear accommodation portion 350*b* from the rear side. The third spacer 353 holds the second rear lens 372 from the rear side and interposes the second rear lens 372 with the second spacer 352 therebetween. The fourth spacer 354 holds the fourth rear lens 374 from the rear side and interposes the fourth rear lens 374 with the third spacer 353. The fourth spacer 354 locks the fifth rear lens 375 from the front side.

As shown in FIGS. 9 and 10, the front cap 355 is formed in an annular plate shape and has a partial circular outer contour and an inner contour. The front cap 355 is made of a relatively easily moldable rigid material such as resin. The front cap 355 is externally fitted to the wide angle accommodation portion 350*a* from the front side, and in particular, the front cap 355 may be adhered to the wide angle accommodation portion 350*a* at the outer fitting portion. The front cap 355 holds the wide angle lens 36 locked from the front side and interposes the wide angle lens 36 with the first spacer 351.

In this example, a locking claw portion 355*a* is provided in the front cap 355 for locking the wide angle optical surface 360 of the wide angle lens 36. The locking claw portion 355*a* is formed in a partially annular shape by, for example, resin molding in advance, before the outer-fitting of the cap 355 to the wide angle accommodation portion 350*a*. In the first embodiment, a locked portion of the wide angle lens 36 with the locking claw portion 355*a* is shifted toward the rear side from the lowermost portion Pwl of the chord portion 360*b* toward the uppermost portion Pwu of the arc portion 360*a* in a circumferential direction along the outer contour of the wide angle optical surface 360.

As shown in FIG. 9, the rear cap 356 is made of a relatively easily moldable rigid material such as resin and formed in an annular plate shape. The rear cap 356 is fitted into the rear accommodation portion 350*b* from the rear side. In particular, the rear cap 356 may be screwed or adhered to the rear accommodation portion 350*b* at the fitting portion. The rear cap 356 locks the fifth rear lens 375 from the rear side and interposes the fifth rear lens 375 with the fourth spacer 354.

In the lens unit 33 configured as described above, breathing (for example, air ventilation or the like) is enabled between the front optical path space 357 in the lens barrel main body 350 and the outside through clearances between the respective accommodation portions 350*a* and 350*b* and the respective components accommodated in the accommodation portions 350*a* and 350*b*.

(Detailed Structure of Imager)

Subsequently, a detailed structure of the imager 34 will be described.

As shown in FIG. 12, the imager 34 of FIG. 2 has an effective image capturing region 340 as a region capable of capturing an inverted image of the optical image, which is formed through the wide angle lens 36 and the lens set 37. In other words, the effective image capturing region 340 represents a region, which is capable of sensing the light from the external environment 5 through the wide angle lens 36 and the lens set 37, in a planar shape within the outer contour when viewed from the front side of the imager 34. The effective image capturing region 340 is formed around the optical axes Aw and Al on the front surface 340*e* side. The front surface 340*e* is substantially perpendicular to each of the optical axes Aw and Al of the wide angle lens 36 and the lens set 37 of the imager 34. In this configuration, the outline of the effective image capturing region 340 viewed from the front side is in a rectangular shape having two upper and lower sides 340*a* and 340*b* and two left and right sides 340*c* and 340*d*. In this example, the two upper and lower sides 340*a* and 340*b* are located substantially along the lateral direction. On the other hand, the two left and right sides 340*c* and 340*d* are located such that the further the two left and right sides 340*c* and 340*d* get closer toward the upper side in the vertical direction, the further the two left and right sides 340*c* and 340*d* are inclined to the front side or the rear side. Alternatively, the two left and right sides 340*c* and 340*d* are located along the vertical direction.

In the effective image capturing region 340 described above, the lowermost portion Pil, which is defined at the lateral center of the lower side 340*b*, and the uppermost portion Piu, which is defined at the lateral center of the upper side 340*a*, are vertically symmetrical to each other with respect to the geometric center Cig in a projection view viewed from the front side. In other words, the geometric center Cig of the effective image capturing region 340 is defined as a midpoint at which a distance between the lowermost portion Pil and the uppermost portion Piu of the region 340 is equally divided in the projection view viewed from the front side.

Under the definitions described above, the geometric center Cig of the effective image capturing region 340 is shifted downward from the respective optical axes Aw and Al of the wide angle lens 36 and the lens set 37. In this way, the size of the effective image capturing region 340 is larger on the lower side of the optical axes Aw and Al than on the upper side of the optical axes Aw and Al. In other words, a lower size Ril defined as a distance from the optical axes Aw and Al to the lowermost portion Pil in the region 340 is set to be larger than an upper size Riu defined as a distance from the optical axes Aw and Al to the uppermost portion Piu in the effective image capturing region 340.

(Operational Effects)

Operational effects of the first embodiment described above will be described below.

According to the lens unit 33 of the first embodiment, the wide angle lens 36 forms the optical image, which is from the external environment 5 of the vehicle 2, on the imager 34. The wide angle optical surface 360 is on the external environment side 5 in the wide angle lens 36. The size of the wide angle optical surface 360 on the upper side of the optical axis Aw is larger than that on the lower side of the optical axis Aw in the wide angle lens 36. Similarly, the size of the wide angle optical surface 360 on the upper side of the optical axis Al (that is, the optical axes of the rear lenses 371, 372, 373, 374, and 375) of the rear lens set 37 passing through the principal point Pp of the wide angle lens 36 is larger than that on the lower side of the optical axis Al. According to the configuration, the size of the wide angle optical surface 360 on the upper side of the optical axes Aw and Al, which unlikely reflects the vehicle 2, is larger than that on the lower side of the optical axes Aw and Al, which likely reflects the vehicle 2. Therefore, on the upper side where the size of the wide angle optical surface 360 becomes larger, the upper side range of the external environment 5 above the vehicle 2 can be imaged to enable image recognition. On the other hand, on the lower side where the imaging target range of the external environment 5 is restricted due to the vehicle 2, even though the size of the wide angle optical surface 360 becomes small, imaging within that range can be secured, and thereby, downsizing of the camera module 1 can be enabled.

According to the lens unit 33 of the first embodiment, the wide angle lens 36 forms the optical image, which is from the external environment 5 of the vehicle 2, on the imager 34. The geometric center Cwg of the wide angle optical surface 360 of the wide angle lens 36, which is on the external environment 5 side, is shifted toward the upper side of the optical axis Aw of the wide angle lens 36. Similarly, the geometric center Cwg of the wide angle optical surface 360 is shifted toward the upper side of the optical axis Al (that is, the optical axes of the rear lenses 371, 372, 373, 374, and 375) of the rear lens set 37. The optical axis Al passes through the principal point Pp of the wide angle lens 36. According to the configuration, the geometric center Cwg of the wide angle optical surface 360 is shifted not toward the lower side of the optical axes Aw and Al, which likely reflects the vehicle 2, but toward the upper side of the optical axes Aw and Al, which unlikely reflects the vehicle 2. Therefore, on the upper side where the size of the wide angle optical surface 360 becomes larger than that on the lower side according to the shift amount of the geometric center Cwg, the upper side range of the external environment 5 than the vehicle 2 can be imaged to enable image recognition. On the other hand, on the lower side where the imaging target range of the external environment 5 is restricted due to the vehicle 2, imaging in that range can be secured even though the size of the wide angle optical surface 360 decreases according to the shift amount of the geometric center Cwg. The configuration enables to downsize the camera module 1.

In addition, according to the imager 34 of the first embodiment, the effective image capturing region 340 is capable of capturing the inverted image of the optical image, which is from the external environment 5 of the vehicle 2 and is formed thereon. The size of the effective image capturing region 340 on the lower side of the optical axis Aw of the wide angle lens 36 is larger than that on the upper side of the optical axis Aw. Similarly, the optical axis Al (that is, the optical axes of the rear lenses 371, 372, 373, 374, and 375) of the rear lens set 37 passes through the principal point Pp of the wide angle lens 36. In addition, the size of the effective image capturing region 340 on the lower side of the optical axis Al is larger than that on the upper side of the optical axis Al. The configuration enables to secure the area, in which the inverted image is formed, on the lower side where the size of the effective image capturing region 340 becomes larger. The inverted image is from the upper side range of the external environment 5 than the vehicle 2. Therefore, the configuration enables to set the upper range, which is to be imaged, as wide as possible.

In addition, according to the imager 34 of the first embodiment, the effective image capturing region 340 is capable of capturing the inverted image of the optical image, which is from the external environment 5 of the vehicle 2 and is formed thereon. The geometric center Cig of the effective image capturing region 340 is shifted toward the lower side of the optical axis Aw of the wide angle lens 36. Similarly, the geometric center Cig of the effective image capturing region 340 is shifted toward the lower side of the optical axis Al (that is, the optical axes of the rear lenses 371, 372, 373, 374, and 375) of the rear lens set 37 passing through the principal point Pp of the wide angle lens 36. According to the configuration, the size of the effective image capturing region 340 becomes larger on the lower side than that on the higher side according to the shift amount of the geometric center Cig. Therefore, the configuration enables to secure the area, in which the inverted image from the upper side range of the external environment 5 is formed. In addition, the configuration enables to set the upper range than the vehicle 2 to be imaged as wide as possible.

Further, according to the wide angle lens 36 of the first embodiment, the size of the wide angle optical surface 360 formed in the cut form on the lower side of the principal point Pp is larger on the upper side of the principal point Pp. According to the configuration, the wide angle lens 36, which is for imaging the upper side range of the external environment 5 above the vehicle 2 to enable image recognition, can be manufactured in a small size and in a relatively simple shape.

According to the first embodiment, the lens unit 33 and the imager 34 are accommodated in the camera casing 20. The accommodation configuration described above enables to set the size of the wide angle optical surface 360 in the lens unit 33 to be smaller on the lower side than that on the upper side. Therefore, the camera casing 20 can be restricted from increasing in size while ensuring the accommodation space necessary for the imager 34.

According to the first embodiment, the circuit unit 50, in which the control circuit 55 for controlling the imager 34 is mounted on the control board 54, is accommodated in the camera casing 20 together with the lens unit 33 and the imager 34. In the configuration described above, the size of the wide angle optical surface 360 in the lens unit 33 is set to be smaller on the lower side than that on the upper side. Therefore, not only the accommodation space necessary for the imager 34 but also the accommodation space necessary for the circuit unit 50 is ensured while increase in the size of the camera casing 20 can be reduced.

In addition, the control circuit 55 of the first embodiment controls the exposure during imaging with the imager 34 based on the pixel values of the effective pixels 551*b*, which is set with exclusion of the vehicle image capturing pixels 551*a* in the outside image 551 generated by image processing of the output from the imager 34. According to the configuration, the vehicle 2 is not reflected. Therefore, the pixel values of the effective pixels 551*b*, which are likely to follow the brightness of the external environment 5, can be reflected in the exposure control. In other words, the pixel values of the vehicle image capturing pixels 551*a*, which are unlikely to follow the brightness of the external environment 5 due to the reflection of the vehicle 2, is restricted from being reflected in the exposure control, and the upper side range of the external environment 5 above the vehicle 2 can be imaged in an exposure state suitable for image recognition.

Further, according to the circuit unit 50 of the first embodiment, the imaging board 51, on which the imager 34 is mounted, and the control board 54, on which the control circuit 55 is mounted, are connected to each other while a manufacturing tolerance is absorbed with the FPC 53, and can be easily accommodated at specified positions in the camera casing 20. Moreover, the imaging board 51, on which the imager 34 is mounted at least on the upper side of the control board 54, is located across the upper side and the lower side of the control board 54. Therefore, the accommodation space necessary for the circuit unit 50 can be reduced vertically.

Further, according to the camera casing 20 of the first embodiment, the opposing wall portion 210 is located in a posture in which the bent wall portion 211, which is bent relative to the opposing wall portion 210, faces the front windshield 3 and in which the bent wall portion 211 is spaced apart from the front windshield 3 such that the further the bent wall portion 211 is distant away from the opposing wall portion 210, the further the bent wall portion 211 is spaced away from the front windshield 3. According to the configuration, the ridge-shaped portion 214 is formed with the bent wall portion 211 and the opposing wall portion 210. The lens unit 33 is passed through the bent wall portion 211 for exposure to the outside of the camera casing 20. The configuration enables the camera casing 20 to be mounted inside the front windshield 3 in a state, in which the ridge-shaped portion 214 is brought closer to the front windshield 3. Therefore, according to the small-sized camera casing 20 to be mounted close to the front windshield 3, not only an occupant's field of view of the external environment 5 can be secured but also an optical path from the external environment 5 to the lens unit 33 can be ensured between the bent wall portion 211 and the front windshield 3.

Further, the hood 40 of the first embodiment enables to restrict incidence of excess light from the external environment 5 outside the imaging target range of the imager 34 to the lens unit 33. The configuration enables to restrict excess light, which is likely to enter the lens unit 33 in which the angle of view of the lens unit 33 is expanded with the wide angle lens 36, from being superimposed on a normal optical image within the imaging target range and from interfering with the imaging.

Further, according to the hood 40 of the first embodiment, in the base wall portion 41 located to face the front windshield 3, the multiple restriction ribs 411 protrude toward the front windshield 3 thereby to restrict the light reflection on the lens unit 33. The configuration can restrict light, which is reflected on the base wall portion 41 and is likely to increase light incidence, from being superimposed on the normal optical image within the imaging target range and from interfering with the imaging, under the placement where the base wall portion 41 faces the front windshield 3.

In addition, according to the hood 40 of the first embodiment, the specific ribs 411*a* as the restriction ribs 411 having a high protrusion height around the lens unit 33 are likely to block an optical path in which the reflected light on the base wall portion 41 travels toward the wide angle lens 36. The configuration enables to restrict light, which is reflected on the base wall portion 41 and is likely to enter the lens unit 33 in which the angle of view is expanded, from being superimposed on the normal optical image within the imaging target range and from interfering with the imaging.

Second Embodiment

Figure 13:
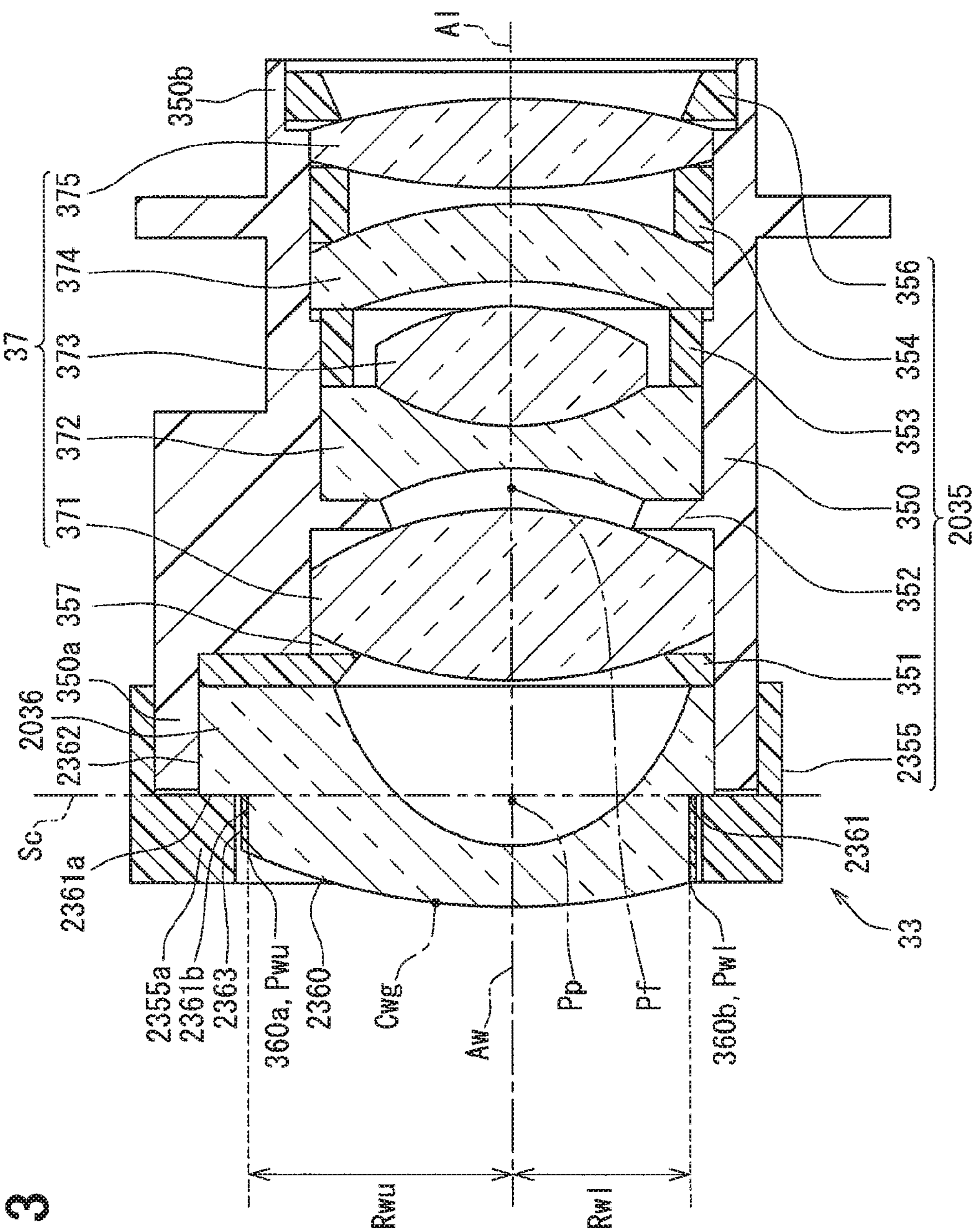
FIG. 13 is a cross-sectional view illustrating a lens unit according to a second embodiment.

As shown in FIG. 13, a second embodiment is a modification of the first embodiment.

A wide angle lens 2036 according to the second embodiment includes a locked recess portion 2361 recessed rearward on an outer peripheral side of a wide angle optical surface 2360. The wide angle optical surface 2360 according to the second embodiment has substantially the same configuration as that of the first embodiment except for a configuration having a partial circular outer contour reduced in substantially a similar shape to the wide angle optical surface 360 of the first embodiment, when viewed from a front side.

More specifically, the locked recess portion 2361 is formed in a recess groove shape. The locked recess portion 2361 is in a partial circular shape and is continuous in the entire outer peripheral portion of the wide angle lens 2036. The locked recess portion 2361 opens to an outer peripheral surface 2362 fitted into the wide angle accommodation portion 350*a* in the wide angle lens 2036 and the wide angle optical surface 2360 of the lens 2036.

A recessed inner surface 2361*b* of the locked recess portion 2361, which faces radially outward and is in a partial tubular shape, is formed along an outer contour of the wide angle optical surface 2360. For example, a black coating film is formed on an entire surface of the recessed inner surface 2361*b* to form a reflection restriction portion 2363 for absorbing light and restricting reflection of the light. A planar recess inner bottom surface 2361*a* of the locked recess portion 2361 faces the front side and is locked with a locking claw portion 2355*a* of a front cap 2355. The front cap 2355 is externally fitted to a wide angle accommodation portion 350*a* of a lens barrel 2035. A locking position of the recess inner bottom surface 2361*a*, which is locked with the locking claw portion 2355*a*, is located on a common plane Sc, which is substantially perpendicular to respective optical axes Aw and Al of the wide angle lens 36 and the lens set 37, in an entire circumferential direction along an outer contour of the wide angle optical surface 2360. In other words, the locking portion according to the second embodiment is not substantially displaced back and forth. The size of the recess inner bottom surface 2361*a* in the radial direction is set such that, for example, the size at a lowermost portion of the recess inner bottom surface 2361*a* is set to be equal to or smaller than the size at an uppermost portion. In the configuration, the operational effects, which are produced by the size setting on the wide angle optical surface 2360 similarly to that in the first embodiment, are unlikely reduced.

According to the wide angle lens 2036 of the second embodiment described above, the locked recess portion 2361 recessed on the outer peripheral side of the wide angle optical surface 2360 is locked with the lens barrel 2035. In this example, the locking portion of the locked recess portion 2361 locked with the locking claw portion 2355*a* is located on the common plane Sc in the circumferential direction along the outer contour of the wide angle optical surface 2360. In this way, an accommodation posture of the wide angle lens 2036 in the lens barrel 2035 can be stabilized. The configuration enables to reduce occurrence of imaging failure of the outside image 551 due to variation in posture of the wide angle lens 2036.

Incidentally, the configurations other than those of the wide angle lens 2036 and the lens barrel 2035 according to the second embodiment are substantially the same as those of the wide angle lens 36 and the lens barrel 35 in the first embodiment. Therefore, likewise, the same operational effects as those of the first embodiment can be produced according to the second embodiment.

Third Embodiment

Figure 14:
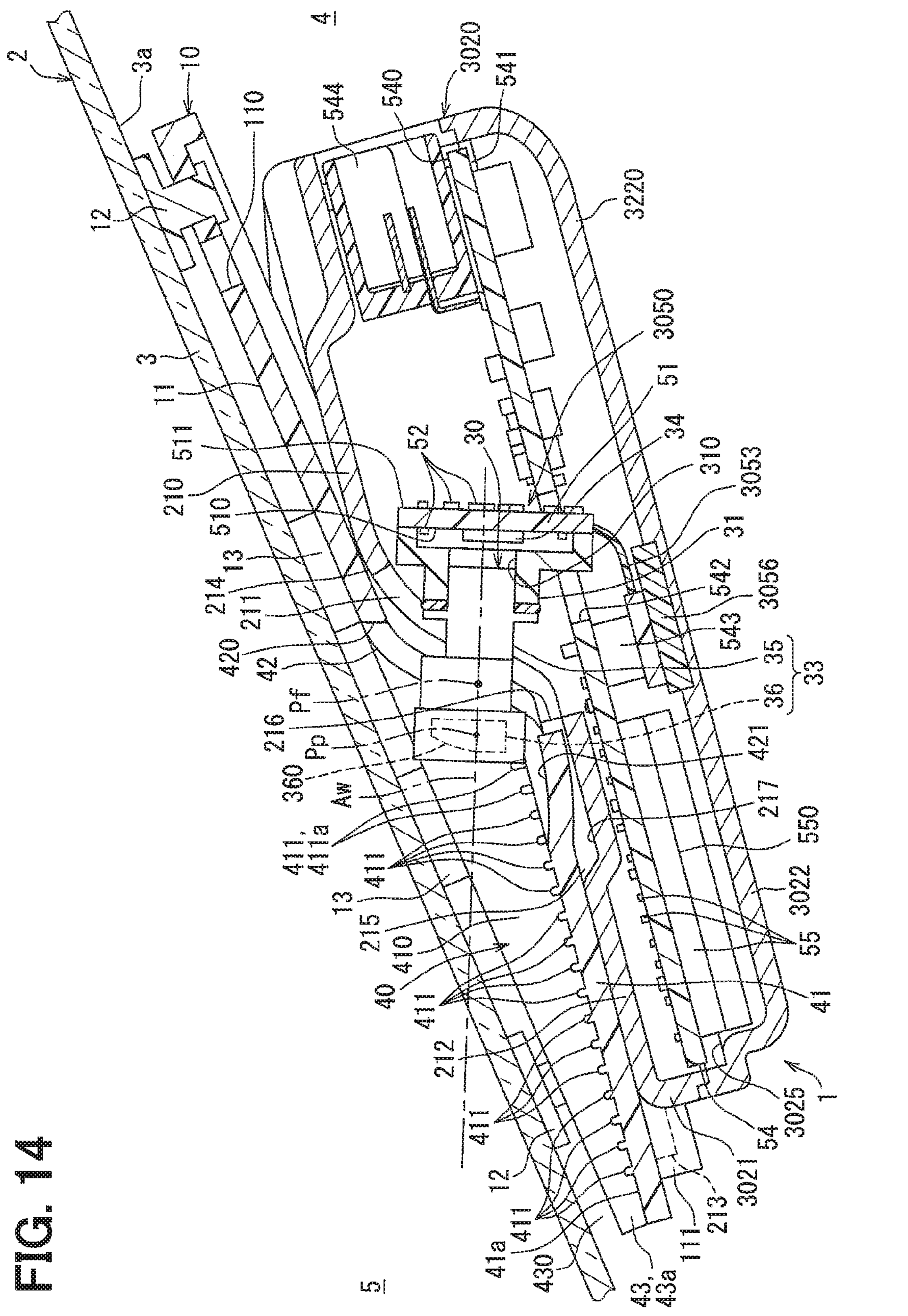
FIG. 14 is a cross-sectional view illustrating a camera module according to a third embodiment.

As shown in FIG. 14, a third embodiment is a modification of the first embodiment.

As components of a circuit unit 3050 according to the third embodiment, a relay member 3056 is combined with boards 51, 54, an FPC 3053, and circuits 52, 55. The relay member 3056 is accommodated in an accommodation space 3025 of a metal camera casing 3020 together with the FPC 3053 and the like. The metal camera casing 3020 is formed with casing members 3021 and 3022 which are made of, for example, aluminum. The relay member 3056 is fixed to a bottom wall portion 3220 of the lower casing member 3022 of the camera casing 3020 in a contact manner or in a fitting manner. The relay member 3056 is formed in a flat piece shape and is made of a functional material such as a metal filler mixed with a resin base. In this way, at least one of a thermal radiation property or a conductivity (hereinafter simply referred to as the thermal radiation property and the conductivity) as a specific property is given to the relay member 3056. The relay member 3056 may be formed in, for example, a cushion shape, a foam shape, or the like, to provide a cushioning property.

In this example, a thermal radiation base film or a thermal radiation dummy wiring in the FPC 3053 is connected to the imaging board 51 together with the relay member 3056 having the thermal radiation property in a contact and fixing manner, thereby to provide a thermal radiation path. In addition, a ground wiring of the FPC 3053 having the conductivity is connected to the imaging board 51 together with the relay member 3056 having the conductivity in an electrically conductive and fixing manner, thereby to form an electrically conductive path. In any of those connection structures, the imaging board 51, on which the imaging circuit 52 for image processing the output from the imager 34 is mounted, is in a state of being connected to the camera casing 3020 through the FPC 3053 and the relay member 3056. Incidentally, the configurations other than the configuration described for the FPC 3053 according to the third embodiment are substantially the same as those of the FPC 53 according to the first embodiment. Therefore, the imaging board 51 is also connected to the control board 54 through the FPC 3053 by electrically conductive fixation.

According to the circuit unit 3050 of the third embodiment described above, the FPC 3053 accommodated in and connected to the metal camera casing 3020 is connected to the imaging board 51 on which the imaging circuit 52 for image processing is mounted. According to the configuration, at least one of heat or noise (at least one of them corresponding to the connection structure described above in the third embodiment) generated in the imaging board 51 can be transferred to the camera casing 3020 through the FPC 3053. Therefore, at least one of a thermal radiation property or an EMC can be enhanced. In particular, according to the third embodiment, the FPC 3053 connecting the imaging board 51 to the control board 54 is leveraged for transferring at least one of heat or noise. Therefore, at least one of the thermal radiation property or the EMC can be enhanced with a simple configuration.

According to the third embodiment, as in the first embodiment, since the lens unit 33 includes the wide angle lens 36, the imaging target range of the external environment 5 is enlarged. As a result, the image processing amount in the imaging board 51 increases so that the heat generation amount and noise are also likely to increase. However, at least one of heat or noise can be transferred to the camera casing 3020 according to the above principle. Therefore, at least one of the thermal radiation property or the EMC can be enhanced. In addition to the above effects, according to the third embodiment, the same operational effects as those in the first embodiment can be produced.

Fourth Embodiment

Figure 15:
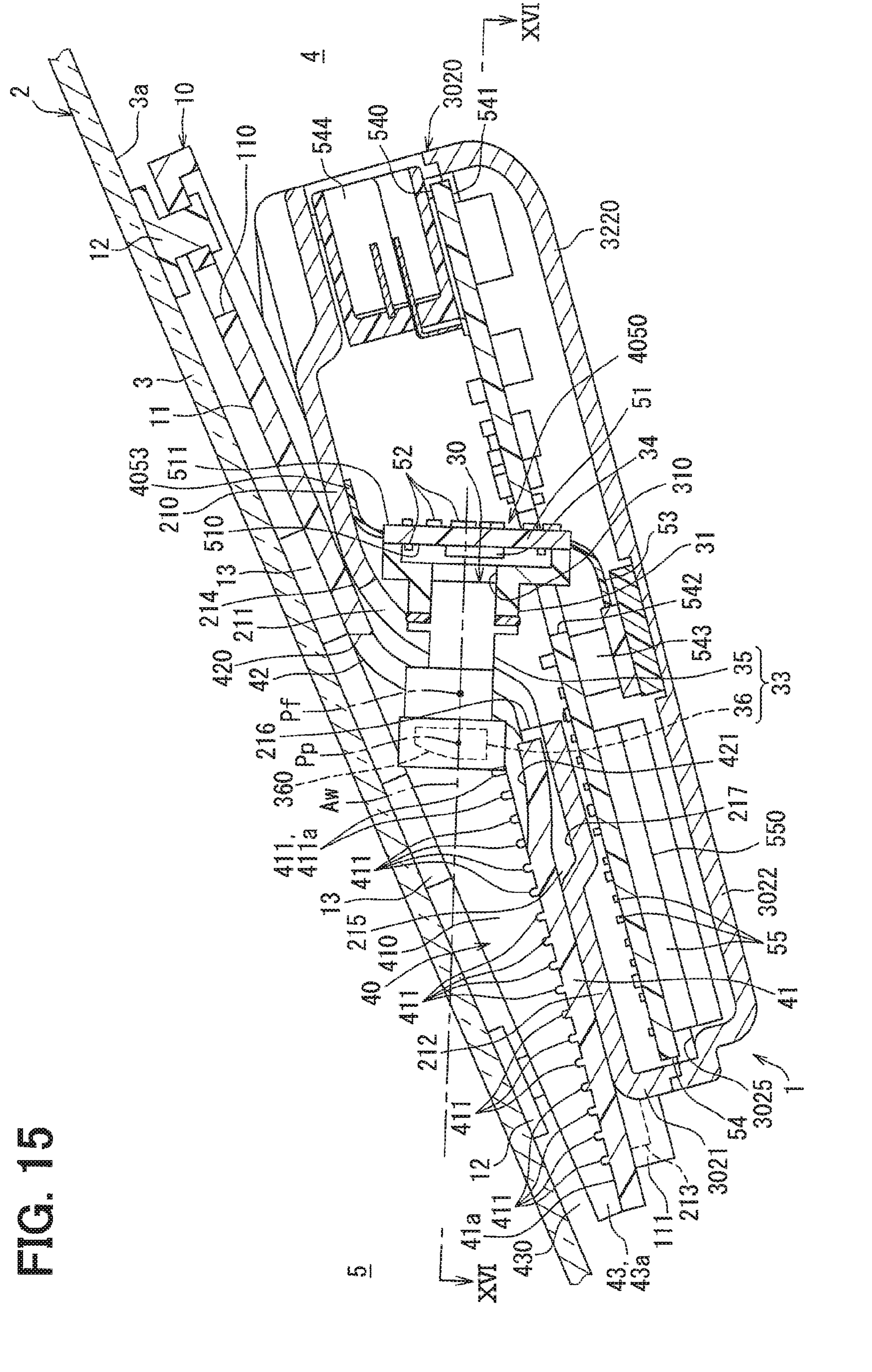
FIG. 15 is a cross-sectional view illustrating a camera module according to a fourth embodiment.

As shown in FIG. 15, a fourth embodiment is a modification of the first and third embodiments.

As components of a circuit unit 4050 according to the fourth embodiment, another FPC 4053 different from an FPC 53 is combined with the FPC 53 of the first embodiment which is substituted for the FPC 3053 of the third embodiment, together with boards 51, 54 and circuits 52, 55. The FPC 4053 is accommodated in the accommodation space 3025 of a camera casing 3020 together with the FPC 53 and the like. As with the FPC 53, the FPC 4053 is formed by holding a conductive wire on a base film made of, for example, a flexible resin or the like, and is formed in a substantially rectangular band shape as a whole.

In this example, a thermal radiation base film or a thermal radiation dummy wiring of the FPC 4053 is connected to the opposing wall portion 210 of the upper casing member 3021 in the metal camera casing 3020 together with the imaging board 51 in a contact and fixing manner, thereby to provide a thermal radiation path. In addition, a ground wiring having the conductivity in the FPC 4053 is connected to the opposing wall portion 210 together with the imaging board 51 in an electrically conductive and fixing manner, thereby to form an electrically conductive path. In any of those connection structures, the imaging board 51, on which the imaging circuit 52 for image processing the output from the imager 34 is mounted, is in a state of being connected to the camera casing 3020 through the FPC 4053.

According to the circuit unit 4050 of the fourth embodiment described above, the FPC 4053 accommodated in and connected to the metal camera casing 3020 is connected to the imaging board 51 on which the imaging circuit 52 for image processing is mounted. According to the configuration, at least one of heat or noise (at least one of them corresponding to the connection structure described above in the fourth embodiment) generated in the imaging board 51 can be transferred to the camera casing 3020 through the FPC 4053. Therefore, at least one of a thermal radiation property or an EMC can be enhanced.

According to the fourth embodiment, as in the first embodiment, since the lens unit 33 includes the wide angle lens 36, the imaging target range of the external environment 5 is enlarged. As a result, the image processing amount in the imaging board 51 increases so that the heat generation amount and noise are also likely to increase. However, at least one of heat or noise can be transferred to the camera casing 3020 according to the above principle. Therefore, at least one of the thermal radiation property or the EMC can be enhanced. In addition to the above effects, according to the fourth embodiment, the same operational effects as those in the first embodiment can be produced.

Fifth Embodiment

Figure 16:
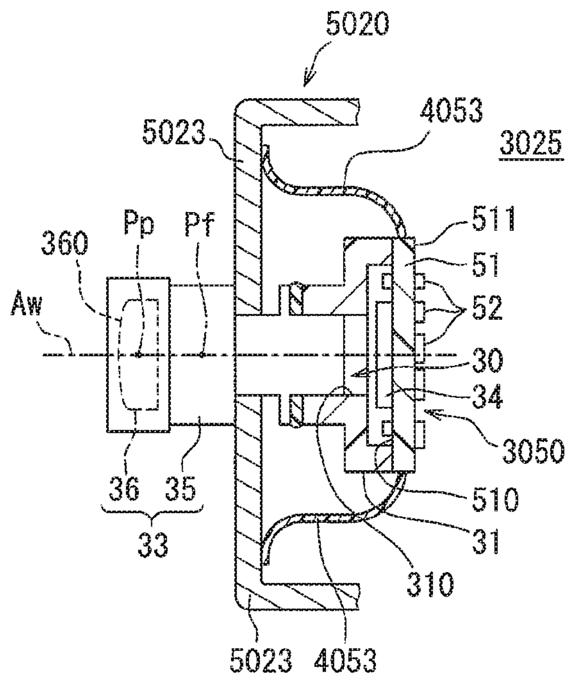
FIG. 16 is a cross-sectional view illustrating a camera module according to a fifth embodiment.

As shown in FIG. 16, a fifth embodiment is a modification of the fourth embodiment.

As components of a metal camera casing 5020 according to the fifth embodiment, connection members 5023 are combined with casing members 3021 and 3022 and are accommodated in the accommodation space 3025. The connection members 5023 are formed in, for example, a rigid frame shape and made of metal such as aluminum. In this way, at least one of the thermal radiation property or the conductivity is given to the connection members 5023. The connection members 5023 are connected to the opposing wall portion 210 of the upper casing member 3021 of the metal camera casing 3020 by screw fixing or by fitting fixation. The connection members 5023 may be integrally formed with the opposing wall portion 210. Although two connection members 5023 are provided in the example of FIG. 16, one or three or more connection members 5023 may be provided.

In this example, a thermal radiation base film or a thermal radiation dummy wiring in FPCs 4053 is connected to the imaging board 51 and the connection members 5023 in a contact and fixing manner, thereby to form a thermal radiation path. In addition, a ground wiring having the conductivity in the FPCs 4053 is connected to the imaging board 51 and the connection members 5023 in an electrically conductive and fixing manner, thereby to form an electrically conductive path. In any of those connection structures, the imaging board 51, on which the imaging circuit 52 for image processing the output from the imager 34 is mounted, is in a state of being connected to the camera casing 5020 through the FPCs 4053 and the connection members 5023. Although two FPCs 4053 are provided in correspondence with the number of connection members 5023 in the example of FIG. 16, one or three or more connection members 5023 may be provided.

The connection members 5023 further abut against the lens barrel 35 or the assembly holder 31 of the image assembly 30, thereby to lock the abutment target. In this way, the lens unit 33 and the imager 34 are positioned relative to the camera casing 5020. As shown in FIG. 16, in the case of a structure in which the connection members 5023 lock the lens barrel 35, the lens barrel 35 is screwed not to both end portions 311 of the assembly holder 31 but to the connection members 5023. Although not shown, in a case where the connection members 5023 lock the assembly holder 31, both the end portions 311 of the holder 31 are screwed to the connection members 5023.

According to the fifth embodiment described above, with a change to the connection members 5023 as required by product specifications, a positioning state of the lens unit 33 and the imager 34 can be adjusted with high precision and the same operational effects as those in the fourth embodiment can be produced.

Sixth Embodiment

Figure 17:
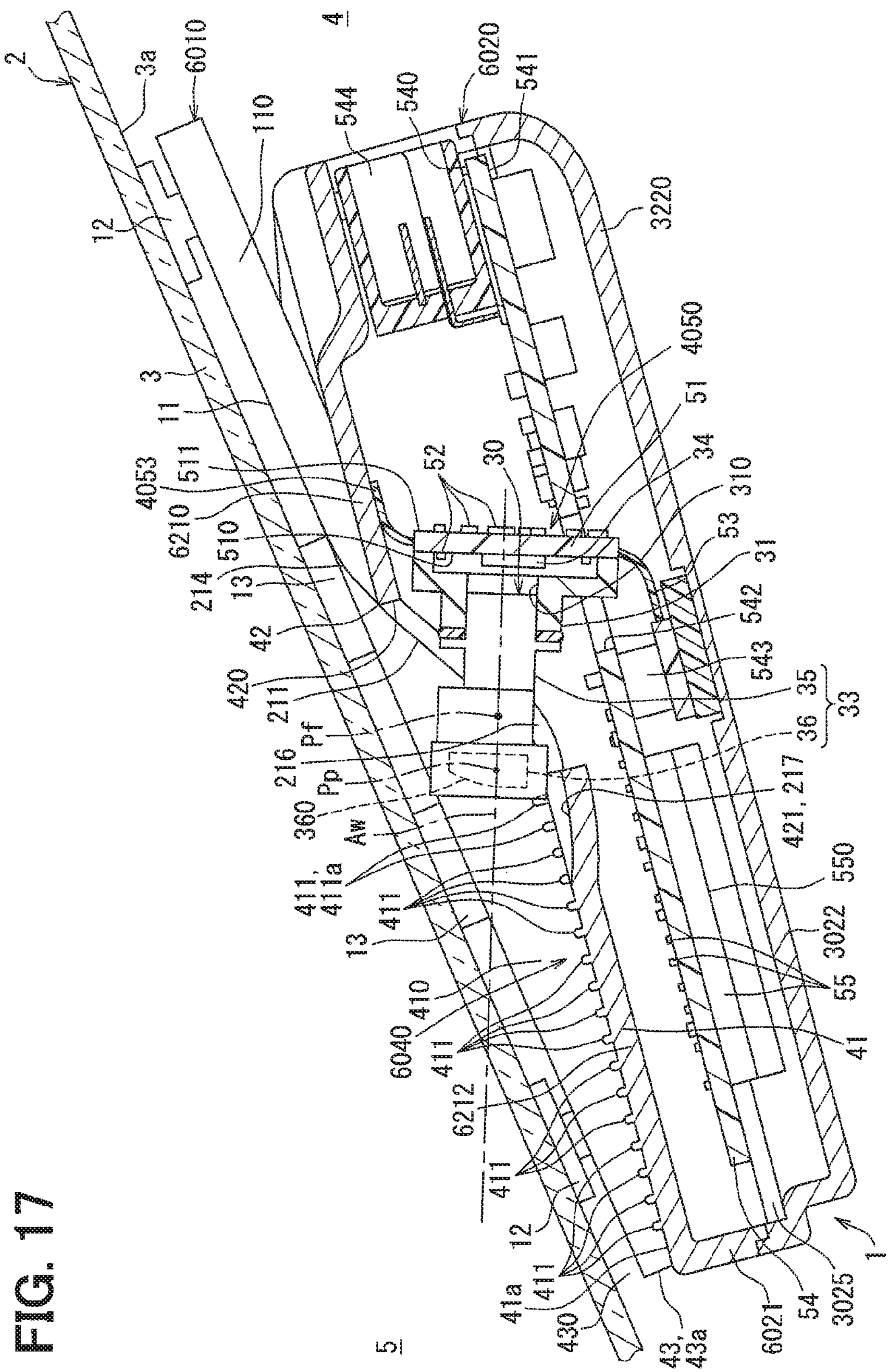
FIG. 17 is a cross-sectional view illustrating a camera module according to a sixth embodiment.

As shown in FIG. 17, a sixth embodiment is a modification of the fourth embodiment.

In a metal camera casing 6020 according to the sixth embodiment, a hood 6040 is formed with a recess wall portion 6212 of an upper casing member 6021. In other words, the hood 6040 configures a part of the camera casing 6020. In this way, in the recess wall portion 6212, the release hole 217 also serves as the incident hole 421 of the hood 6040.

In a bracket assembly 6010 according to the sixth embodiment, the bracket main body 11 is not provided, and the cushion 13 and a mounting pad 12 are held by the upper casing member 6021 in the camera casing 6020. In this way, an opposing wall portion 6210 of the upper casing member 6021, to which an FPC 4053 is connected, is located so as to be directly oppose to the inner surface 3a of the front windshield 3, thereby to be kept as close as possible to the windshield 3.

In this example, a thermal radiation base film or a thermal radiation dummy wiring of the FPC 4053 is connected to an imaging board 51 and the opposing wall portion 6210 in a contact and fixing manner, thereby to provide a thermal radiation path. In this way, the opposing wall portion 6210 having the thermal radiation property is attained. A ground wiring of the FPC 4053 having the conductivity may be connected to the imaging board 51 and the opposing wall portion 6210 in an electrically conductive and fixing manner, thereby to form an electrically conductive path.

According to the sixth embodiment described above, thermal radiation from the opposing wall portion 6210 enables to reduce or eliminate fogging caused by dew condensation on the front windshield 3. The front windshield 3 is located to face the opposing wall portion 6210 of the metal camera casing 6020, which has the thermal radiation property. Therefore, according to the sixth embodiment, the same operational effects as those in the fourth embodiment can be produced while the thermal radiation from the opposing wall portion 6210 is used to contribute to countermeasures against dew condensation in the vehicle 2.

Seventh Embodiment

Figure 18:
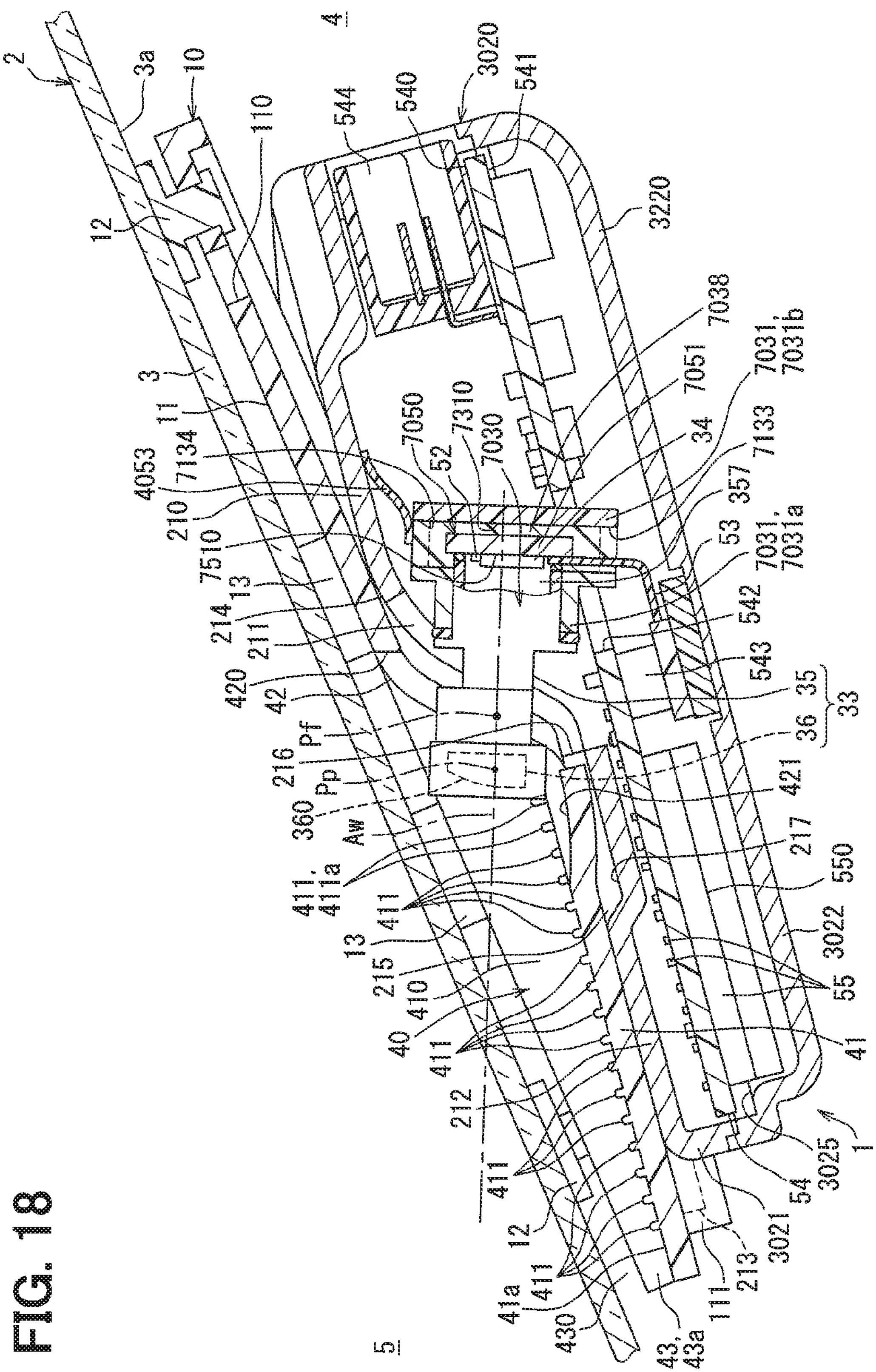
FIG. 18 is a cross-sectional view illustrating a camera module according to a seventh embodiment.

As shown in FIG. 18, a seventh embodiment is a modification of the fourth embodiment.

As components of an image assembly 7030 according to the seventh embodiment, a filler 7038 is combined with an assembly holder 7031, the lens unit 33, and the imager 34. In the image assembly 7030 that is accommodated in the accommodation space 3025 of the metal camera casing 3020, a rear optical path space 7310 is defined by the assembly holder 7031. The assembly holder 7031 is configured with two members 7031a and 7031b. The rear optical path space 7310 is filled with the filler 7038. The filler 7038 is made of, for example, a functional material in which a metal filler is mixed with a resin base. In this way, the filler 7038 is provided with at least one of the thermal radiation property or the conductivity. The filler 7038 may be formed into a gel or the like to provide a buffering property.

In a circuit unit 7050 according to the seventh embodiment, an imaging board 7051, on which an imaging circuit 52 is mounted, is accommodated in the rear optical path space 7310. The imaging circuit 52 is for processing the output from the imager 34, which is to image processing. The imaging board 7051 is fixed and is in contact with the lens barrel 35. In this way, a front mounting surface 7510 of the imaging board 7051 closes the front optical path space 357, which is defined by the lens barrel 35, from the rear side. Together with the imager 34, circuit elements configuring the imaging circuit 52 are mounted on a part of the front mounting surface 7510, which is exposed to the front optical path space 357. In this way, the imager 34 accommodated in the lens barrel 35 and located in the front optical path space 357 is enabled to image the external environment 5 in a state where being restricted from exposure to the rear optical path space 7310 filled with the filler 7038.

In this example, a surface of the imaging board 7051 which is exposed to the rear optical path space 7310 is connected to the filler 7038 having the thermal radiation property in a contact and fixing manner, thereby to provide a thermal radiation path. Further, a ground electrode of the imaging board 7051 exposed to the rear optical path space 7310 is connected to the filler 7038 having the conductivity in an electrically conductive and fixing manner, thereby to form an electrically conductive path. In any of those connection structures, the imaging board 7051, on which the imaging circuit 52 for image processing the output from the imager 34 is mounted, is connected to the filler 7038.

The assembly holder 7031 is provided with a through window 7133, which is in the form of a through hole continuous from the rear optical path space 7310 and is filled with the filler 7038. In the circuit unit 7050, the FPC 53 passes through the filler 7038 with which the through window 7133 is filled. The FPC 53 is inserted into the rear optical path space 7310 and is connected to the imaging board 7051 in the front optical path space 357. The assembly holder 7031 is further provided with a connection window 7134 in the form of a through hole continuous from the rear optical path space 7310 and filled with the filler 7038. In the circuit unit 7050, the FPC 4053 is connected to the filler 7038 with which the connection window 7134 is filled.

In this example, a thermal radiation base film or a thermal radiation dummy wiring of the FPC 4053 is connected to the opposing wall portion 210 of the upper casing member 3021 of the metal camera casing 3020 and the filler 7038, which is in the connection window 7134 and has the conductivity, in a contact and fixing manner, thereby to provide a thermal radiation path. In addition, a conductive ground wiring of the FPC 4053 is connected to the opposing wall portion 210 together with the filler 7038, which is in the connection window 7134 and has the conductivity, in an electrically conductive and fixing manner, thereby to form an electrically conductive path. In any of those connection structures, the camera casing 3020 is connected to the filler 7038 through the FPC 4053, and also connected to the imaging board 7051 through the FPC 4053 and the filler 7038.

According to the seventh embodiment described above, the filler 7038 having the specific property, which is at least one of the thermal radiation property or the conductivity, is filled in a partitioned space 7310 of the assembly holder 7031 and is connected to the metal camera casing 3020. The partitioned space 7310 accommodates the imaging board 7051 on which the imaging circuit 52 for image processing is mounted. According to the configuration, at least one of heat or noise generated in the imaging board 7051 can be transferred to the camera casing 3020 through the filler 7038. Therefore, at least one of a thermal radiation property or an EMC can be enhanced.

Further, the imaging board 7051 according to the seventh embodiment is connected with the metal camera casing 3020 through the FPC 4053 and the filler 7038 having the specific property. In this way, a releasing path for at least one of heat or noise can be provided between the imaging board 7051 and the camera casing 3020 in a state where a manufacturing tolerance can be absorbed by bending the FPC 4053. Therefore, the releasing path for enhancing at least one of the thermal radiation property or the EMC can be secured even in a small space in the downsized camera casing 3020. In addition to the above effects, according to the seventh embodiment, the same operational effects as those in the fourth embodiment can be produced.

Eighth Embodiment

Figure 19:
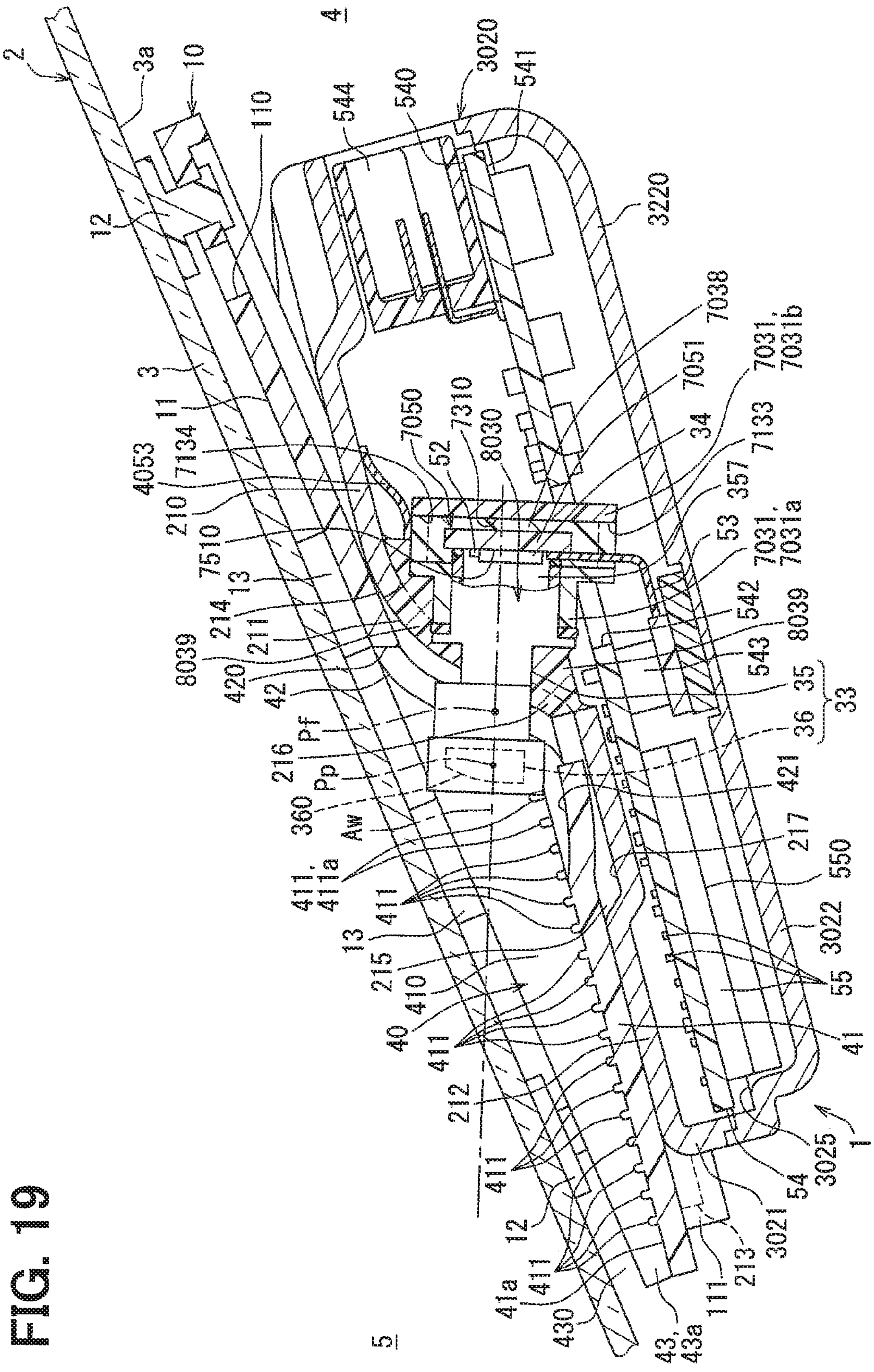
FIG. 19 is a cross-sectional view illustrating a camera module according to an eighth embodiment.
Figure 20:
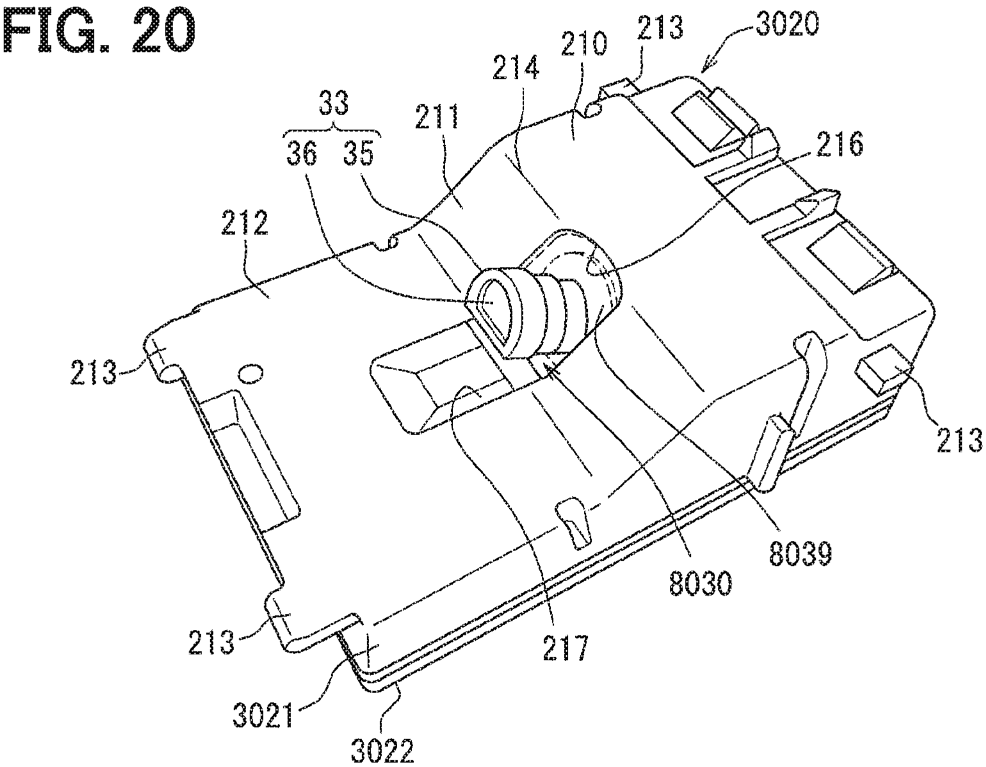
FIG. 20 is a perspective view illustrating the camera module according to the eighth embodiment.

As shown in FIGS. 19 and 20, an eighth embodiment is a modification of the fourth embodiment.

As components of an image assembly 8030 according to the eighth embodiment, an adhesive 8039 is combined with the assembly holder 7031, the lens unit 33, and the imager 34 together with the filler 7038. The adhesive 8039 adheres each of the lens unit 33 and the assembly holder 7031, which are fixed to each other, to the camera casing 3020. As shown in FIG. 19, in the eighth embodiment, more particularly, the adhesive 8039 extends continuously from a portion between the lens barrel 35 of the lens unit 33 and the bent wall portion 211 of an upper casing member 3021 to a portion between the assembly holder 7031 and the bent wall portion 211. As shown in FIGS. 19 and 20, in the eighth embodiment, a space between the lens window 216 of the bent wall portion 211 and the lens barrel 35 of the lens unit 33 is fully filled with the adhesive 8039. The lens window 216 is the through hole exposing the lens unit 33 to the outside of the camera casing 3020.

The adhesive 8039 is produced by curing a liquid functional material such as a metal filler mixed with a resin base. Before the adhesive 8039 is cured, an adhesive posture of the lens unit 33 and the assembly holder 7031 is adjusted so as to position the lens unit 33 and the imager 34 relative to the camera casing 3020. Further, after the adhesive 8039 has been cured, the adhesive 8039 having at least one of the thermal radiation property or the conductivity adheres both of the lens unit 33 and the assembly holder 7031 to the metal camera casing 3020. Under the above state, the adhesive 8039 spreads over the outer surface of the filler 7038 exposed from the inside of the connection window 7134 of the assembly holder 7031. In this way, the imaging board 7051 is connected to the adhesive 8039 through the filler 7038. The imaging circuit 52, which is for image processing the output from the imager 34, is mounted on the imaging board 7051. In the eighth embodiment described above, there is no need to fasten both end portions 311 of the assembly holder 31 to the upper casing member 21 with a screw.

In this example, a thermal radiation base film or a thermal radiation dummy wiring of the FPC 4053 is connected to the opposing wall portion 210 of the upper casing member 3021 of the camera casing 3020 together with the adhesive 8039 and the filler 7038, each of which has the conductivity, in a contact and fixing manner, thereby to provide a thermal radiation path. In addition, a conductive ground wiring of the FPC 4053 is connected to the opposing wall portion 210 together with the adhesive 8039 and the filler 7038, each of which has the conductivity, in an electrically conductive and fixing manner, thereby to form an electrically conductive path. In any of those connection structures, the camera casing 3020 is connected to the filler 7038 through the adhesive 8039 and the FPC 4053, and is further connected to the imaging board 7051 through the components 8039, 4053, and 7038.

According to the eighth embodiment described above, the adhesive 8039 having the specific property, which is at least one of the thermal radiation property or the conductivity, adheres at least one of the lens unit 33 or the assembly holder 7031, which is accommodated in the metal camera casing 3020, to the camera casing 3020, in a connection state with the imaging board 7051 on which the imaging circuit 52 for image processing is mounted. According to the configuration, at least one of heat or noise generated in the imaging board 7051 can be transferred to the camera casing 3020 through the adhesive 8039. Therefore, at least one of a thermal radiation property or an EMC can be enhanced.

Further, according to the eighth embodiment, the clearance between the lens window 216 and the lens unit 33 is filled with the adhesive 8039, which has the specific property and is connected to the imaging board 7051. The lens window 216 is the through hole for exposing the lens unit 33 in the metal camera casing 3020 to the outside of the camera casing 3020. According to the configuration, an adhesive area between the adhesive 8039 and the camera casing 3020 increases, thereby to enable to enhance a releasing efficiency of at least one of heat or noise. At the same time, the clearance between the lens window 216 and the lens unit 33 is filled, thereby being capable of restricting occurrence of a malfunction caused by foreign matter entering into the camera casing 3020 through a space between the lens window 216 and the lens unit 33. The configuration enables to improve reliability of enhancing at least one of the thermal radiation property or the EMC as well as the durability.

Further, according to the eighth embodiment, the metal camera casing 3020 is connected to the imaging board 7051 on which the imager 34 is mounted through the adhesive 8039 and the filler 7038 having the specific property. According to the configuration, the releasing path for at least one of heat or noise can be formed between the imaging board 7051 and the camera casing 3020 in a state in which the adhesive posture of the lens unit 33 and the assembly holder 7031 held with the adhesive 8039 can be adjusted. Therefore, the same operational effects as those in the seventh embodiment can be produced while the positioning state of the lens unit 33 and the imager 34 is simply adjusted with an adhesive posture adjustment conforming to product specifications.

Ninth Embodiment

Figure 21:
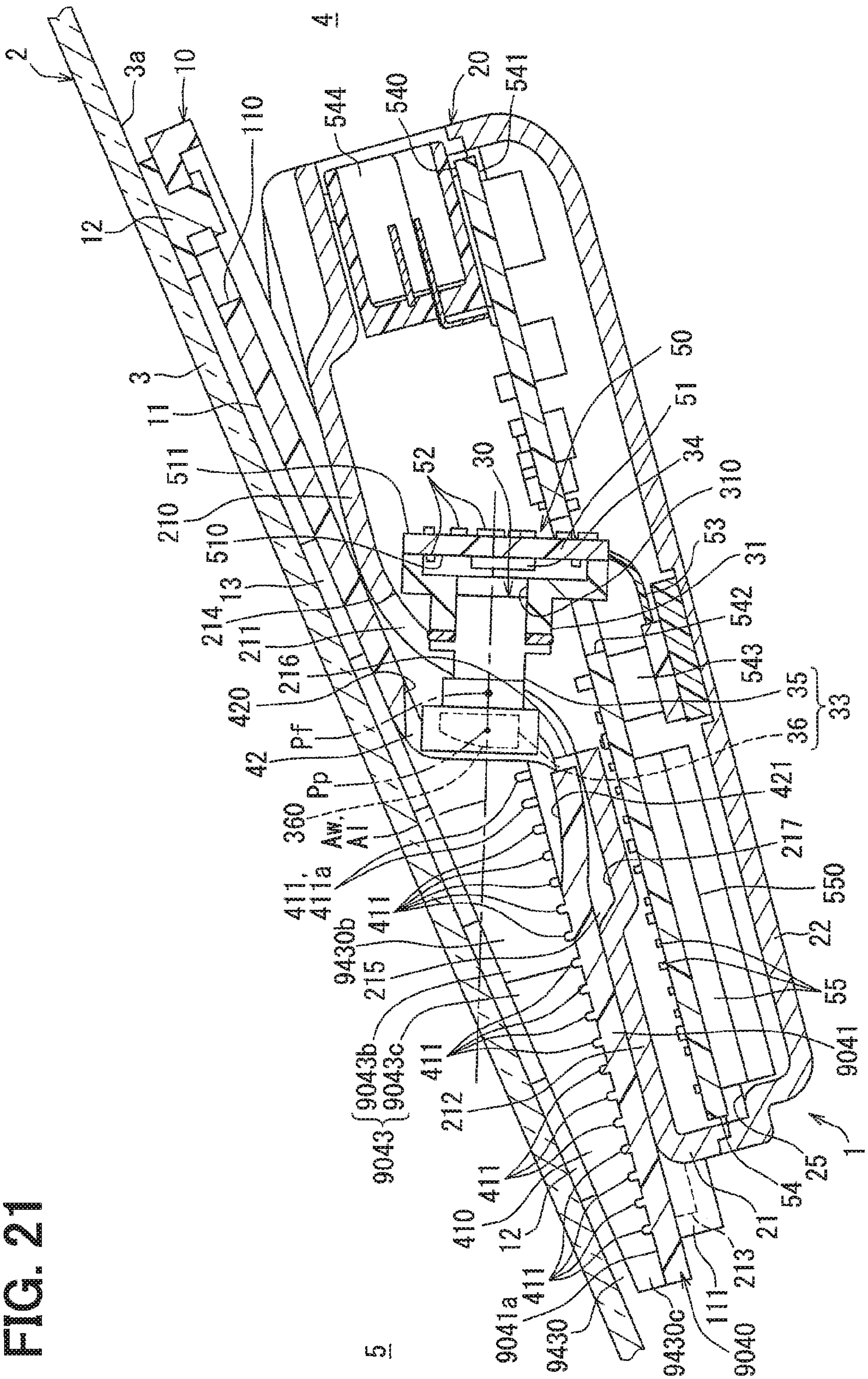
FIG. 21 is a cross-sectional view illustrating a camera module according to a ninth embodiment.
Figure 29:
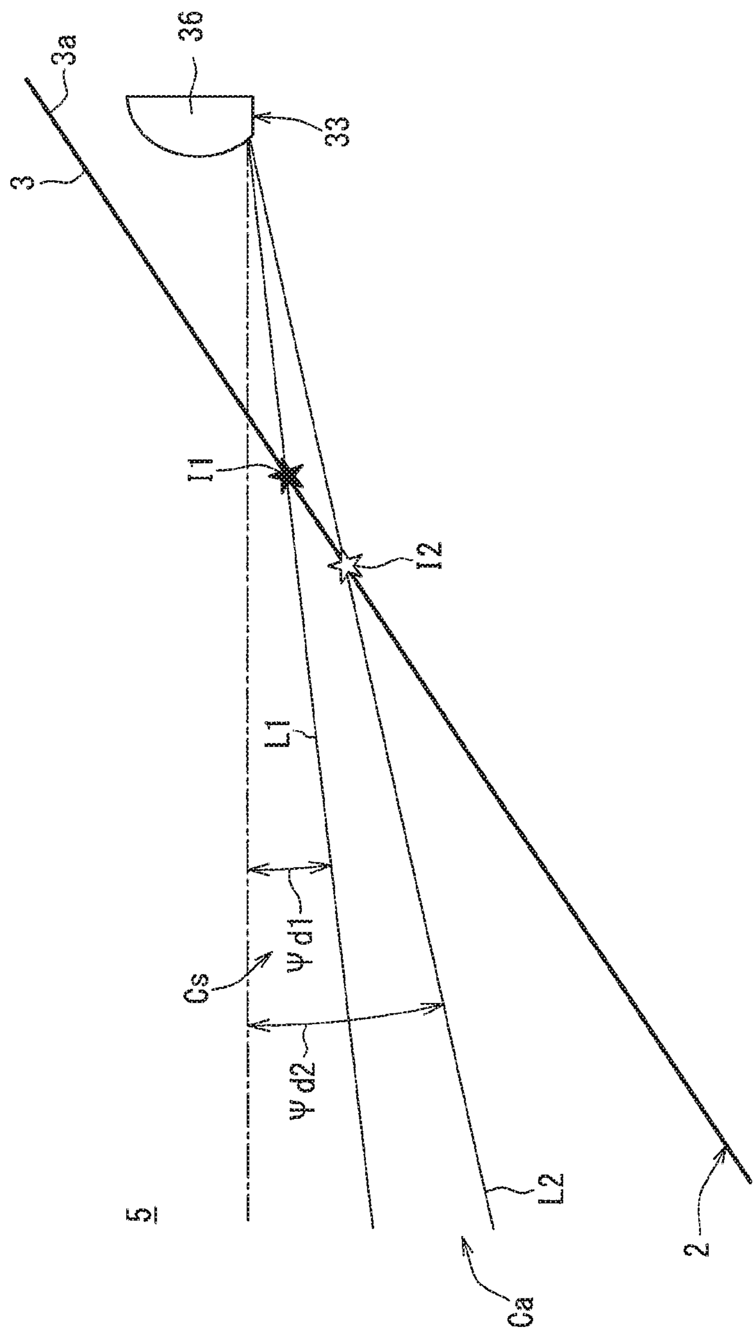
FIG. 29 is a schematic side view illustrating the structure of the hood according to the ninth embodiment.

As illustrated in FIGS. 21 and 29, a ninth embodiment is a modification of the first embodiment. In the ninth embodiment shown in FIGS. 21 to 24, a hood 9040 having a light shielding property (in other words, non-transmissibility) includes a base wall portion 9041 and side wall portions 9043 together with the rear end wall portion 42. The base wall portion 9041 and the side wall portions 9043 are respectively substituted for the base wall portion 41 and the side wall portions 43 in the first embodiment.

Figure 22:
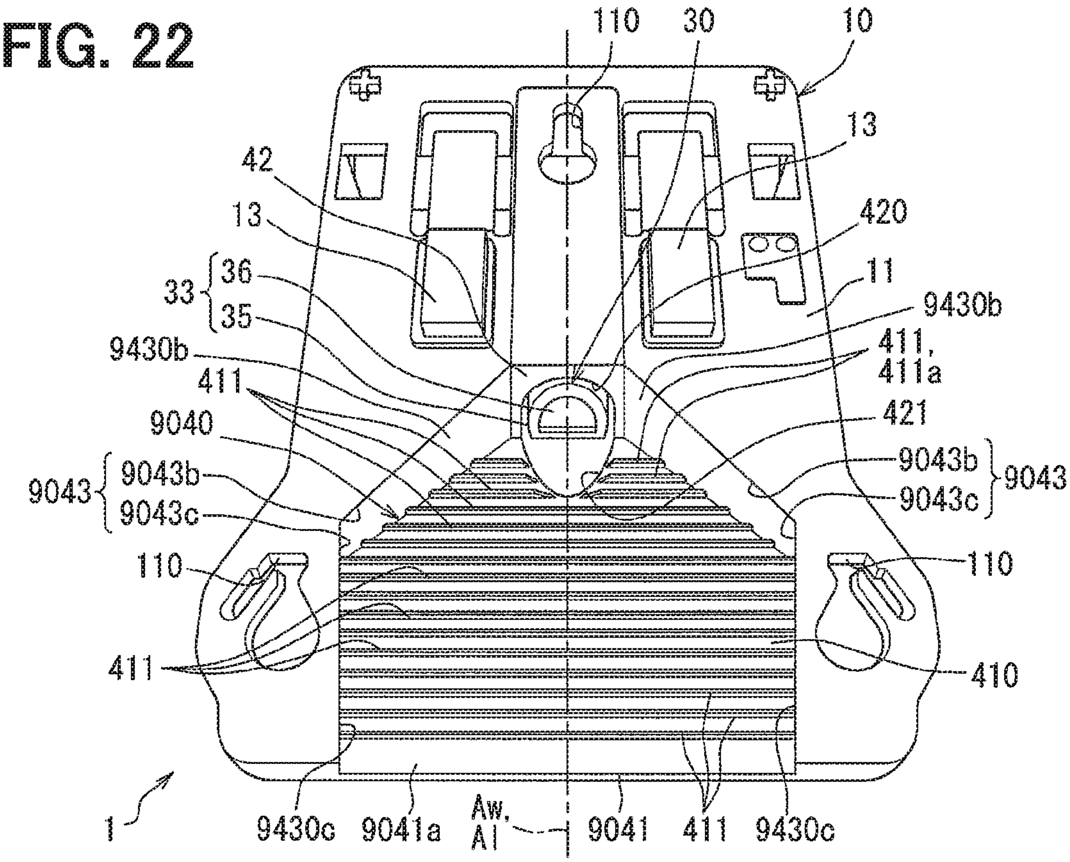
FIG. 22 is a perspective view illustrating the camera module according to the ninth embodiment.
Figure 23:
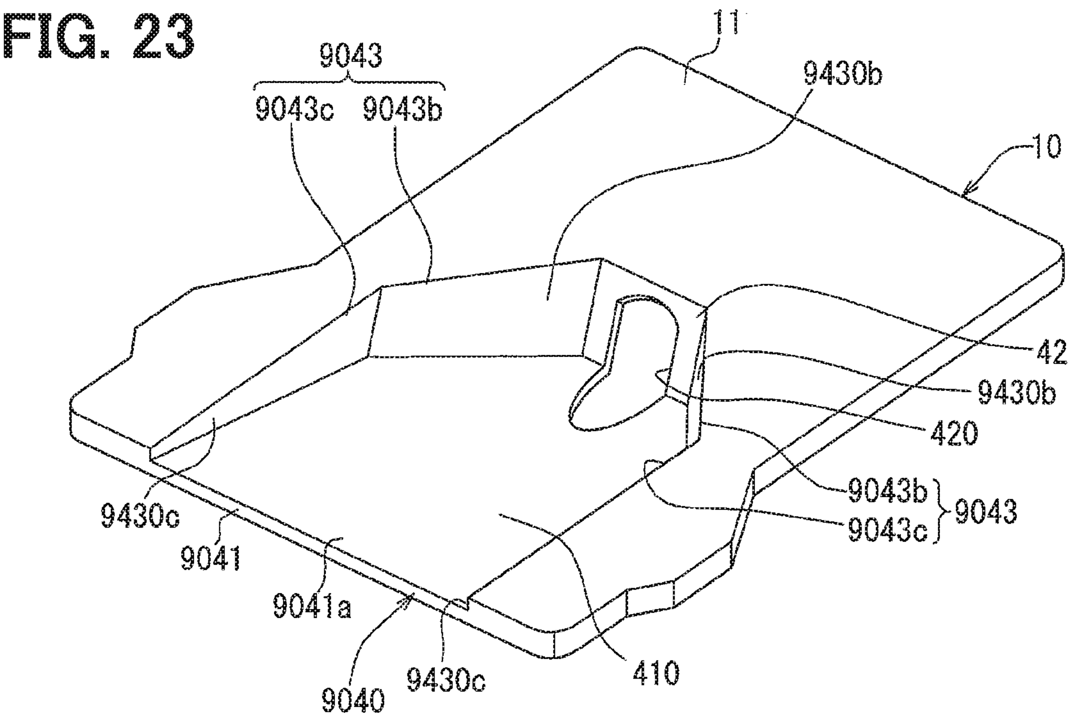
FIG. 23 is a perspective view illustrating a bracket assembly and a hood according to a ninth embodiment.
Figure 24:
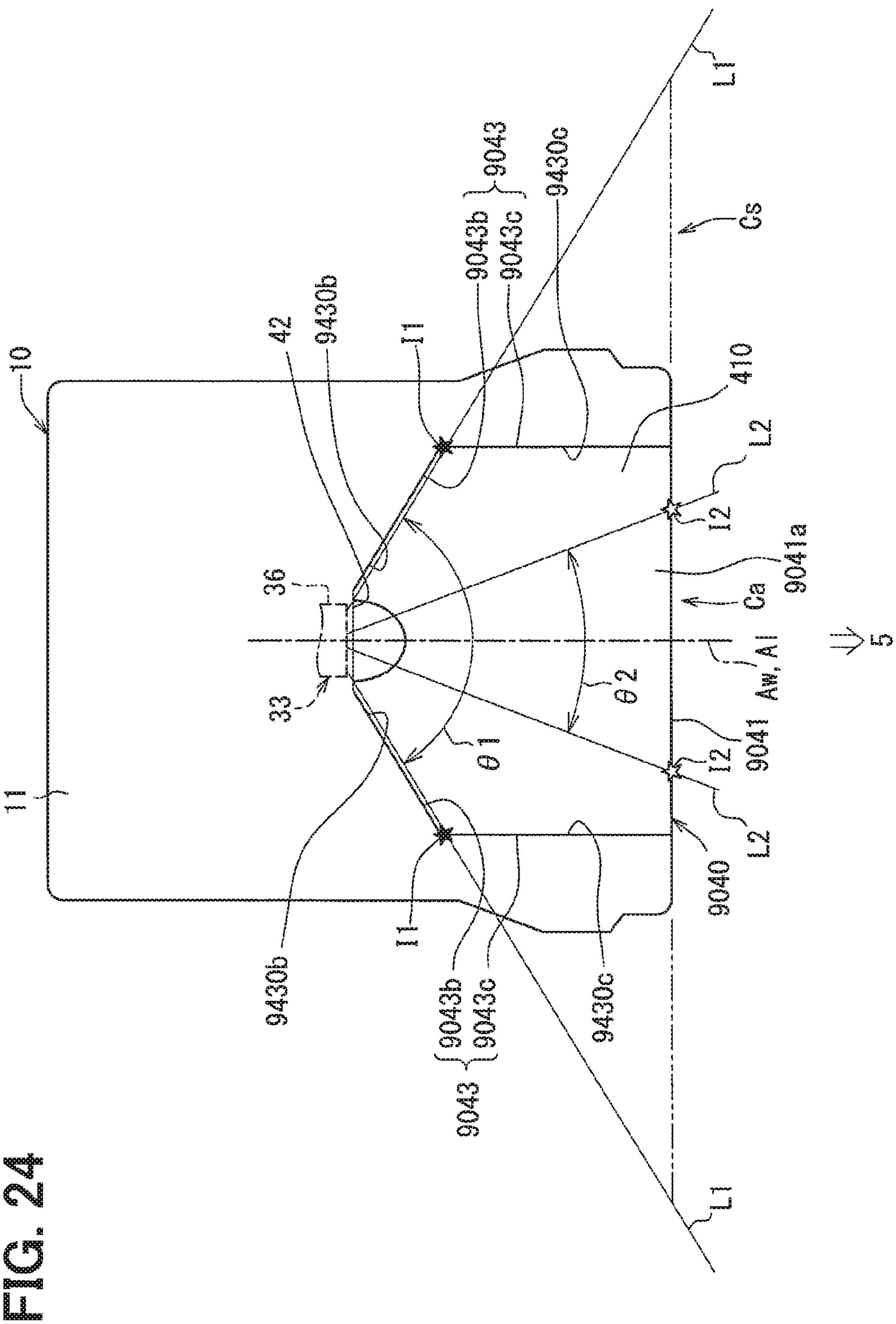
FIG. 24 is a top view illustrating the bracket assembly and the hood according to the ninth embodiment.

In the vehicle 2, a bottom wall surface 9041*a* of the base wall portion 9041 spreads in a trapezoidal substantially planar shape facing the inner surface 3*a* of the front windshield 3 across an imaging space 410. According to the first embodiment, the base wall portion 9041 is provided with multiple restriction ribs 411 protruding from the bottom wall surface 9041*a* into the imaging space 410 as shown in FIGS. 21 and 22. One or more of the restriction ribs 411 are adjusted to be specific ribs 411*a* each having a higher protrusion height around the lens unit 33. In FIGS. 23 and 24, partial components such as the multiple restriction ribs 411 including the specific ribs 411*a* are omitted from illustration. In addition, in the ninth embodiment and the subsequent embodiments, figures, in drawings corresponding to FIGS. 23 and 24, the partial components are omitted in the same way.

As shown in FIGS. 21 to 24, the side wall portions 9043 are raised substantially perpendicularly from the entire side edge of the base wall portion 9041 on both sides of the imaging space 410, so that each of the side wall portions 9043 has a bent plate-like shape. Each of the side wall portions 9043 has an inclined portion 9043*b* and a straight portion 9043*c*.

The inclined portions 9043*b* of the respective side wall portions 9043 are provided on the left and right sides symmetrically with the optical axes Aw and Al of the lens unit 33. The inclined portions 9043*b* of the respective side wall portions 9043 are inclined and spread from a side periphery of the lens barrel 35 of the lens unit 33, which is exposed through the lens window 420, to an oblique front side (that is, diagonally external environment 5 side) with respect to the optical axes Aw and Al. In this way, in the inclined portions 9043*b* of the respective side wall portions 9043, a mutual space is defined between respective inner wall surfaces 9430*b* each having a trapezoidal planar shape. The mutual space gradually spreads toward the front side (that is, the external environment 5 side). In the inclined portions 9043*b* of the respective side wall portions 9043, a height from the base wall portion 9041 gradually decreases toward the front side. In this way, the inclined portions 9043*b* of the respective side wall portions 9043 are located in a posture in which the inclined portions 9043*b* are spaced from the inner surface 3*a* of the front windshield 3 with a clearance 9430.

The straight portions 9043*c* of the respective side wall portions 9043 are provided on the left and right sides symmetrically with the optical axes Aw and Al of the lens unit 33. The straight portion 9043*c* of each side wall portion 9043 spreads from a front end portion (that is, an end portion on the external environment 5 side) of the inclined portion 9043*b* of the same side wall portion 9043. The straight portion 9043*c* spreads substantially in parallel with the optical axes Aw and Al. In this way, in the straight portions 9043*c* of the respective side wall portions 9043, inner wall surfaces 9430*c* each having a trapezoidal planar shape are spaced apart from each other at a substantially constant mutual distance over the entire longitudinal region. A height of the straight portion 9043*c* from the base wall portion 9041 is equal to a height of the inclined portion 9043*b* at the front end portion of the inclined portion 9043*b* in the same side wall portion 9043. The height of the straight portion 9043*c* gradually decreases toward the front side. In this way, the straight portion 9043*c* of each side wall portion 9043 is also located in a posture in which the straight portion 9043*c* is spaced from the inner surface 3*a* of the front windshield 3 with the clearance 9430.

Figure 25:
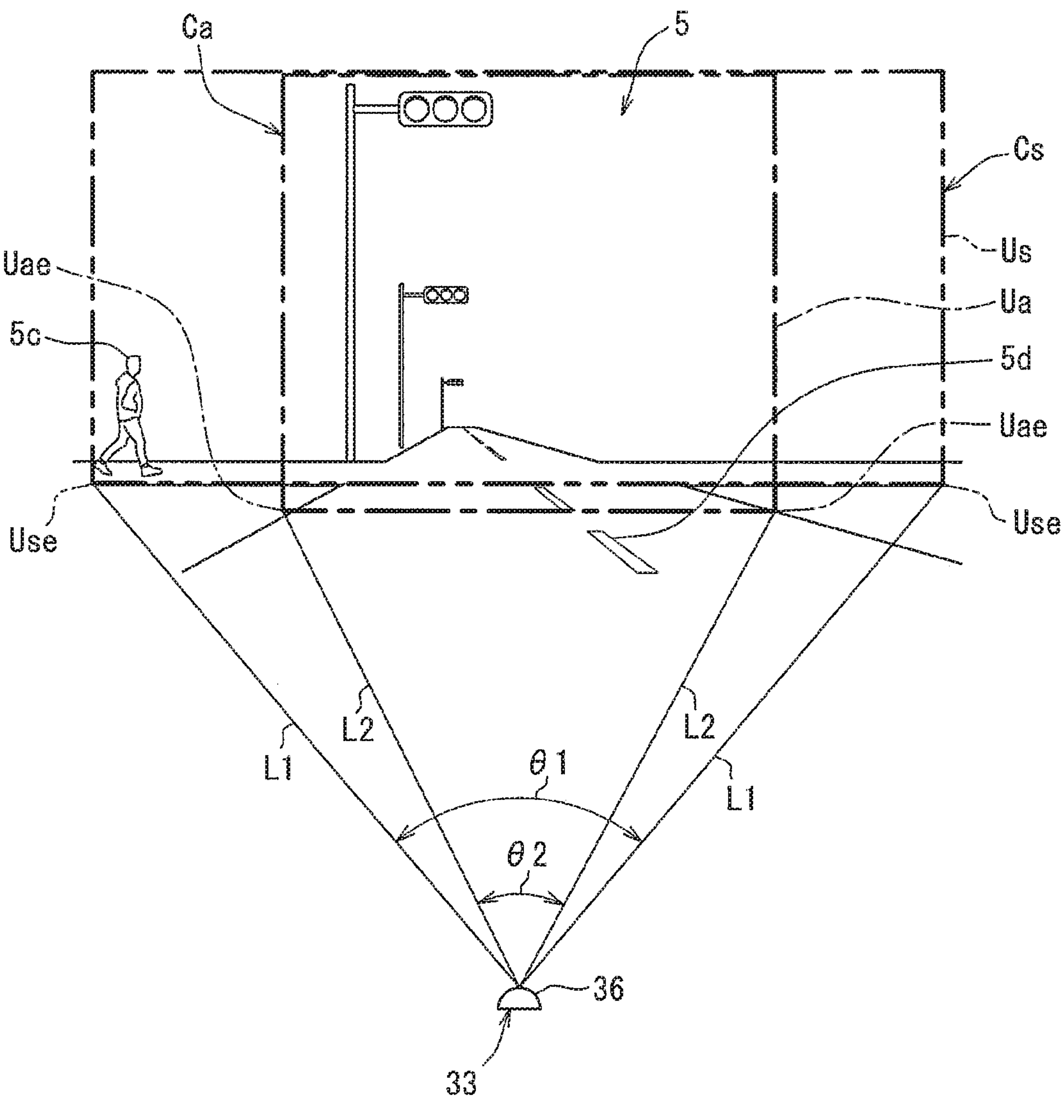
FIG. 25 is a front schematic view illustrating a control function according to the ninth embodiment.
Figure 26:
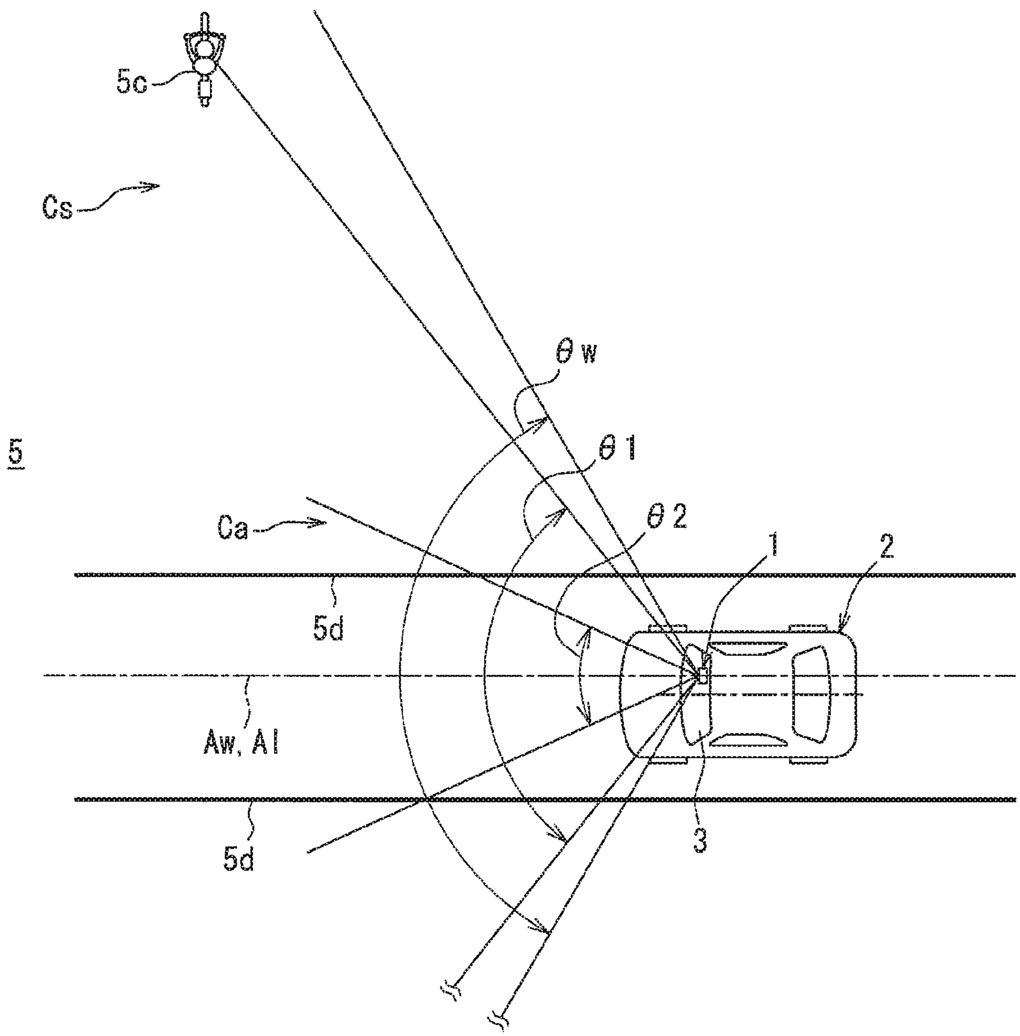
FIG. 26 is a schematic top view illustrating a vehicle control function according to the ninth embodiment.

In the ninth embodiment, control functions of the vehicle 2 according to a situation of the external environment 5 shown in FIGS. 25 and 26 are installed in the control circuit 55 or an external circuit such as an ECU connected to the external connector 544. In this example, one of the control functions is a collision avoidance control of the vehicle 2 against the front obstacle 5*c* (for example, a pedestrian, a bicycle, another vehicle, or the like) as a specific control Cs of the vehicle 2. A specific example of the specific control Cs is an autonomous emergency braking (AEB) that automatically controls a vehicle speed of the vehicle 2 when an emergency control condition, in which a time to collision (TTC) is several seconds or less, arises, thereby to forcibly decelerate the vehicle 2, or the like. In addition, one of the control functions is a driving control of the vehicle 2 in a traveling lane as another control Ca of the vehicle 2 different from the specific control Cs. A specific example of the other control Ca is a lane keeping assist (LKA) that automatically controls a position of the vehicle 2 in a width direction of the traveling lane to restrict a deviation of the vehicle 2 from a lane marking 5*d* such as a lane line or a yellow lane line on a road surface, or the like.

As shown in FIGS. 24 to 27, a horizontal angle of view range, which is necessary for the specific control Cs of the vehicle 2, falls within the imaging target range of the external environment 5 for the camera module 1 mounted on the front windshield 3. The horizontal angle of view range is defined by a first taper angle θ1 with the optical axes Aw and Al as a bisector when viewed in the vertical direction (that is, in a horizontal plane view) of the vehicle 2, which is on the horizontal plane. In this example, the first taper angle θ1 is smaller than a horizontal angle of view range of the lens angle of view θw defined around the optical axes Aw and Al of the lens unit 33. For example, the first taper angle θ1 is set to an angle of 100° or more to enable imaging of the front obstacle 5*c*, which precedes the vehicle 2 by 13 meter or more, on condition that the TTC is equal to or more than 2.4 seconds. In the ninth embodiment, the lens angle of view θw is set to a large wide angle such as 120° or more through the wide angle lens 36.

Figure 28:
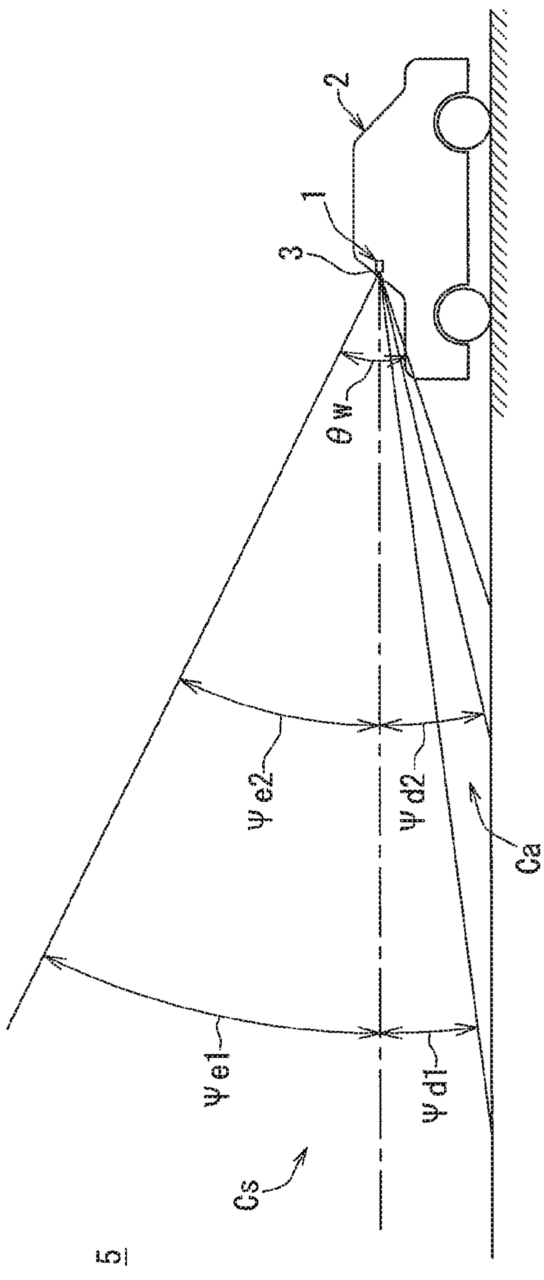
FIG. 28 is a schematic side view illustrating a vehicle control function according to the ninth embodiment.

As shown in FIGS. 28 and 29, a vertical angle of view range necessary for the specific control Cs of the vehicle 2 falls within the imaging target range of the external environment 5 for the camera module 1 mounted on the front windshield 3. The vertical angle of view range is defined by a sum of a first depression angle ψd1 and a first elevation angle ψe1 in a horizontal-direction view (that is, side view) of the vehicle 2, which is on the horizontal plane. In this example, the sum of the first depression angle ψd1 and the first elevation angle ψe1 is smaller than a vertical angle of view range of the lens angle of view θw. For example, the first depression angle ψd1 is set to such as an angle of 6° or less to enable imaging of the front obstacle 5*c*, which precedes the vehicle 2 by 13 meter or more, on condition that the TTC is equal to or more than 2.4 seconds.

Figure 27:
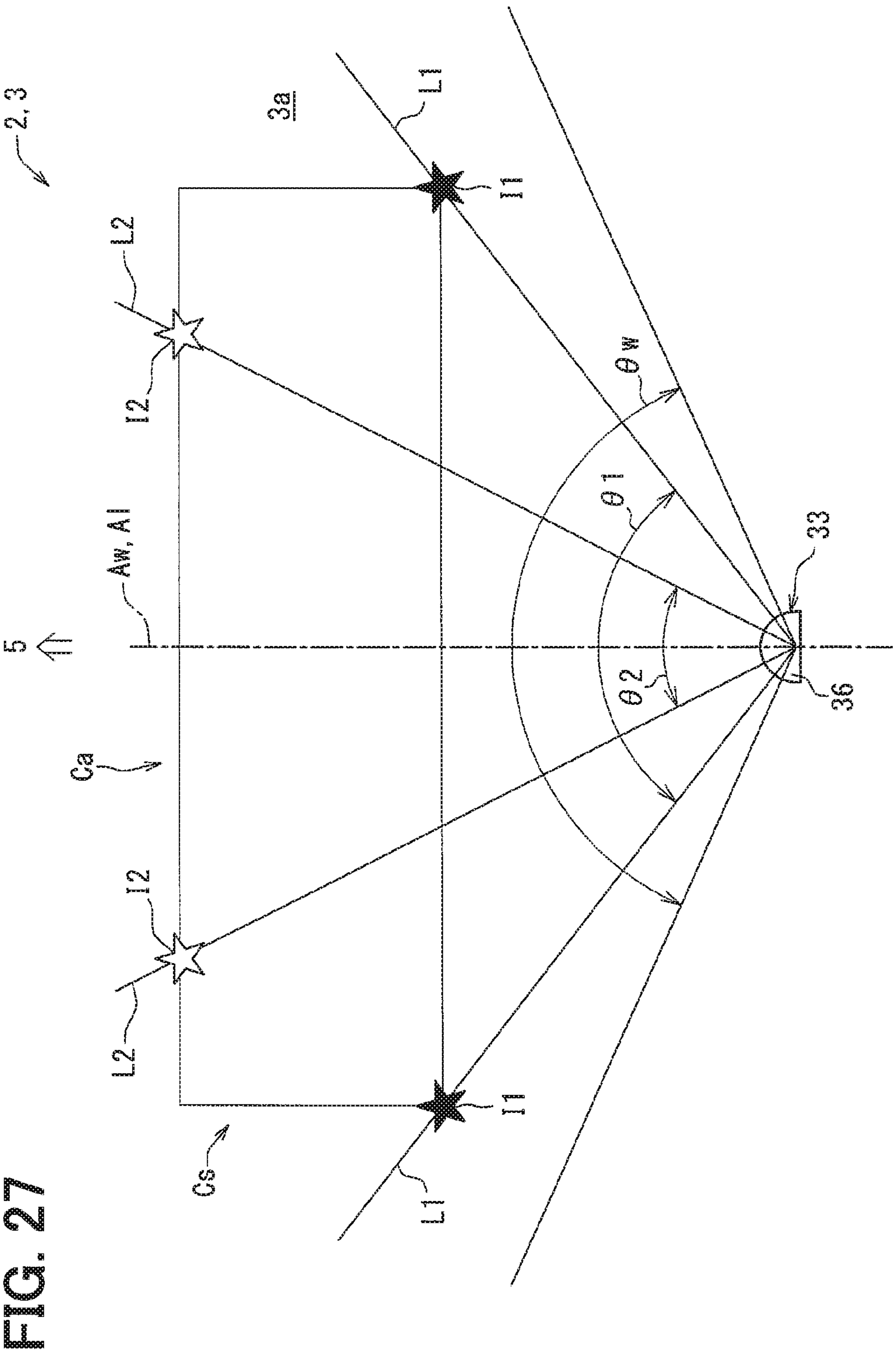
FIG. 27 is a schematic top view illustrating a structure of the hood according to the ninth embodiment.

As shown in FIG. 25, an individual imaging range Us used to be specialized for the specific control Cs is determined according to the horizontal angle of view range and the vertical angle of view range of the external environment 5 necessary for the specific control Cs. Therefore, as shown in FIGS. 24, 25, 27, and 29, a light ray entering the wide angle lens 36 of the lens unit 33 at the first taper angle θ1 and the first depression angle ψd1 from both of right and left ends Use of a lowermost portion of the individual imaging range Us is assumed as a first lower light ray L1. Under the above assumption, a point, at which each first lower light ray L1 associated with the specific control Cs imaginarily intersects with the inner surface 3*a* of the front windshield 3 in the vehicle 2, is defined as first imaginary intersections I1 as shown in FIGS. 24, 27, and 29. As shown in FIG. 24, each of the first imaginary intersections I1 is associated with an upper part of the front end portion of the inclined portion 9043*b* of each side wall portion 9043, thereby to realize the following configuration of each side wall portion 9043.

On the lens unit 33 side (that is, on the rear side) of the first imaginary intersections I1 in the vehicle 2, each of the side wall portions 9043 forms an inner wall surface 9430*b* of the inclined portion 9043*b* on the outside of both the right and left taper lines of the first taper angle θ1 across a slight clearance when viewed in the vertical direction. The right and left taper lines of the first taper angle θ1 substantially overlap with the respective first lower light rays L1. In this way, in the inclined portion 9043*b* of each side wall portion 9043 directed from the periphery of the lens unit 33 to each first imaginary intersection I1 in the vehicle 2, the inner wall surface 9430*b* spreads along the taper line at the angle θ1 on the outside of the first taper angle θ1 when viewed in the vertical direction. On the other hand, on the external environment 5 side (that is, front side) of the first imaginary intersections I1 in the vehicle 2, each of the side wall portions 9043 forms the inner wall surface 9430*c* of the straight portion 9043*c* so as to spread substantially in parallel with the optical axes Aw and Al inside both the right and left taper lines at the first taper angle θ1 when viewed in the vertical direction. With the configuration described above, when viewed in the vertical direction of each side wall portion 9043, the inclined portion 9043*b* and the straight portion 9043*c* enter the inside of the lens angle of view θw.

To the contrary, as shown in FIGS. 24 to 27, the horizontal angle of view range required for the other control Ca of the vehicle 2 falls within the imaging range of the external environment 5. The horizontal angle of view range is defined by a second taper angle θ2 with the optical axes Aw and Al as a bisector when viewed in the vertical direction of the vehicle 2, which is on the horizontal plane. In this example, the second taper angle θ2 is further smaller than the first taper angle θ1 which is smaller than the horizontal angle of view range of the lens angle of view θw. For example, the second taper angle θ2 is set to an angle of 50° or more and less than 100° to enable imaging of the lane marking 5*d* on a road surface, which precedes the vehicle 2 by 8.5 meter or more.

As shown in FIGS. 28 and 29, the vertical angle of view range required for the other control Ca of the vehicle 2 falls within the imaging target range of the external environment 5. The vertical angle of view range is defined by a sum of a second depression angle ψd2 and a second elevation angle ψe2 in the horizontal-direction view of the vehicle 2, which is on the horizontal plane. In this example, the sum of the second depression angle ψd2 and the second elevation angle ψe2 is smaller than the vertical angle of view range of the lens angle of view θw. For example, the second depression angle ψd2 is set to an angle of 6° or more and 12° or less to enable imaging of the lane marking 5*d* on the road surface, which precedes the vehicle 2 by 8.5 meter or more. The second depression angle ψd2 is larger than the first depression angle ψd1.

As shown in FIG. 25, an individual imaging range Ua used to be specialized for the other control Ca is determined according to the horizontal angle of view range and the vertical angle of view range of the external environment 5 necessary for the other control Ca. Therefore, as shown in FIGS. 24, 25, 27, and 29, a light ray entering the wide angle lens 36 of the lens unit 33 at the second taper angle θ2 and the second depression angle ψd2 from both of right and left ends Uae of a lowermost portion of the individual imaging range Ua is assumed as a second lower light ray L2. Under the above assumption, a point, at which each second lower light ray L2 associated with the other control Ca imaginarily intersects with the inner surface 3*a* of the front windshield 3 in the vehicle 2, is defined as second imaginary intersections I2 as shown in FIGS. 24, 27, and 29. As shown in FIG. 24, each of the second imaginary intersections I2 is associated with an upper portion of the front end portion of the base wall portion 9041, thereby to realize the following configuration of the base wall portion 9041 and each side wall portion 9043.

On the lens unit 33 side (that is, on the rear side) of the second imaginary intersections I2 in the vehicle 2, the base wall portion 9041 forms the bottom wall surface 9041*a* in an entire inside area and a predetermined outside area that sandwich both the right and left taper lines of the second taper angle θ2, which substantially overlap with the respective second lower light rays L2, when viewed in the vertical direction. In this way, in the vehicle 2, the base wall portion 9041 extends from the periphery of the lens unit 33 to the second imaginary intersections I2 and to both the inside and the outside of the second imaginary intersections I2. In the base wall portion 9041, the bottom wall surface 9041*a* spreads to an inside portion of the taper lines of the first taper angle θ1 outside the second imaginary intersections I2 when viewed in the vertical direction. In addition, in the straight portion 9043*c* of each side wall portion 9043, the inner wall surface 9430*c* spreads to the inside portion of the taper lines of the first taper angle θ1 outside the second imaginary intersections I2 when viewed in the vertical direction. With the configuration described above, the base wall portion 9041 and the straight portion 9043*c* of each side wall portion 9043 are formed so as to spread laterally outward the second imaginary intersections I2 when viewed in the vertical direction.

In the ninth embodiment described above, as shown in FIGS. 22 to 24, the bracket assembly 10 is configured with the bracket main body 11 integrally formed with the hood 9040. The bracket assembly 10 is detachably attached to the front windshield 3 by fitting and detachment of the mounting pad 12 into and from the mounting slots 110 as shown in FIG. 21. Further, as in the first embodiment, the camera casing 20 that accommodates the lens unit 33 and the imager 34 is hung from the bracket assembly 10 mounted to the front windshield 3 together with the hood 9040 in the vehicle 2 as shown in FIG. 21.

(Operational Effects)

Subsequently, the operational effects of the ninth embodiment described above will be described.

Further, according to the hood 9040 of the ninth embodiment as in the first embodiment, excess light incidence from the external environment 5 outside the imaging target range of the imager 34 to the lens unit 33 is restricted. The configuration enables to restrict excess light from being superimposed on the normal optical image within the imaging target range and from interfering with the imaging.

In particular, according to the hood 9040 of the ninth embodiment, the base wall portion 9041 is located to face the front windshield 3 across the imaging space 410, and each side wall portion 9043 raised from the base wall portion 9041 on the lateral side of the imaging space 410 spreads from the periphery of the lens unit 33 toward the imaginary intersections I1 in the vehicle 2. According to the configuration, even though the hood 9040 is formed small, incidence of the lower light ray L1 is unlikely blocked with the side wall portion 9043. The lower light ray L1 intersects with the front windshield 3 at the imaginary intersections I1 at the taper angle θ1 and defines the horizontal angle of view range, which is smaller than that of the lens unit 33, in the imaging target range. Therefore, the configuration enables to reduce in size the camera module 1, which includes the hood 9040 that secures the taper angle θ1 to enable to capture the normal optical image.

Further, in the first embodiment, the lens unit 33 according to the ninth embodiment includes the wide angle lens 36 to ensure the wide lens angle of view θw. Therefore, a concern arises that incident of excess light increases and that the hood 9040 becomes larger in size. However, as described above, in the ninth embodiment, the excess light incident on the lens unit 33 is restricted. Therefore, even though the hood 9040 is formed small, the light incidence at the taper angle θ1 is unlikely to be blocked. Moreover, in the ninth embodiment employing the specific wide angle lens 36 as in the first embodiment, even though the size of the wide angle optical surface 360 is reduced, imaging of the normal optical image can be secured. From the above viewpoints, the configuration enables to reduce in size the camera module 1 that includes the hood 9040, which secures the taper angle θ1 enabling to image the normal optical image, and the wide angle lens 36.

As in the first embodiment, according to the hood 9040 of the ninth embodiment, the base wall portion 9041 is located to face the front windshield 3 across the imaging space 410, and in the base wall portion 9041, the multiple restriction ribs 411 protrude into the imaging space 410 to restrict the light reflection on the lens unit 33. The configuration enables to restrict the reflected light on the base wall portion 9041, which is likely to increase light incidence, from being superimposed on the normal optical image within the taper angle θ1 and from interfering with the imaging, in the placement of the base wall portion 9041 to face the front windshield 3.

In addition, as in the first embodiment, according to the hood 9040 of the ninth embodiment, the specific ribs 411*a* having the higher protrusion height around the lens unit 33 among the multiple restriction ribs 411 are likely to block the optical path in which reflected light on the base wall portion 9041 travels toward the lens unit 33. The configuration enables to enhance the effect of restricting the reflected light on the base wall portion 9041 from being superimposed on the normal optical image within the taper angle θ1 and from interfering with the imaging.

According to the hood 9040 of the ninth embodiment, the side wall portions 9043 of the vehicle 2 are spread along the taper angle θ1 on the outside of the taper angle θ1 on the lens unit 33 side of the imaginary intersections I1. According to the configuration, the hood 9040 can be formed in a limited size for securing the taper angle θ1. The configuration enables to promote reduction in size of the camera module 1 including the hood 9040 which secures the taper angle θ1 to enable to image the normal optical image.

Further, according to the hood 9040 of the ninth embodiment, in the vehicle 2, each of the side wall portions 9043 spreads to the inside of the taper angle θ1 on the side where the side wall portions 9043 are unlikely to affect the taper angle θ1, that is, on the external environment 5 side beyond the imaginary intersections I1. The taper angle θ1 is secured by spreading the side wall portions 9043 from the lens unit 33 to the imaginary intersections I1. In this case, the hood 9040 can be formed small because of the spreading of the side wall portions 9043 inside the taper angle θ1. In addition, light, which would enter the inside of the taper angle θ1 after being reflected on the front windshield 3, can be blocked before being reflected. Therefore, the configuration enables to restrict the reflected light on the front windshield 3 from being superimposed on the normal optical image and from interfering with the imaging, while promoting reduction in size of the camera module 1 including the hood 9040 which secures the taper angle θ1 and enables to image the normal optical image.

In this example, the side wall portions 9043 of the vehicle 2 may be brought into a state in which the inner side of the taper angle θ1 spreads along the optical axes Aw and Al of the lens unit 33 on the external environment 5 side beyond the imaginary intersections I1 as in the hood 9040 of the ninth embodiment. The configuration enables to form the small hood 9040 with a relatively simple structure because of the spreading of the side wall portions 9043 inside the taper angle θ1 along the optical axes Aw and Al. In addition, light, which would enter the inside of the taper angle θ1 if reflected on the front windshield 3, can be blocked before being reflected. Therefore, the reflected light on the front windshield 3 can be restricted from being superimposed on the normal optical image and from interfering with the imaging while the configuration promotes reduction in size and simplification of the camera module 1 including the hood 9040 which secures the taper angle θ1 enabling to image the normal optical image.

According to the hood 9040 of the ninth embodiment, as described above, in the lower light rays L1 that intersect with the front windshield 3 at the imaginary intersections I1, the side wall portions 9043 unlikely blocks the incidence at the taper angle θ1, which is necessary for the specific control Cs of the vehicle 2 within the imaging target range. Therefore, the configuration enables to reduce in size the camera module 1 including the hood 9040, which enables to image the normal optical image within the taper angle θ1 necessary for the specific control Cs.

According to the hood 9040 of the ninth embodiment, in the vehicle 2, the side wall portions 9043 spread from the periphery of the lens unit 33 toward the first imaginary intersection I1 as the imaginary intersection I1. According to the configuration, even though the hood 9040 is formed small, the side wall portions 9043 unlikely block the incidence of the first lower light rays L1, which are at the first depression angle ψd1 and at the taper angle θ1 and intersect with the front windshield 3 at the first imaginary intersections I1. Moreover, in the vehicle 2, the base wall portion 9041 spreads from the periphery of the lens unit 33 toward the second imaginary intersections I2. According to the configuration, the base wall portion 9041 and the side wall portions 9043 unlikely block the incidence of the second lower light rays L2, which are at the second taper angle θ2 and at the second depression angle ψd2 and intersect the front windshield 3 at the second imaginary intersections I2. The second taper angle θ2 is smaller than the first taper angle θ1, and the second depression angle ψd2 is larger than the first depression angle ψd1. From the above viewpoints, it is possible to reduce the size of the camera module 1 including the hood 9040, which is capable of not only capturing the normal optical image within the first taper angle θ1 necessary for the specific control Cs of the vehicle 2 but also capturing the normal optical image within the second taper angle θ2 necessary for the other control Ca of the vehicle 2.

Further, according to the hood 9040 of the ninth embodiment, in the vehicle 2, each of the side wall portions 9043 and the base wall portion 9041 spreads toward the lateral sides of the second imaginary intersections I2 on the side where each of the side wall portions 9043 and the base wall portion 9041 is unlikely to affect the first taper angle θ1, which is secured by spreading from the lens unit 33 toward the first imaginary intersection I1. That is, each of the side wall portions 9043 and the base wall portion 9041 spreads toward the lateral sides of the second imaginary intersections I2 on the external environment 5 side beyond the first imaginary intersection I1. In this case, the side wall portions 9043 and the base wall portion 9041 cooperate to enable to block light, which would enter the inside of the first taper angle θ1 or to the inside of the second taper angle θ2 if reflected on the front windshield 3, before being reflected. Therefore, both of capturing the normal optical image within the first taper angle θ1 necessary for the specific control Cs and capturing the normal optical image within the second taper angle θ2 necessary for the other control Ca can be enabled.

According to the ninth embodiment, in the collision avoidance control of the vehicle 2 against the front obstacle 5*c*, as the specific control Cs, the relatively large first taper angle θ1 can be ensured and the desired collision restriction function can be exhibited. On the other hand, in the driving control of the vehicle 2 within the traveling lane, as the other control Ca, different from the specific control Cs, the relatively large second depression angle ψd2 of the second lower light ray L2 incident at the second taper angle θ2, which may be relatively small, can be ensured, and the desired driving control function can be produced.

Further, according to the ninth embodiment, in the vehicle 2, the camera casing 20 that accommodates the lens unit 33 and the imager 34 is hung from the bracket assembly 10 detachably attached to the front windshield 3. In this example, the hood 9040 is formed integrally with the bracket assembly 10 of the ninth embodiment. The configuration enables the camera casing 20 to be detached from the front windshield 3 together with the bracket assembly 10 and the hood 9040 and enables to perform maintenance work of the lens unit 33 and the imager 34. At that time, more particularly, the fitting protrusion portions 213 of the camera casing 20 are detached from the respective fitting protrusion portions 111 of the bracket assembly 10, and the casing members 21 and 22 are separated from each other as required to expose the inside of the camera casing 20, thereby facilitating the maintenance work.

After the work described above, in the ninth embodiment, the bracket assembly 10, from which the camera casing 20 is hung, is mounted to the front windshield 3 together with the hood 9040. With such operation, the normal optical image can be again captured with the lens unit 33 and the imager 34 which have been maintained. In addition to the above effects, in the ninth embodiment, the same operational effect as those in the first embodiment can be produced.

Tenth Embodiment

Figure 30:
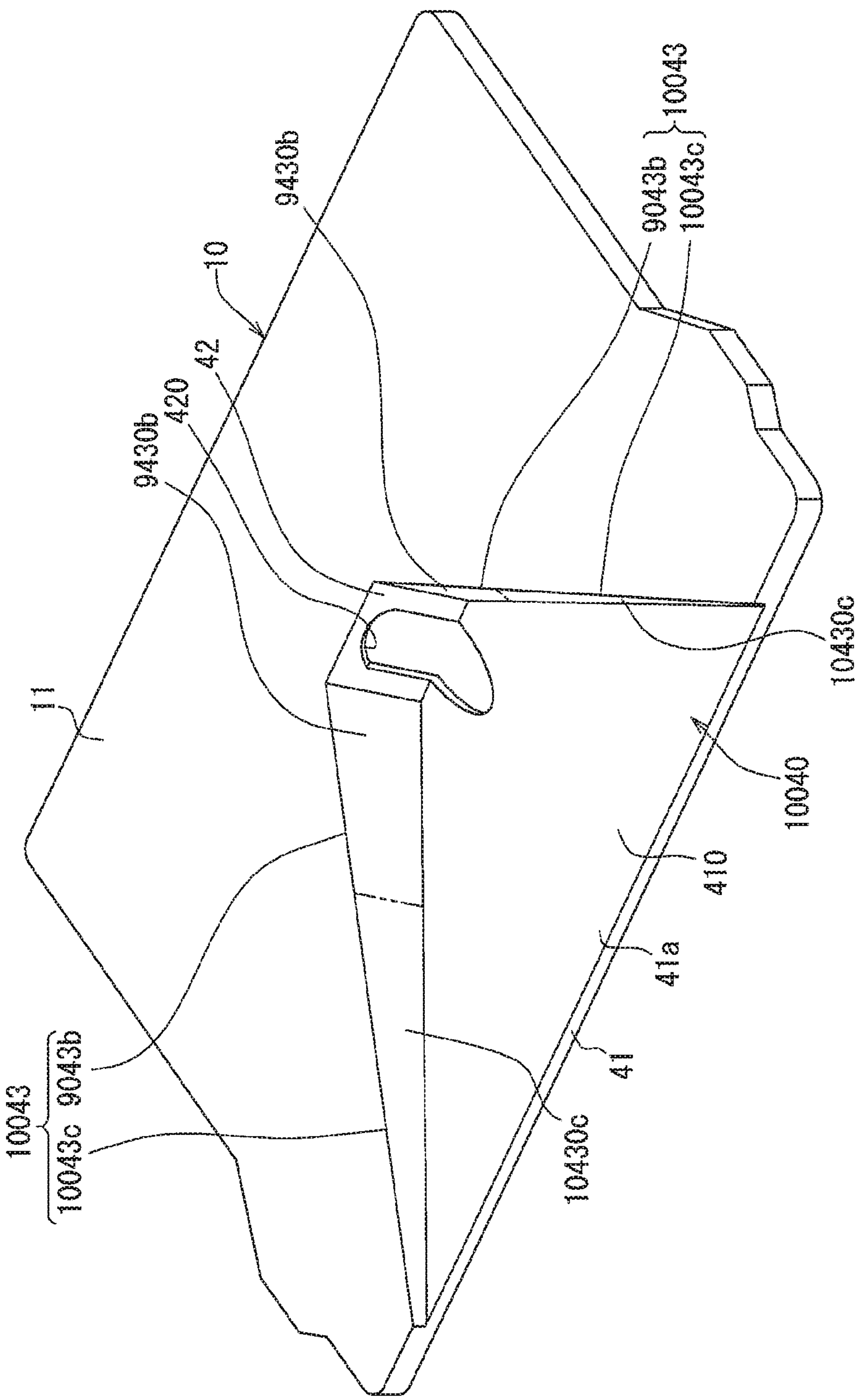
FIG. 30 is a perspective view illustrating a bracket assembly and a hood according to a tenth embodiment.
Figure 31:
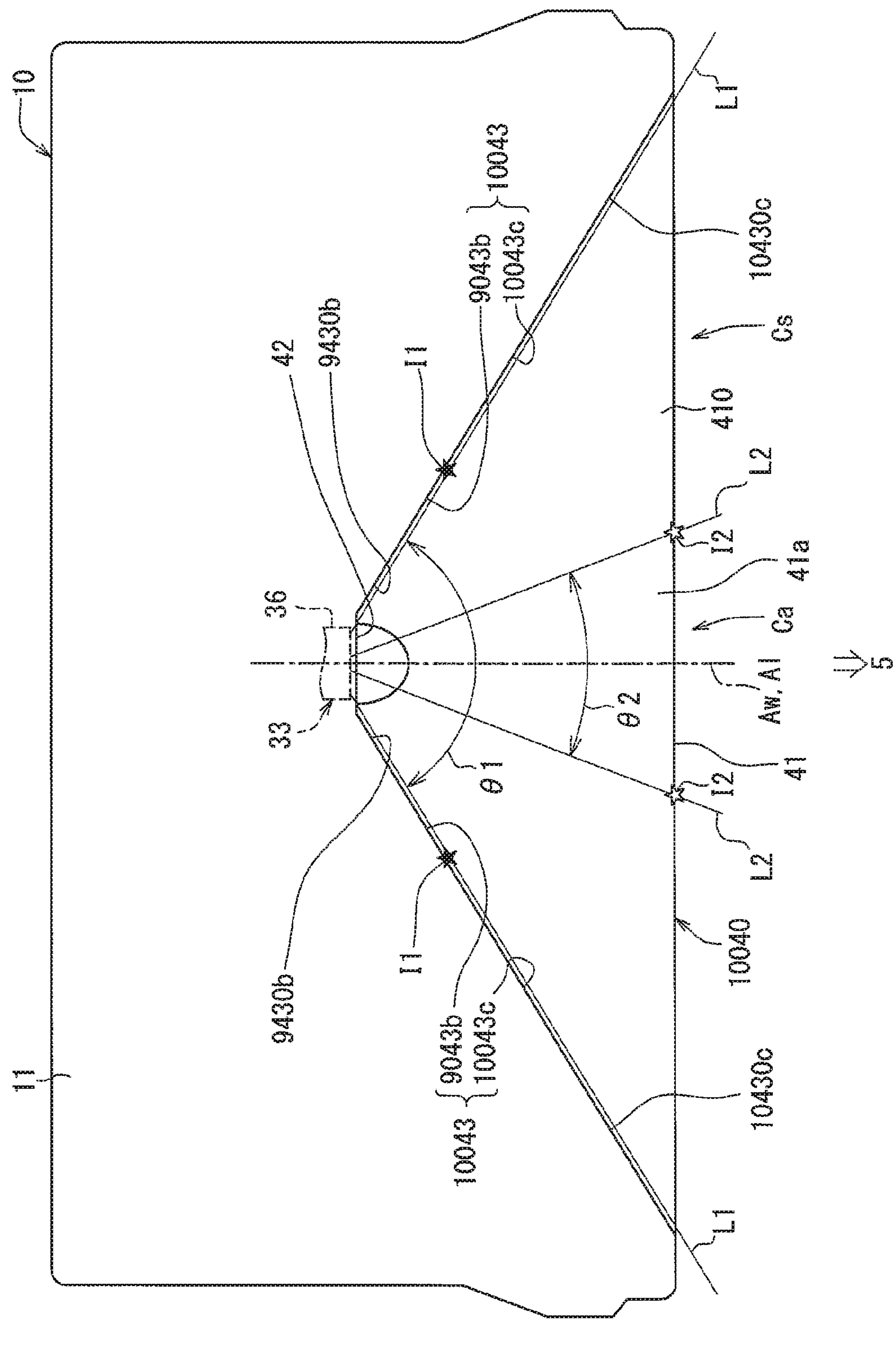
FIG. 31 is a top view illustrating the bracket assembly and the hood according to the tenth embodiment.

As shown in FIGS. 30 and 31, a tenth embodiment is a modification of the ninth embodiment.

A light shielding hood 10040 according to the tenth embodiment includes side wall portions 10043 substituted for the side wall portions 9043 in the ninth embodiment, together with the base wall portion 41 of the first embodiment substituted for the base wall portion 9041 in the ninth embodiment, and the rear end wall portion 42. The side wall portions 10043 are raised substantially vertically on both sides of the imaging space 410 from the entire side edge area of the base wall portion 41. In the base wall portion 41, the bottom wall surface 41*a* spreads in a trapezoidal substantially planar shape, and the restriction ribs 411 are provided. Each of the side wall portions 10043 has a straight plate-like shape. Each of the side wall portions 10043 includes the inclined portion 9043*b* described in the ninth embodiment as a first inclined portion 9043*b* and further includes another inclined portion substituted for the straight portion 9043*c* of the ninth embodiment as a second inclined portion 10043*c*. In FIG. 30, a boundary between the first inclined portion 9043*b* and the second inclined portion 10043*c* is imaginarily indicated by a two-dot chain line.

As shown in FIGS. 30 and 31, the second inclined portions 10043*c* of the respective side wall portions 10043 are provided on the left and right sides symmetrically with the optical axes Aw and Al of the lens unit 33. The second inclined portion 10043*c* of each side wall portion 10043 spreads forward to be inclined obliquely to the optical axes Aw and Al from the front end portion of the first inclined portion 9043*b* of the same side wall portion 10043. In this example, in each of the side wall portions 10043, inclination angles of the inclined portions 9043*b* and 10043*c* to the optical axes Aw and Al are set to be substantially equal to each other, so that the inner wall surfaces 9430*b* and 10430*c* of the inclined portions 9043*b* and 10043*c* are continuous to and substantially flush with each other. In this way, in the second inclined portions 10043*c* of the respective side wall portions 10043, inner wall surfaces 10430*c* each having a trapezoidal planar shape define a mutual space therebetween to gradually spread toward the front side. In the second inclined portion 10043*c* of each side wall portion 10043, the height from the base wall portion 41 is equal to the height of the front end portion of the first inclined portion 9043*b* in the same side wall portion 10043, and the height gradually decreases toward the front side. In this way, the second inclined portion 10043*c* of each side wall portion 10043 is located in a posture in which the second inclined portion 10043*c* is spaced from the inner surface 3*a* of the front windshield 3 with the clearance 9430 (not shown in the present embodiment).

As shown in FIG. 31, similarly to the lens unit 33 side of the intersections I1, in each side wall portion 10043, on the external environment 5 side beyond first imaginary intersections I1 in the vehicle 2, an inner wall surface 10430*c* of the second inclined portion 10043*c* is formed with a slight clearance, which is on the outside of both the right and left taper lines of the first taper angle θ1 when viewed in the vertical direction. In this way, in the second inclined portion 10043*c* of each side wall portion 9043, the inner wall surface 10430*c* spreads along the taper line of the angle θ1 on the outside of the first taper angle θ1 when viewed in the vertical direction of the vehicle 2. With the configuration described above, when viewed in the vertical direction of each side wall portion 10043, the first inclined portion 9043*b* and the second inclined portion 10043*c* enter the inside of the lens angle of view θw.

On the lens unit 33 side of the second imaginary intersections I2 in the vehicle 2, the base wall portion 41 forms the bottom wall surface 41*a* across an entire area, which is inside the first taper angle θ1, and a predetermined area outside the angle θ1 when viewed in the vertical direction. The entire area inside the first taper angle θ1 includes an entire area inside the second taper angle θ2. In this way, the base wall portion 41 extends from the periphery of the lens unit 33 toward the second imaginary intersection I2 and toward both the inside and outside of the second imaginary intersection I2 in the vehicle 2. In the base wall portion 41, the bottom wall surface 41*a* extends to portions outside the second imaginary intersection I2 when viewed in the vertical direction. In the portions, the bottom wall surface 41*a* extends to the slightly outside portions beyond the taper lines of the first taper angle θ1. In addition, in the second inclined portion 10043*c* of each side wall portion 10043, the inner wall surface 10430*c* extends to the slightly outside portion beyond the taper line of the first taper angle θ1 in the portion outside the second imaginary intersections I2 when viewed in the vertical direction. With the configuration described above, the base wall portion 41 and the second inclined portion 10043*c* of each side wall portion 10043 are formed to extend toward the laterally outside of the second imaginary intersections I2 when viewed in the vertical direction.

According to the hood 10040 of the tenth embodiment described above, in the vehicle 2, each of the side wall portions 10043 spreads on the outside of the taper angle θ1 along the angle θ1, on the side where the side wall portion 10043 is unlikely to affect the taper angle θ1 secured by spreading from the lens unit 33 to the imaginary intersections I1, that is, on the external environment 5 side beyond the imaginary intersections I1. In this case, the side wall portions 10043 are raised from the base wall portion 41 in a wide region on the external environment 5 side beyond the imaginary intersections I1, and the side wall portions 10043 and the base wall portion 41 cooperate to block light, which would enter the inside of the taper angle θ1 if being reflected on the front windshield 3, before being reflected. Therefore, the configuration enables to increase the effect of restricting the reflected light, which is reflected on the front windshield 3, from being superimposed on the normal optical image and from interfering with the imaging, without significantly impairing reduction in size of the camera module 1 including the hood 10040 which secures the taper angle θ1 enabling to image the normal optical image.

The hood 10040 of the tenth embodiment attains the side wall portions 10043 which spread along the taper angle θ1 on both the lens unit 33 side of the imaginary intersections I1 and on the external environment 5 side beyond the imaginary intersections I1. According to the configuration, the productivity of the hood 10040 can be enhanced with the formation of the side wall portions 10043 in a simple shape. In addition to the above effects, according to the tenth embodiment, the same operational effects as those in the ninth embodiment can be produced.

Eleventh Embodiment

Figure 32:
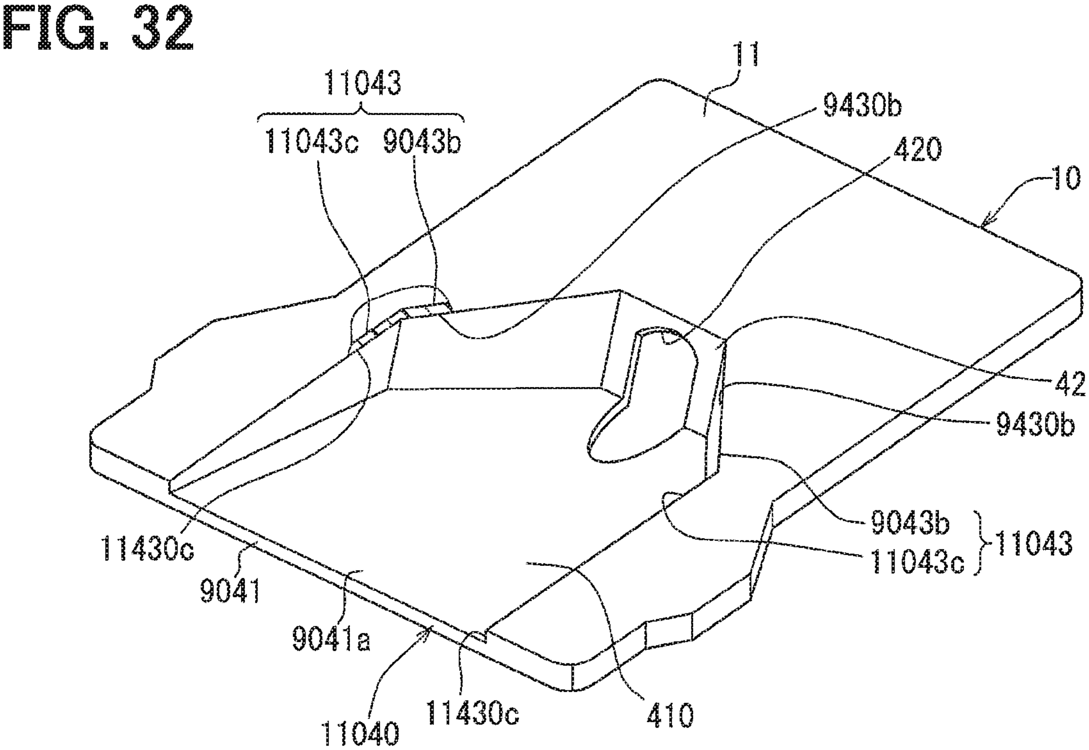
FIG. 32 is a partially cross section perspective view illustrating a bracket assembly and a hood according to an eleventh embodiment.

As shown in FIG. 32, an eleventh embodiment is a modification of the ninth embodiment.

A hood 11040 having a partially light shielding property according to the eleventh embodiment includes side wall portions 11043 substituted for the side wall portions 9043 in the ninth embodiment together with the base wall portion 9041 and the rear end wall portion 42. The side wall portions 11043 are raised substantially vertically on both sides of the imaging space 410 from an entire side edge area of the base wall portion 9041, in which the bottom wall surface 9041*a* spreads in a hexagonal substantially planar shape and restriction ribs 411 are provided. Each of the side wall portions 11043 is in a bent plate-like shape. Each of the side wall portions 11043 includes a straight portion 11043*c*, which is substituted for the straight portion 9043*c* of the ninth embodiment, together with the inclined portion 9043*b*.

The straight portions 11043*c* of the respective side wall portions 11043 are provided on the right side and the left side symmetrically with the optical axes Aw and Al of the lens unit 33 on the external environment 5 side beyond the first imaginary intersections I1 in the vehicle 2 when viewed in the vertical direction. The straight portions 11043*c* are provided as portions extending laterally outside of the second imaginary intersections I2. The straight portion 11043*c* of each side wall portion 11043 has substantially the same configuration as that of the straight portion 9043*c* of the ninth embodiment except that the entire inner wall surface 11430*c* having the trapezoidal planar shape is formed of a light transmissive polarizing filter. In this example, the polarizing filter made of, for example, resin or the like has a polarizing function to cut S polarized light and to transmit P polarized light. Therefore, the straight portion 11043*c* of each side wall portion 11043 is formed of the polarizing filter so that the polarizing filter cuts the S-polarized light which has a reflectance in the front windshield 3 particularly high in the horizontal direction.

According to the hood 11040 of the eleventh embodiment described above, in the side wall portions 11043 on the external environment 5 side beyond the imaginary intersections I1 in the vehicle 2, the portion formed of the polarizing filter spreads. In this case, according to the polarizing filters on the external environment 5 side beyond the imaginary intersections I1, the polarizing filters of the side wall portions 11043 are enables to cut the S-polarized light, which would strongly enter the inside of the taper angle θ1 if reflected on the front windshield 3, before reflection. Therefore, the configuration enables to enhance the effect of restricting the reflected light on the front windshield 3 from being superimposed on the normal optical image and from interfering with the imaging while reducing the size of the camera module 1 including the hood 11040 that secures the taper angle θ1 enabling to image the normal optical image. In addition to the above effects, in the eleventh embodiment, the same operational effects as those of the ninth embodiment can be produced.

Twelfth Embodiment

Figure 33:
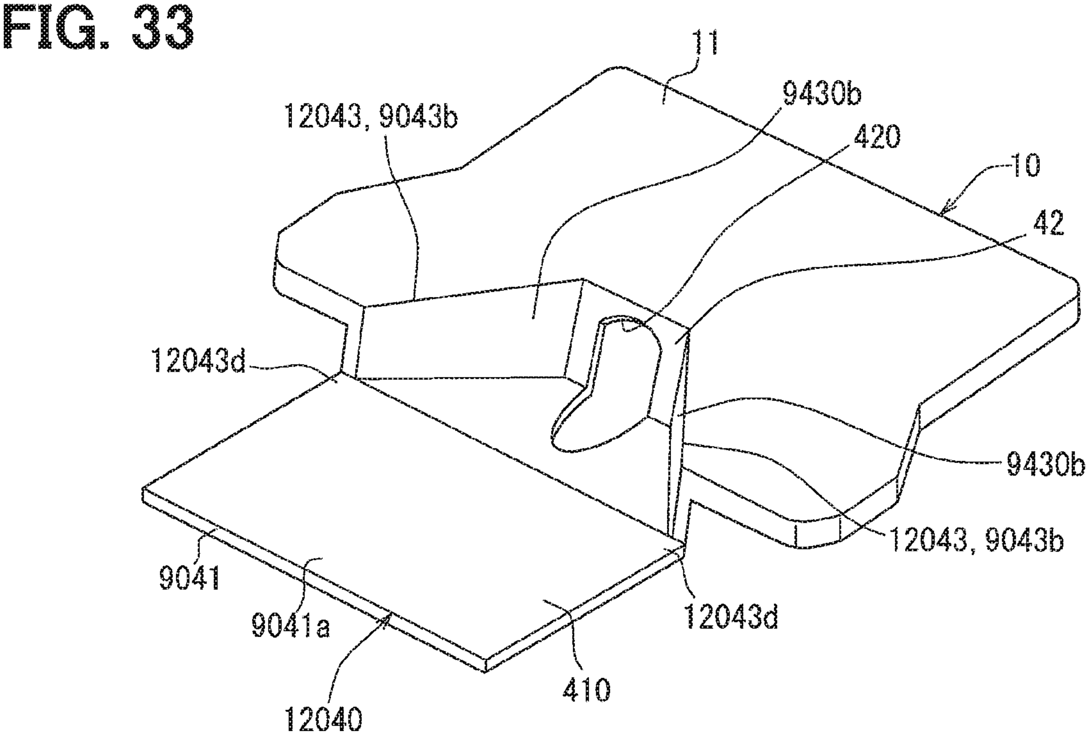
FIG. 33 is a perspective view illustrating a bracket assembly and a hood according to a twelfth embodiment.
Figure 34:
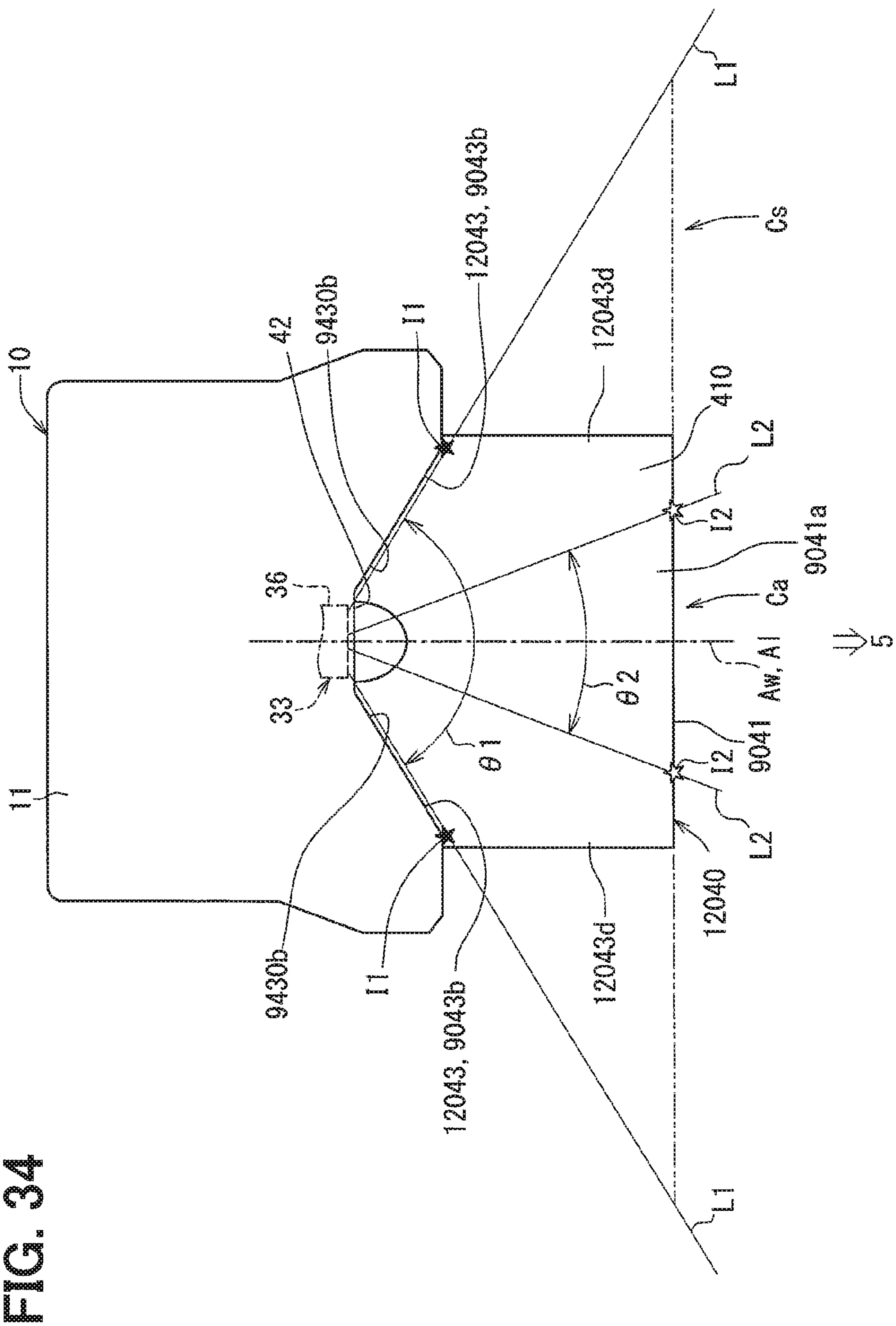
FIG. 34 is a top view illustrating a bracket assembly and a hood according to a twelfth embodiment.

As shown in FIGS. 33 and 34, a twelfth embodiment is a modification of the ninth embodiment.

A hood 12040 having a light shielding property according to the twelfth embodiment includes side wall portions 12043 substituted for the side wall portions 9043 in the ninth embodiment together with the base wall portion 9041 and the rear end wall portion 42. The side wall portions 12043 are raised substantially vertically on both sides of the imaging space 410 from a partial side edge of the base wall portion 9041 in which the bottom wall surface 9041*a* spreads in a hexagonal substantially planar shape, and in which restriction ribs 411 are provided. Each of the side wall portions 12043 is in a straight plate-like shape. Each of the side wall portions 12043 has the inclined portion 9043*b* but has no straight portion 9043*c*. In this way, the respective side wall portions 12043 are formed in a cut form on the external environment 5 side beyond the first imaginary intersections I1 in the vehicle 2, thereby defining a window 12043*d* communicated with the imaging space 410. Incidentally, the cut form is not limited to the shape, which is actually cut by cutting or the like, and includes a shape previously given by molding or the like.

According to the hood 12040 of the twelfth embodiment described above, in the vehicle 2, each of the side wall portions 12043 is in the cut-shaped portion on a side that is unlikely to affect the taper angle θ1 secured by spreading from the lens unit 33 to the imaginary intersections I1, that is, on the external environment 5 side beyond the imaginary intersections I1. In this case, even in a case where a relative position of the side wall portions 12043 to the front windshield 3 fluctuates due to, for example, vibration of the vehicle 2 or the like, the side wall portions 12043 unlikely obstruct the taper angle θ1 on the external environment 5 side beyond the imaginary intersections I1 by the provision of the cut-shaped portions. The configuration enables to eliminate a risk that an unnecessary portion of the hood 12040 would obstruct imaging of the normal optical image in securing the taper angle θ1. In addition to the above effects, according to the twelfth embodiment, the same operational effects as those in the ninth embodiment can be produced.

Thirteenth Embodiment

Figure 35:
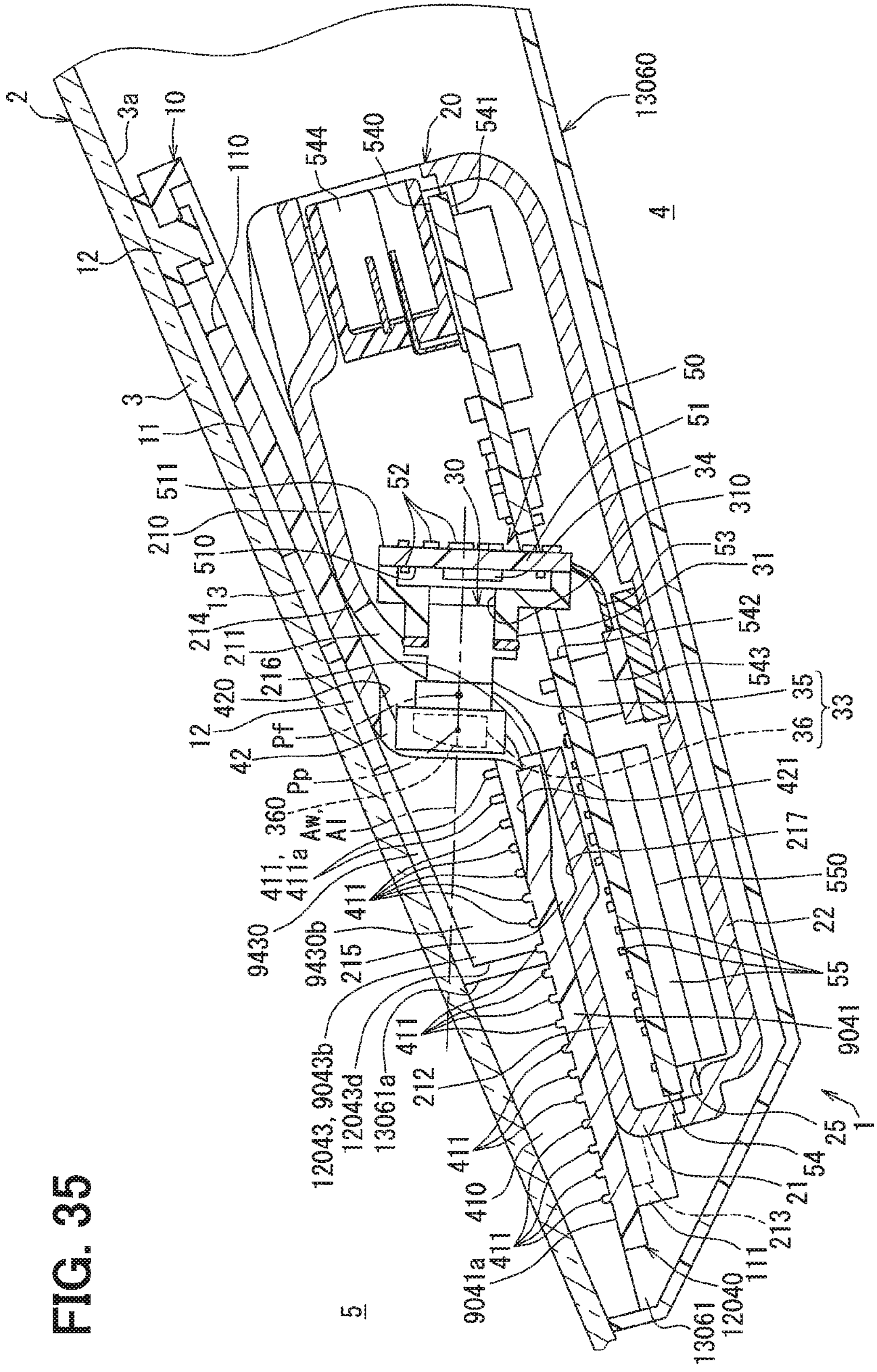
FIG. 35 is a cross-sectional view illustrating a camera module according to a thirteenth embodiment.
Figure 36:
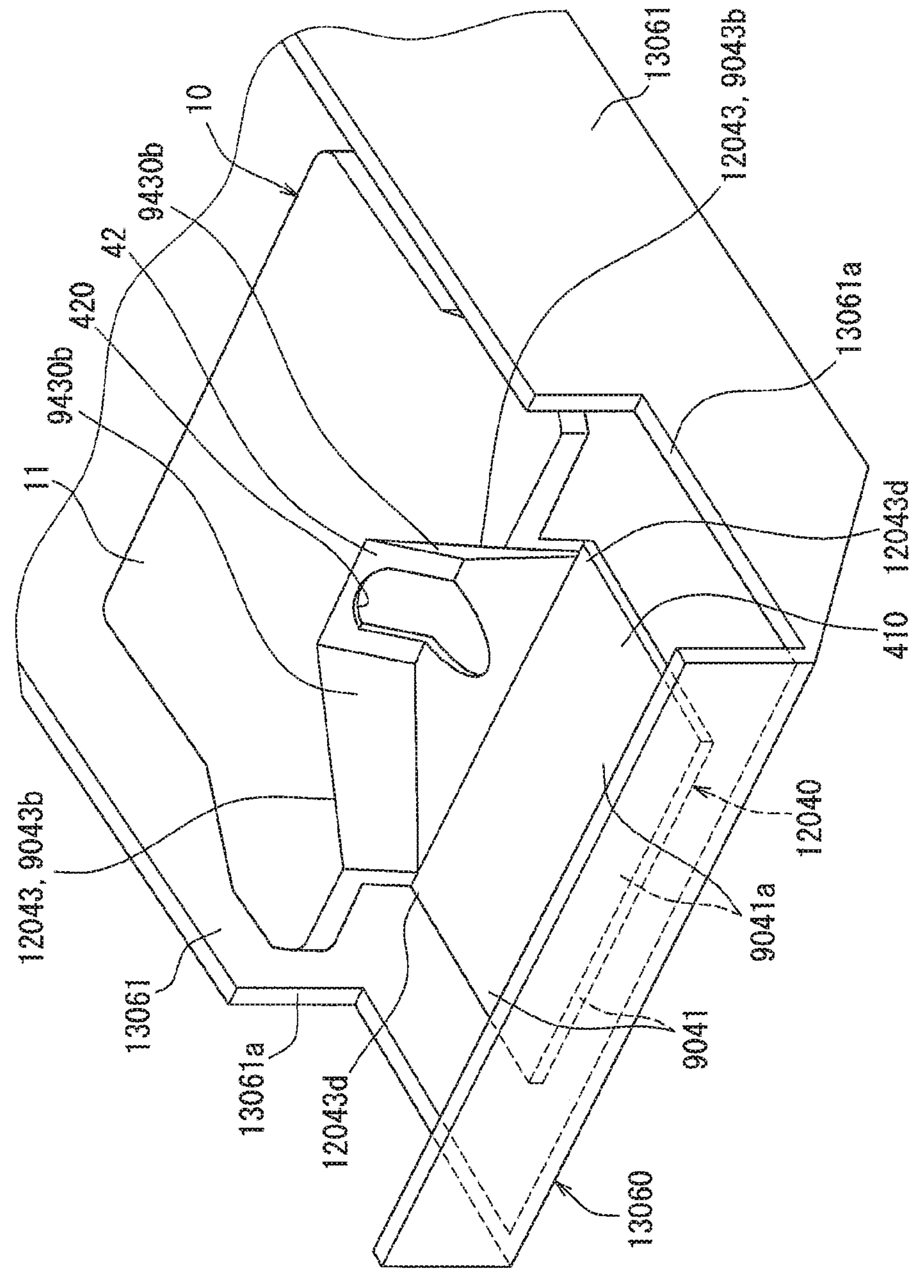
FIG. 36 is a perspective view illustrating a bracket assembly and a hood together with a camera cover according to the thirteenth embodiment.
Figure 37:
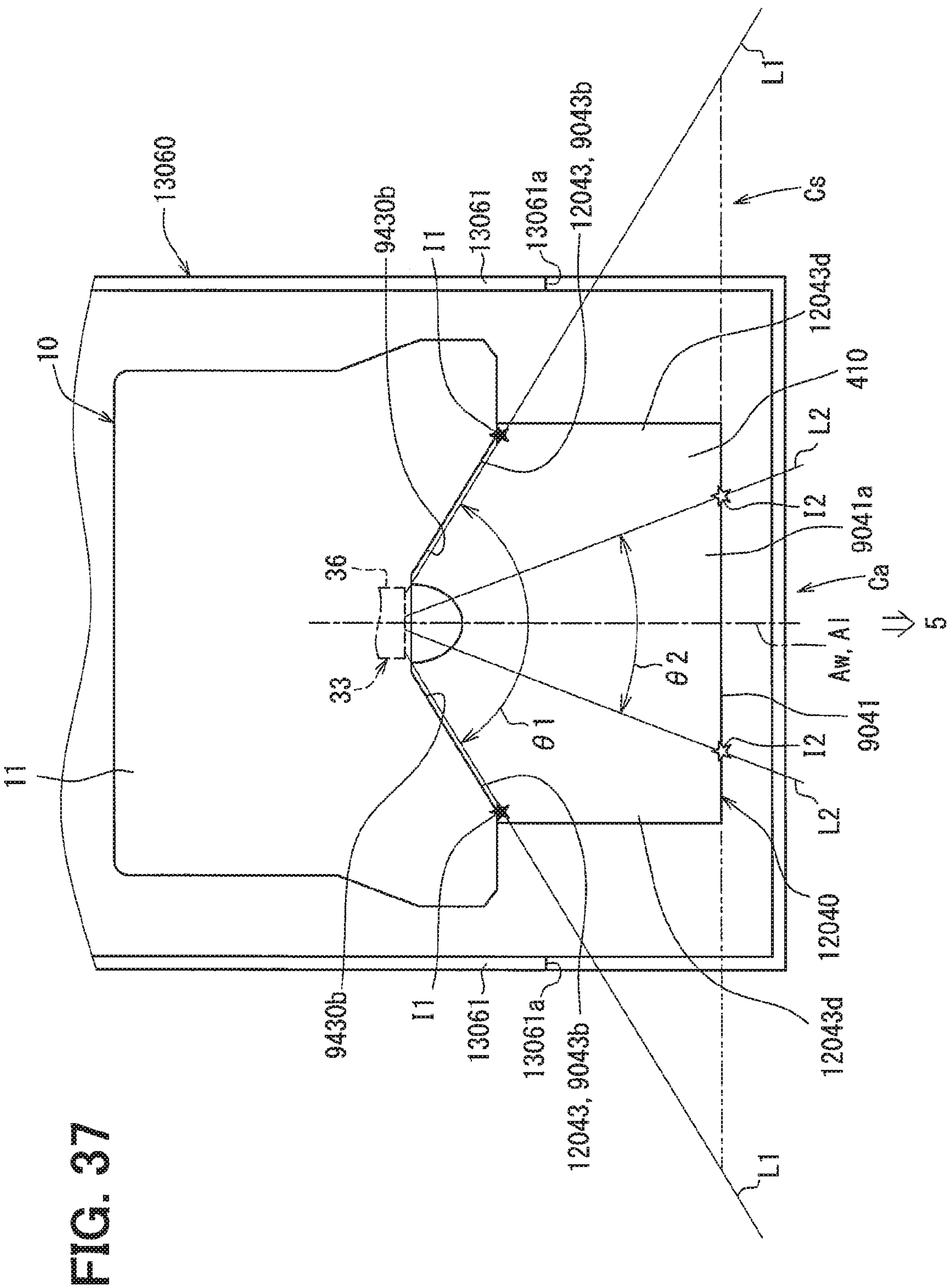
FIG. 37 is a top view illustrating the bracket assembly and the hood together with the camera cover according to the thirteenth embodiment.

As illustrated in FIGS. 35 to 37, a thirteenth embodiment is a modification of the twelfth embodiment.

A camera module 1 according to the thirteenth embodiment further includes a camera cover 13060. The camera cover 13060 is made of a relatively easily moldable rigid material such as resin and formed in a deep pot shape as a whole. The camera cover 13060 is fixed to the bracket assembly 10. In this way, the camera cover 13060 hangs from the bracket assembly 10, which is detachably attached to the front windshield 3, and is located to cover the other components 10, 20, 30, 12040, and 50 of the camera module 1 from the lower side and the lateral side.

The camera cover 13060 has a pair of cover side portions 13061 to cover the lens unit 33 and the hood 12040 from both lateral sides. Each of the cover side portions 13061 is in a cut form at a position inside the first taper angle θ1 when viewed in the vertical direction of the vehicle 2, thereby to define other windows 13061*a*. The other windows 13061*a* are communicated to the imaging space 410 through the window 12043*d*. Incidentally, the cut form is not limited to the shape, which is actually cut by cutting or the like, and includes a shape previously given by molding or the like.

According to the thirteenth embodiment described above, the camera cover 13060 that covers the lens unit 33 and the hood 12040 from the lower side and the lateral sides has a cut-shaped portion inside the taper angle θ1. In this case, even in a case where a relative position of the side wall portions 12043 and the camera cover 13060 to the front windshield 3 fluctuates due to, for example, vibration of the vehicle 2 or the like, those elements 12043 and 13060 unlikely obstruct the taper angle θ1 on the external environment 5 side beyond the imaginary intersections I1 by the presence of the cut-shaped portions. In addition, the camera cover 13060 enables to block light, which would enter the inside of the taper angle θ1 if being reflected on the front windshield 3, before the reflection. From the above viewpoint, the configuration enables to enhance the effect of restricting the reflected light on the front windshield 3 from being superimposed on the normal optical image and from interfering with the imaging without significantly impairing reduction in size of the camera module 1 including the hood 12040 and the camera cover 13060 which enable to image the normal optical image within the taper angle θ1. In addition to the above effects, according to the thirteenth embodiment, the same operational effects as those in the twelfth embodiment can be produced.

Fourteenth Embodiment

Figure 38:
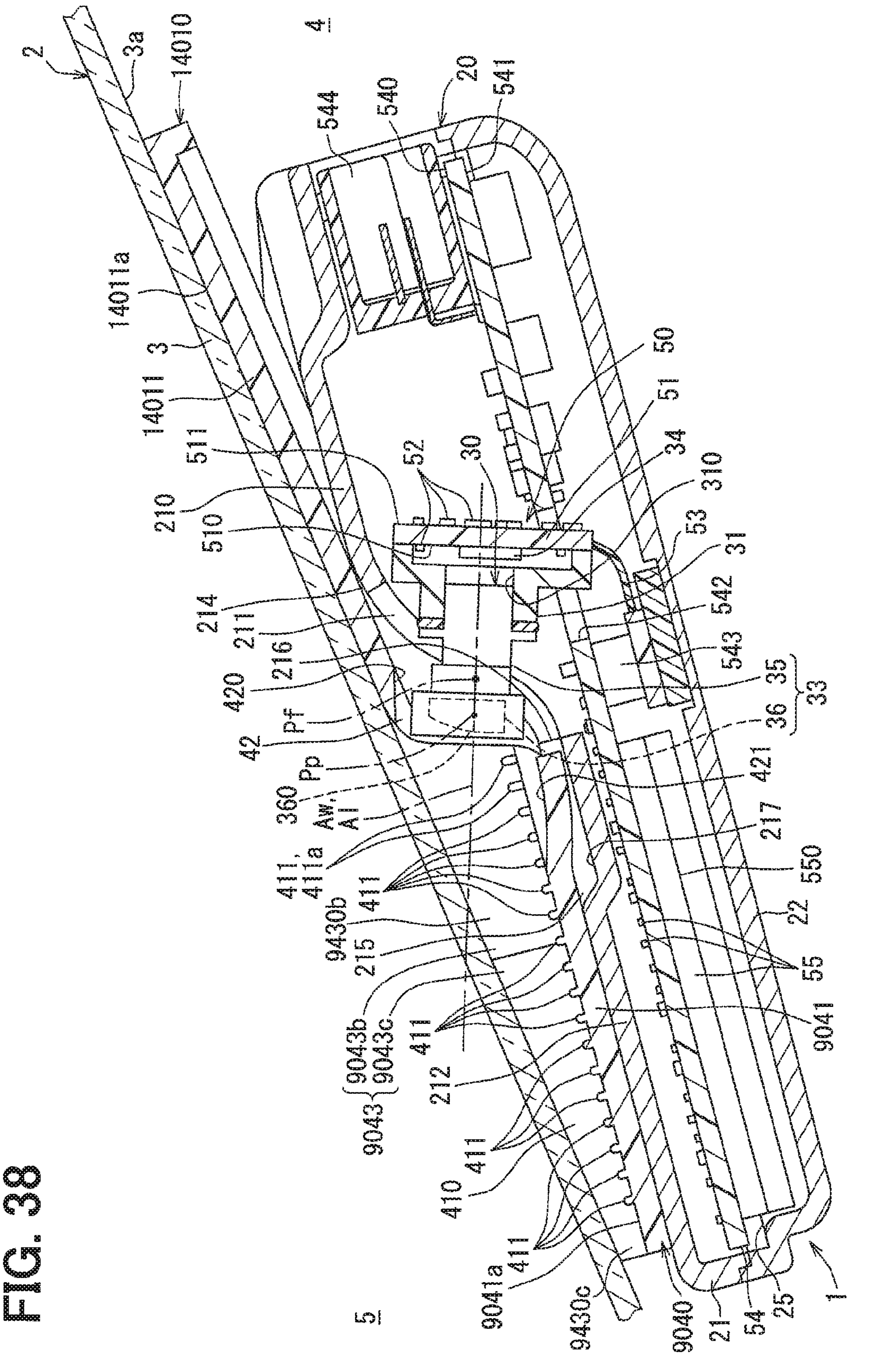
FIG. 38 is a cross-sectional view illustrating a camera module according to a fourteenth embodiment.
Figure 39:
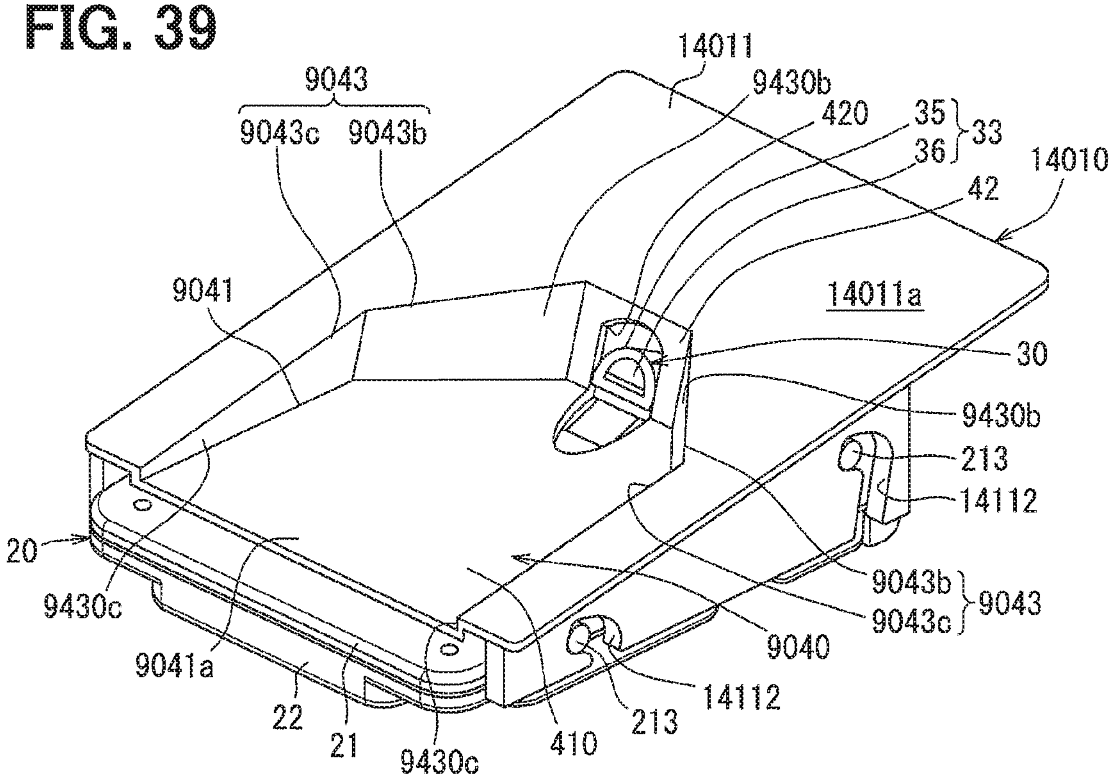
FIG. 39 is a perspective view illustrating the camera module according to the fourteenth embodiment.

As shown in FIGS. 38 and 39, a fourteenth embodiment is a modification of the ninth embodiment.

In a bracket assembly 14010 according to the fourteenth embodiment, the cushion 13 and the mounting pad 12 are not provided, and a bracket main body 14011 substituted for the bracket main body 11 of the ninth embodiment described in detail in the first embodiment is provided. In the bracket main body 14011, a flat upper surface 14011*a* is adhesively fixed to the inner surface 3*a* of the front windshield 3. In this way, in the vehicle 2, the bracket assembly 14010 is detachably attached to the front windshield 3.

As shown in FIG. 39, the bracket main body 14011 is provided with multiple fitting groove portions 14112 having a substantially L shape in correspondence with respective fitting protrusion portions 213 of an upper casing member 21 of the camera casing 20, respectively. Each of the fitting protrusion portions 213 is fixedly engaged with a substantially L-shaped terminal end portion of the corresponding fitting groove portion 14112 by slide fitting. In this way, in the vehicle 2, the camera casing 20 is hung from the bracket assembly 14010 in a detachable and attachable manner as shown in FIG. 38.

The configuration of the bracket main body 14011 other than the configuration described above is substantially the same as that of the bracket main body 11 of the ninth embodiment. In other words, the bracket assembly 14010 is formed of the bracket main body 14011 integrally formed with the hood 9040.

According to the fourteenth embodiment described above, in the vehicle 2, the camera casing 20 that accommodates the lens unit 33 and the imager 34 is hung from the bracket assembly 14010 mounted to the front windshield 3 in the detachable and attachable manner. In this example, the hood 9040 is formed integrally with the bracket assembly 14010 of the fourteenth embodiment. According to the configuration, the camera casing 20 can be detached from the bracket assembly 14010 that is kept to be mounted to the front windshield 3 together with the hood 9040, and maintenance work of the lens unit 33 and the imager 34 can be performed. At that time, more particularly, the fitting protrusion portions 213 of the camera casing 20 are detached from the respective fitting groove portions 14112 of the bracket assembly 14010, and the casing members 21 and 22 are separated from each other as required, to expose the inside of the camera casing 20, thereby facilitating the maintenance work.

After the work described above, in the fourteenth embodiment, the camera casing 20 is mounted to and hung from the bracket assembly 14010 that is kept to be mounted to the front windshield 3 together with the hood 9040. With such operation, the normal optical image can be again captured with the lens unit 33 and the imager 34 which have been maintained. In addition to the above effects, according to the fourteenth embodiment, the same operational effects as those in the ninth embodiment can be produced.

Fifteenth Embodiment

Figure 40:
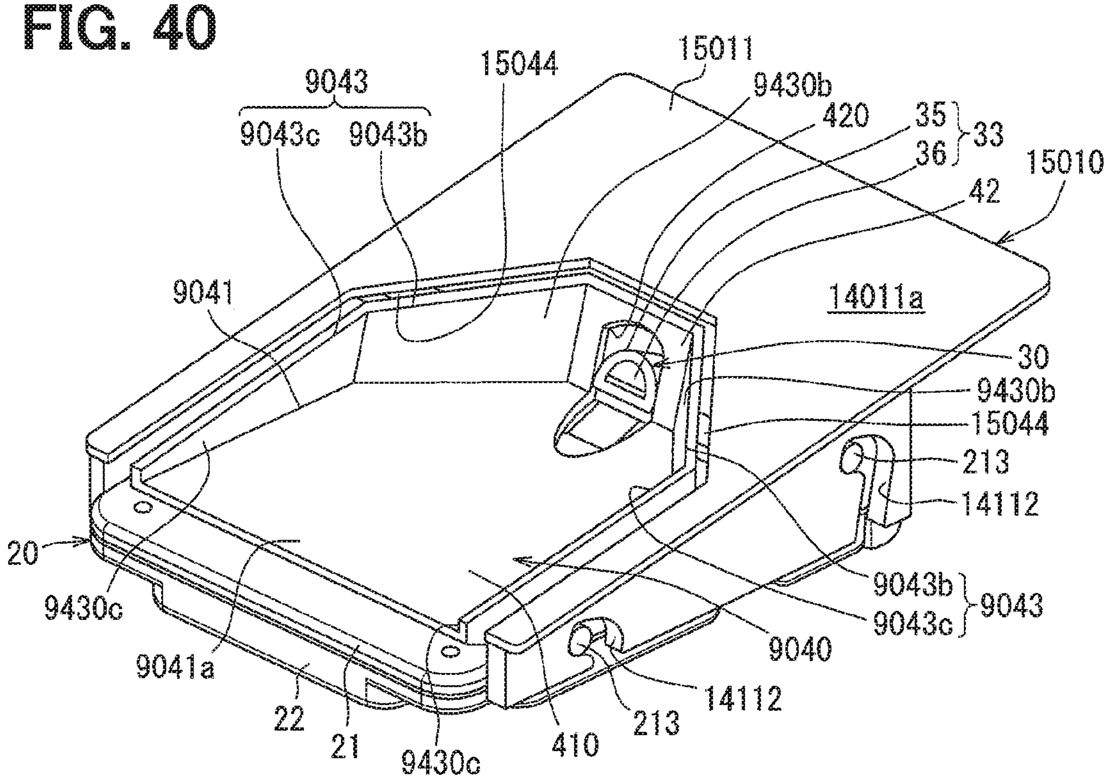
FIG. 40 is a perspective view illustrating a camera module according to a fifteenth embodiment.
Figure 41:
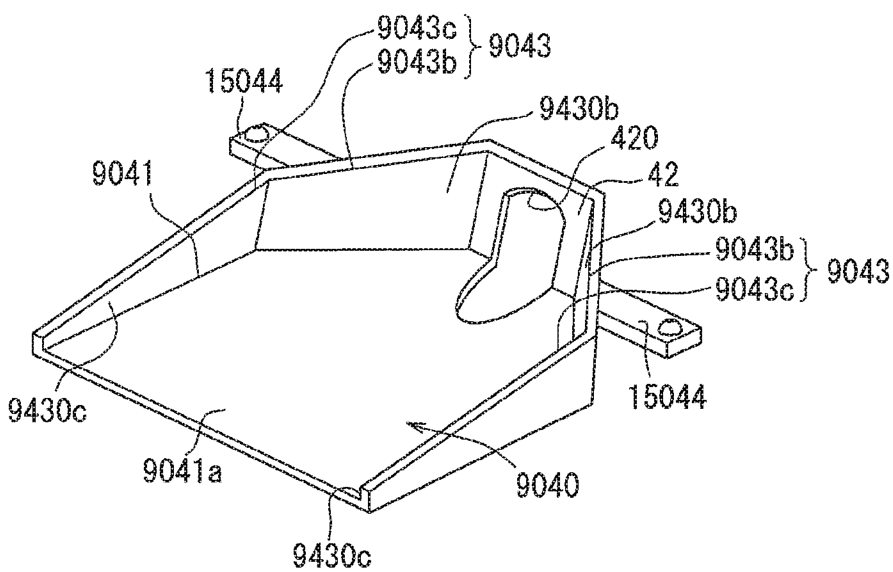
FIG. 41 is a perspective view illustrating a hood according to the fifteenth embodiment.

As illustrated in FIGS. 40 and 41, a fifteenth embodiment is a modification of the fourteenth embodiment.

In a bracket assembly 15010 according to the fifteenth embodiment, a bracket main body 15011 substituted for the bracket main body 14011 of the fourteenth embodiment is provided. The hood 9040 is not integrally formed with the bracket main body 15011. In other words, the hood 9040 is separated from the bracket main body 15011 into a separate component. The separate hood 9040 has a fixing portion 15044 that is fixed to the bracket main body 15011 by, for example, snap fit. In this way, the hood 9040 is detachably attached to the bracket assembly 15010.

The configuration of the bracket main body 15011 other than the configuration described above is substantially the same as that of the bracket main body 14011 of the fourteenth embodiment. In other words, as the bracket main body 15011 formed separately from the hood 9040 and detachably attached to the front windshield 3 in the vehicle 2, the bracket assembly 15010 is formed of the bracket main body 15011 from which the camera casing 20 is detachably hung.

According to the fifteenth embodiment described above, in the vehicle 2, the camera casing 20 is hung from the bracket assembly 15010 mounted to the front windshield 3 in the detachable and attachable manner. The hood 9040 is formed detachably from the bracket assembly 15010 of the fifteenth embodiment. The configuration enables the camera casing 20 and the hood 9040 to be detached from the bracket assembly 15010 that is kept to be mounted to the front windshield 3 and enables maintenance work of the lens unit 33 and the imager 34. Similarly, at that time, more particularly, the fitting protrusion portions 213 of the camera casing 20 are detached from the respective fitting groove portions 14112 of the bracket assembly 14010, and the casing members 21 and 22 are separated from each other as required, to expose the inside of the camera casing 20, thereby facilitating the maintenance work.

After the work described above, in the fifteenth embodiment, the camera casing 20 is mounted to and hung from the bracket assembly 14010 kept to be mounted to the front windshield 3 after the hood 9040 has been mounted to the bracket assembly 14010. With such operation, the normal optical image can be again captured by the lens unit 33 and the imager 34 which have been maintained. In addition to the above effects, according to the fifteenth embodiment, the same operational effects as those in the ninth embodiment can be produced.

Sixteenth Embodiment

Figure 42:
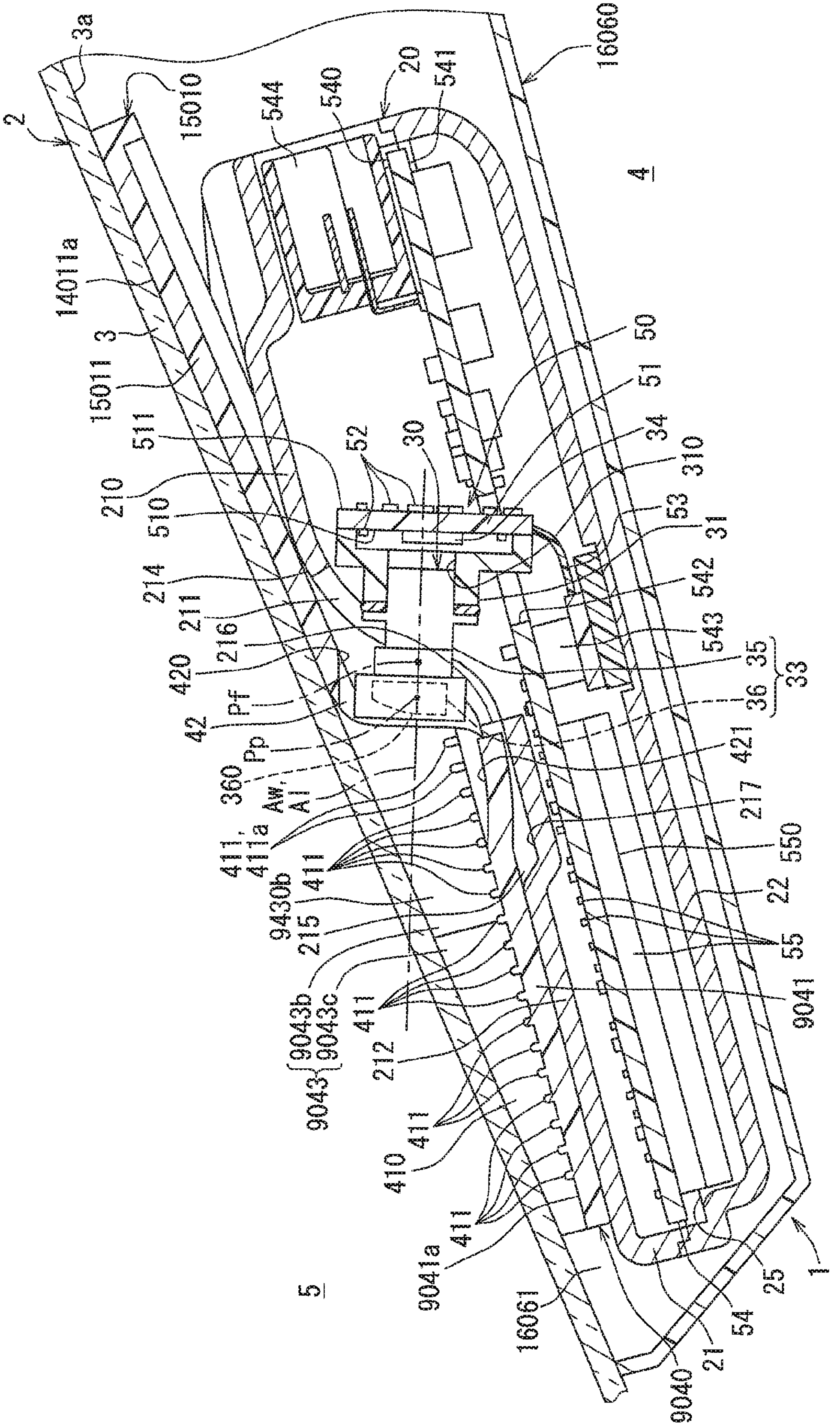
FIG. 42 is a cross-sectional view illustrating a camera module according to a sixteenth embodiment.

As shown in FIG. 42, a sixteenth embodiment is a modification of the fifteenth embodiment.

A camera module 1 according to the sixteenth embodiment further includes a camera cover 16060. The camera cover 16060 is made of a relatively easily moldable rigid material such as resin and formed in a deep pot shape as a whole. The camera cover 16060 is fixed to the bracket assembly 15010. In this way, the camera cover 16060 hangs from the bracket assembly 15010 which is undetachably attached to the front windshield 3 and located to cover the other components 10, 20, 30, 9040, and 50 of the camera module 1 from the lower side and the upper side. In the camera cover 16060, a pair of cover side portions 16061 covers the lens unit 33 and the hood 9040 from both of the right side and the left side, and the window 13061*a* as in the thirteenth embodiment is not provided in the pair of cover side portions 16061.

According to the camera cover 16060 of the sixteenth embodiment described above, the lens unit 33 and the hood 9040 are covered from the lower side and the lateral sides, thereby being capable of blocking light, which would enter the inside of the taper angle θ1 if being reflected on the front windshield 3, before being reflected, in cooperation with the hood 9040. Therefore, the configuration enables to enhance the effect of restricting the reflected light on the front windshield 3 from being superimposed on the normal optical image and from interfering with the imaging without significantly impairing reduction in size of the camera module 1 including the hood 9040 and the camera cover 16060 which secure the taper angle θ1 to enable imaging of the normal optical image. In addition to the above effects, according to the sixteenth embodiment, the same operational effects as those in the fifteenth embodiment can be produced.

Seventeenth Embodiment

Figure 43:
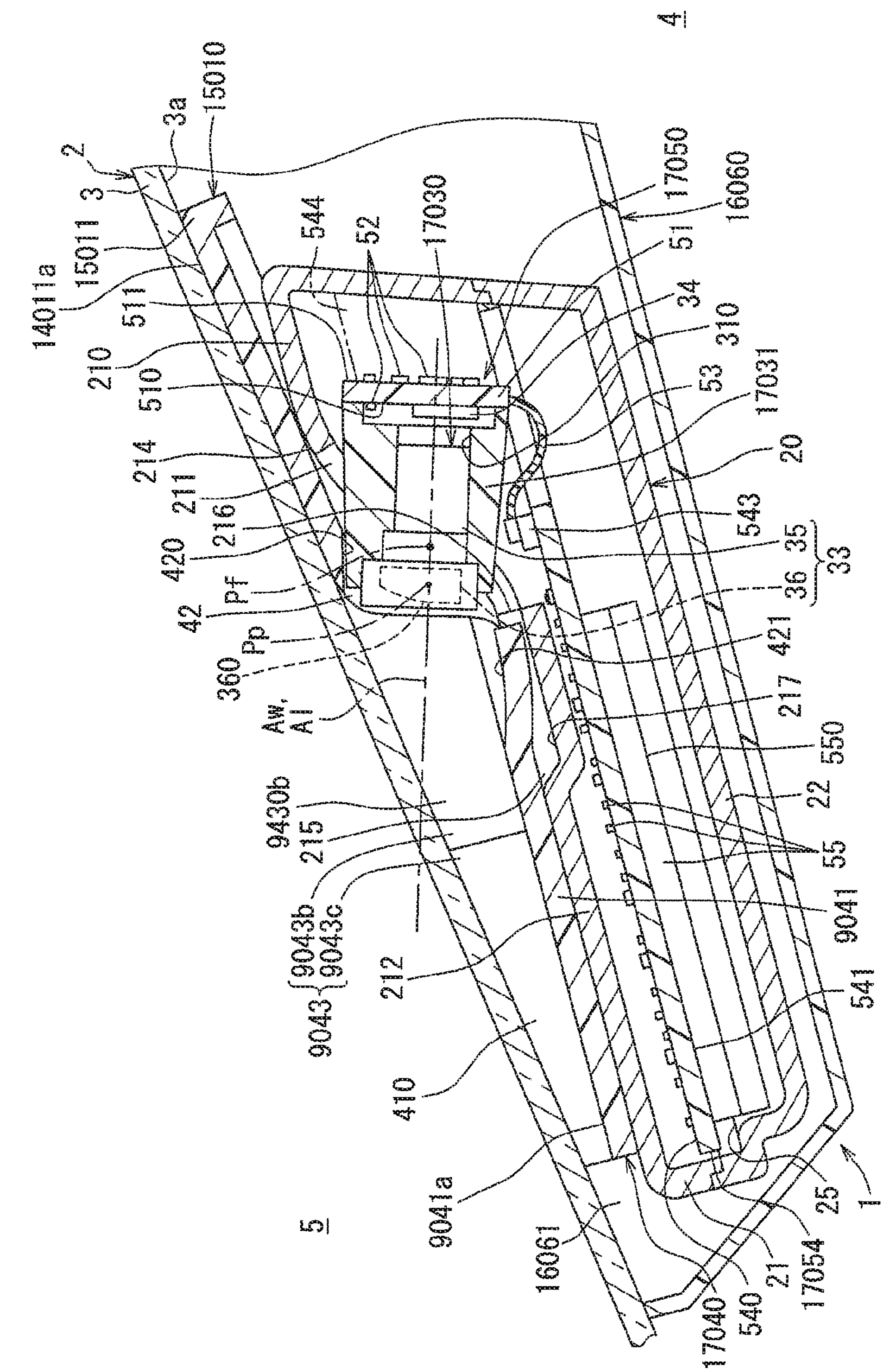
FIG. 43 is a cross-sectional view illustrating a camera module according to a seventeenth embodiment.
Figure 44:
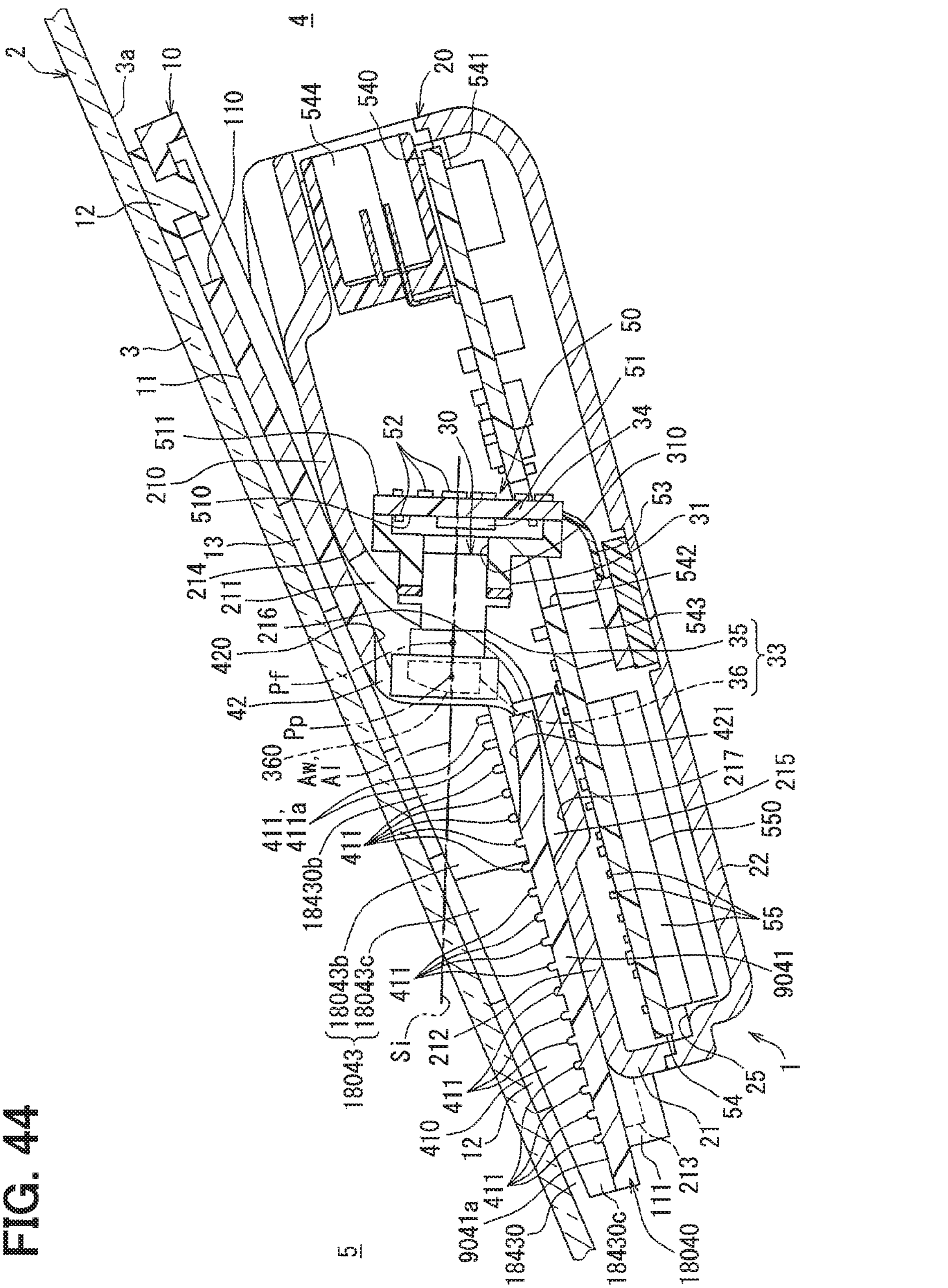
FIG. 44 is a cross-sectional view illustrating a camera module according to an eighteenth embodiment.
Figure 45:
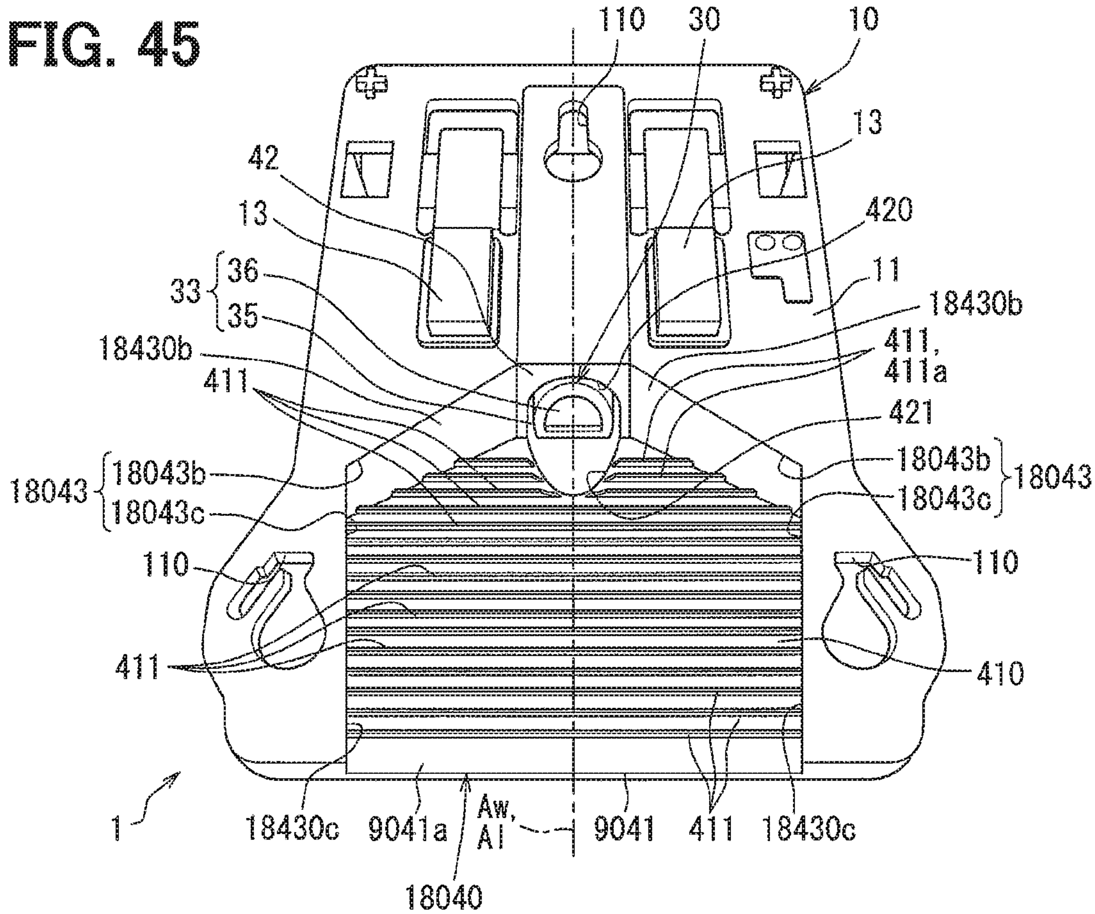
FIG. 45 is a perspective view illustrating the camera module according to the eighteenth embodiment.
Figure 46:
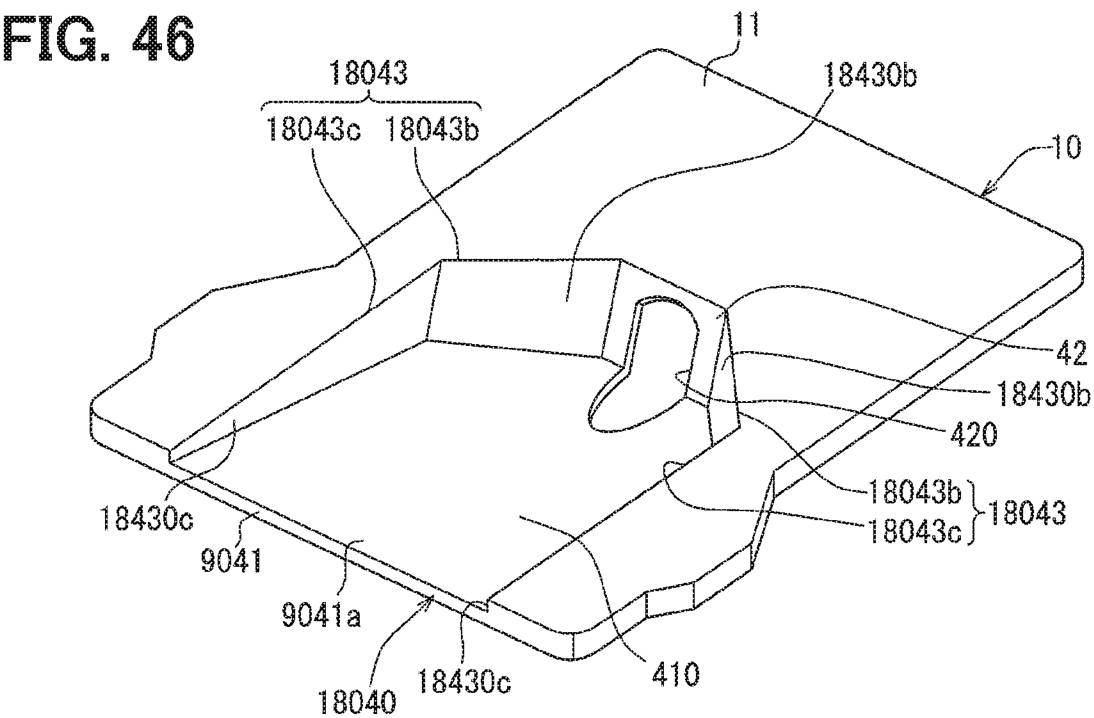
FIG. 46 is a perspective view illustrating a bracket assembly and a hood according to the eighteenth embodiment.
Figure 47:
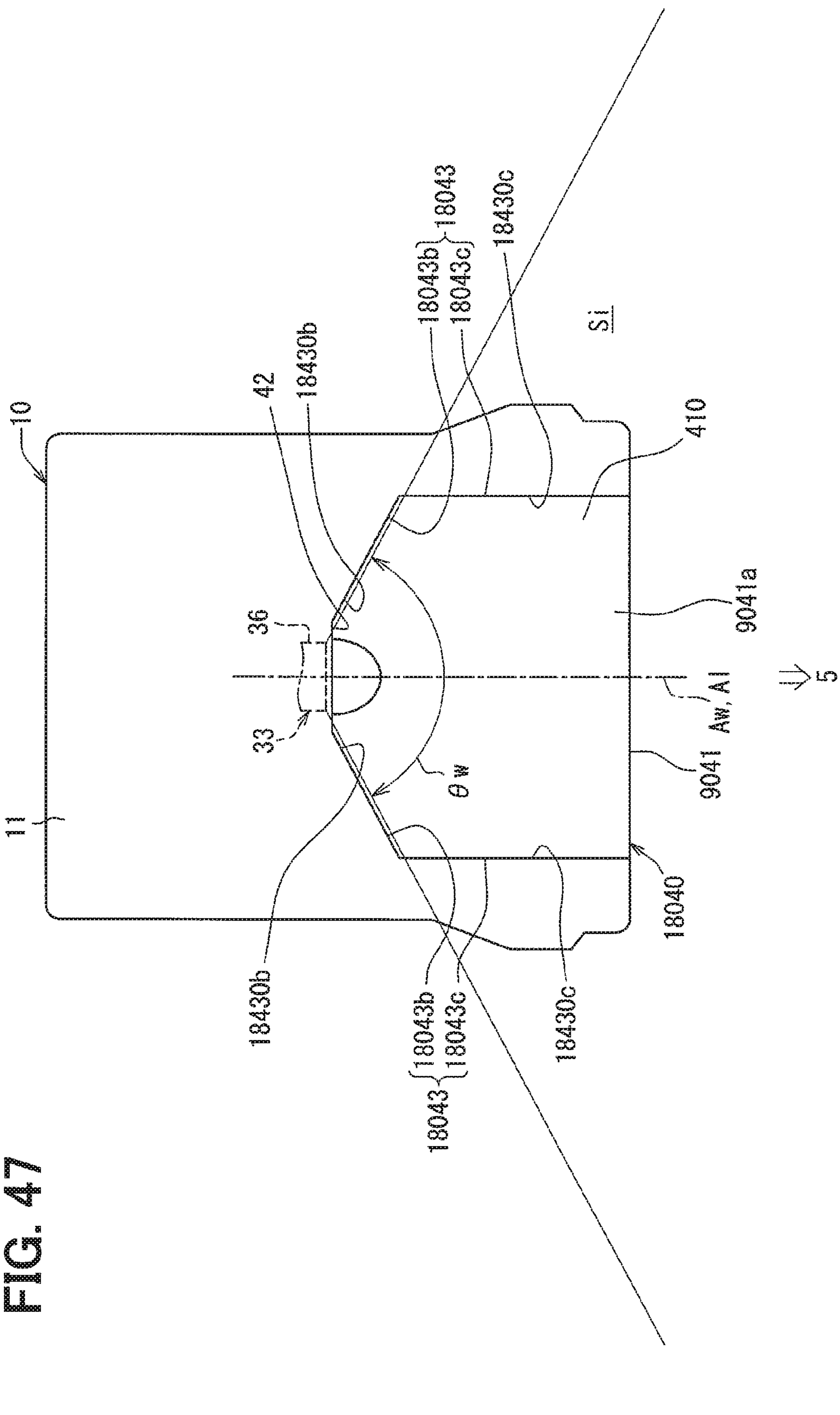
FIG. 47 is a top view illustrating the bracket assembly and the hood according to the eighteenth embodiment.

As shown in FIG. 43, a seventeenth embodiment is a modification of the sixteenth embodiment.

In the seventeenth embodiment, a hood 17040 is covered with the camera cover 16060 from the lower side and both of lateral sides, and the hood 17040 is substantially the same configuration as that of the hood 9040 except that the restriction ribs 411 are not provided.

As components of an image assembly 17030 in the seventeenth embodiment, an assembly holder 17031 substituted for the assembly holder 31 of the sixteenth embodiment described in detail in the first embodiment is combined with the lens unit 33 and the imager 34. The assembly holder 17031 has substantially the same configuration as that of the assembly holder 31 except that most part of the lens barrel 35 is accommodated inside the holder 17031.

As components of a circuit unit 17050 in the seventeenth embodiment, a control board 17054 is combined with the imaging board 51, the FPC 53, and the circuits 52, 55. The control board 17054 has substantially the same configuration as that of the control board 54 except that the connection hole 542 is not provided and the internal connector 543 is mounted on the upper mounting surface 540. In this way, the imaging board 51 is connected to the internal connector 543 through the FPC 53 that wraps around an outer peripheral side of the control board 17054 in a meandering curved state. Incidentally, the imaging board 51 may be connected to the internal connector 543 mounted on the upper mounting surface 540 of the control board 17054 not through the FPC 53. At least latter of the imaging board 51 and the assembly holder 17031 is located unevenly on the upper side of the control board 17054. Alternatively, both of the imaging board 51 and the assembly holder 17031 may be located across the upper side and the lower side of the control board 17054.

Similarly, according to the seventeenth embodiment described above, the same operational effects as those of the sixteenth embodiment can be produced.

Eighteenth Embodiment

As illustrated in FIGS. 44 to 47, an eighteenth embodiment is a modification of the ninth embodiment. In the following description, the horizontal direction and the vertical direction of the vehicle 2 on the horizontal plane are referred to simply as the horizontal direction and the vertical direction, respectively.

A hood 18040 having a light shielding property according to the eighteenth embodiment includes side wall portions 18043 substituted for the side wall portions 9043 in the ninth embodiment together with the base wall portion 9041 and the rear end wall portion 42. The side wall portions 18043 are raised substantially vertically on both sides of the imaging space 410 from the entire side edge area of the base wall portion 9041 having the multiple restriction ribs 411 with the specific ribs 411*a*. Each of the side wall portions 18043 is in a bent plate-like shape. Each of the side wall portions 18043 includes an inclined portion 18043*b* and a straight portion 18043*c* which are substituted for the inclined portion 9043*b* and the straight portion 9043*c* of the ninth embodiment.

The inclined portion 18043*b* and the straight portion 18043*c* of each side wall portion 18043 have substantially the same configurations as those of the inclined portion 9043*b* and the straight portion 9043*c* in the ninth embodiment except that, in particular, the lens angle of view θw passing through the wide angle lens 36 of the lens unit 33 is set based on a lens angle of view θw on the imaginary plane Si, as will be described below in detail. In this example, the imaginary plane Si is imaginarily formed along at least the right and left direction (that is, the lateral direction) in the horizontal direction to include the optical axes Aw and Al of the lens unit 33. Therefore, on condition that the optical axes Aw and Al are along the front and back direction in the horizontal direction, the imaginary plane Si becomes a plane including the optical axes Aw and Al and extending along both the front and back direction and the right and left direction, that is, becomes the horizontal plane. On the other hand, in a case where the optical axes Aw and Al are inclined downward or upward toward the front side in the front and back direction, the imaginary plane Si becomes a plane, which includes the optical axes Aw and Al, spreads along an inclination direction relative to the front and back direction, and spreads along the right and left direction. In other words, the imaginary plane Si becomes an inclined plane relative to the horizontal plane.

The inclined portions 18043*b* of the respective side wall portions 18043 are provided on the left and right sides symmetrically with the optical axes Aw and Al. The inclined portions 18043*b* of the respective side wall portions 18043 are located in a posture in which the inclined portions 18043*b* are spaced from the inner surface 3*a* of the front windshield 3 with the clearance 18430. The inclined portion 18043*b* of each side wall portion 18043 is formed outside the lens angle of view θw and on the imaginary plane Si when viewed in the vertical direction. In particular, the trapezoidal planar inner wall surface 18430*b* of the inclined portion 18043*b* of each side wall portion 18043 is formed so as to spread substantially in parallel with angle of view lines representing both of the right and left side edges of the lens angle of view θw on the imaginary plane Si or so as to spread obliquely with respect to the angle of view lines when viewed in the vertical direction. In this way, in the inclined portion 18043*b* of each side wall portion 18043, the further the inner wall surface 18430*b* gets closer to the lens barrel 35, the further the inner wall surface 18430*b* is inclined toward the optical axes Aw and Al in a range outside the lens angle of view θw on the imaginary plane Si when viewed in the vertical direction (that is, when viewed in the horizontal plane). The lens barrel 35 is exposed through the lens window 420 in the lens unit 33.

The straight portions 18043*c* of the respective side wall portions 18043 are provided on the left and right sides symmetrically with the optical axes Aw and Al. The straight portion 18043*c* of each side wall portion 18043 is formed substantially in parallel with the optical axes Aw and Al so as to extend from the front end portion of the inclined portion 18043*b* of the same side wall portion 18043 into the inside of the lens angle of view θw on the imaginary plane Si when viewed in the vertical direction. In particular, the trapezoidal planar inner wall surface 18430*c* of the straight portion 18043*c* of each side wall portion 18043 is formed so as to intersect with the angle of view lines representing both of the right and left side edges of the lens angle of view θw on the imaginary plane Si when viewed in the vertical direction. However, the straight portion 18043*c* of each side wall portion 18043 viewed from the right and left direction (that is, the side direction) in the horizontal direction is formed at a height that avoids the angle of view lines representing both of the right and left side edges of the lens angle of view θw on the imaginary plane on the lower side of the angle of view. In other words, the height of the straight portion 18043*c* in each side wall portion 18043 is set to a height that does not block edges of the lens angle of view θw on the imaginary plane Si. In this way, the straight portion 18043*c* of each side wall portion 18043 is also located in a posture in which the straight portion 18043*c* is spaced from the inner surface 3*a* of the front windshield 3 with the clearance 18430. On the straight portions 18043*c* of the respective side wall portions 18043, the inner wall surfaces 18430*c* spread in a symmetrical shape substantially in parallel with the optical axes Aw and Al in the range inside the lens angle of view θw on the imaginary plane Si when viewed in the vertical direction.

(Operational Effects)

Subsequently, the operational effects of the eighteenth embodiment described above will be described.

The hood 18040 of the eighteenth embodiment as in the ninth embodiment enables to restrict excess light incidence from the external environment 5 outside the imaging target range of the imager 34 to the lens unit 33. The configuration enables to restrict the excess light from being superimposed on the normal optical image within the imaging target range and from interfering with the imaging.

In particular, according to the hood 18040 of the eighteenth embodiment, the base wall portion 9041 is located to face the front windshield 3 across the imaging space 410, and the side wall portions 18043 are raised from the base wall portion 9041 on the lateral sides of the imaging space 410. The side wall portions 18043 are formed, on the imaginary plane Si, at the height avoiding the edges of the lens angle of view θw of the lens unit 33. According to the configuration, even though the hood 18040 is formed small, at least the incidence of the optical image within the imaging target range is unlikely blocked on the imaginary plane Si, which is imaginarily formed along the horizontal direction to include the optical axes Aw and Al of the lens unit 33, and on the front windshield 3 side (that is, the upper side) of the imaginary plane Si. Therefore, the camera module 1 including the hood 18040, which is capable of capturing the normal optical image in the lens angle of view θw, can be reduced in size.

Further, as in the ninth embodiment, the lens unit 33 according to the eighteenth embodiment includes the wide angle lens 36 to ensure the wide lens angle of view θw, and therefore, a concern arises that incident excess light increases and that the hood 18040 becomes larger in size. However, as described above, in the eighteenth embodiment, even though the hood 18040 is formed small, the configuration enables not only to restrict excess light incident on the lens unit 33 but also to unlikely block the light incidence on the imaginary plane Si and incidence on the front windshield 3 side relative to the imaginary plane Si. Moreover, in the eighteenth embodiment, in which the special wide angle lens 36 described in the first embodiment is employed similarly to the ninth embodiment, even though the size of the wide angle optical surface 360 is reduced, at least the imaging of the normal optical image can be secured on the imaginary plane Si and on the front windshield 3 side relative to the imaginary plane Si. From the above viewpoints, the configuration enables to reduce in size the camera module 1 that includes the hood 18040, which is capable of capturing the normal optical image in the lens angle of view θw, together with the wide angle lens 36.

As in the ninth embodiment, according to the hood 18040 of the eighteenth embodiment, in the base wall portion 9041 located to face the front windshield 3 across the imaging space 410, the multiple restriction ribs 411 protrude into the imaging space 410 to restrict the light reflection on the lens unit 33. The configuration enables to restrict the reflected light on the base wall portion 9041, which is likely to increase the light incidence, from being superimposed on the normal optical image in the lens angle of view θw and from interfering with the imaging under the placement of the base wall portion 9041 to face the front windshield 3.

In addition, as in the ninth embodiment, according to the hood 18040 of the eighteenth embodiment, the specific ribs 411*a*, which have the higher protrusion height and are located around the lens unit 33, among the multiple restriction ribs 411 are likely to block the optical path in which the reflected light on the base wall portion 9041 travels to the lens unit 33. The configuration enables to enhance the effect of restricting the reflected light on the base wall portion 9041 from being superimposed on the normal optical image in the lens angle of view θw and from interfering with the imaging.

Further, the hood 18040 of the eighteenth embodiment defines the clearance 18430 between the side wall portion 18043 and the front windshield 3. The configuration blocks the light, which is reflected on the front windshield 3 and would enter the lens angle of view θw, with the side wall portions 18043. In addition, the configuration enables to enlarge as much as possible the imaging space 410 between the base wall portion 9041, from which the side wall portions 18043 are raised, and the front windshield 3. Therefore, the camera module 1 including the hood 18040, which enables to capture the normal optical image within the lens angle of view θw as wide as possible, enables to restrict the reflected light on the front windshield 3 from being superimposed on the normal image and from interfering with the imaging.

According to the eighteenth embodiment, the side wall portions 18043 are formed along the optical axes Aw and Al on the imaginary plane Si inside the lens angle of view θw. Therefore, the lateral width of the hood 18040 along the right and left direction (that is, the lateral direction) in the horizontal direction can be limited to a small width. Therefore, the configuration promotes reduction in size of the camera module 1, which includes the hood 18040 capable of capturing the normal optical image in the lens angle of view θw.

According to the eighteenth embodiment, the side wall portions 18043 are formed in the symmetrical shape across the optical axes Aw and Al on the imaginary plane Si inside the lens angle of view θw. Therefore, the hood 18040 can be configured with a small and relatively simple structure. Therefore, the configuration enables to promote reduction in size and simplification of the camera module 1, which includes the hood 18040 capable of capturing the normal optical image in the lens angle of view θw.

According to the hood 18040 of the eighteenth embodiment, the inclined portions 18043*b* of the side wall portions 18043, which are located outside the lens angle of view θw on the imaginary plane Si, are shaped such that the further the inclined portions 18043*b* gets closer toward the lens unit 33 side, the further the inclined portions 18043*b* are inclined toward the optical axes Aw and Al. According to the configuration, the hood 18040 can be formed in a size as small as possible while securing the lens angle of view θw. Therefore, the configuration enables to promote reduction in size of the camera module 1, which includes the hood 18040 capable of capturing the normal optical image in the lens angle of view θw.

Nineteenth Embodiment

Figure 48:
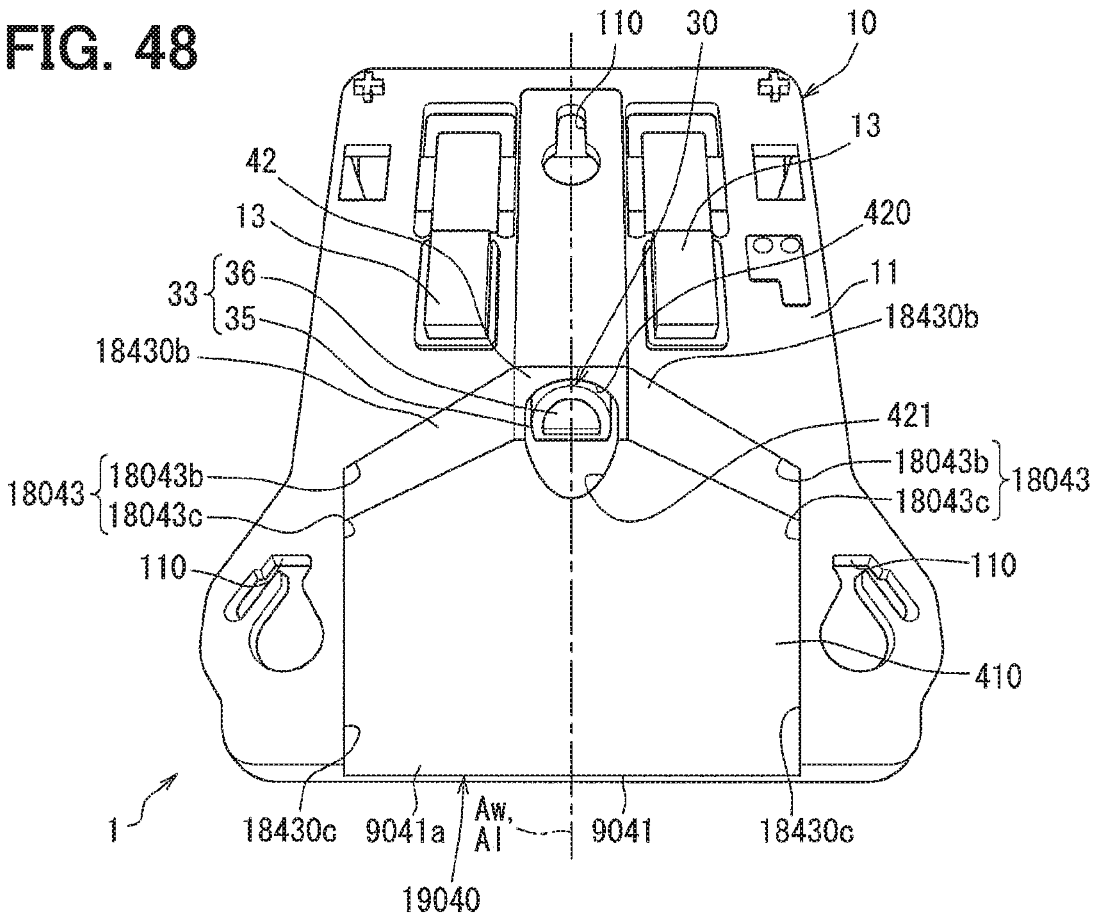
FIG. 48 is a perspective view illustrating a camera module according to a nineteenth embodiment.

As shown in FIG. 48, a nineteenth embodiment is a modification of the eighteenth embodiment.

In the nineteenth embodiment, a hood 19040 has substantially the same configuration as that of the hood 18040 except that the restriction ribs 411 are not provided. Therefore, also according to the nineteenth embodiment, the same operational effects as those of the eighteenth embodiment can be produced except for the operational effects of the restriction ribs 411 including the specific ribs 411*a*.

Twentieth Embodiment

Figure 49:
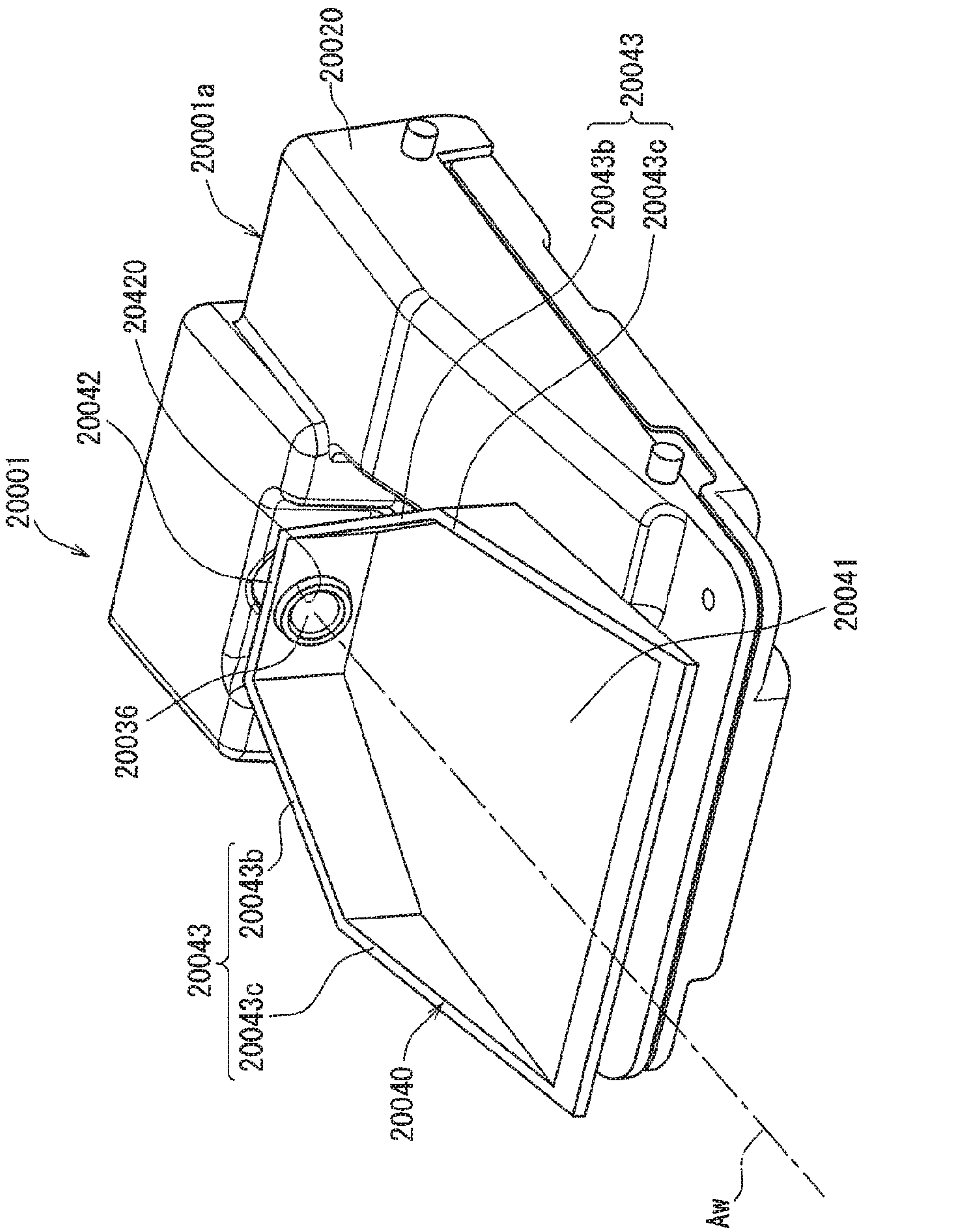
FIG. 49 is a perspective view illustrating a camera module according to a twentieth embodiment.
Figure 50:
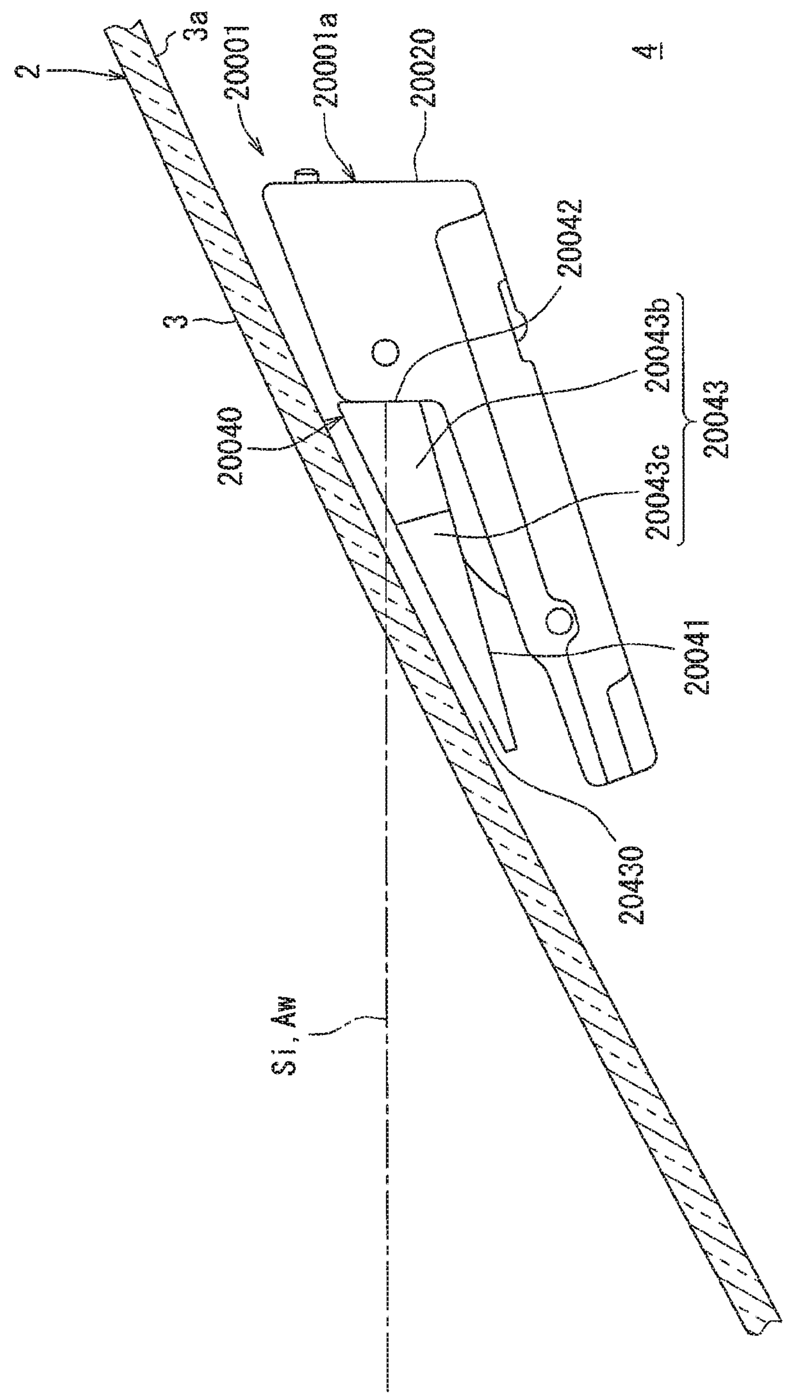
FIG. 50 is a side view illustrating the camera module according to the twentieth embodiment.
Figure 51:
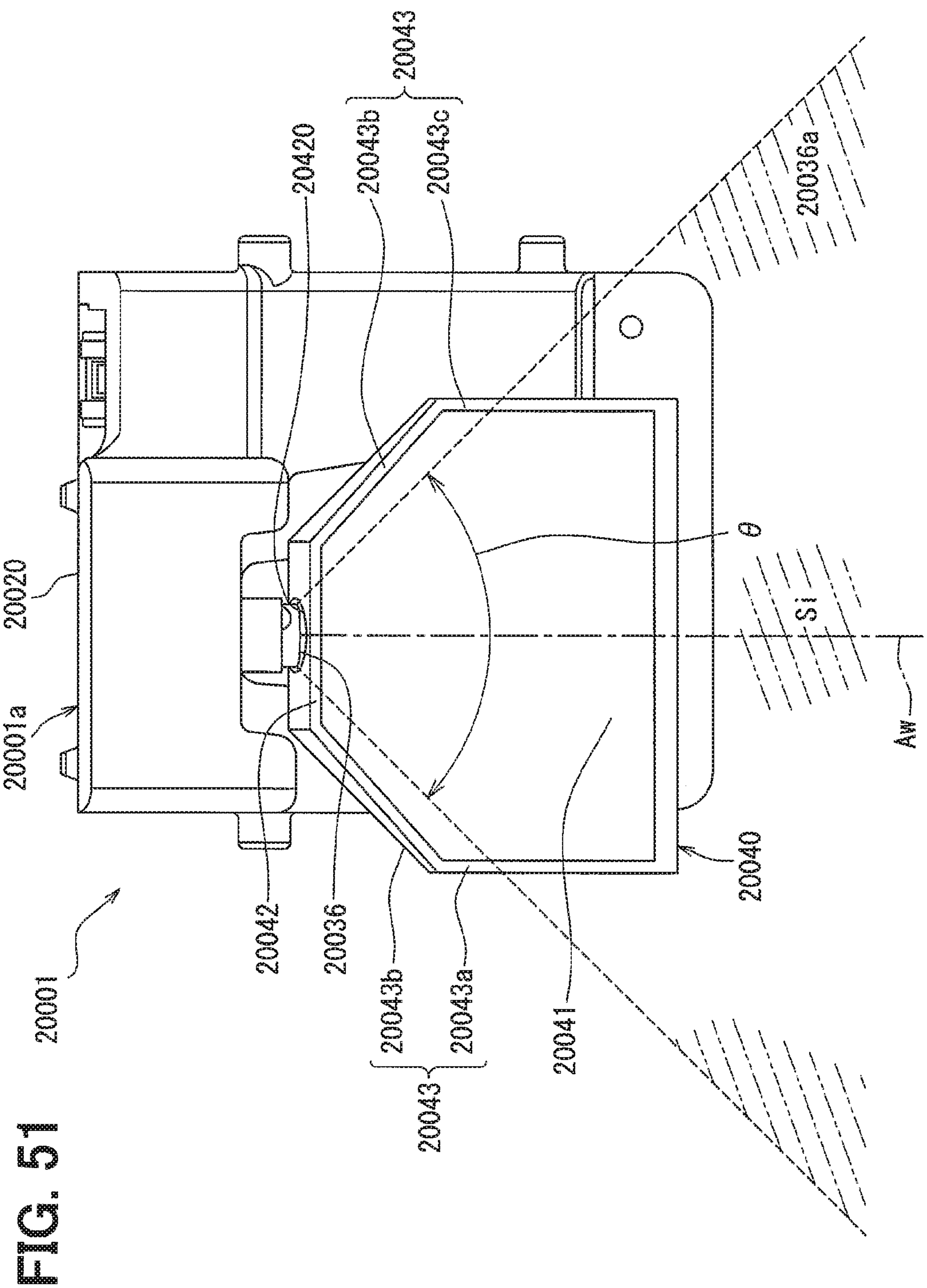
FIG. 51 is a top view illustrating the camera module according to the twentieth embodiment.

A camera module (camera unit) 20001 according to a twentieth embodiment shown in FIGS. 49 to 51 is mounted to an inside of the front windshield 3 of the vehicle 2, more specifically, to the inner surface 3*a* through a bracket, which is not shown. In the following description of the twentieth embodiment, the representation of directions of the camera module 20001 and components of the camera module 20001, for example, the representation of the front and back direction, the right and left direction, the vertical direction, and the like, are based on the camera module 20001 mounted to the front windshield 3. The front and back direction and the right and left direction of the camera module 20001 and the components of the camera module 20001 are synonymous with the front and back direction and the right and left direction of the vehicle.

The camera module 20001 includes a camera module main body (camera unit main body) 20001*a* and a hood 20040. The camera module main body 20001*a* accommodates the components of the camera including a wide angle lens 20036 inside a camera casing (housing) 20020 which is a box-shaped component.

The wide angle lens 20036 is provided at a position above the camera casing 20020 and exposed from the camera casing 20020 when viewed from the front side. In other words, the wide angle lens 20036 is located at a position enabling to image the outside of the vehicle 2 from the inside of the front windshield 3. As shown in FIGS. 50 and 51, on the imaginary plane Si, which is imaginarily formed along the light and left direction and the front and back direction in the horizontal direction and includes the optical axis Aw, and on condition that the optical axis Aw is along the front and back direction, the wide angle lens 20036 has the angle of view θ about 75° to about 150°. The angle of view θ is, for example, 90°. In this example, as indicated by two-dot chain line hatching in FIG. 51, a region is included within a range of the angle of view θ on the horizontal plane, which is the imaginary plane Si including the optical axis Aw, and the region is defined as a horizontal angle of view region 20036*a*. Further, two straight lines (that is, broken lines in FIG. 51) divide the horizontal angle of view region 20036 from a region, which is other than the horizontal angle of view region 20036*a*, on the horizontal plane including the optical axis Aw. The two straight lines are referred to as edges of the angle of view θ on the horizontal plane. The region outside the range of the angle of view θ is on the horizontal plane including the optical axis Aw.

The hood 20040 is a component for restricting light, which is from the vehicle compartment 4 of the vehicle 2 shown in FIG. 50 and is reflected on the inside of the front windshield 3, from entering the wide angle lens 20036. Therefore, the hood 20040 is fixed to a front portion of the upper surface of the camera casing 20020 to cover the wide angle lens 20036 from the lower side. In this example, the hood 20040 is configured as a separate member assembled to the camera casing 20020. The hood 20040 may be integrally formed with the camera casing 20020.

As shown in FIGS. 49 to 51, in the vehicle 2 on the horizontal plane, the hood 20040 is a tray-like component having a bilaterally symmetrical shape with respect to a vertical plane. The vertical plane includes the optical axis Aw of the wide angle lens 20036. In other words, the hood 20040 is symmetrical with respect to the optical axis Aw when viewed in the vertical direction. Specifically, the hood 20040 includes a base wall portion (bottom wall portion) 20041, two side wall portion portions (side wall portions) 20043, and a rear end wall portion (rear wall portion) 20042.

The base wall portion 20041 is a hexagonal flat plate located on the lower side of the optical axis Aw of the wide angle lens 20036. More specifically, the base wall portion 20041 has two lateral sides, which are parallel to each other, a front end side, which connects front ends of the two lateral sides to each other, two inclined sides, which extend obliquely rearward from rear ends of the respective two lateral sides so as to approach each other, and a rear end side, which connects rear ends of the two inclined sides to each other. It is preferable that an angle between each of the two lateral sides and the front end side is substantially a right angle, nevertheless, the angle may not be necessarily substantially a right angle. In addition, the front end side and the rear end side are substantially parallel to each other.

The base wall portion 20041 is inclined so that the front end side of the base wall portion 20041 is the lowest. In this example, the inclination of the base wall portion 20041 is smaller than the inclination of a portion of the front windshield 3 located on the front side of the base wall portion 20041. In this way, the base wall portion 20041 comes closest to the front windshield 3 at the front end side. Multiple protrusions (that is, restriction ribs) or multiple grooves may be provided in the base wall portion 20041 in order to reduce reflection or the like.

The two side wall portions 20043 are plates raised from both of the right and left sides, specifically, from the right and left lateral sides and from the inclined sides of the base wall portion 20041 toward the front windshield 3, in other words, toward the upper side. The two side wall portions 20043 are raised substantially vertically from the base wall portion 20041. However, the respective side wall portions 20043 are not necessarily raised substantially vertically from the base wall portion 20041 so far as, the height of each side wall portion 20043 in the vertical direction is designed so that the upper end of each side wall portion 20043 comes closer to the inner surface 3*a* of the front windshield 3 and does not block the edges of the angle of view θ on the horizontal plane. The horizontal plane is the imaginary plane Si including the optical axis Aw of the wide angle lens 20036. As shown in FIG. 50, each side wall portion 20043 is located to form a clearance 20430, specifically, a minute clearance 20430 of about 2 to 3 mm, between the upper end of the side wall portion 20043 and the front windshield 3.

As shown in FIGS. 49 to 51, each side wall portion 20043 has a flat plate-shaped straight portion (straight wall) 20043*c* and a plate-like inclined portion (inclined wall) 20043*b* as one pair. The flat plate-shaped straight portion 20043*c* is along the lateral side of the base wall portion 20041. The plate-like inclined portion 20043*b* is along the inclined side of the base wall portion 20041. The flat plate-shaped straight portions 20043*c* and the plate-like inclined portions 20043*b* are in a symmetrical shape with respect to the optical axis Aw. Each of the straight portions 20043*c* is in a linear shape substantially parallel to the optical axis Aw when viewed in the vertical direction. On the other hand, each of the inclined portions 20043*b* is in a linear shape, and the further the inclined portion 20043*b* gets closer toward the wide angle lens 20036, the further the inclined portion 20043*b* is inclined in a direction to approach the optical axis As when viewed in the vertical direction. Further, the straight portion 20043*c* and the inclined portion 20043*b* shown in FIG. 50 are configured so that a projected shape when observed from the right and left direction (that is, in the vehicle width direction or in the horizontal direction) is a triangle in which the height gradually decreases from the rear side toward the front side of the vehicle 2. In this way, the clearance 20430 between the upper end edge of the straight portion 20043*c* and the front windshield 3 and the clearance 20430 between the upper end edge of the inclined portion 20043*b* and the front windshield 3 can be kept substantially constant. Further, each straight portion 20043*c* is partially included in the horizontal angle of view region 20036*a* when viewed in the vertical direction. On the other hand, each inclined portion 20043*b* is not included in the horizontal angle of view region 20036*a* when viewed in the vertical direction.

The rear end wall portion 20042 is a flat plate raised from the rear side of the base wall portion 20041 toward the front windshield 3, that is, upward. The rear end wall portion 20042 connects the rear ends of the two side wall portions 20043 to each other. In addition, the rear end wall portion 20042 has a through hole 20420 at a position covering the wide angle lens 20036. In other words, the wide angle lens 20036 is located so as to be exposed through the through hole 20420 of the rear end wall portion 20042.

(Operational Effects)

According to the twentieth embodiment described above, the following operational effects are produced.

Figure 52:
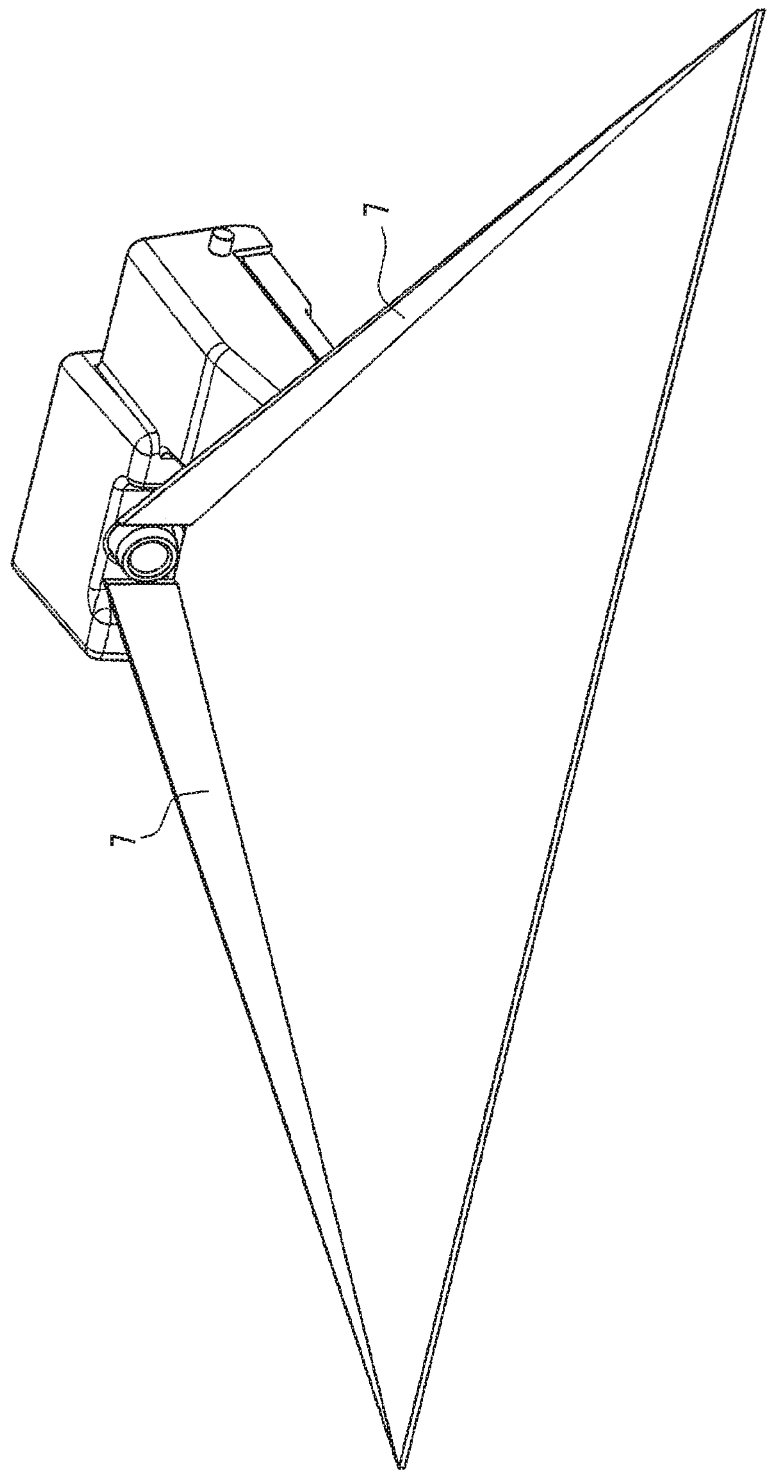
FIG. 52 is a perspective view illustrating a camera module according to a comparative example to the twentieth embodiment.

According to the twentieth embodiment, the configuration is adapted to the wide angle lens 20036 while enabling to reduce the hood 20040 in size for the following reasons. That is, for example, as in a comparative example shown in FIG. 52, when the hood is to be configured without the side wall portions 7 in the range of the angle of view when viewed in the vertical direction, a concern arises that the lateral width of the hood becomes larger when the wide angle lens is employed. To the contrary, in the twentieth embodiment, as shown in FIG. 51, a part of each side wall portion 20043 is within the horizontal angle of view region 20036*a* when viewed in the vertical direction. Therefore, on the horizontal plane as the imaginary plane Si including at least the optical axis Aw of the wide angle lens 20036, the hood 20040 is configured so that the imageable range is not blocked with each side wall portion 20043. According to the configuration, the hood 20040 can be reduced in size while taking advantage of the wide angle of view θ of the wide angle lens 20036 in the horizontal direction.

In addition, according to the twentieth embodiment, each side wall portion 20043 is located with the slight clearance 20430 between the side wall portion 20043 and the front windshield 3. In this way, the imageable range can be enlarged such that a phenomenon, which is due to reflection of light from the vehicle compartment 4 on the inside of the front windshield 3, unlikely occurs. That is, a phenomenon, in which an object in the vehicle compartment 4 is reflected as a captured image, unlikely occurs. In this example, in the twentieth embodiment, the clearance 20430 between each side wall portion 20043 and the front windshield 3 is as small as about 2 to 3 mm. For this reason, even in a case where an object in the vehicle compartment 4 is reflected as the captured image, the size of the object on the captured image is very small, for example, about 5 pixels. Therefore, even in a case where an object, which is likely to be misrecognized as a lane line, a pedestrian, or the like, is present in the vehicle compartment 4, only a small part of the object is reflected in the captured image. Therefore, an erroneous recognition unlikely occurs. Thus, according to the twentieth embodiment, the configuration enables to enlarge the imageable range to an extent that the erroneous recognition, which is caused by reflecting the object in the vehicle compartment 4 in the captured image, unlikely occurs.

In the twentieth embodiment, each of the straight portions 20043*c* when viewed in the vertical direction has a linear shape substantially parallel to the optical axis Aw and is configured so as to be partially included in the horizontal angle of view region 20036*a*. In addition, the straight portions 20043*c* when viewed in the vertical direction have the symmetrical shape with respect to the optical axis Aw. Those configurations enable to ensure the distance between the wide angle lens 20036 and each straight portion 20043*c* while restricting the lateral width of the hood 20040.

In the twentieth embodiment, each side wall portion 20043 when viewed in the vertical direction is in a shape such that the inclined portion 20043*b* is in the region other than the horizontal angle of view region 20036*a*. This is because the hood 20040 is the hexagonal tray-like component. In this way, the area of the base wall portion 20041 can be reduced in the region other than the horizontal angle of view region 20036*a*, that is, in the region not required to cover the lower side of the wide angle lens 20036. Therefore, according to the twentieth embodiment, the hood 20040 per se can be downsized as compared with the configuration without the inclined portion 20043*b*.

In the hood 20040 described above, the edges of the angle of view θ is on the imaginary plane Si, which is imaginarily formed in at least the right and left direction in the horizontal direction and includes the optical axis Aw of the wide angle lens 20036. The hood 20040 described above includes the two side wall portions 20043 at a height that does not block the edges of the angle of view θ on the horizontal plane on condition that the optical axis Aw is along the front and back direction in the horizontal direction. However, the configuration of each side wall portion 20043 is not limited to the above configuration. For example, in a case where the optical axis Aw is inclined to the lower side or to the upper side toward the front side in the front and back direction, on condition that the hood 20040 has the two side wall portions 20043 at the height that does not block the edges of the angle of view θ on the imaginary plane Si imaginarily formed along the right and left direction and includes the inclined optical axis Aw, the operational effects as those described above can be produced.

Figure 53:
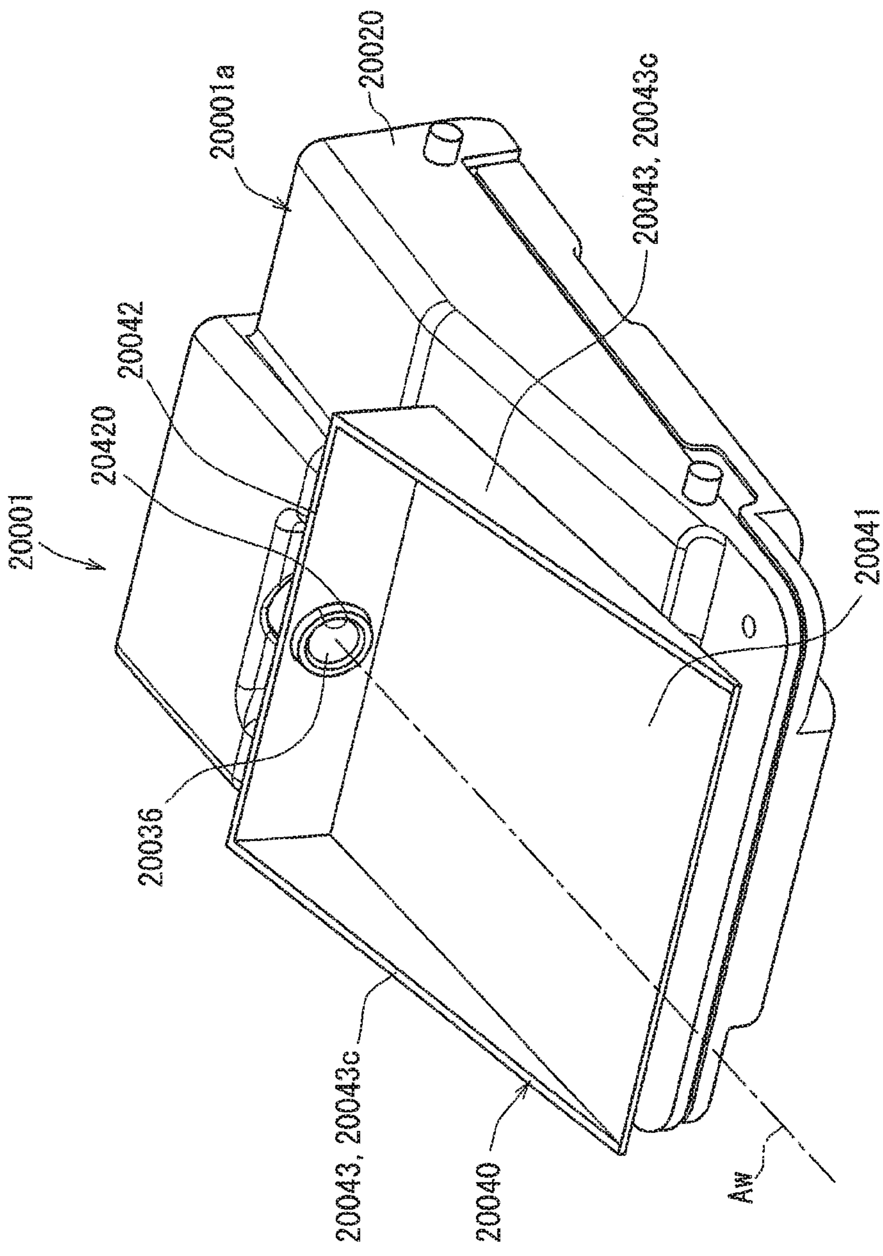
FIG. 53 is a perspective view illustrating a hood shape of the camera module according to the twentieth embodiment, which is different from that of FIG. 49.
Figure 75:
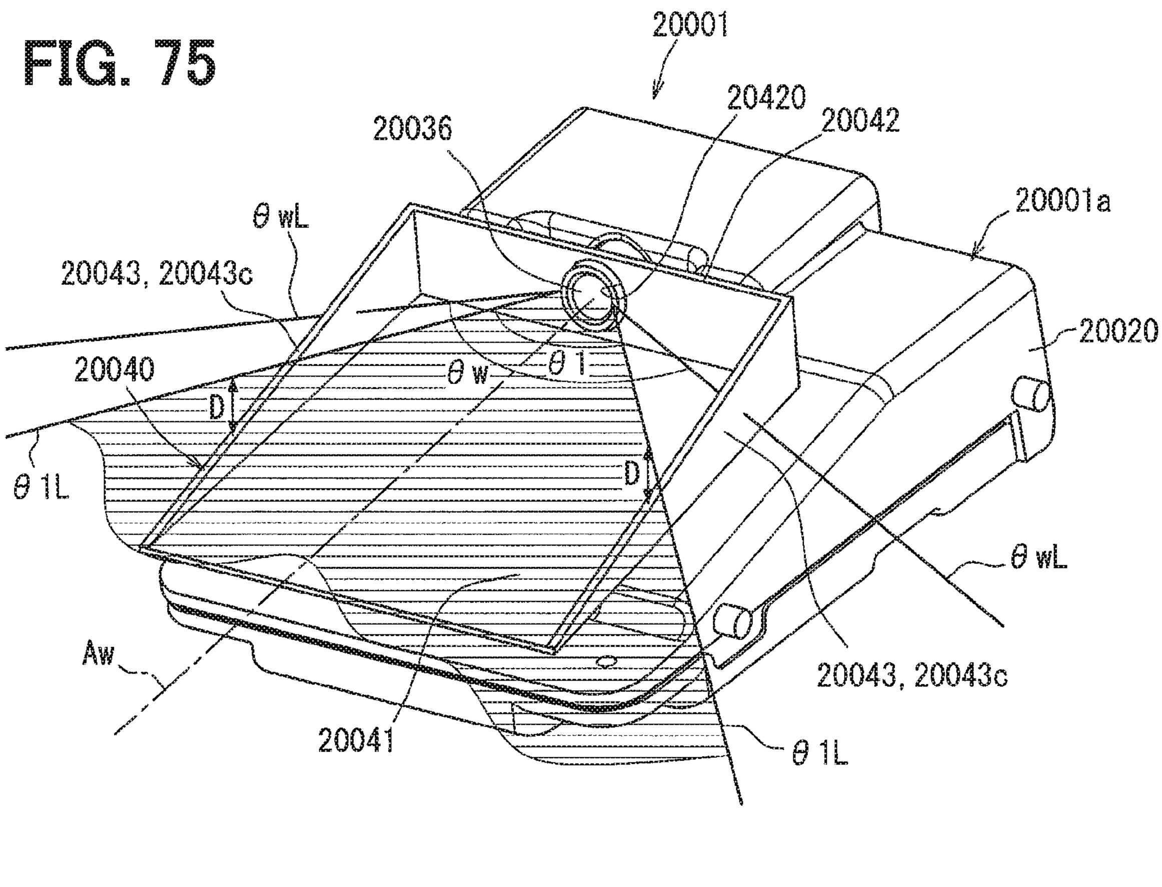
FIG. 75 is a perspective view showing the hood of FIG. 53 and illustrating a relationship between the hood and a field of lens angle of view.

In the hood 2040 as described above, each side wall portion 20043 has the straight portion 20043*c* and the inclined portion 20043*b*. It is noted that, the configuration of the side wall portion 20043 is not limited to the above example. In the example as shown in FIGS. 53, 75, the hood 20040 is in a rectangular tray-shape. The hood 20040 has the side wall portions 20043 each having only the straight portion (linear wall) 20043*c*. Even in this configuration, the upper end of each side wall portion 20043 has the height such that the upper end is close to the inner surface 3*a* of the front windshield 3 and does not block the edges of the angle of view θ on the imaginary plane Si including the optical axis Aw of the wide angle lens 20036. The configuration will be described further in detail with reference to FIG. 75. FIG. 75 is a perspective view illustrating the horizontal angle of view range of the first taper angle θ1, which is required for the specific control Cs, and the horizontal angle of view range of the lens angle of view θw of the lens unit on FIG. 53. FIG. 75 shows the relationship of the horizontal angle of view ranges and the side wall portions 20043. Lines θwL define the lens angle of view θw in which the wide angle lens 20036 is configured to image on an arbitrary horizontal plane, which passes through the wide angle range 20036. The lines θwL are blocked by the side wall portions 20043, respectively. Lines θ1L define the first taper angle θ1 of the wide angle lens 20036 on the arbitrary horizontal plane. Each of the lines θ1L passes on the upper side of the corresponding side wall portion 20043 via a clearance D (D≥0) from the corresponding side wall portion 20043. In other words, the side wall portions 20043 are raised to its height lower than edge lines on both sides of a field of lens angle of view. The field of lens angle of view is defined by the first taper angle θ1 of the wide angle lens 20036 on the arbitrary horizontal plane. The field of lens angle of view defines a field to recognize an obstacle in an external environment 5 in front of the vehicle. The angle between the edges of the field of the first taper angle θ1 is selected from an angular range of 80° to 110°. The configuration also produces an operation effect similar to the above-described effect.

Other Embodiments

Figure 61:
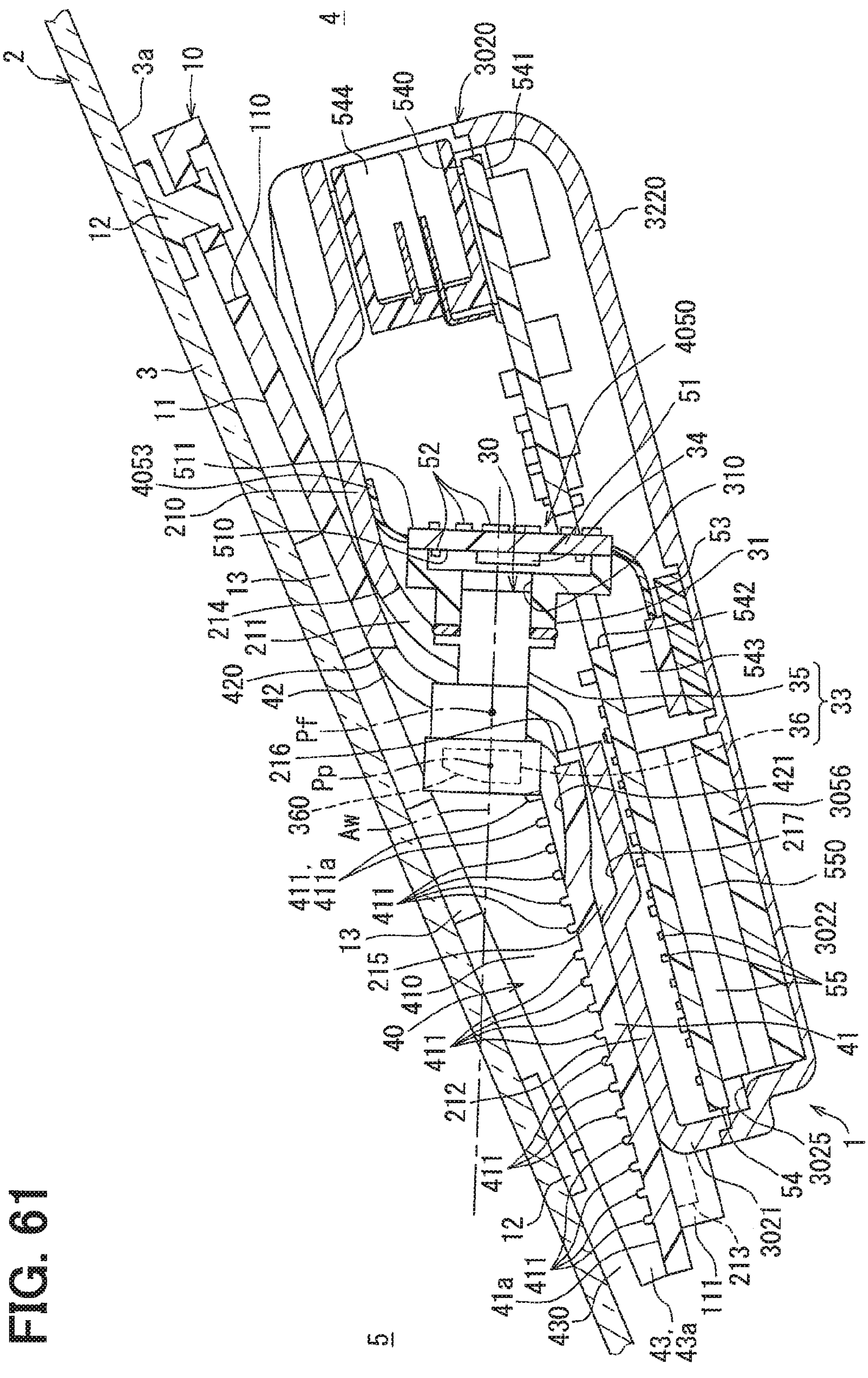
FIG. 61 is a cross-sectional view illustrating one modification of FIG. 15.
Figure 62:
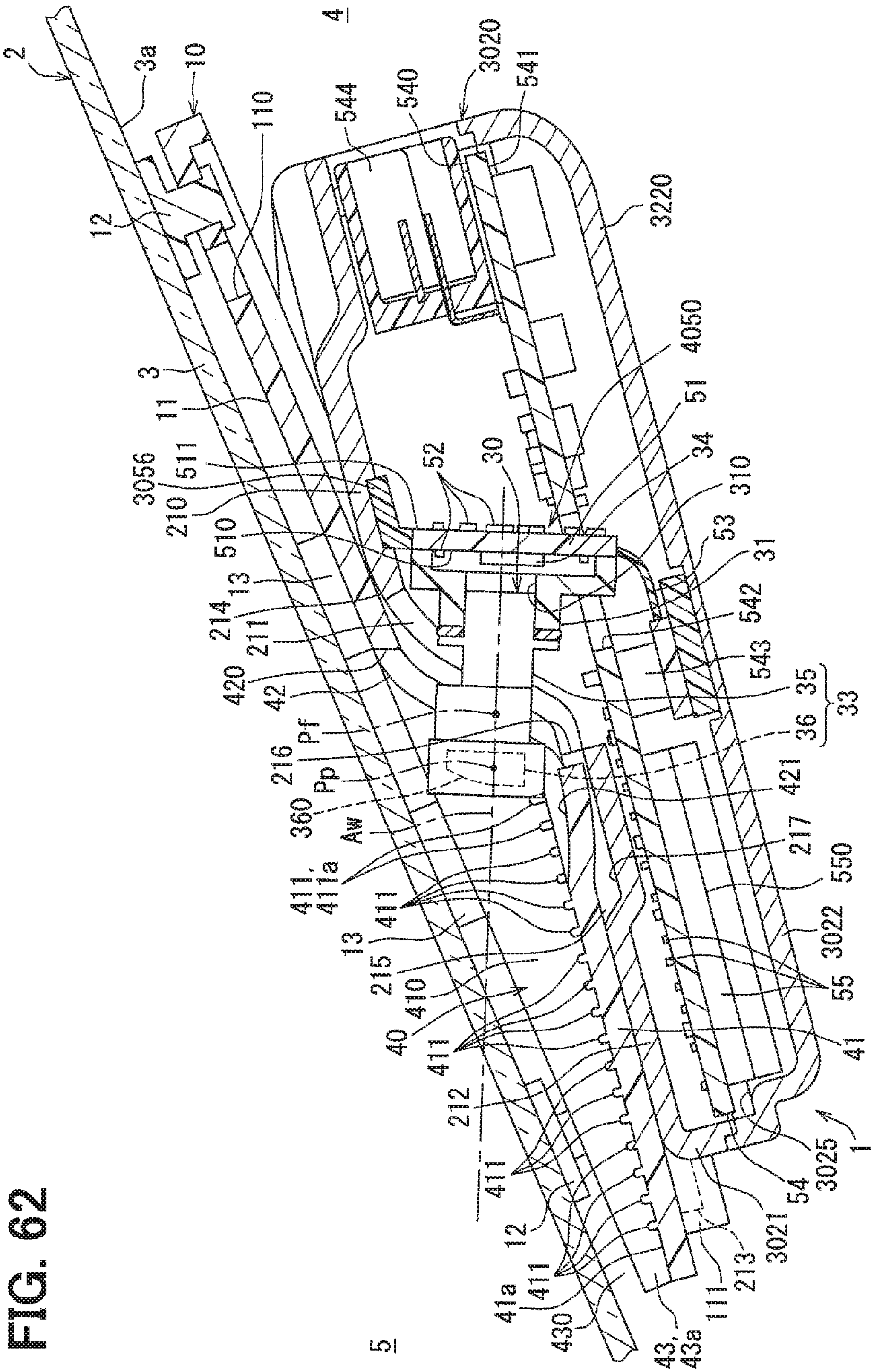
FIG. 62 is a cross-sectional view illustrating another modification of FIG. 15.

Above description is given of multiple embodiments; however, the present disclosure is not to be interpreted as being limited to the embodiments and may be applied to various embodiments and combinations in a scope which does not depart from the intent of the present disclosure. In the following description, FIGS. 54 and 55 typically illustrate modifications according to the second embodiment, and FIGS. 56, 57 and 67 typically illustrate modifications according to the first embodiment. FIGS. 58 and 68 to 73 typically illustrate modifications according to the ninth embodiment, and FIGS. 59 and 60 typically illustrate modifications according to the third embodiment. FIGS. 61 and 62 typically illustrate modifications according to the fourth embodiment, and FIGS. 63 and 74 typically illustrate modifications according to the fifteenth embodiment.

Figure 54:
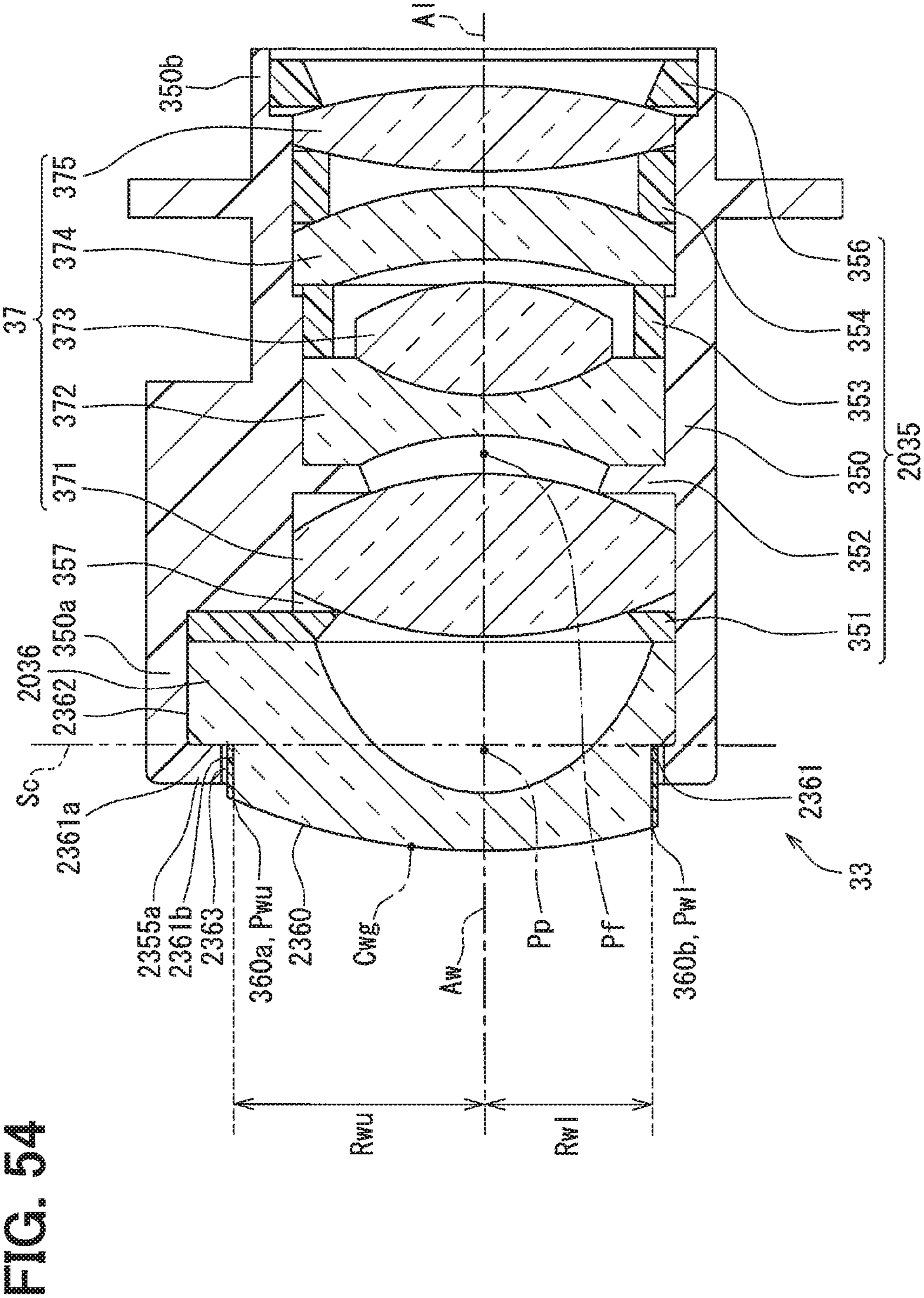
FIG. 54 is a cross-sectional view illustrating one modification of FIG. 13.

Specifically, in Modification 1 relating to the first to nineteenth embodiments, as shown in FIG. 54, locking claw portion 355*a* and 2355*a* shaped to lock the wide angle lens 36 and 2036 may be formed by crimping the front side end portion of the wide angle accommodation portion 350*a* after fitting the wide angle lens 36 and 2036 into the wide angle accommodation portion 350*a*. In this case, the front caps 355 and 2355 are not required.

Figure 55:
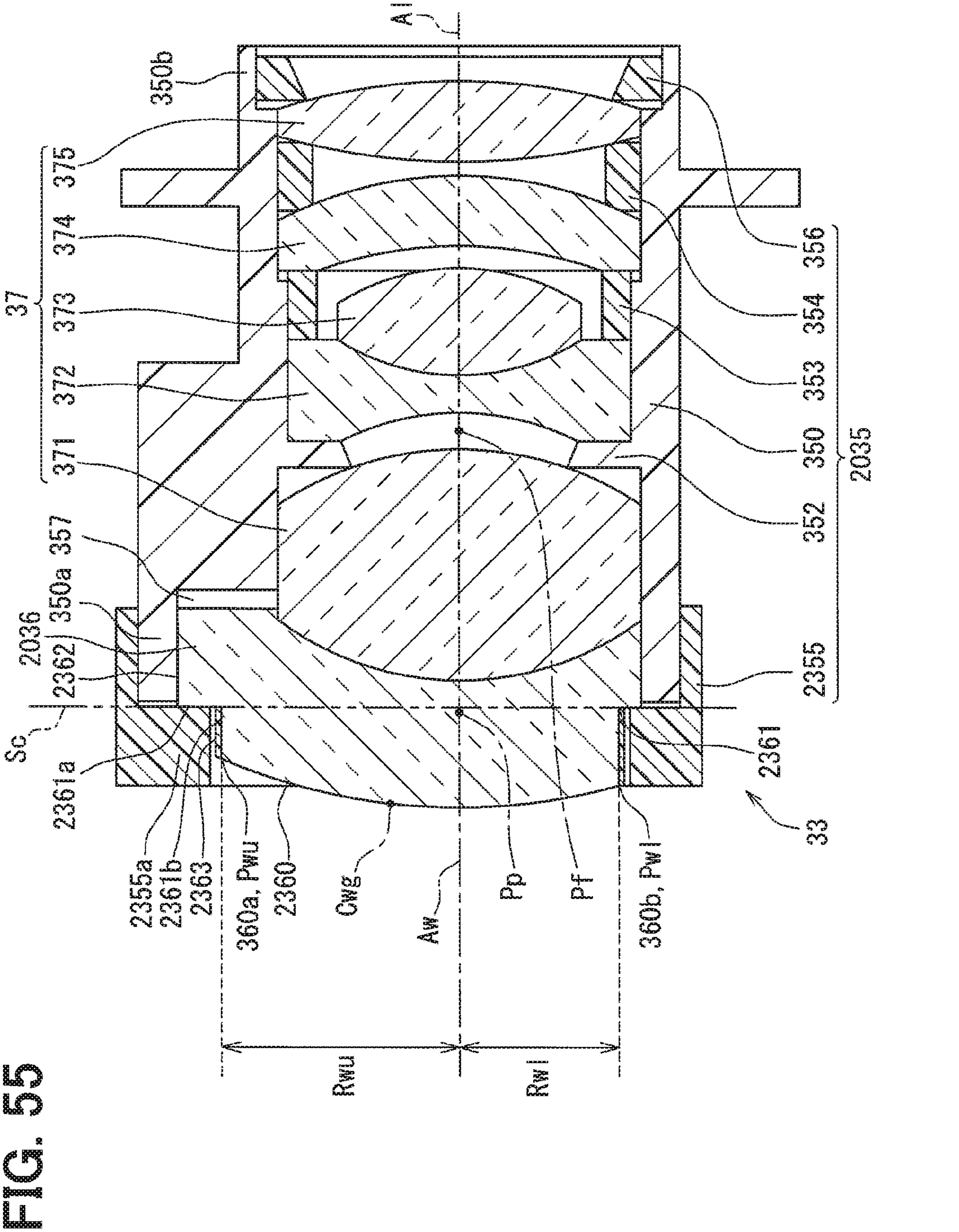
FIG. 55 is a cross-sectional view illustrating another modification of FIG. 13.

In Modification 2 according to the first to nineteenth embodiments, as shown in FIG. 55, the wide angle lens 36 and 2036 are fixed on the front optical surface of the first rear lens 371 in an overlapping manner, so as to be sandwiched between the front caps 355, 2355 and the second spacer 352. In this case, the first spacer 351 is not required.

Figure 56:
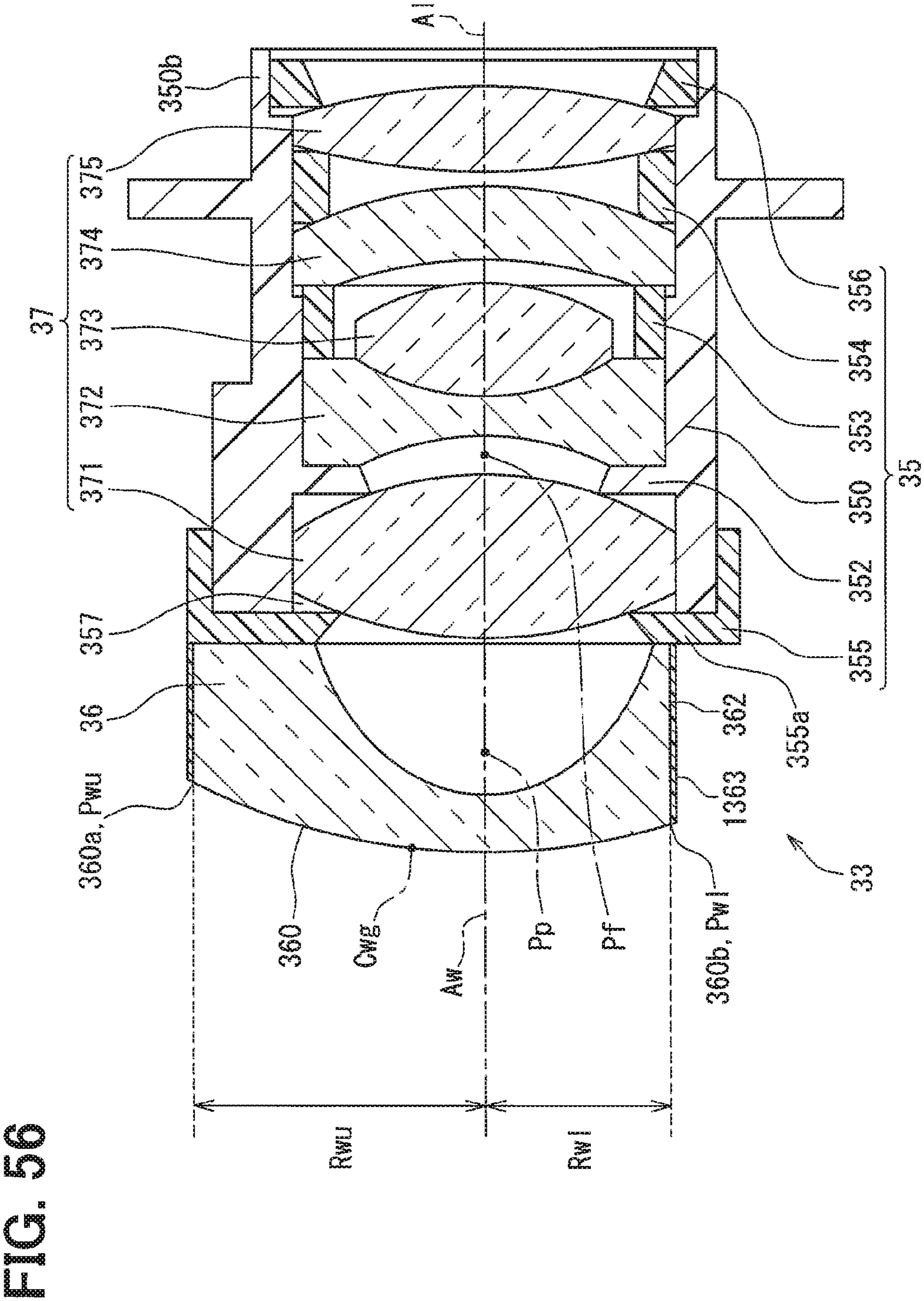
FIG. 56 is a cross-sectional view illustrating a modification of FIG. 9.

In Modification 3 according to the first and third to nineteenth embodiments, as shown in FIG. 56, the wide angle lens 36 may be adhered from the front side to the front cap 355 having the locking claw portion 355*a* that locks the first rear lens 371 from the front side. In this case, the first spacer 351 and the wide angle accommodation portion 350*a* are not required. In addition, In this case, a reflection restriction portion 1363 according to the second embodiment may be provided on the outer peripheral surface 362 and 2362 of the wide angle lens 36 and 2036.

Figure 57:
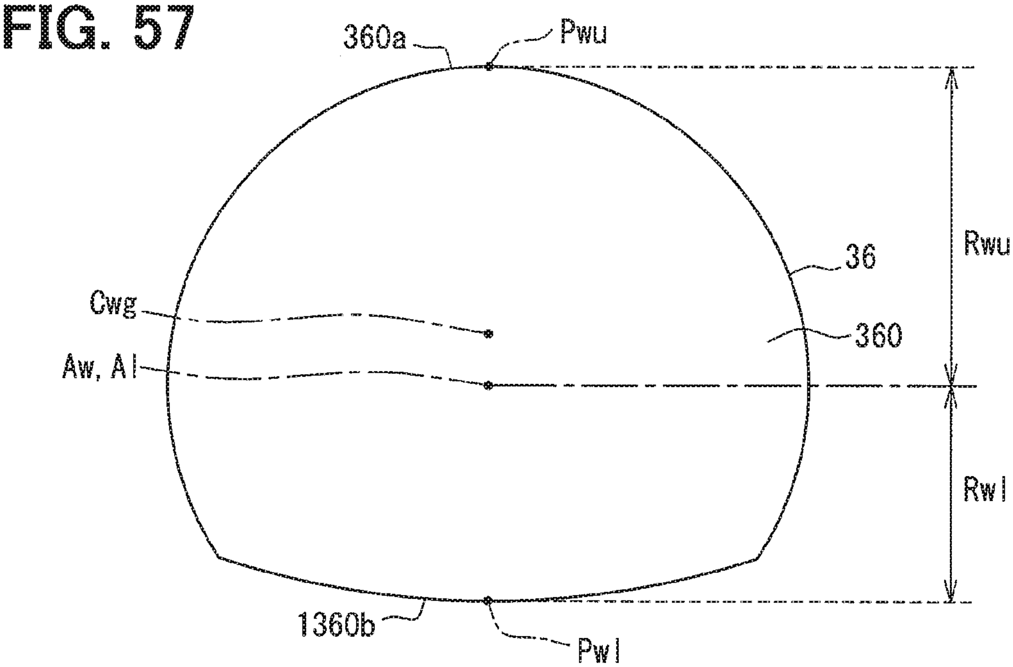
FIG. 57 is a front view illustrating a modification of FIG. 11.

In Modification 4 according to the first to nineteenth embodiments, as shown in FIG. 57, the linear chord portion 360*b* may be replaced with a curved portion 1360*b* that curves convex downward with a smaller curvature than the arc portion 360*a* to produce the cut form of the wide angle optical surface 360 and 2360. In Modification 5 according to the first to nineteenth embodiments, as long as the upper size Rwu larger than the lower size Rwl in the lowermost portion Pwl is ensured on the uppermost portion Pwu, the curvature of the arc portion 360*a* in the wide angle optical surface 360 and 2360 may change in the circumferential direction. In Modification 6 according to the first to nineteenth embodiments, the wide angle lens 36 and 2036 may have cut forms conforming to the wide angle optical surface 360 and 2360 on the right and left side portions.

Figure 58:
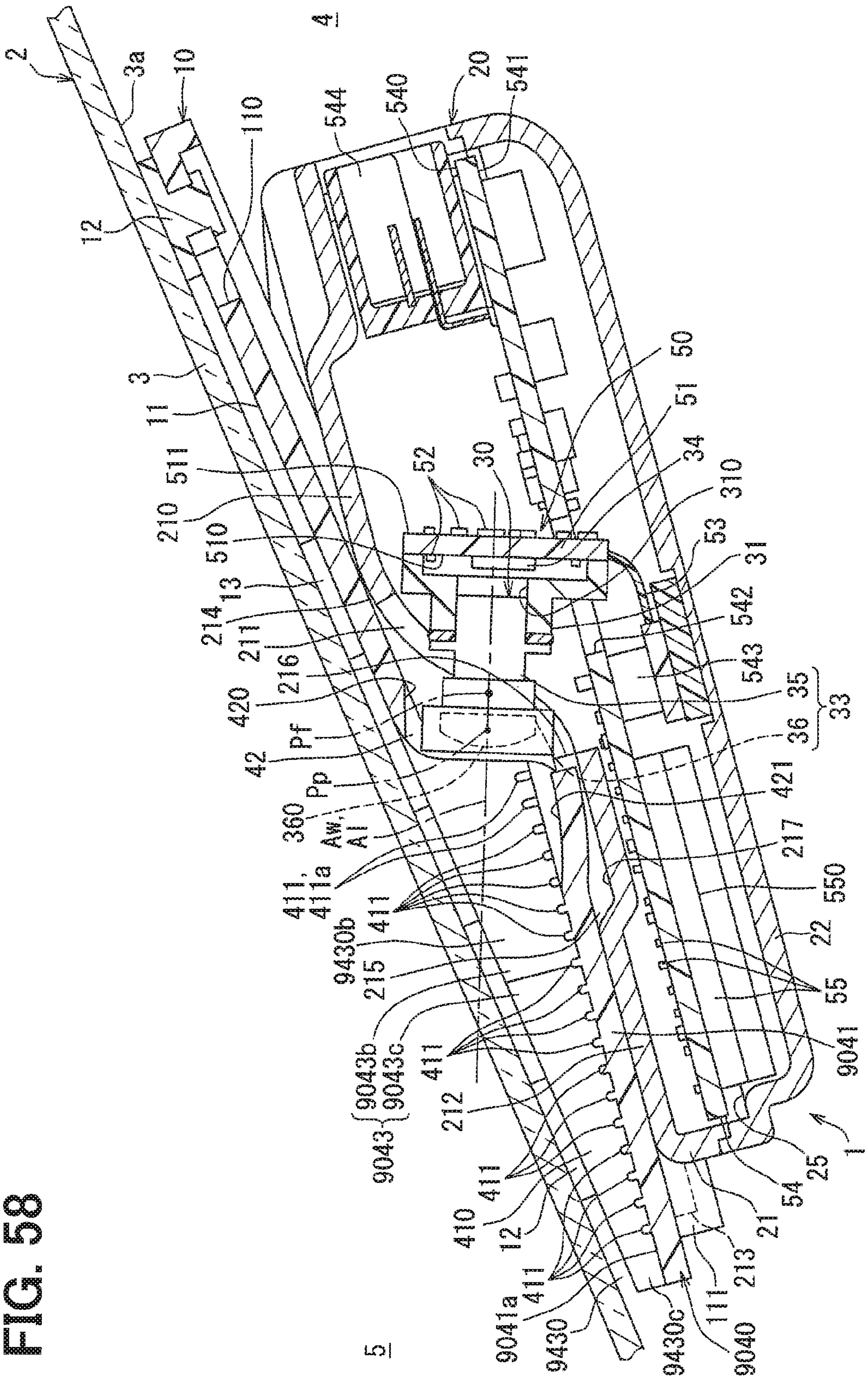
FIG. 58 is a cross-sectional view illustrating a modification of FIG. 21.
Figure 59:
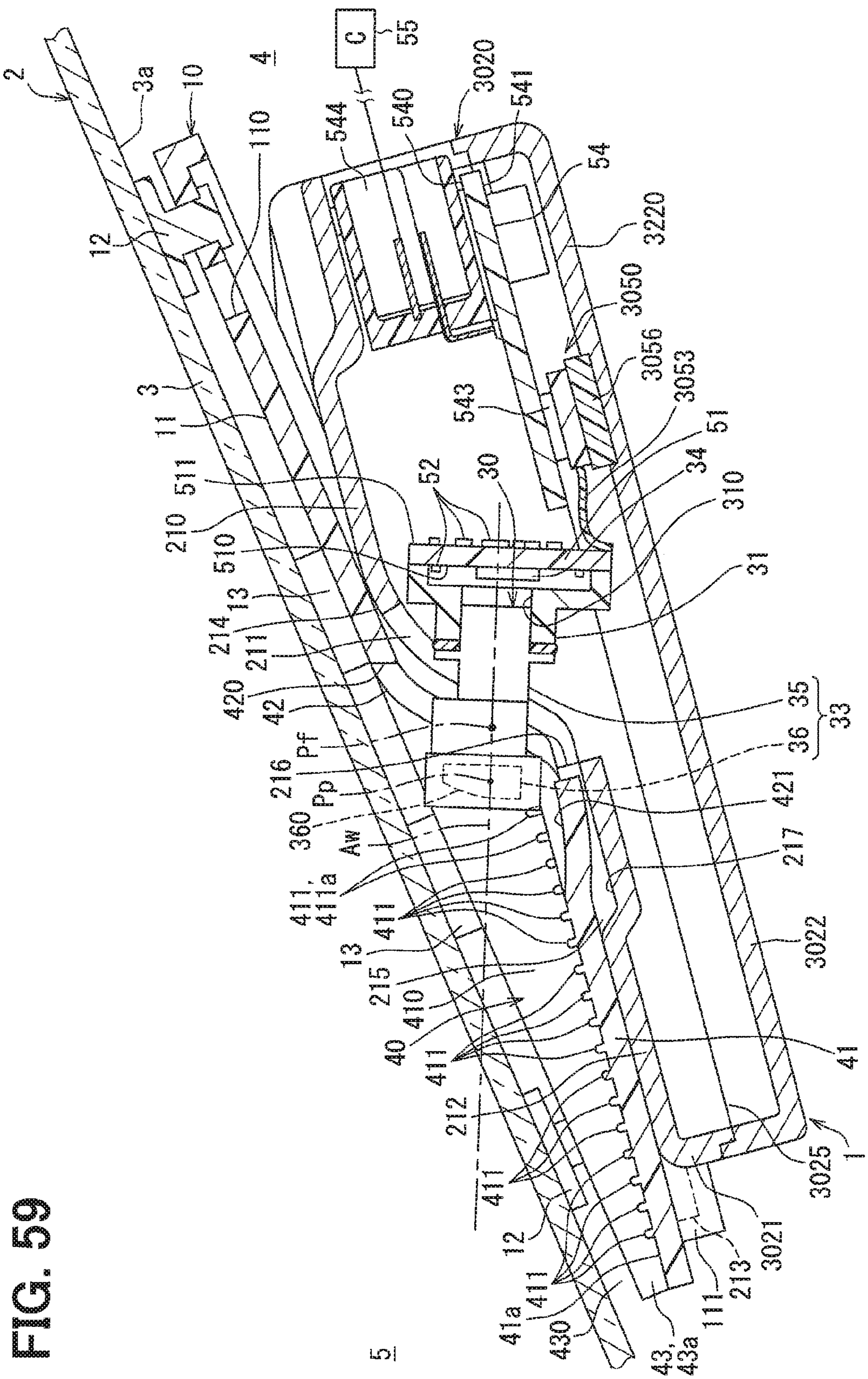
FIG. 59 is a cross-sectional view illustrating one modification of FIG. 14.

In Modification 7 according to the first to nineteenth embodiments, as shown in FIG. 58, the wide angle lens 36 and 2036 do not have a cut form. In this case, the respective optical axes Aw and Al of the wide angle lens 36 and 2036 and the lens set 37 may not be shifted from the geometric center Cwg of the wide angle optical surface 360 and may pass through the geometric center Cwg. Even In this case, the operational effects, which are caused by shifting the geometric center Cig of the effective image capturing region 340 in the imager 34 toward the lower side of the respective optical axes Aw and Al of the wide angle lens 36 and 2036 and the lens set 37, can be produced.

In Modification 8 according to the first to nineteenth embodiments, the lens set 37 may be configured with multiple rear lens of a number other than five or may be configured with one rear lens, as a lens having the optical axis Al, which is substantially the same as the optical axis Aw of the wide angle lens 36 and 2036. In Modification 9 according to the first to nineteenth embodiments, at least one rear lens in the lens set 37 may have a cut form according to the wide angle optical surface 360 and 2360 on the upper side. In Modification 10 according to the first to nineteenth embodiments, the rear lens may not be provided.

In Modification 11 according to the first to nineteenth embodiments, the respective optical axes Aw and Al of the wide angle lens 36 and 2036 and the lens set 37 are not substantially shifted from the geometric center Cig of the effective image capturing region 340 in the imager 34, and may pass through the geometric center Cig. In Modification 12 according to the first to nineteenth embodiments, an exposure state at the next imaging time may be controlled based on the pixel value of a predetermined pixel including the vehicle image capturing pixels 551*a* of the outside image 551.

In Modification 13 according to the first to nineteenth embodiments, at least a part of the functions of the control circuit 55 for controlling the imager 34 may be attained by an external circuit outside the camera casing 20, 3020, 5020, and 6020 such as an ECU. In a case shown in FIG. 59 as a specific example In this case, the entire control circuit 55 is located outside the camera casing 3020 as an external circuit such as an ECU, and the FPC 3053 is connected to the external connector 544. In this case, there is no need to take measures for the control circuit 55 against thermal radiation, and the control circuit 55 can be reduced in size. In the specific example of FIG. 59, the board 54 for mounting the internal connector 543 connected to the FPC 3053 remains in addition to the external connector 544 connected to the external control circuit 55.

In Modification 14 according to the first to sixteenth, eighteenth, and nineteenth embodiments, the connection hole 542 may not be provided in the control board 54. In this case, the imaging board 51 and 7051 may be connected to the internal connector 543 mounted on the upper mounting surface 540 of the control board 54 through or not through the FPC 53 and 3053. Alternatively, the imaging board 51 and 7051 may be connected to the internal connector 543 mounted on the lower mounting surface 541 of the control board 54 through FPC 53 and 3053 which wrap around an outer peripheral side of the control board 54.

In Modification 15 according to the first, second and ninth to nineteenth embodiments, at least one of the opposing wall portion 210 or the recess wall portion 212 may not be provided in the camera casing 20. In Modification 16 according to the first to fifth, seventh to thirteenth, and eighteenth and nineteenth embodiments, the mounting pad 12 directly held by the camera casing 20, 3020, and 5020 may be fixed to the front windshield 3 without the bracket main body 11.

In Modification 17 according to the first to fifth, seventh to thirteenth, eighteenth and nineteenth embodiments, the hood 40, 9040, 10040, 11040, 12040, 18040, and 19040 may be formed separately from the bracket main body 11. In Modification 18 according to the sixteenth and seventeenth embodiments, the hood 9040 may be formed integrally with the bracket main body 15011.

In Modification 19 according to the first to sixteenth and eighteenth embodiments, the height of each of the restriction ribs 411 may be substantially equal to each other in the hood 40, 6040, 9040, 10040, 11040, 12040, and 18040. In Modification 20 according to the first to sixteenth embodiments, the restriction ribs 411 may not be provided in the hood 40, 6040, 9040, 10040, 11040, and 12040. In Modification 21 according to the seventeenth embodiment, the restriction ribs 411 including the specific ribs 411*a* may be provided on the hood 17040.

Figure 60:
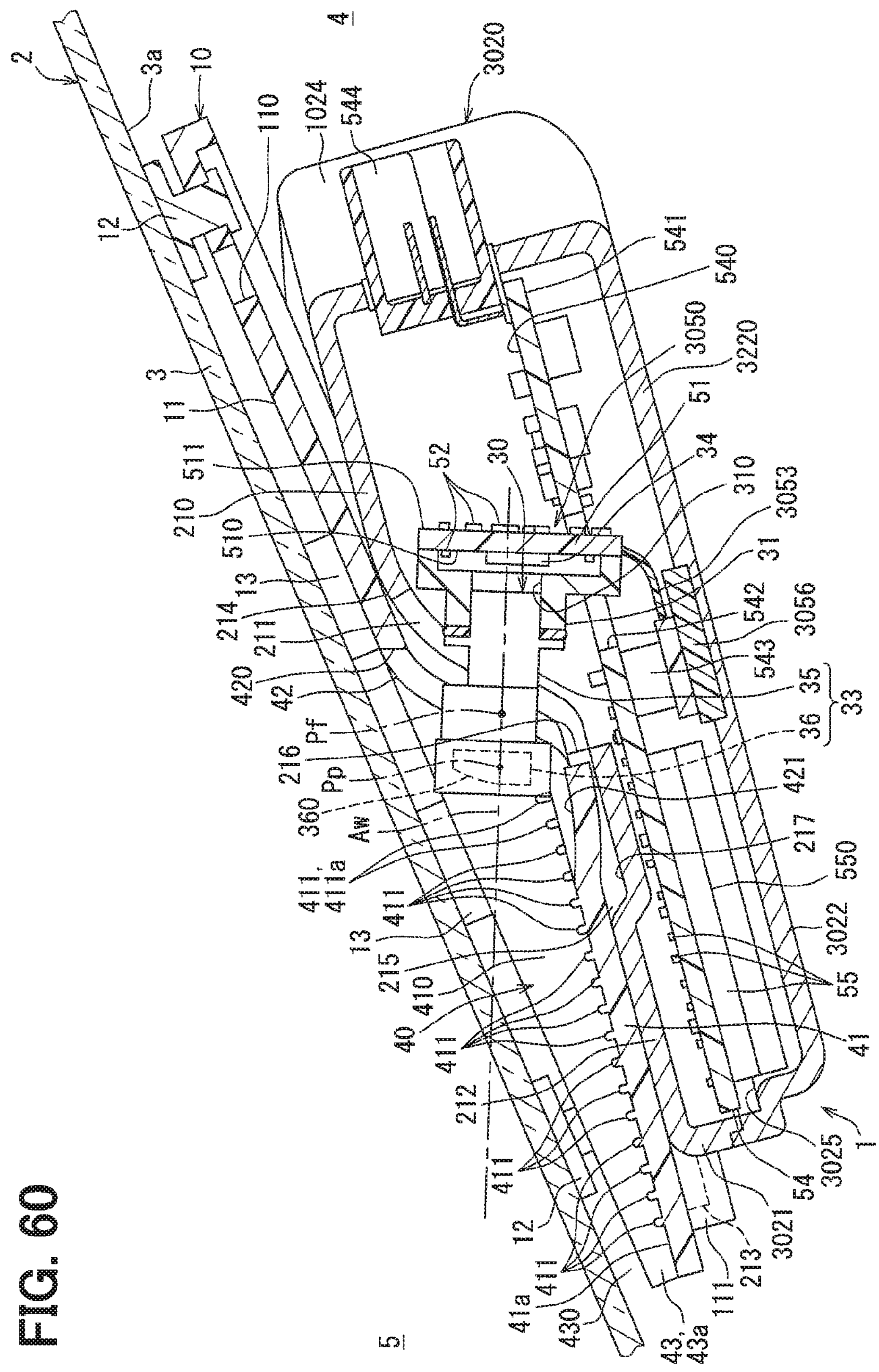
FIG. 60 is a cross-sectional view illustrating another modification of FIG. 14.

In Modification 22 according to first to nineteenth embodiments, as shown in FIG. 60, in the camera casing 20, 3020, 5020, and 6020, the surroundings of the external connector 544 may be open to the outside through an opening 1024 formed in the upper casing members 21, 3021, and 6021. In this case, since the external connector 544 can be cooled with an air flow in the vehicle compartment 4, the thermal radiation performance can be enhanced.

In Modification 23 according to the third to nineteenth embodiments, a wide angle lens 2036 according to the second embodiment may be provided. In Modification 24 according to the fourth to sixteenth, eighteenth, and nineteenth embodiments, the relay member 3056 connected to the FPC 3053 substituted for the FPC 53 according to the third embodiment may be added. In Modification 25 according to the first to nineteenth embodiments, as shown in FIG. 61, the relay member 3056 according to the third embodiment may be provided in a structure where at least one of the control board 54, 17054 or the control circuit 55 is connected to the lower casing member 22 and 3022 of the camera casing 20, 3020, 5020, and 6020.

In Modification 26 according to the fourth and sixth to eighth embodiments, as shown in FIG. 62, the relay member 3056 according to the third embodiment may be formed in a rigid plate form at a placement location of the FPC 4053 and may be substituted for the FPC 4053. In Modification 27 according to the ninth to nineteenth embodiments, the FPC 4053 may be added according to the fourth embodiment.

In Modification 28 according to the sixth to eighth embodiments, the FPC 4053 may be connected to the connection member 5023 according to the fifth embodiment. In Modification 29 according to the ninth to nineteenth embodiments, the connection member 5023 may be added together with the FPC 4053 according to the fifth embodiment.

Figure 63:
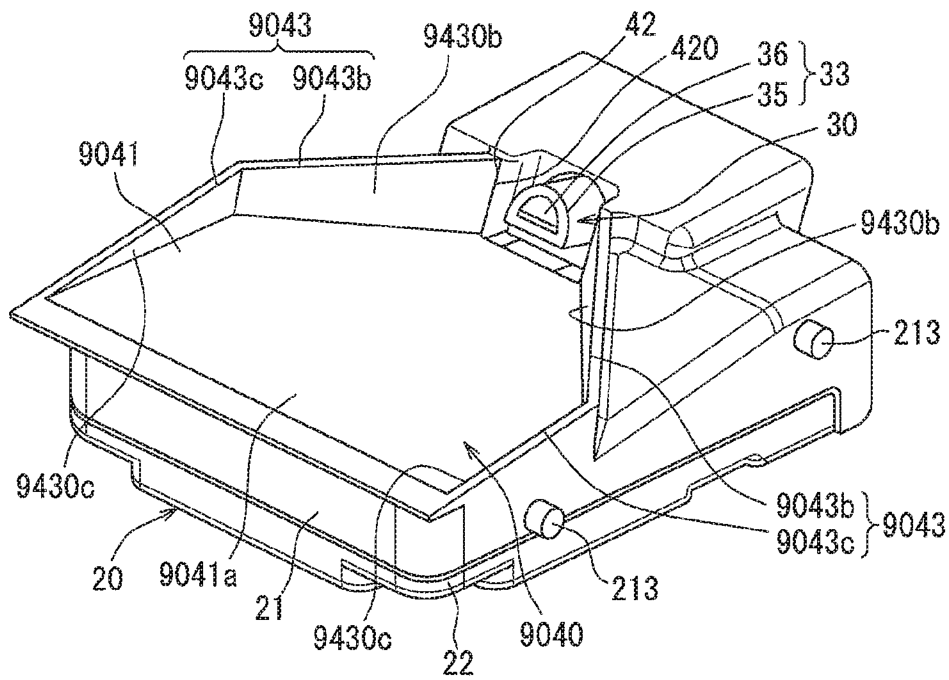
FIG. 63 is a perspective view illustrating a modification of FIG. 41.

In Modification 30 according to the first to third, fifth, seventh to thirteenth and fifteenth to nineteenth embodiments, the hood 40, 9040, 10040, 11040, 12040, 17040, 18040, and 19040 may be formed by the camera casing 20, 3020, and 5020 according to the sixth embodiment as shown in FIG. 63. In Modification 31 according to the sixth embodiment, the bracket main body 11 having no hood 6040 may be provided in a case where the hood 6040 is configured with a part of the camera casing 6020.

Figure 64:
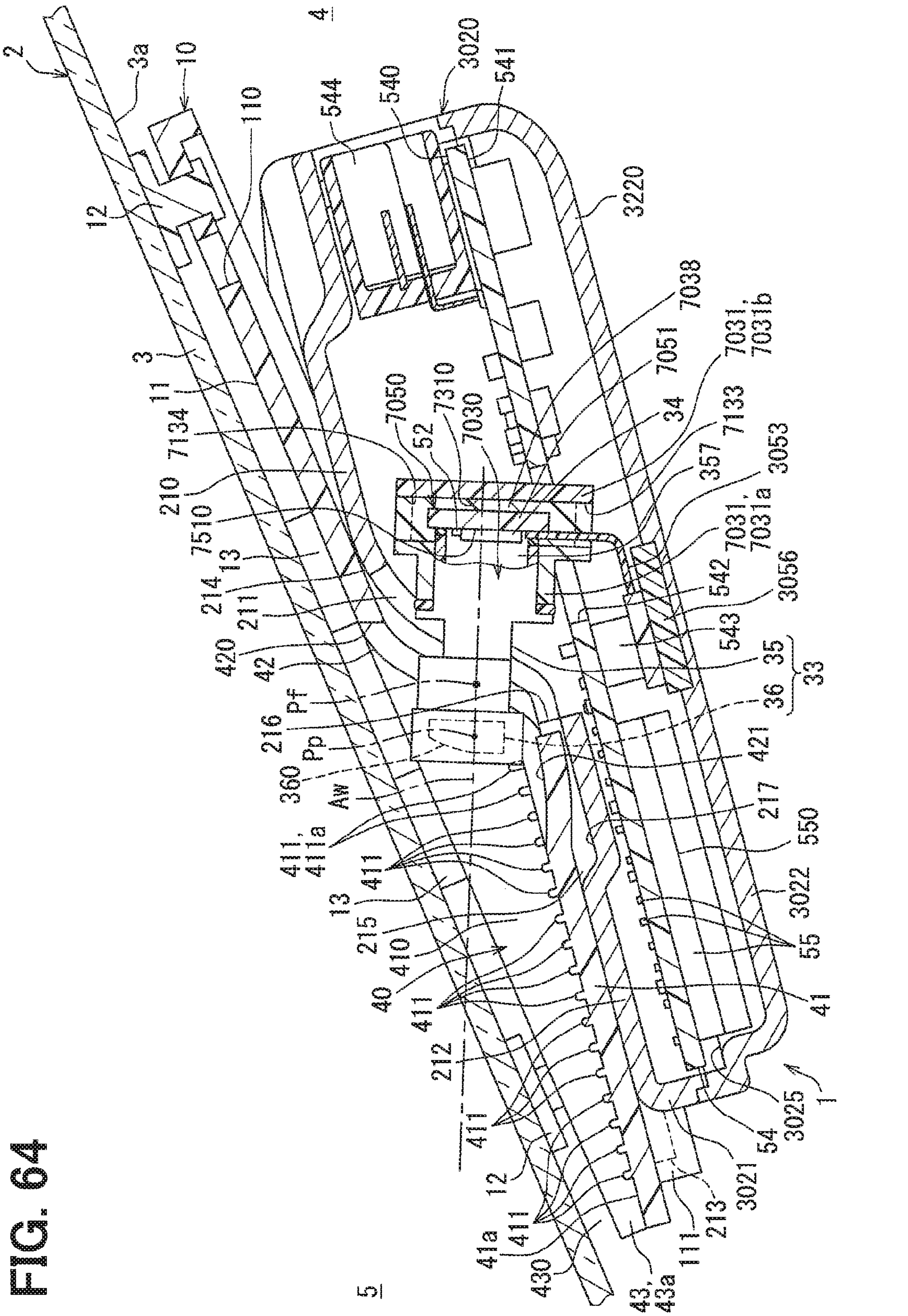
FIG. 64 is a cross-sectional view illustrating a modification of FIG. 18.

In Modification 32 according to the seventh embodiment, as shown in FIG. 64, the FPC 4053 may not be provided, and the relay member 3056 connected to the FPC 3053 may be added in combination with Modification 24 described above. In this case, the FPC 3053 may be connected not only to the imaging board 51 but also to the filler 7038 by at least one of adhesion fixing or conduction fixing.

Figure 65:
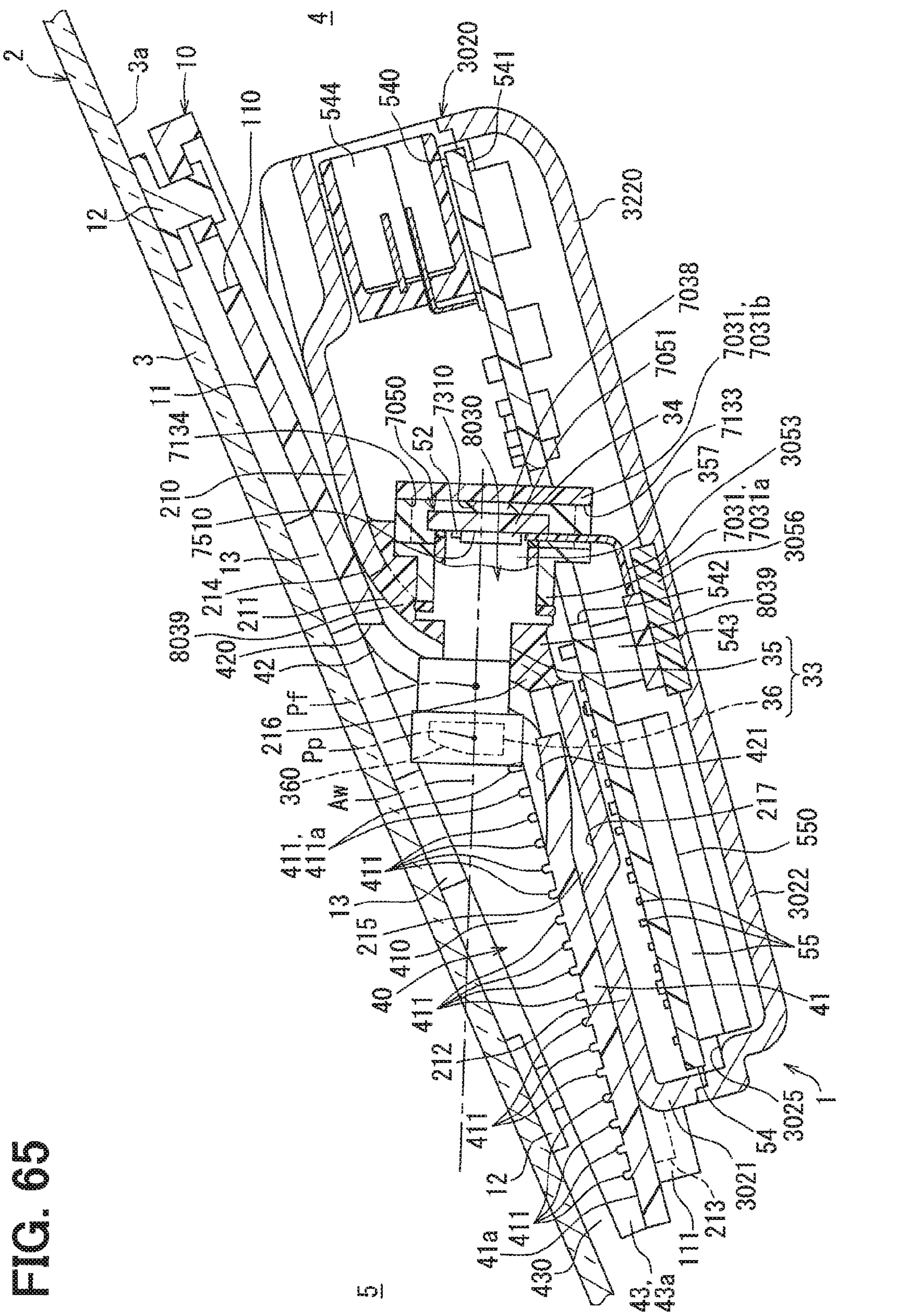
FIG. 65 is a cross-sectional view illustrating one modification of FIG. 19.

In Modification 33 according to the eighth embodiment, as shown in FIG. 65, the FPC 4053 may not be provided. In this case, the relay member 3056 connected to the FPC 3053 may be added or may not be connected by combination with Modification 24 described above. Further, in Modification 33 in which the relay member 3056 is added, the FPC 3053 connected to the imaging board 51 may be connected to the filler 7038 by at least one of adhesion fixing or conduction fixing or may not be connected to the filler 7038.

Figure 66:
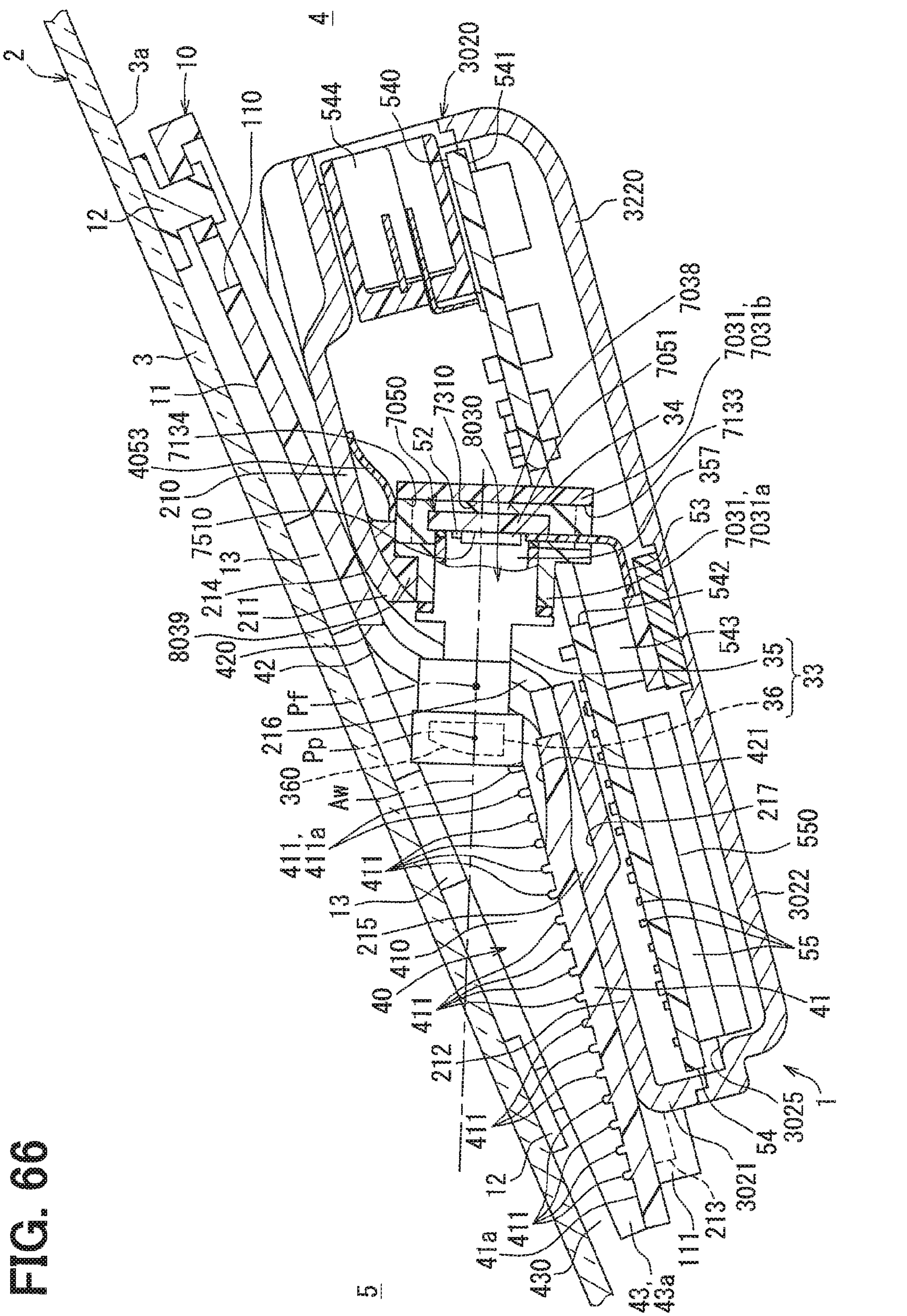
FIG. 66 is a cross-sectional view illustrating another modification of FIG. 19.

In Modification 34 according to the eighth embodiment, a part of or all of the space between the through hole shaped lens window 216 and the lens barrel 35 of the lens unit 33 may not be filled with the adhesive 8039. In a configuration shown in FIG. 66 as a specific example In this case, the space between the lens window 216 and the lens barrel 35 is not filled with the adhesive 8039 at all but is opened.

In Modification 35 according to the eighth embodiment, the adhesive 8039 may be provided between one of the lens unit 33 and the assembly holder 7031 and the camera casing 3020, but may not be provided between the other and the casing 3020. In a configuration shown in FIG. 66 as a specific example of that case, no adhesive 8039 is provided between the lens unit 33 and the camera casing 3020.

In Modification 36 according to the ninth to nineteenth embodiments, the filler 7038 may be added together with the FPC 4053 according to the seventh embodiment. In Modification 37 according to the ninth to nineteenth embodiments, the filler 7038 and the adhesive 8039 may be added together with the FPC 4053 according to the eighth embodiment.

Figure 67:
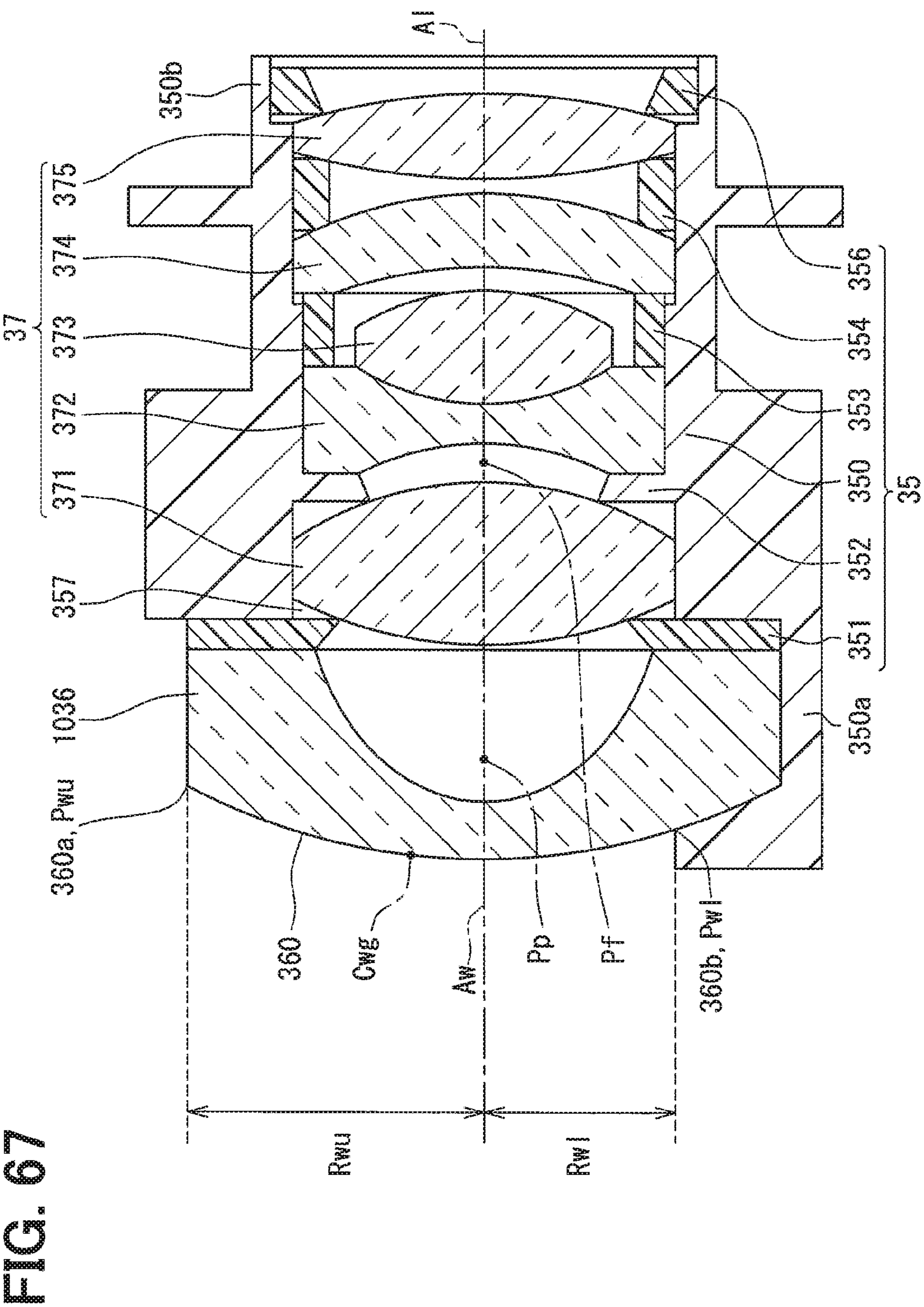
FIG. 67 is a cross-sectional view illustrating a modification of FIG. 9.
Figure 68:
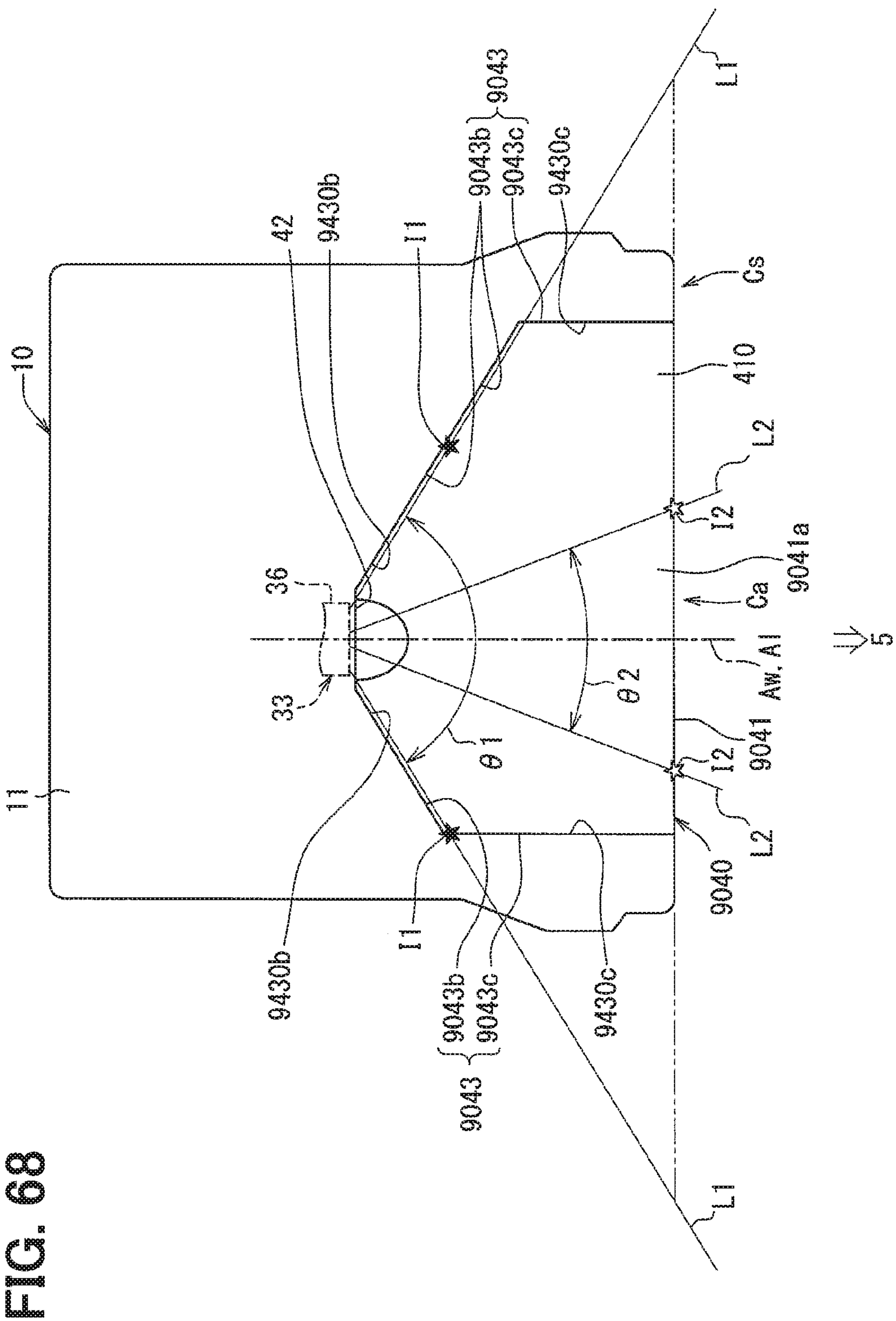
FIG. 68 is a top view illustrating one modification of FIG. 24.

In Modification 38 according to the first to nineteenth embodiments, as shown in FIG. 67, a lower portion of a wide angle lens 1036 having no cut form may be buried in the lens barrel 35 and 2035 in combination with Modification 7 described above. In this way, the wide angle optical surface 360 and 2360 according to the first or second embodiment are configured in a pseudo manner.

In Modification 39 according to the first to nineteenth embodiments, an asymmetric structure may be employed so that the side wall portion 43, 9043, 10043, 11043, 12043, and 18043 is bilaterally asymmetric with the optical axes Aw and Al. In a configuration shown in FIG. 68 as a specific example In this case, the first imaginary intersection I1 is associated with an upper portion of the intermediate portion of the inclined portion 9043*b* on one side. In this way, an asymmetric structure is formed according to the shift amount between the center of the opening window 6*a* and the installation location in the range Xh shown in FIG. 1 or the like.

In Modification 40 according to the first to nineteenth embodiments, at least one side wall portion 43, 9043, 10043, 11043, 12043, and 18043 may be raised upright from the base wall portion 41 and 9041 at an acute angle or obtuse angle. In Modification 41 according to the first to eighth embodiments, the inner wall surface 43*a* of at least one side wall portion 43 may be formed in a curved surface shape or in a bent surface shape.

Figure 69:
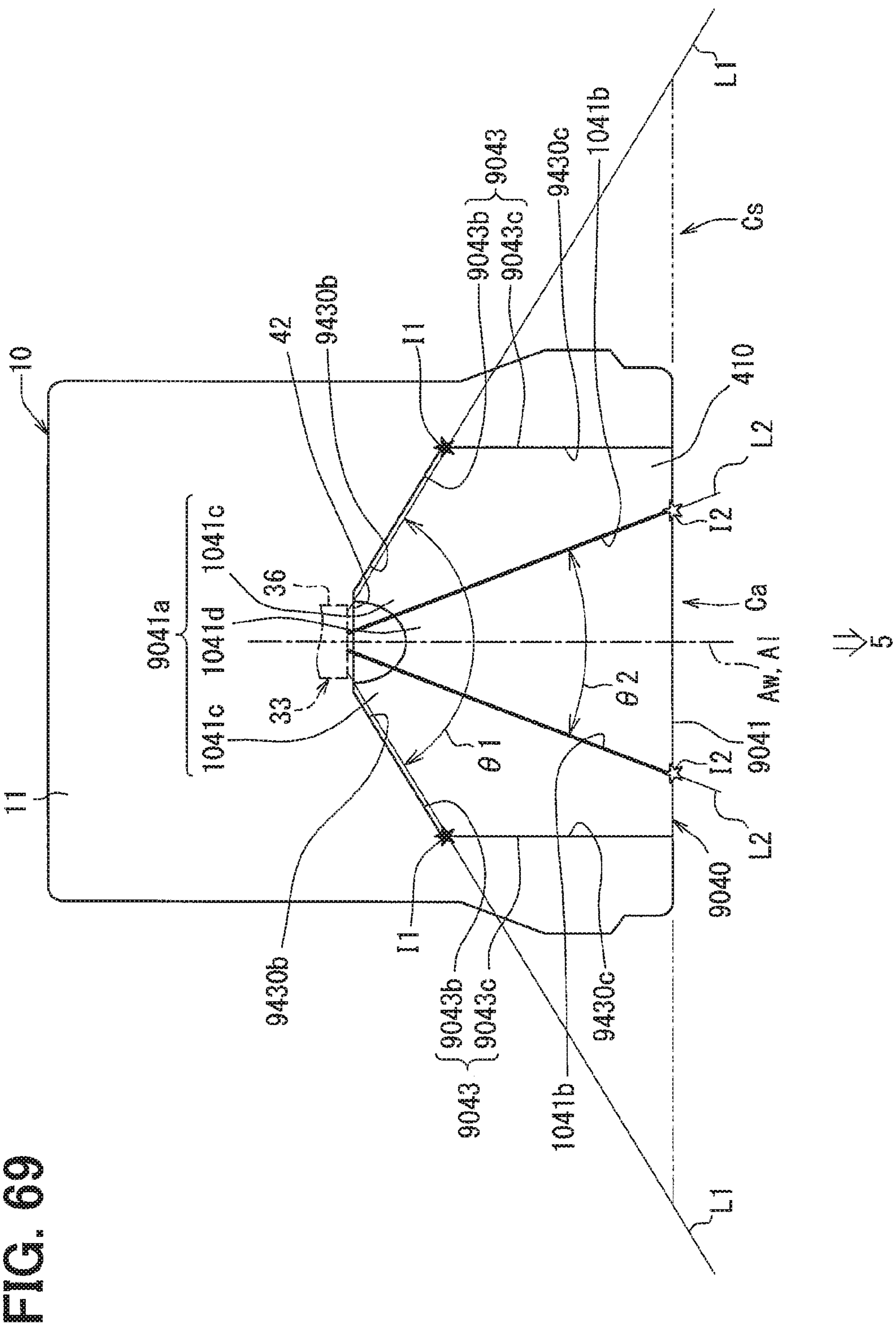
FIG. 69 is a top view illustrating another modification of FIG. 24.
Figure 70:
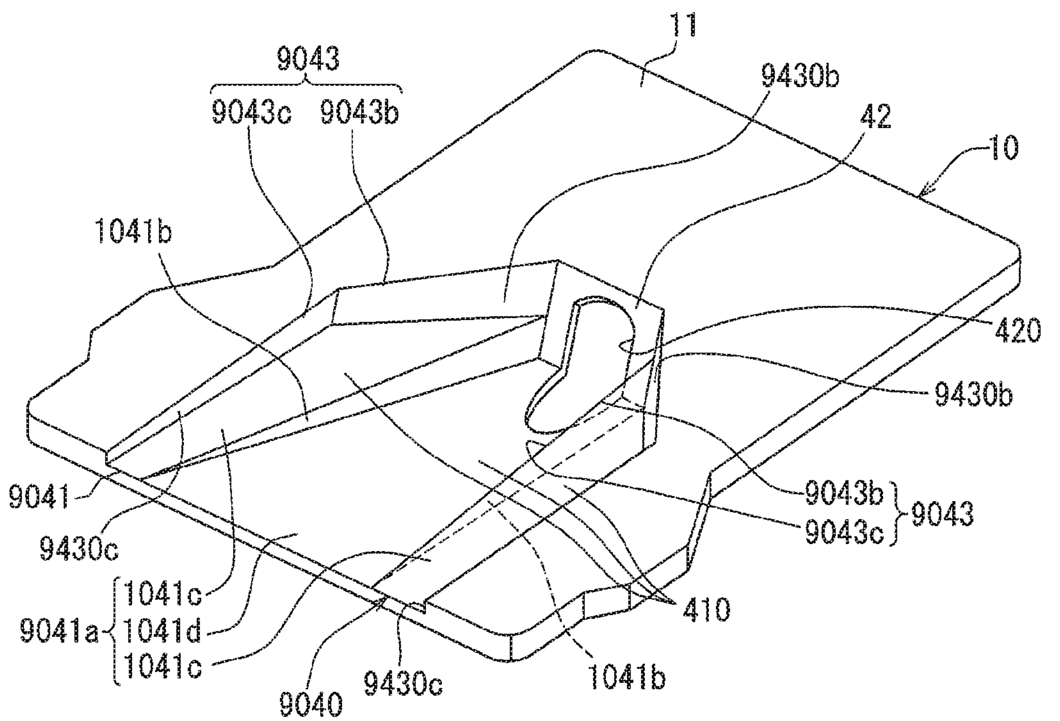
FIG. 70 is a top view illustrating a modification of FIG. 23.

In Modification 42 according to the ninth to the seventeenth embodiments, as shown in FIGS. 69 and 70, in the vehicle 2, stepped portions 1041*b* may be formed in the base wall portion 9041 and 41 so that the second taper angle θ2 is divided along the taper line from the periphery of the lens unit 33 to the second imaginary intersection I2. In this case, in the bottom wall surface 9041*a* and 41*a* of the base wall portion 9041 and 41, outer bottom surfaces 1041*c* are shifted upward from an inner bottom surface 1041*d*. The outer bottom surfaces 1041*c* spread to predetermined outer regions of the stepped portions 1041*b*, respectively. The inner bottom surface 1041*d* spreads entirely inside the stepped portions 1041*b*.

Figure 71:
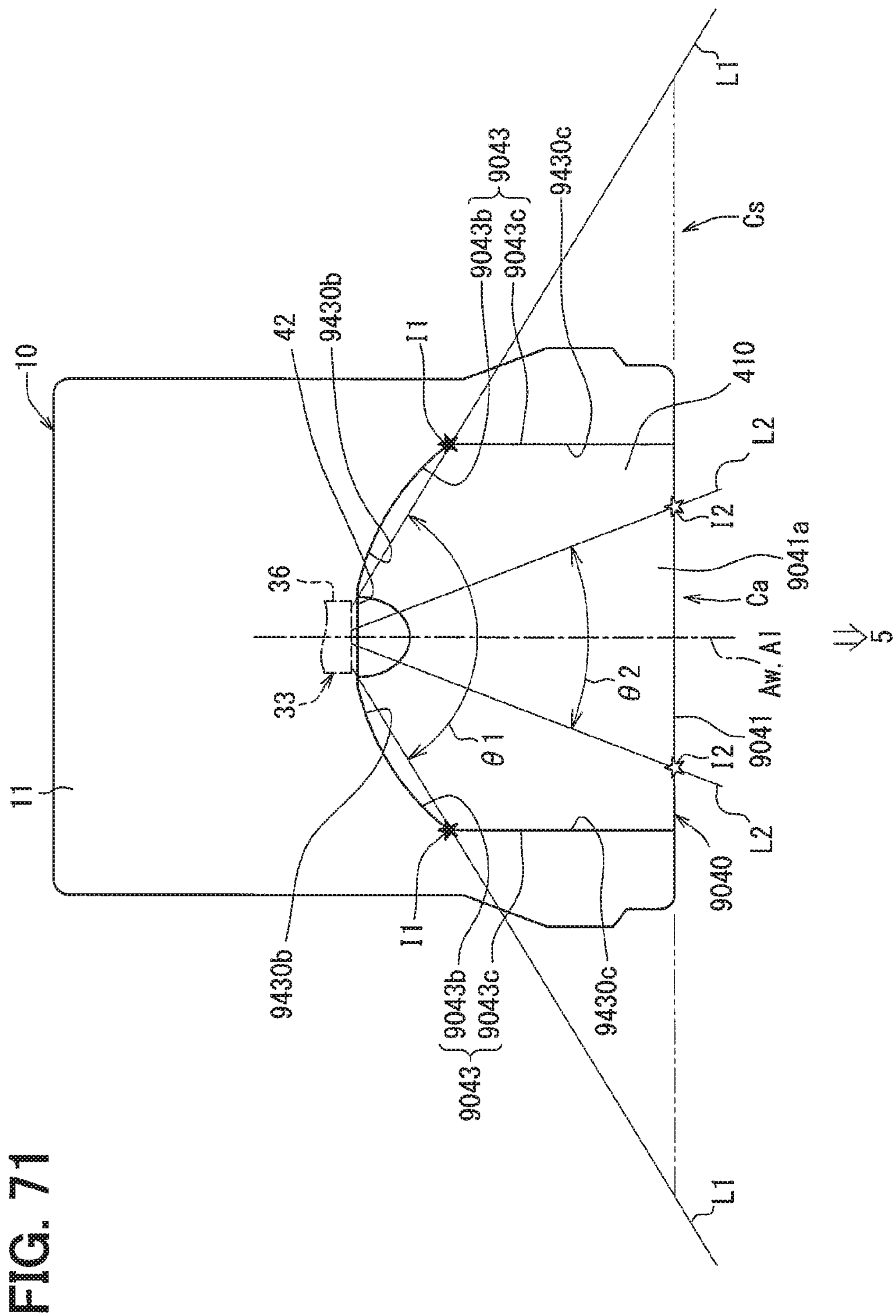
FIG. 71 is a top view illustrating one modification of FIG. 24.

In Modification 43 according to the ninth to nineteenth embodiments, as shown in FIG. 71, the inner wall surface 9430*b* and 18430*b* in the inclined portion 9043*b* and 18043*b* on at least one side may be formed in a curved surface shape or in a bent surface shape. In this case, the inclined portion 9043*b* in Modification 43 according to the ninth to the seventeenth embodiments is formed so as not to enter the inside of the first taper angle θ1 when viewed in the vertical direction, thereby producing a state in which the inclined portion 9043*b* spreads from the periphery of the lens unit 33 toward the first imaginary intersection I1. In this example, FIG. 71 shows a specific example in which the inner wall surfaces 9430*b* are formed in a curved surface shape in the inclined portions 9043*b* on both sides. In Modification 43 according to the eighteenth and nineteenth embodiments, a height avoiding the edges of the lens angle of view θw on the imaginary plane Si is attained by the inclined portions 18043*b* of the inner wall surfaces 18430*b* in the curved surface shape or in the bent surface shape.

Figure 72:
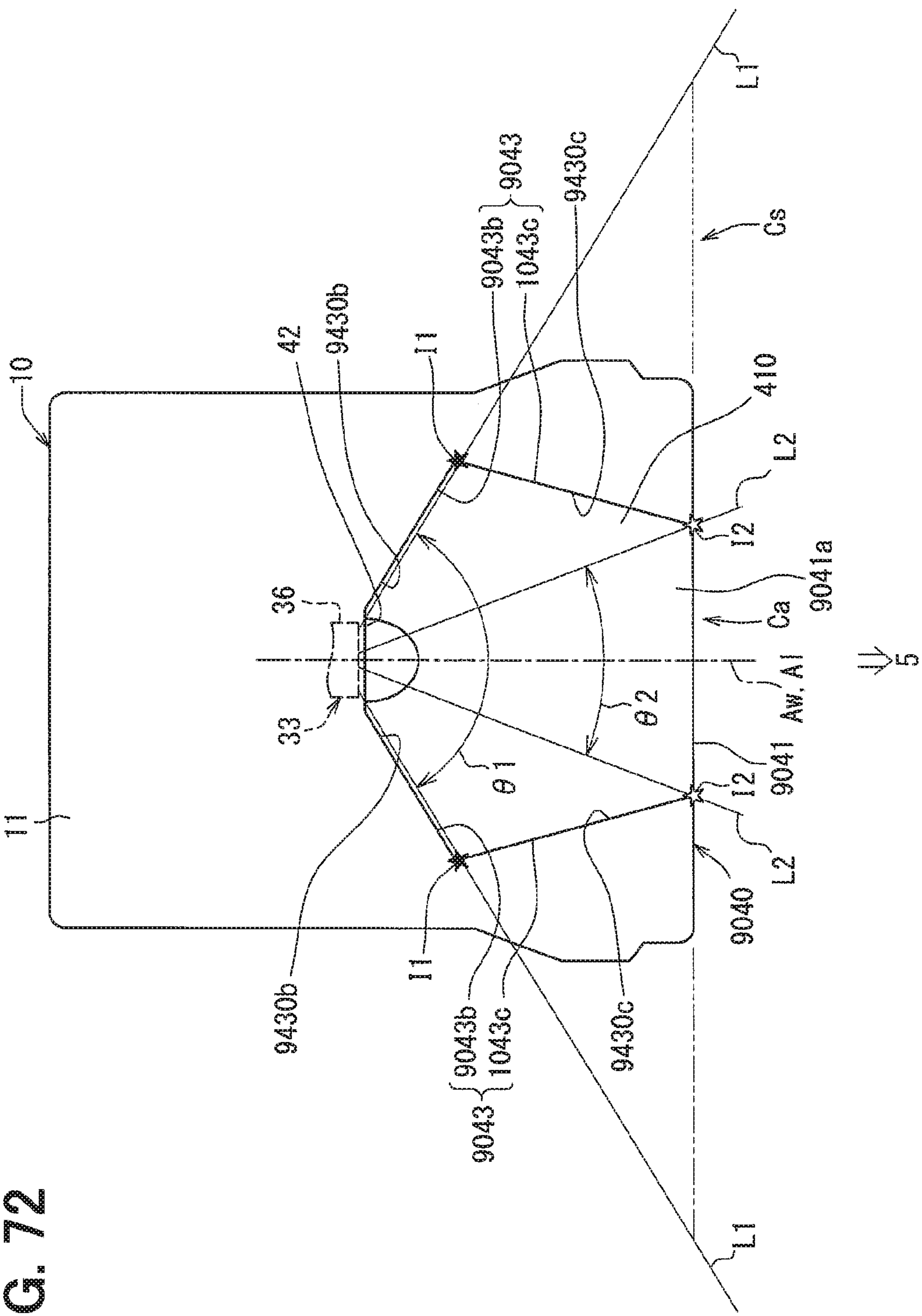
FIG. 72 is a top view illustrating another modification of FIG. 24.

In Modification 44 according to the ninth, eleventh, and fourteenth to nineteenth embodiments, as shown in FIG. 72, instead of the straight portions 9043*c*, 11043*c*, and 18043*c* on at least one side, reverse inclined portions 1043*c* may be formed. Each of the reverse inclined portions 1043*c* has the inner wall surface 9430*c*, 11430*c*, and 18430*c* in a planar shape, in a curved surface shape, or in a bent surface shape and are inclined in a direction opposite to the inclined portions 9043*b* and 18043*b*. In this case, the reverse inclined portions 1043*c* in Modification 44 according to the ninth to the seventeenth embodiments spread to the second imaginary intersection I2 so as not to enter the inside of the second taper angle θ2 when viewed in the vertical direction. FIG. 72 shows a specific example in which the inner wall surfaces 9430*c* in a planar shape are formed on both sides in the reverse inclined portions 1043*c*. Further, in Modification 44 according to the eighteenth and nineteenth embodiments, the reverse inclined portions 1043*c* enable to attain the height that avoids the edges of the lens angle of view θw on the imaginary plane Si.

Figure 73:
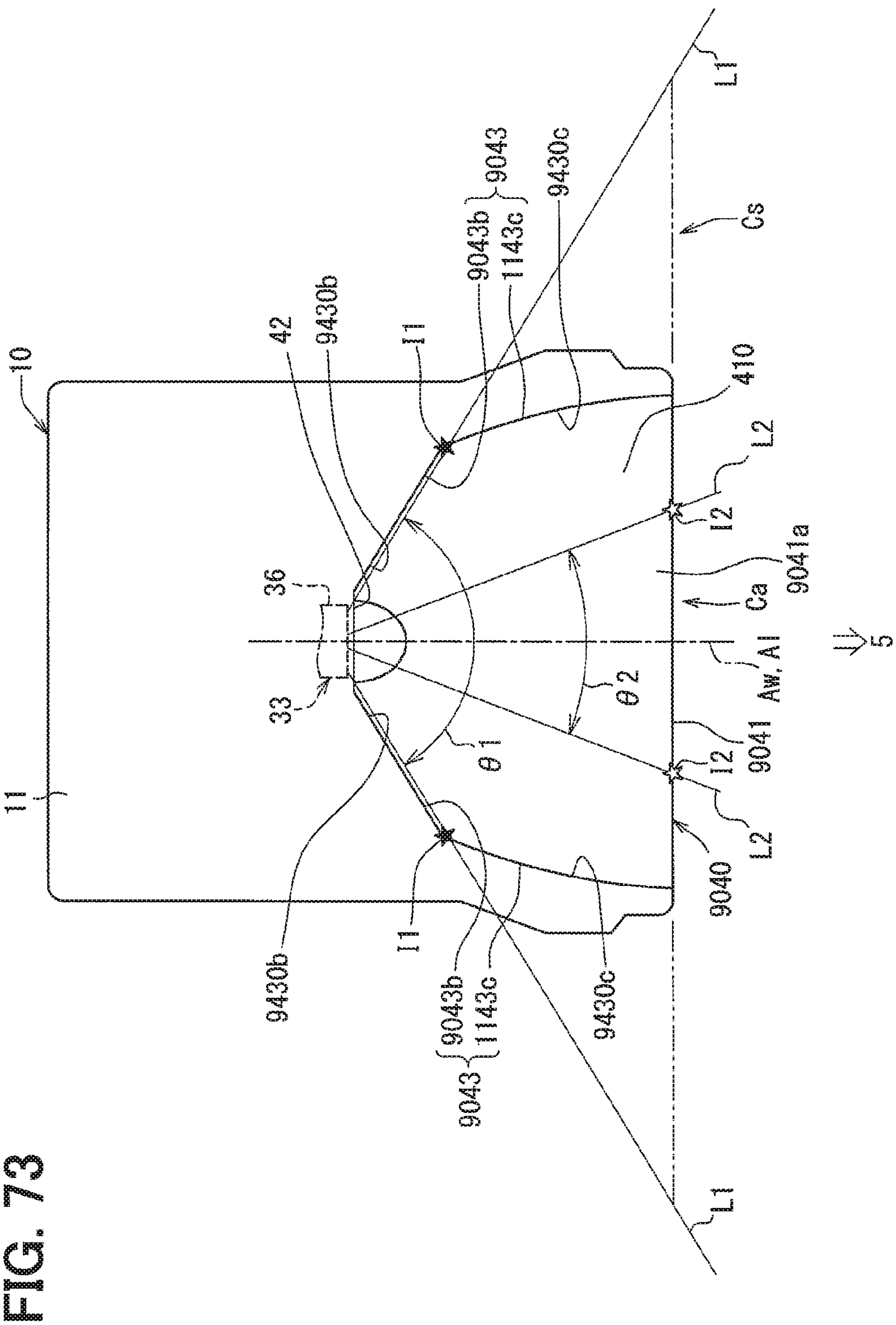
FIG. 73 is a top view illustrating a modification of FIG. 24.
Figure 74:
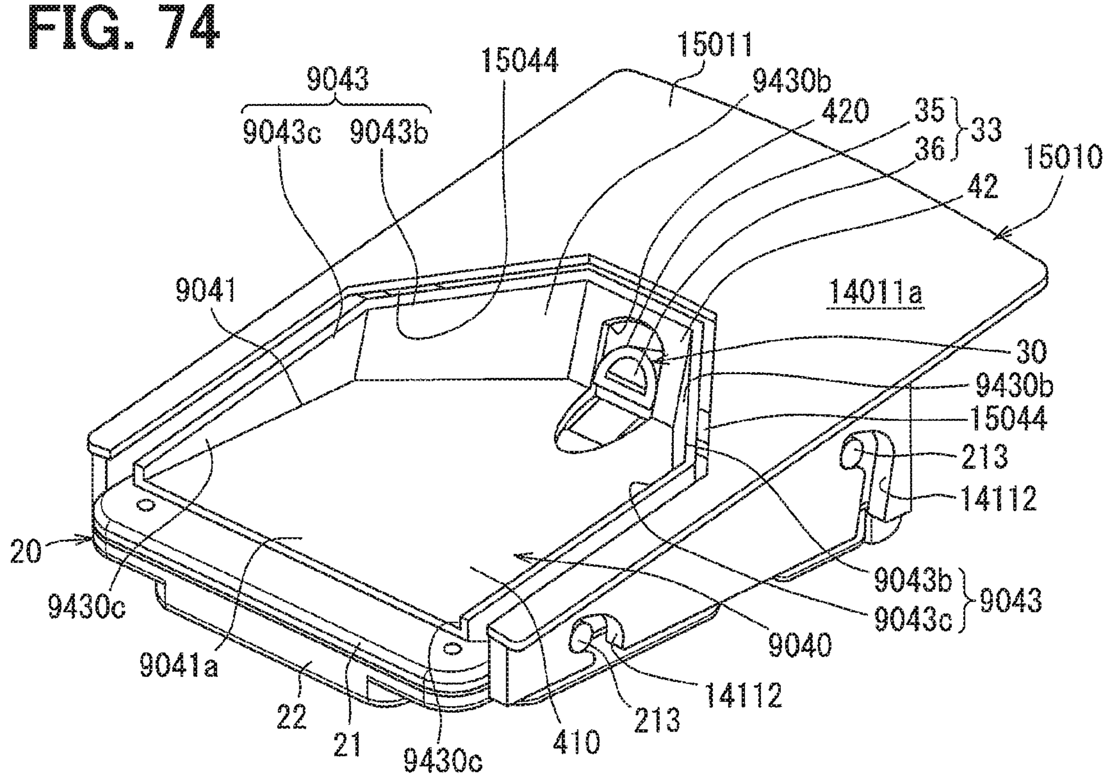
FIG. 74 is a perspective view illustrating a modification of FIG. 40.

In Modification 45 according to the ninth to eleventh and the fourteenth to nineteenth embodiments, as shown in FIG. 73, instead of the straight portion 9043*c*, 11043*c*, and 18043*c* or the inclined portion 10043*c* on at least one side, a curved portion 1143*c* having the inner wall surface 9430*c*, 10430*c*, 11430*c*, and 18430*c* in a curved surface shape or in a bent surface shape may be formed. In this case, the curved portions 1143*c* in Modification 45 according to the ninth to the seventeenth embodiments spread to lateral sides outside the second imaginary intersection I2 so as not to enter the inside of the second taper angle θ2 when viewed in the vertical direction. FIG. 73 shows a specific example in which the inner wall surfaces 9430*c* are formed in a curved surface shape in the curved portions 1143*c* on both sides. Further, in Modification 45 according to the eighteenth and nineteenth embodiments, the curved portions 1143*c* enables to attain the height that avoids the edges of the lens angle of view θw on the imaginary plane Si.

In Modification 46 according to the fourteenth to the seventeenth embodiments, a curved structure may be employed so that the upper surface 14011*a* of the bracket main body 14011 and 15011 is curved so as to conform to the inner surface 3*a* of the front windshield 3. In a configuration shown in FIG. 74 as a specific example, an asymmetric structure is formed according to the shift amount between the center of the opening window 6*a* and the installation location in the range Xh shown in FIG. 1 or the like, so that the heights of the respective side wall portions 9043 are different from each other on the right and left in combination with Modification 39 described above.

In Modification 47 according to the eleventh and fourteenth to nineteenth embodiments, the inclined portion 10043*c* according to the tenth embodiment may be provided in place of the straight portion 11043*c*, 9043*c*, and 18043*c* on at least one side. In this case, in Modification 47 according to the eleventh embodiment, the inclined portion 10043*c* formed of a polarizing filter is provided. In Modification 47 according to the fourteenth to nineteenth embodiments, the inclined portions 10043 formed of the polarizing filter may be provided according to the eleventh embodiment. In Modification 47 according to the eighteenth and nineteenth embodiments, the inclined portion 10043*c*, in which its inclination relative to the optical axes Aw and Al is smaller than the inclined portion 18043*b*, enables to attain the height that avoids the edges of the lens angle of view θw on the imaginary plane Si.

In Modification 48 according to the fourteenth to nineteenth embodiments, the straight portion 11043*c* formed of the polarizing filter according to the eleventh embodiment may be provided instead of the straight portion 9043*c* and 18043*c* on at least one side. In Modification 49 according to the fourteenth, fifteenth, eighteenth and nineteenth embodiments, the side wall portion 9043 and 18043 may be formed in a cut form according to the twelfth embodiment.

In Modification 50 according to the sixteenth and seventeenth embodiments, the side wall portion 9043 and the camera cover 16060 may be formed in a cut form according to the thirteenth embodiment. In Modification 51 according to the eighteenth and nineteenth embodiments, the cut-like camera cover 13060 is provided together with the cut-like side wall portions 18043 in combination with Modification 49 described above, according to the thirteenth embodiment.

In Modification 52 according to the eighteenth and nineteenth embodiments, the bracket assembly 14010 according to the fourteenth embodiment may be provided integrally with the hood 18040 and 19040 instead of the bracket assembly 10. In Modification 53 according to the eighteenth and nineteenth embodiments, the bracket assembly 15010 according to the fifteenth embodiment may be provided separately from the hood 18040 and 19040, in place of the bracket assembly 10. In Modification 54 according to the first to eighth embodiments, the hood 40 and 6040 may not be provided. In Modification 55 according to the first to nineteenth embodiments, multiple grooves are provided so as to extend in the right and left direction in the hood 40, 6040, 9040, 10040, 11040, 12040, 17040, 18040, and 19040. In this case, in Modification 55 according to the first to sixteenth embodiments, the grooves are provided in place of the restriction ribs 411 in combination with Modification 20 described above.

In Modification 56 according to the first to twelfth, fourteenth, eighteenth, and nineteenth embodiments, the camera cover 16060 according to the sixteenth embodiment may be provided. In Modification 57 according to the seventeenth embodiment, the camera cover 16060 may not be provided. In Modification 58 according to the first to sixteenth, eighteenth, and nineteenth embodiments, the assembly holder 31 and 7031 may be modified into a structure conforming to the assembly holder 17031 of the seventeenth embodiment. In Modification 59 according to the first to sixteenth, eighteenth, and nineteenth embodiments, the control board 54 may be modified into a structure conforming to the control board 17054 of the seventeenth embodiment.

In Modification 60 according to the ninth to the seventeenth embodiments, the specific control Cs may be other than the collision avoidance control of the vehicle 2. In Modification 61 according to the ninth to seventeenth embodiments, as long as the other control Ca is different from the specific control Cs, the other control Ca may be other than the driving control of the vehicle 2 in a traveling lane. In Modification 62 according to the ninth to the seventeenth embodiments, the other control Ca may not be executed. In this case, since the second taper angle θ2 is not defined, the second imaginary intersection I2 may not be imaginarily formed. For example, a structure may be employed in which the base wall portion 9041 and 41 is along a predetermined second depression angle ψd2.

In Modification 63 according to the first to nineteenth embodiments, the material of the assembly holder 31, 7031, and 17031 is exemplified by the resin or the like. As the material, a molding material is preferably selected taking the following points into consideration. Specifically, if the assembly holder 31, 7031, and 17031 molded of resin is thermally expanded and deformed by heat from the outside such as sunlight, the imaging may be out of focus. Therefore, the assembly holder 31, 7031, and 17031 are molded of a mixture of a raw material that exerts an action of shrinking when heat is applied to the assembly holder 31, 7031, and 17031 of resin. As the raw material exerting such an action, for example, a negative thermal expansion and contraction filler or the like may be preferably selected. The negative thermal expansion and contraction filler or the like has a negative thermal expansion characteristic in a wide temperature range (up to 800° C.), has a heat resistance hard to decompose even when being treated at a high temperature (800° C.), and uses no heavy metal. As described above, thermal expansion of the assembly holder 31, 7031, and 17031 due to the heat from the outside can be reduced.

In Modification 64 according to the first to nineteenth embodiments, in a case where excess light enters the optical path from the wide angle lens 36 and 2036 to the imager 34, it may be difficult to properly recognize an image. Therefore, it is preferable that the transmittance of light is taken into account for components surrounding the wide angle lens 36 and 2036 so that the excess light does not enter the optical path. Specifically, in addition to the adhesive 8039 as in the eighth embodiment, for example, an adhesive is used for fixing the lens barrel 35, 2035 to the assembly holder 31, 7031, 17031 or the like. In a case where the adhesive for fixing is made of a material curable by UV light, its color tends to turn white after its curing. Therefore, the cured adhesive likely reflects light and likely exerts adversely effect on the image recognition. Therefore, as such an adhesive, for example, a black material having a light transmittance of 2% or less, preferably a material having a transmittance of 0.9% or less is selected, thereby being capable of reducing an influence of light transmitted from a portion using the adhesive.

In Modification 65 according to the first to nineteenth embodiments, since there is a possibility that the imaging is out of focus due to shrinkage at the time of curing the adhesive described in Modification 64, a material having a curing shrinkage rate of 2% or less may be preferably selected. In this example, as the adhesive having a small curing shrinkage rate, for example, a resin containing an oxetane group, a bisphenol type epoxy resin or the like can be considered. As a method of curing such an adhesive, for example, a method using laser irradiation, infrared irradiation, visible light irradiation, high frequency induction heating, electron beam irradiation, hot melt and the like are conceivable.

In Modifications 63 to 65 described above, a material or a method considering the thermal expansion, entrance of the excess light, and curing shrinkage are proposed, but other materials or methods may be employed without limitation to those described above.

In addition to the above, in Modification 66 according to the first to nineteenth embodiments, the camera module 1 may be mounted inside a rear windshield of the vehicle 2, and in this case, a context is reversed in the first to nineteenth embodiments.

The present disclosure further encompasses the following configurations.

An area of the wide angle optical surface above the optical axis is larger in size than that of an area of the wide angle optical surface lower than the optical axis.

A lens unit is configured by a combination of a plurality of lenses. The plurality of lenses includes a wide angle lens which is disposed on an external environment side of an other lens among the plurality of lenses. The wide angle lens has a wide angle optical surface on the external environment side. The wide angle optical surface on an upper side of an optical axis of the rear lens is larger in size than that on a lower side of the optical axis of the rear lens, the optical axis passing through a principal point of the wide angle lens.

A lens unit may be configured by a combination of a plurality of lenses. The plurality of lenses includes a wide angle lens which is disposed on an external environment side of an other lens among the plurality of lenses, which defines a single optical axis thereof. The wide angle lens has a wide angle optical surface on the external environment side. A geometric center of the wide angle optical surface is shifted toward an upper side of the single optical axis of the rear lens. The optical axis passes through a principal point of the wide angle lens.

A circuit unit is configured by combination of an imaging board, on which an imaging circuit to implement image processing on an output from the imager is mounted, with a flexible board connected to the imaging board. A metal camera casing accommodates the circuit unit to enable to release heat of the flexible board.

An imaging circuit to implement image processing on an output from the imager is mounted on an imaging board. A holder defines a space accommodating the imaging board and filled with a filler having a specific property. The specific property is at least one of a thermal radiation property or a conductivity in the space. A metal camera casing accommodates the holder to enable to release heat generated in the imaging board via the filler.

The side wall portion may be formed to spread on an outside of the taper angle and further formed to bend to go through the imaginary intersection. The side wall portion may be formed to spread parallel to the taper angle on an outside of the taper angle. A length of the base wall portion in a vehicle front-rear direction may be longer than a length from the lens unit to the imaginary intersection in a vehicle-rear direction. The base wall portion may extend to a front side of the vehicle relative to the imaginary intersection. The side wall portion may e formed to spread parallel to the taper angle on an outside of the taper angle on the external environment side beyond the imaginary intersection.

The hood includes: a base wall portion to be located to face the windshield across from the external environment; and a pair of side wall portions raised from both vehicle width direction sides of the base wall portion. Under a definition that an imaginary plane imaginarily extends along a horizontal direction and goes through at least a part of a front end surface of the lens unit, the side wall portions are formed at a height to pass under edges of a field of lens angle of view of the lens unit on the imaginary plane. The field of lens angle of view may be a field for recognizing obstacles located in the external environment ahead of the vehicle. An angle between the edges of the field of lens angle of view may be selected from 80-110 degrees.

A wide angle lens is located at a position enabling to capture an image of an outside of the vehicle from an inside of the windshield. A hood is to restrict light, which is from a vehicle interior of the vehicle is reflected on an inside of the windshield, from entering the wide angle lens. The hood includes two side wall portions raised toward the windshield in a state where being mounted to the inside of the windshield. A height of the side wall portions in the vertical direction is a height not to block edges of a field of an angle of view of the wide angle lens on an imaginary plane. The imaginary plane imaginarily extends along a horizontal direction and goes through at least a part of a front end surface of the wide angle lens. The field of lens angle of view may be a field for recognizing obstacles located in the external environment ahead of the vehicle. An angle between the edges of the field of lens angle of view may be selected from 80-110 degrees.

What is claimed is:

1. A camera module configured to be mounted to an inside of a windshield of a vehicle and to image an external environment of the vehicle, the camera module comprising:

a lens unit through which an optical image from the external environment enters;

an imager to image the external environment by forming the optical image thereon through the lens unit;

an imaging board on which an imaging circuit to implement image processing on an output from the imager is mounted;

a holder defining a space accommodating the imaging board and filled with a filler having a specific property, the specific property being at least one of a thermal radiation property or a conductivity in the space; and a metal camera casing accommodating the holder to enable to release heat generated in the imaging board via the filler, wherein the imaging circuit includes a circuit element mounted on the imaging board, both the imager and the imaging board are accommodated in the space of the holder, the holder has a bottom surface therein, the imaging board is entirely accommodated in the space of the holder, the filler surrounds an entirety of a surface of the imaging board that faces the bottom surface of the holder, the filler has an electric conductivity, and the imaging board is electrically connected with the metal camera casing via the filler.

2. The camera module according to claim 1, wherein at least one of the lens unit or the holder accommodated in the metal camera casing is adhered to the metal camera casing with an adhesive, the adhesive being connected to the imaging board and having the specific property.

3. The camera module according to claim 2, wherein the metal camera casing is connected to the imaging board through the adhesive and the filler.

4. The camera module according to claim 1, wherein the lens unit includes a wide angle lens.

5. The camera module according to claim 1, wherein the metal camera casing includes an opposing wall portion having a thermal radiation property and to be located to face the windshield.

6. The camera module according to claim 1, wherein the filler is located between the imaging board and the holder, and the filler is in contact directly with the imaging board and the holder.

7. The camera module according to claim 1, wherein the filler is located between the surface of the imaging board, which is on an opposite side of the imager, and the bottom surface of the holder which faces to the surface of the imaging board.

8. The camera module according to claim 1, wherein the holder is a combination of a tubular member and a bottomed member forming the space.

9. The camera module according to claim 8, wherein the tubular member and the bottomed member are two separate members and are directly connected with each other.

10. The camera module according to claim 1, wherein the filler is entirely accommodated in the space.

11. The camera module according to claim 10, wherein the holder has a bottom wall and a side wall raised from the bottom wall, the space is enclosed with the bottom wall and the side wall, and the space opens on a side facing the bottom wall and surrounded by the side wall.

12. The camera module according to claim 1, wherein the space surrounds sides of the imaging board, the sides of the imaging board positioned between a first face of the imaging board on which the imager is mounted and a second face that is opposite the first face.

13. The camera module according to claim 1, wherein the space comprises a cavity for accommodating the imaging board, and the cavity is filled with the filler.

14. The camera module according to claim 1, wherein the holder comprises a tubular member and a bottom member, which together form the space that accommodates the imaging board.

15. The camera module according to claim 1, wherein an adhesive resides between an entirety of the surface of the imaging board, which is on an opposite side of the imager, and the bottom surface of the holder.

16. The camera module according to claim 1, wherein the holder is a combination of a cylindrical member and a bottomed member, the cylindrical member has an opening end on one side to which the lens unit is inserted, and the cylindrical member has an opening end on an other side that is entirely covered with the bottomed member.

17. The camera module according to claim 1, wherein the imaging board is electrically connected with the casing via the filler and a conductive wire.

18. The camera module according to claim 17, wherein the holder has a though hole, and the conductive wire is electrically connected with the filler with which the through hole is filled.

19. The camera module according to claim 1, wherein the filler contacts the surface of the imaging board that faces the bottom surface of the holder.

20. A camera module configured to be mounted to an inside of a windshield of a vehicle and to image an external environment of the vehicle, the camera module comprising:

a lens unit through which an optical image from the external environment enters;

an imager to image the external environment by forming the optical image thereon through the lens unit;

an imaging board on which an imaging circuit to implement image processing on an output from the imager is mounted;

a holder holding the imaging board; and a metal camera casing accommodating the lens unit and the holder and adhered to at least one of the lens unit or the holder with an adhesive, the adhesive connected to the imaging board and having a specific property, the specific property being an electrical conductivity with which the adhesive is electrically conductive to the imaging board, wherein the holder defines a space accommodating the imaging board, the space is filled with a filler, the adhesive spreads over an outer surface of the filler exposed from the inside of a connection window of the holder, and the imaging board is connected to the adhesive through the filler.

21. The camera module according to claim 20, wherein the metal camera casing has a through hole through which the lens unit is exposed to an outside of the metal camera casing, and the adhesive fills a second space between the through hole and the lens unit.

22. The camera module according to claim 21, wherein the adhesive contacts the through hole and the lens unit.

23. The camera module according to claim 20, wherein the lens unit includes a wide angle lens.

24. The camera module according to claim 20, wherein the metal camera casing includes an opposing wall portion having a thermal radiation property and to be located to face the windshield.

25. The camera module according to claim 20, wherein the metal camera casing is connected with the imaging board via the adhesive and a flexible board.

26. The camera module according to claim 20, wherein the metal camera casing is connected with the imaging board via the adhesive and the filler, and the filler is located between the imaging board and the holder.

27. A camera module configured to be mounted to an inside of a windshield of a vehicle and to image an external environment of the vehicle, the camera module comprising:

a lens unit through which an optical image from the external environment enters;

an imager to image the external environment by forming the optical image thereon through the lens unit;

an imaging board on which an imaging circuit to implement image processing on an output from the imager is mounted;

a holder holding the imaging board; and a metal camera casing accommodating the lens unit and the holder and adhered to at least one of the lens unit or the holder with an adhesive, the adhesive connected to the imaging board and having a specific property, the specific property being at least one of a thermal radiation property or a conductivity, wherein the adhesive extends continuously from a portion between the lens unit and a bent wall portion of the metal camera casing to a portion between the holder and the bent wall portion.

28. A camera module configured to be mounted to an inside of a windshield of a vehicle and to image an external environment of the vehicle, the camera module comprising:

a lens unit through which an optical image from the external environment enters;

an imager to image the external environment by forming the optical image thereon through the lens unit;

an imaging board on which an imaging circuit to implement image processing on an output from the imager is mounted;

a holder holding the imaging board; and a metal camera casing accommodating the lens unit and the holder and adhered to at least one of the lens unit or the holder with an adhesive, the adhesive connected to the imaging board and having a specific property, the specific property being at least one of a thermal radiation property or a conductivity, wherein the metal camera casing has a through hole through which the lens unit is exposed to an outside of the metal camera casing, the metal camera casing has a periphery of the through hole, and the adhesive fills a space between the periphery of the through hole and the lens unit and contacts the periphery of the through hole and the lens unit.

29. The camera module according to claim 28, wherein the adhesive contacts the through hole and the lens unit.

30. A camera module configured to be mounted to an inside of a windshield of a vehicle and to image an external environment of the vehicle, the camera module comprising:

a lens unit through which an optical image from the external environment enters;

an imager to image the external environment by forming the optical image thereon through the lens unit;

an imaging board on which an imaging circuit to implement image processing on an output from the imager is mounted;

a holder holding the imaging board; and a metal camera casing accommodating the lens unit and the holder and adhered to at least one of the lens unit or the holder with an adhesive, the adhesive connected to the imaging board and having a specific property, the specific property being at least one of a thermal radiation property or a conductivity, wherein the metal camera casing has a through hole through which the lens unit is exposed to an outside of the metal camera casing, and the adhesive contacts the through hole and the lens unit.

31. A camera module configured to be mounted to an inside of a windshield of a vehicle and to image an external environment of the vehicle, the camera module comprising:

a lens unit through which an optical image from the external environment enters;

an imager to image the external environment by forming the optical image thereon through the lens unit;

an imaging board on which an imaging circuit to implement image processing on an output from the imager is mounted;

a holder defining a space accommodating the imaging board and filled with a filler having a specific property, the specific property being at least one of a thermal radiation property or a conductivity in the space;

a metal camera casing accommodating the holder to enable to release heat generated in the imaging board via the filler; and a flexible board (FPC) connected to the imaging board within the holder on a side of the imaging board that faces the lens unit, wherein the imaging circuit includes a circuit element mounted on the imaging board, both the imager and the imaging board are accommodated in the space of the holder, the holder has a bottom surface therein, the imaging board is entirely accommodated in the space of the holder, the filler surrounds an entirety of a surface of the imaging board that faces the bottom surface of the holder, the holder comprises a connection window through which the FPC passes therethrough, the connection window is filled with the filler, the filler has an electric conductivity, and the imaging board is electrically connected with the metal camera casing via the filler.

32. The camera module according to claim 31, wherein the imaging board is electrically connected with the casing via the filler and the FPC.

33. The camera module according to claim 32, wherein the FPC is electrically connected with the filler with which the connection window is filled.

* * * * *